(12) United States Patent
Jang et al.

(10) Patent No.: US 12,074,822 B2
(45) Date of Patent: Aug. 27, 2024

(54) METHOD AND APPARATUS FOR REPORTING CHANNEL STATE INFORMATION THROUGH REPEATED UPLINK DATA TRANSMISSION IN NETWORK COOPERATIVE COMMUNICATION

(71) Applicant: Samsung Electronics Co., Ltd., Suwon-si (KR)

(72) Inventors: Youngrok Jang, Suwon-si (KR); Seongmok Lim, Suwon-si (KR); Taehan Bae, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 17/592,252

(22) Filed: Feb. 3, 2022

(65) Prior Publication Data
US 2022/0255700 A1    Aug. 11, 2022

(30) Foreign Application Priority Data

Feb. 3, 2021 (KR) .......... 10-2021-0015625
Mar. 9, 2021 (KR) .......... 10-2021-0030851
Apr. 15, 2021 (KR) .......... 10-2021-0049435

(51) Int. Cl.
H04L 5/00    (2006.01)
(52) U.S. Cl.
CPC .................. H04L 5/0053 (2013.01)
(58) Field of Classification Search
CPC ................................ H04L 5/0053
USPC .................................................. 370/329
See application file for complete search history.

(56) References Cited

U.S. PATENT DOCUMENTS

| | | | | |
|---|---|---|---|---|
| 2017/0331602 A1* | 11/2017 | Hugl | ........ | H04W 72/1268 |
| 2019/0239253 A1* | 8/2019 | Tomeba | ........ | H04W 74/006 |
| 2020/0177254 A1* | 6/2020 | Lee | ........ | H04W 76/27 |
| 2020/0314844 A1* | 10/2020 | Tomeba | ........ | H04W 88/10 |
| 2022/0329308 A1* | 10/2022 | Huang | ........ | H04L 5/1461 |

FOREIGN PATENT DOCUMENTS

EP    3780476 B1 * 11/2023 ........... H04L 5/0048
WO    2020029782 A1    2/2020

OTHER PUBLICATIONS

International Search Report and Written Opinion of the International Searching Authority dated May 3, 2022, in connection with International Application No. PCT/KR2022/001712, 7 pages.

(Continued)

*Primary Examiner* — Anthony Mejia

(57) ABSTRACT

The disclosure relates to a communication technique for convergence between an IoT technology and a 5G communication system for supporting a higher data transmission rate than a 4G system, and a system thereof. The disclosure may be applied to intelligence services (for example, smart homes, smart buildings, smart cities, smart cars or connected cars, healthcare, digital education, retail businesses, security and safety related services, etc.) based on a 5G communication technology and an IoT-related technology. The disclosure provides a coverage improvement method for a PDCCH in a wireless communication system.

20 Claims, 29 Drawing Sheets

(56) References Cited

OTHER PUBLICATIONS

3GPP TS 38.214 V16.4.0 (Dec. 2020), Technical Specification, 3rd Generation Partnership Project; Technical Specification Group Radio Access Network; NR; Physical layer procedures for data (Release 16), Dec. 2020, 169 pages.

CATT, "Discussion on enhancements on multi-TRP/panel for PDCCH, PUCCH and PUSCH," R1-2007825, 3GPP TSG RAN WG1 Meeting #103-e, e-Meeting, Oct. 26-Nov. 13, 2020, 15 pages.

LG Electronics, "Enhancements on Multi-TRP for PDCCH, PUCCH and PUSCH," R1-2008574, 3GPP TSG RAN WG1 #103-e, e-Meeting, Oct. 26-Nov. 13, 2020, 7 pages.

ZTE, "Multi-TRP enhancements for PDCCH, PUCCH and PUSCH," R1-2007764, 3GPP TSG RAN WG1 Meeting #103-e, e-Meeting, Oct. 26-Nov. 13, 2020, 22 pages.

Supplementary European Search Report dated May 15, 2024, in connection with European Patent Application No. 22750021.2, 13 pages.

CATT, "Remaining issues on PUSCH enhancements," R1-2002084, 3GPP TSG RAN WG1 #100bis, e-Meeting, Apr. 10-30, 2020, 19 pages.

Ericsson, "Remaining Issue of PUSCH Enhancements for NR URLLC," R1-2001786, 3GPP TSG-RAN WG1 Meeting #100bis, e-Meeting, Apr. 20-30, 2020, 12 pages.

Qualcomm Incorporated, "Enhancements on Multi-TRP for PDCCH, PUCCH and PUSCH," R1-2101447, 3GPP TSG-RAN WG1 Meeting #104-e, e-Meeting, Jan. 25-Feb. 5, 2021, 28 pages.

Samsung, "Remaining issues for PUSCH enhancement," R1-2003867, 3GPP TSG RAN WG1 #101, e-Meeting, May 25-Jun. 5, 2020, 3 pages.

Moderator (VIVO), "Email discussion #01 for remaining issues on URLLC enhanced configured grant transmission," R1-2007178, 3GPP TSG RAN WG1 #102-e, e-Meeting, Aug. 17-28, 2020, 14 pages.

* cited by examiner

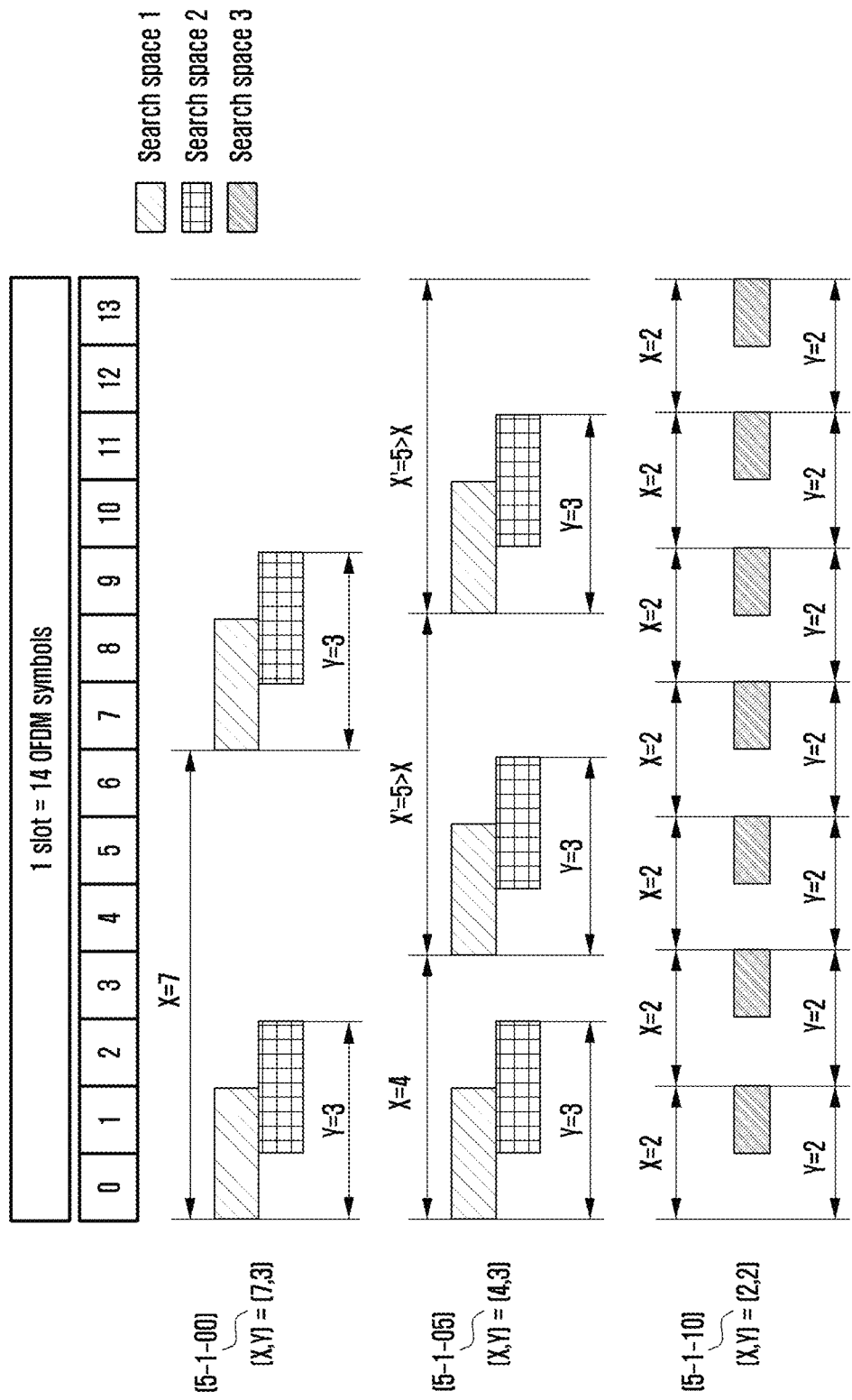

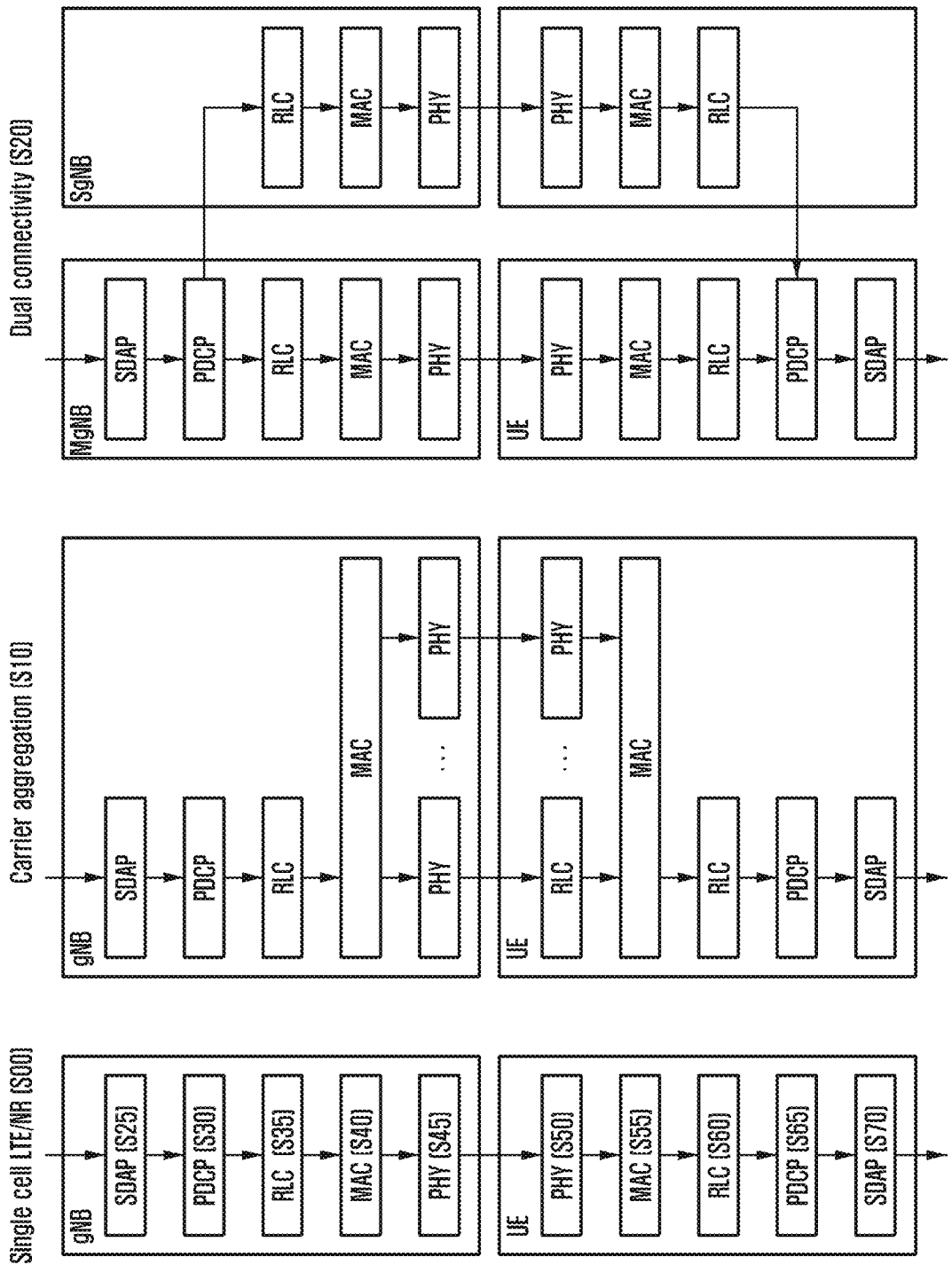

METHOD AND APPARATUS FOR REPORTING CHANNEL STATE INFORMATION THROUGH REPEATED UPLINK DATA TRANSMISSION IN NETWORK COOPERATIVE COMMUNICATION

CROSS-REFERENCE TO RELATED APPLICATIONS

This application is based on and claims priority under 35 U.S.C. § 119 to Korean Patent Application Nos. 10-2021-0015625, 10-2021-0030851, and 10-2021-0049435 filed on Feb. 3, 2021, Mar. 9, 2021, and Apr. 15, 2021, in the Korean Intellectual Property Office, the disclosures of which are herein incorporated by reference in their entirety.

BACKGROUND

1. Field

The disclosure relates to an operation of a terminal and a base station in a wireless communication system. Specifically, the disclosure relates to a method for reporting channel state information through repeated uplink data transmission in network cooperative communication, and an apparatus capable of performing the method in a wireless communication system.

2. Description of Related Art

To meet the demand for wireless data traffic having explosively increased since deployment of 4G communication systems and increases of multimedia services, efforts have been made to develop an improved 5G or pre-5G communication system. Therefore, the 5G or pre-5G communication system is also called a "Beyond 4G Network" communication system or a "Post LTE" system. The 5G communication system is considered to be implemented in ultra-higher frequency (mmWave) bands (e.g., 60 GHz bands) so as to increase data rates. To decrease propagation loss of the radio waves and increase the transmission distance in the ultra-higher frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

With the advance of wireless communication systems as described above, various services can be provided, and accordingly there is a need for schemes to smoothly provide these services.

The above information is presented as background information only to assist with an understanding of the disclosure. No determination has been made, and no assertion is made, as to whether any of the above might be applicable as prior art with regard to the disclosure.

SUMMARY

An embodiment disclosed herein is to provide a device and a method for effectively providing a service in a mobile communication system.

In accordance with an aspect of the disclosure, a method performed by a terminal in a communication system is provided. The method includes receiving, from a base station, configuration of a physical uplink shared channel (PUSCH) repetition type B; receiving, from the base station, downlink control information (DCI) scheduling an aperiodic channel state information (CSI) report or activating a semi-persistent CSI report on a PUSCH, the DCI including a first sounding reference signal (SRS) resource indicator field associated with a first SRS resource set and a second SRS resource indicator field associate with a second SRS resource set; identifying nominal repetitions and actual repetitions for the PUSCH according to the PUSCH repetition type B; transmitting, to the base station, a CSI report on the PUSCH according to the PUSCH repetition type B, wherein, in case that the PUSCH is transmitted with a transport block, the CSI report is transmitted on a first actual repetition associated with the SRS resource set and a first actual repetition associated with the second SRS resource set, in response to the first actual repetition associated with the first SRS resource set and the first actual repetition associated with the second SRS resource set having same number of symbols.

In accordance with another aspect of the disclosure, a method performed by a base station in a communication system is provided. The method includes transmitting, to a terminal, configuration of a physical uplink shared channel (PUSCH) repetition type B; transmitting, to the terminal, downlink control information (DCI) scheduling an aperiodic channel state information (CSI) report or activating a semi-persistent CSI report on a PUSCH, the DCI including a first sounding reference signal (SRS) resource indicator field associated with a first SRS resource set and a second SRS resource indicator field associate with a second SRS resource set; and receiving, from the terminal, a CSI report on the PUSCH according to the PUSCH repetition type B, wherein, in case that the PUSCH is received with a transport block, the CSI report is received on a first actual repetition associated with the SRS resource set and a first actual repetition associated with the second SRS resource set, in response to the first actual repetition associated with the first SRS resource set and the first actual repetition associated with the second SRS resource set having same number of symbols.

In accordance with another aspect of the disclosure, a terminal in a communication system is provided. The terminal includes a transceiver; and a controller configured to: receive, from a base station, configuration of a physical uplink shared channel (PUSCH) repetition type B; receive, from the base station, downlink control information (DCI) scheduling an aperiodic channel state information (CSI) report or activating a semi-persistent CSI report on a PUSCH, the DCI including a first sounding reference signal (SRS) resource indicator field associated with a first SRS resource set and a second SRS resource indicator field associate with a second SRS resource set; identify nominal repetitions and actual repetitions for the PUSCH according to the PUSCH repetition type B; and transmit, to the base station, a CSI report on the PUSCH according to the PUSCH repetition type B, wherein, in case that the PUSCH is transmitted with a transport block, the CSI report is transmitted on a first actual repetition associated with the SRS resource set and a first actual repetition associated with the second SRS resource set, in response to the first actual repetition associated with the first SRS resource set and the first actual repetition associated with the second SRS resource set having same number of symbols.

In accordance with another aspect of the disclosure, a base station in a communication system in provided. The base station includes a transceiver; and a controller configured to: transmit, to a terminal, configuration of a physical uplink shared channel (PUSCH) repetition type B; transmit, to the terminal, downlink control information (DCI) scheduling an aperiodic channel state information (CSI) report or activating a semi-persistent CSI report on a PUSCH, the DCI including a first sounding reference signal (SRS) resource indicator field associated with a first SRS resource set and a second SRS resource indicator field associate with a second SRS resource set; and receive, from the terminal, a CSI report on the PUSCH according to the PUSCH repetition type B, wherein, in case that the PUSCH is received with a transport block, the CSI report is received on a first actual repetition associated with the SRS resource set and a first actual repetition associated with the second SRS resource set, in response to the first actual repetition associated with the first SRS resource set and the first actual repetition associated with the second SRS resource set having same number of symbols.

Other aspects, advantages, and salient features of the disclosure will become apparent to those skilled in the art from the following detailed description, which, taken in conjunction with the annexed drawings, discloses various embodiments of the disclosure.

An embodiment disclosed herein provides a device and a method for effectively providing a service in a mobile communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5B illustrates, through a span, a case where a terminal may have multiple PDCCH monitoring occasions in a slot in a wireless communication system according to an embodiment of the disclosure;

FIG. 17 illustrates a radio protocol structure of a base station and a terminal in single cell, carrier aggregation, and dual connectivity cases in a wireless communication system according to an embodiment of the disclosure;

DETAILED DESCRIPTION

Figure 1:
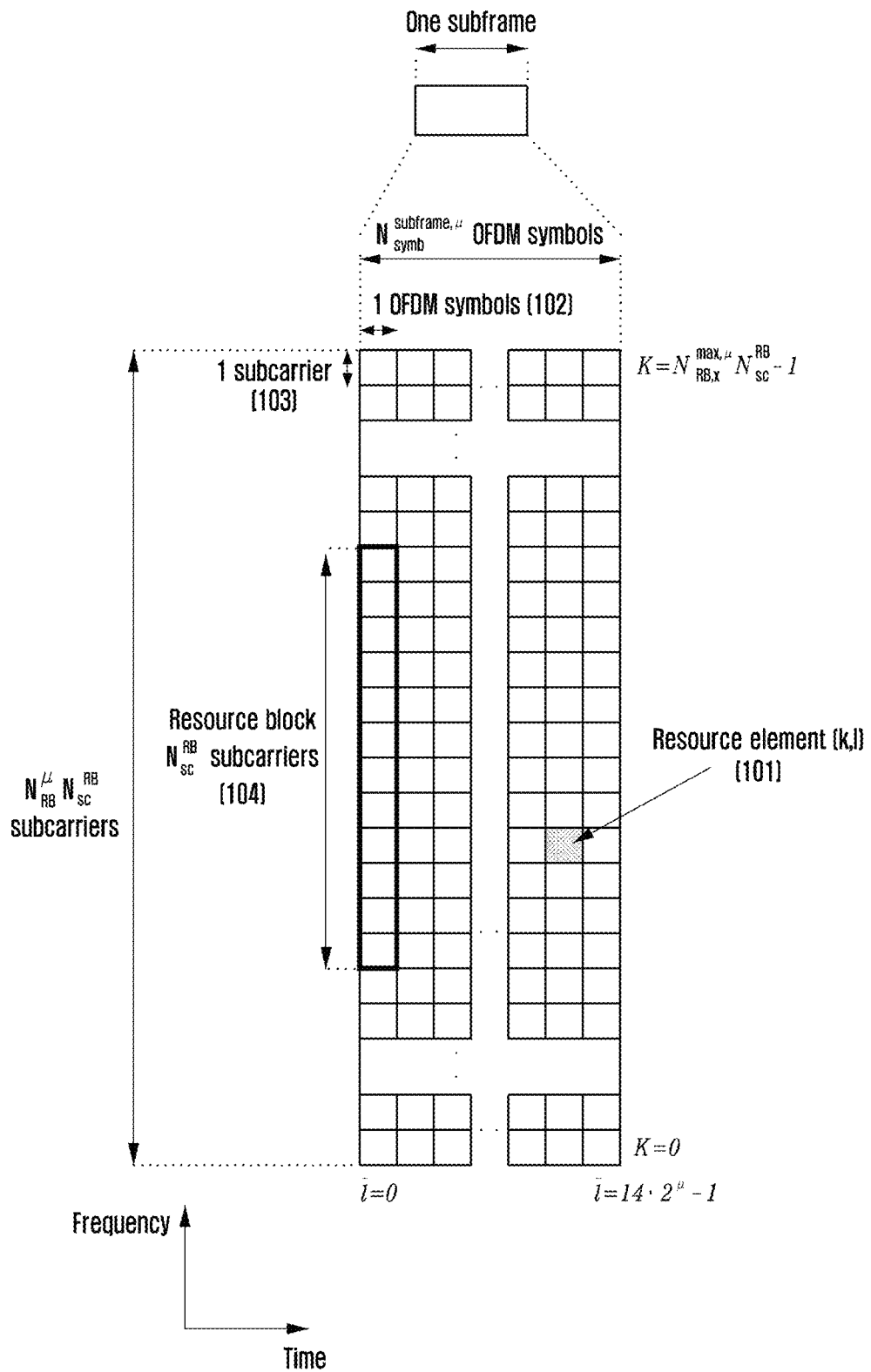
FIG. 1 illustrates a basic structure of a time-frequency domain in a wireless communication system according to an embodiment of the disclosure.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

For the same reason, in the accompanying drawings, some elements may be exaggerated, omitted, or schematically illustrated. Further, the size of each element does not completely reflect the actual size. In the drawings, identical or corresponding elements are provided with identical reference numerals. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit," or divided into a larger number of elements, or a "unit." Moreover, the elements and "units" or may be implemented to reproduce one or more CPUs within a device or a security multimedia card. Further, the "unit" in the embodiments may include one or more processors.

Wireless communication systems have expanded beyond the original role of providing a voice-oriented service and have evolved into wideband wireless communication systems that provide a high-speed and high-quality packet data service according to, for example, communication standards such as high-speed packet access (HSPA), long-term evolution (LTE or evolved universal terrestrial radio access (E-UTRA)), LTE-Advanced (LTE-A), and LTE-Pro of 3GPP, high-rate packet data (HRPD) and a ultra-mobile broadband (UMB) of 3GPP2, and 802.16e of IEEE.

As a representative example of the broadband wireless communication systems, in the LTE system, an orthogonal frequency-division multiplexing (OFDM) scheme has been adopted for a downlink (DL), and a single carrier frequency division multiple access (SC-FDMA) scheme has been adopted for an uplink (UL). The uplink indicates a radio link through which data or a control signal is transmitted from a terminal (a user equipment (UE) or a mobile station (MS)) to a base station (an eNode B, or a base station (BS)), and the downlink indicates a radio link through which data or a control signal is transmitted from a base station to a terminal. In the above-mentioned multiple-access scheme, normally, data or control information is distinguished according to a user by assigning or managing time-frequency resources for carrying data or control information of each user, wherein the time-frequency resources do not overlap, that is, orthogonality is established.

A future communication system subsequent to the LTE, that is, a 5G communication system, has to be able to freely reflect various requirements from a user, a service provider, and the like, and thus service satisfying all of the various requirements needs to be supported. The services considered for the 5G communication system include enhanced mobile broadband (eMBB), massive machine-type communication (mMTC), ultra-reliable low-latency communication (URLLC), etc.

eMBB aims to provide a data rate superior to the data rate supported by the existing LTE, LTE-A, or LTE-Pro. For example, in the 5G communication system, eMBB may be able to provide a peak data rate of 20 Gbps in the downlink and a peak data rate of 10 Gbps in the uplink from the viewpoint of one base station. In addition, the 5G communication system may be able to provide not only the peak data rate but also an increased user-perceived terminal data rate. In order to satisfy such requirements, improvement of various transmitting and receiving technologies including a further improved multi-input multi-output (MIMO) transmission technology may be required. In addition, a signal is transmitted using a transmission bandwidth of up to 20 MHz in the 2 GHz band used by the current LTE, but the 5G communication system uses a bandwidth wider than 20 MHz in the frequency band of 3 to 6 GHz or 6 GHz or higher, thereby satisfying the data rate required in the 5G communication system.

In addition, mMTC is being considered to support application services such as the Internet of Things (IoT) in the 5G communication system. mMTC is required to support access by a large number of terminals in a cell, enhance coverage of a terminal, improve a battery time, and reduce costs of a terminal in order to efficiently provide the IoT. The IoT needs to be able to support a large number of terminals (for example, 1,000,000 terminals/km$^2$) in a cell because the IoT is attached to various sensors and devices to provide communication functions. Furthermore, the terminal supporting mMTC is more likely to be located in a shaded area that is not covered by the cell due to the nature of services, such as a basement of a building, and thus, the terminal may require wider coverage than other services provided in the 5G communication system. The terminal supporting mMTC needs to be configured as an inexpensive terminal and may require a very long battery lifetime of 10 to 15 years, because it is difficult to frequently replace the battery of the terminal.

Finally, URLLC is a cellular-based wireless communication service used for mission-critical purposes. For example, services used for remote control for a robot or machinery, industrial automation, an unmanned aerial vehicle, remote health care, an emergency alert, or the like, may be considered. Accordingly, the communication provided by URLLC needs to provide very low latency and very high reliability. For example, a service that supports URLLC needs to satisfy air interface latency of less than 0.5 milliseconds, and may also have requirements of a packet error rate of $10^{-5}$% or lower. Therefore, for the service that supports URLLC, the 5G system needs to provide a transmission time interval (TTI) smaller than those of other services, and design matters for allocating wide resources in the frequency band in order to secure reliability of the communication link may also arise.

The above-described three services of 5G, that is, eMBB, URLLC, and mMTC, may be multiplexed and transmitted in a single system. Here, in order to satisfy the different requirements of each of the services, different transmission or reception techniques and different transmission and reception parameters may be used for the services. The 5G is not limited to the above-described three services.

[NR Time-Frequency Resource]

Hereinafter, a frame structure of a 5G system is described in detail with reference to the drawings.

FIG. 1 illustrates a basic structure of a time-frequency domain, which is a radio resource area in which a data or a control channel is transmitted in a 5G system.

In FIG. 1, a horizontal axis indicates a time domain, and a vertical axis indicates a frequency domain. A basic unit of a resource in the time-frequency domain is a resource element (RE) 101 and may be defined as one orthogonal frequency division multiplexing (OFDM) symbol 102 in the time axis and one subcarrier 103 in the frequency axis. In the frequency domain, $N_{sc}^{RB}$ (for example, 12) consecutive REs may constitute one resource block (RB) 104.

Figure 2:
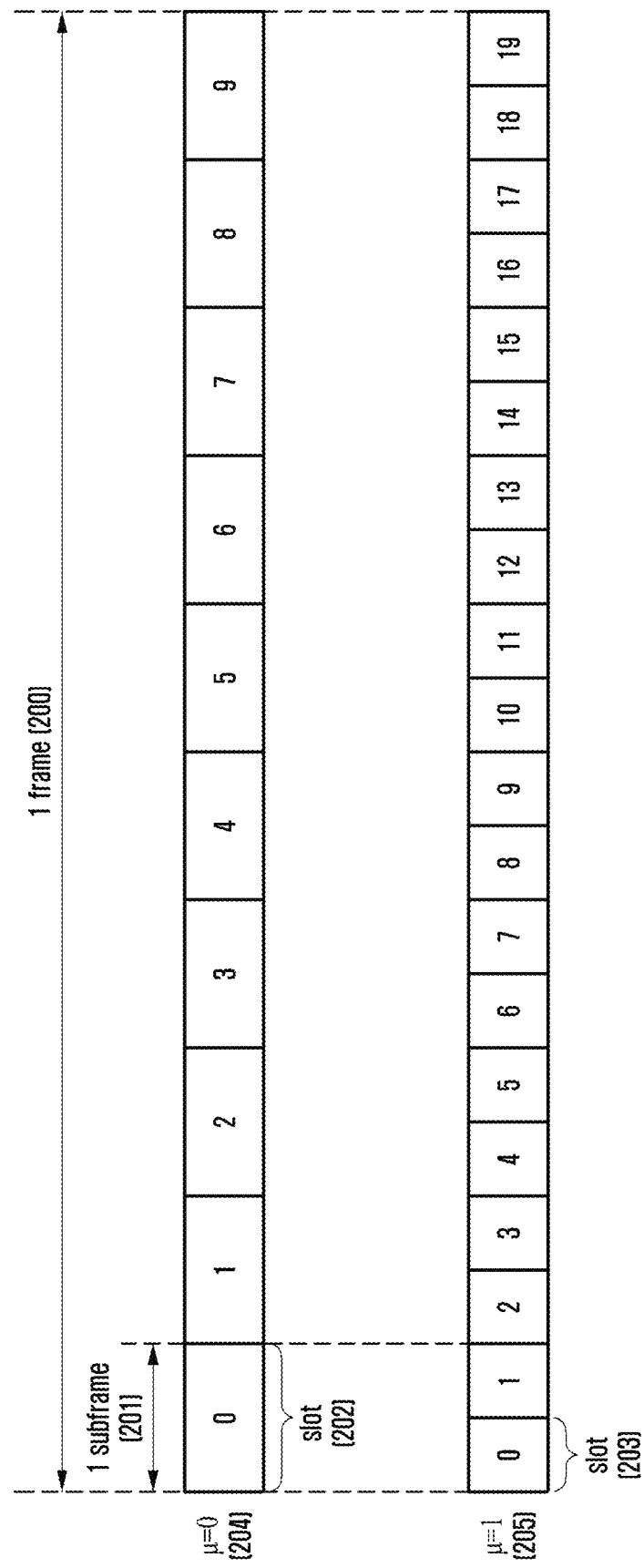
FIG. 2 illustrates a structure including a frame, a subframe, and a slot in a wireless communication system according to an embodiment of the disclosure.

FIG. 2 illustrates a structure including a frame, a subframe, and a slot in a wireless communication system according to an embodiment of the disclosure.

In FIG. 2, an example of a structure including a frame 200, a subframe 201, and a slot 202 is illustrated. One frame 200 may be defined as 10 ms. One subframe 201 may be defined as 1 ms, and accordingly, one frame 200 may include a total of 10 subframes 201. One slot 202 or 203 may be defined as 14 OFDM symbols (that is, the number of symbols per slot ($N_{symb}^{slot}$)=14). One subframe 201 may include one or multiple slots 202 and 203, and the number of slots 202 and 203 per subframe 201 may vary according to a configuration value 204 or 205 for subcarrier spacing. An example of FIG. 2 shows a case in which the subcarrier spacing configuration value corresponds to $\mu$=0 (204) and a case in which the subcarrier spacing configuration value corresponds to $\mu$=1 (205). In the case of $\mu$=0 (204), one subframe 201 may include one slot 202, and, in the case of $\mu$=1 (205), one subframe 201 may include two slots 203. That is, the number ($N_{slot}^{subframe,\mu}$) of slots per subframe may vary according to the configuration value $\mu$ for subcarrier spacing, and accordingly, the number ($N_{slot}^{frame,\mu}$) of slots per frame may also vary. $N_{slot}^{subframe,\mu}$ and $N_{slot}^{frame,\mu}$ according to each subcarrier spacing configuration may be defined as shown in [Table 1] below.

TABLE 1

| $\mu$ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Next, a configuration of a bandwidth part (BWP) in a 5G communication system is described in detail with reference to the drawings.

Figure 3:
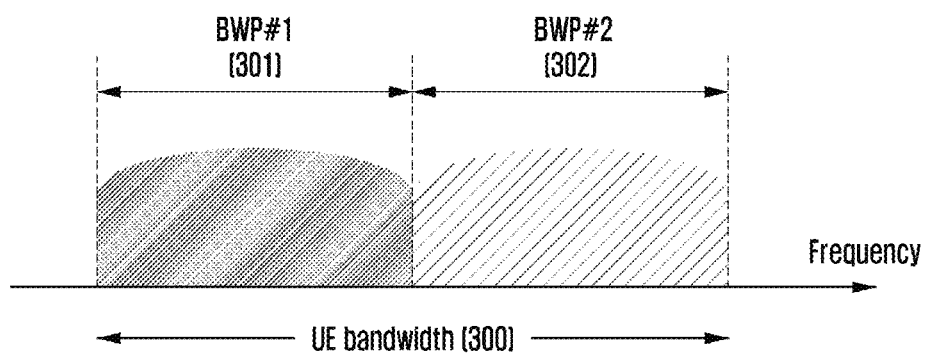
FIG. 3 illustrates an example of a configuration of a bandwidth part in a wireless communication system according to an embodiment of the disclosure.

FIG. 3 illustrates an example of a configuration of a bandwidth part in a wireless communication system according to an embodiment of the disclosure.

FIG. 3 illustrates an example in which a terminal bandwidth (UE bandwidth) 300 is configured to be divided into two bandwidth parts, that is, bandwidth part #1 (BWP #1) 301 and bandwidth part #2 (BWP #2) 302. A base station may configure one or multiple bandwidth parts for a terminal and may configure pieces of information below for each bandwidth part.

TABLE 2

```
BWP ::=          SEQUENCE {
    bwp-Id                        BWP-Id,
    (bandwidth part identifier)
    locationAndBandwidth          INTEGER (1..65536),
    (bandwidth part location)
    subcarrierSpacing             ENUMERATED {n0, n1, n2, n3, n4,
n5},
    (subcarrier spacing)
    cyclicPrefix                  ENUMERATED { extended }
    (cyclic prefix)
}
```

The disclosure is not limited to the example above, and in addition to pieces of configuration information described above, various parameters related to a bandwidth part may be configured for the terminal. The pieces of information may be transferred by the base station to the terminal through higher layer signaling, for example, radio resource control (RRC) signaling. At least one of the configured one bandwidth part or plurality of bandwidth parts may be activated. Whether the configured bandwidth part is activated may be semi-statically transferred through RRC signaling, or dynamically transferred through downlink control information (DCI) from the base station to the terminal.

According to some embodiments, a terminal before radio resource control (RRC)-connected may receive a configuration of an initial bandwidth part (initial BWP) for initial access, from the base station through a master information block (MIB). More specifically, the terminal may receive, through the MIB in the initial access stage, configuration information relating to a control resource set (CORESET) and a search space through which a PDCCH for reception of system information (corresponding to remaining system information (RMSI) or system information block 1 (SIB1)) required for the initial access can be transmitted. Each of the control area and the search space configured by the MIB may be regarded as identity (ID) 0. The base station may notify the terminal of configuration information such as frequency allocation information, time allocation information, and numerology for the control area #0 through the MIB. In addition, the base station may notify the terminal of the configuration information for the monitoring period and occasion for the control area #0 through the MIB, that is, the configuration information for the search space #0. The terminal may regard the frequency domain configured as the control area #0 obtained from the MIB as an initial bandwidth part for initial access. At this time, the identity (ID) of the initial bandwidth part may be regarded as 0.

The bandwidth part configuration supported by in 5G may be used for various purposes.

According to some embodiments, when a bandwidth supported by the terminal is smaller than a system bandwidth, the bandwidth supported by the terminal may be supported through a bandwidth part configuration. For example, the base station may configure, for the terminal, the frequency location (configuration information 2) of a bandwidth part so that the terminal transmits or receives data at a particular frequency location in a system bandwidth.

According to another embodiment, the base station may configure multiple bandwidth parts for the terminal in order to support different numerologies. For example, in order to support, to a terminal, both data transmission or reception using a subcarrier spacing of 15 KHz and data transmission/reception using a subcarrier spacing of 30 KHz, the base station may configure, for the terminal, two bandwidth parts having a subcarrier spacing of 15 KHz and a subcarrier spacing of 30 KHz, respectively. Different bandwidth parts may undergo frequency division multiplexing, and when data is to be transmitted or received at a specific subcarrier spacing, a bandwidth part configured at a corresponding subcarrier spacing may be activated.

According to another embodiment, the base station may configure bandwidth parts having different bandwidths for the terminal in order to reduce the power consumption of the terminal. For example, when the terminal supports a very wide bandwidth, for example, a bandwidth of 100 MHz, and always transmits or receives data through the corresponding bandwidth, the terminal may consume a very large amount of power. Particularly, unnecessary monitoring of a downlink control channel in a large bandwidth of 100 MHz under no traffic may be very inefficient in view of power consumption. In order to reduce the power consumption of a terminal, the base station may configure a bandwidth part having a relatively small bandwidth, for example, a bandwidth part having 20 MHz, for the terminal. When there is no traffic, the terminal may monitor a 20 MHz bandwidth part, and when data is generated, the terminal may transmit or receive the data through a 100 MHz bandwidth part according to an indication of the base station.

In relation to a method for configuring a bandwidth part described above, terminals before RRC-connected may receive configuration information of an initial bandwidth part through a master information block (MIB) in an initial access stage. More specifically, a control resource set (CORESET) for a downlink control channel through which downlink control information (DCI) scheduling a system information block (SIB) can be transmitted may be configured for the terminal through an MIB of a physical broadcast channel (PBCH). The bandwidth of the control resource set configured by the MIB may be considered as an initial bandwidth part, and the terminal may receive a physical downlink shared channel (PDSCH) through which the SIB is transmitted, through the configured initial bandwidth part. An initial bandwidth part may be used for other system information (OSI), paging, and random access, in addition to the purpose of the reception of a SIB.

[Bandwidth Part (BWP) Change]

When one or more bandwidth parts are configured for the terminal, the base station may indicate, to the terminal, a bandwidth part change (or switching) by using a bandwidth part indicator field in the DCI. For example, in FIG. 3, when the currently active bandwidth part of the terminal is bandwidth part #1 301, the base station may indicate bandwidth part #2 302 to the terminal by using the bandwidth part indicator in DCI, and the terminal may perform bandwidth part switching to the bandwidth part #2 302 indicated by the bandwidth part indicator in the received DCI.

As described above, the DCI-based bandwidth switching may be indicated by the DCI which schedules a PDSCH or a PUSCH, and thus, when the terminal receives a request to switch the bandwidth part, the terminal may be able to receive or transmit the PDSCH or the PUSCH scheduled by the DCI without difficulty in the switched bandwidth part. To this end, requirements for a delay time ($T_{BWP}$) required at the bandwidth part switching are specified in the standard and may be defined below, for example.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.
Note 2:
If the BWP switch involves changing of SCS, the BWP switch delay is determined by the larger one between the SCS before BWP switch and the SCS after BWP switch.

The requirements for the bandwidth part switch delay time support type 1 or type 2 depending on the capability of the terminal. The terminal may report a supportable bandwidth part delay time type to the base station.

When the terminal receives the DCI including the bandwidth part switch indicator in slot n according to the requirements for the bandwidth part switch delay time, the terminal may complete switching to a new bandwidth part indicated by the bandwidth part switch indicator at a time no later than slot n+$T_{BWP}$, and may perform transmission or reception for a data channel scheduled by the corresponding DCI in the switched new bandwidth part. When the base station intends to schedule the data channel to the new bandwidth part, the base station may determine a time-domain resource assignment for the data channel by taking into account the bandwidth part switch delay time ($T_{BWP}$) of the terminal. That is, in a method for determining time domain resource assignment for a data channel when the base station schedules the data channel to the new bandwidth part, the base station may schedule the corresponding data channel after the bandwidth part switch delay time. Accordingly, the terminal may not expect the DCI indicating the bandwidth part switch to indicate a slot offset (K0 or K2) having a value less than the bandwidth part switch delay time ($T_{BWP}$).

When the terminal receives the DCI (for example, DCI format 1_1 or 0_1) indicating the bandwidth part switching, the terminal may not perform transmission or reception during a time interval from the third symbol of the slot where the PDCCH including the DCI is received to a start symbol of the slot indicated by the slot offset (K0 or K2) indicated by the time-domain resource assignment field in the DCI. For example, when the terminal has received the DCI indicating the bandwidth part switching in slot n and the slot offset value indicated by the DCI is K, the terminal may not perform any transmission or reception from the third symbol of slot n to a symbol prior to slot n+K (i.e., the last symbol of slot n+K−1).

[SS/PBCH Block]

Next, a synchronization signal (SS)/PBCH block in 5G will be described.

The SS/PBCH block may mean a physical layer channel block including a primary SS (PSS), a secondary SS (SSS), and a PBCH. More specifically, the SS/PBCH block may be defined as follows:

PSS: a PSS is a reference signal for downlink time/frequency synchronization, which provides a part of information of a cell ID;

SSS: an SSS is a reference signal for downlink time/frequency synchronization, which provides the rest of the cell ID information not provided by the PSS. Additionally, the SSS may also serve as a reference signal (RS) for demodulation of the PBCH;

PBCH: a PBCH provides essential system information required for transmission or reception of a data channel and a control channel for a terminal. The essential system information may include search-space-related control information indicating radio resource mapping information of the control channel, scheduling control information for an extra data channel that transmits system information, and the like; and SS/PBCH block: an SS/PBCH block is a combination of a PSS, an SSS, and a PBCH. One or more SS/PBCH blocks may be transmitted in 5 ms, and each SS/PBCH block may be distinguished by an index.

The terminal may detect the PSS and the SSS in the initial access stage, and decode the PBCH. The terminal may acquire the MIB from the PBCH, and may be configured with control resource set (CORESET) #0 (this may correspond to a control resource set having a control resource set index of 0) therefrom. The terminal may monitor control resource set #0, assuming that demodulation reference signal (DMRS) transmitted in control resource set #0 are quasi-co-located (QCL) with the selected SS/PBCH block. The terminal may acquire system information as downlink control information transmitted in control resource set #0. The terminal may acquire random-access channel (RACH)-related configuration information required for initial access from the received system information. The terminal may transmit a physical RACH (PRACH) to the base station in consideration of the selected SS/PBCH index, and the base station having received the PRACH may acquire an SS/PBCH block index selected by the terminal. The base station may identify a block that the terminal selected from among respective SS/PBCH blocks and may identify that control resource set #0 associated with the selected block is monitored.

[DRX]

Figure 6:
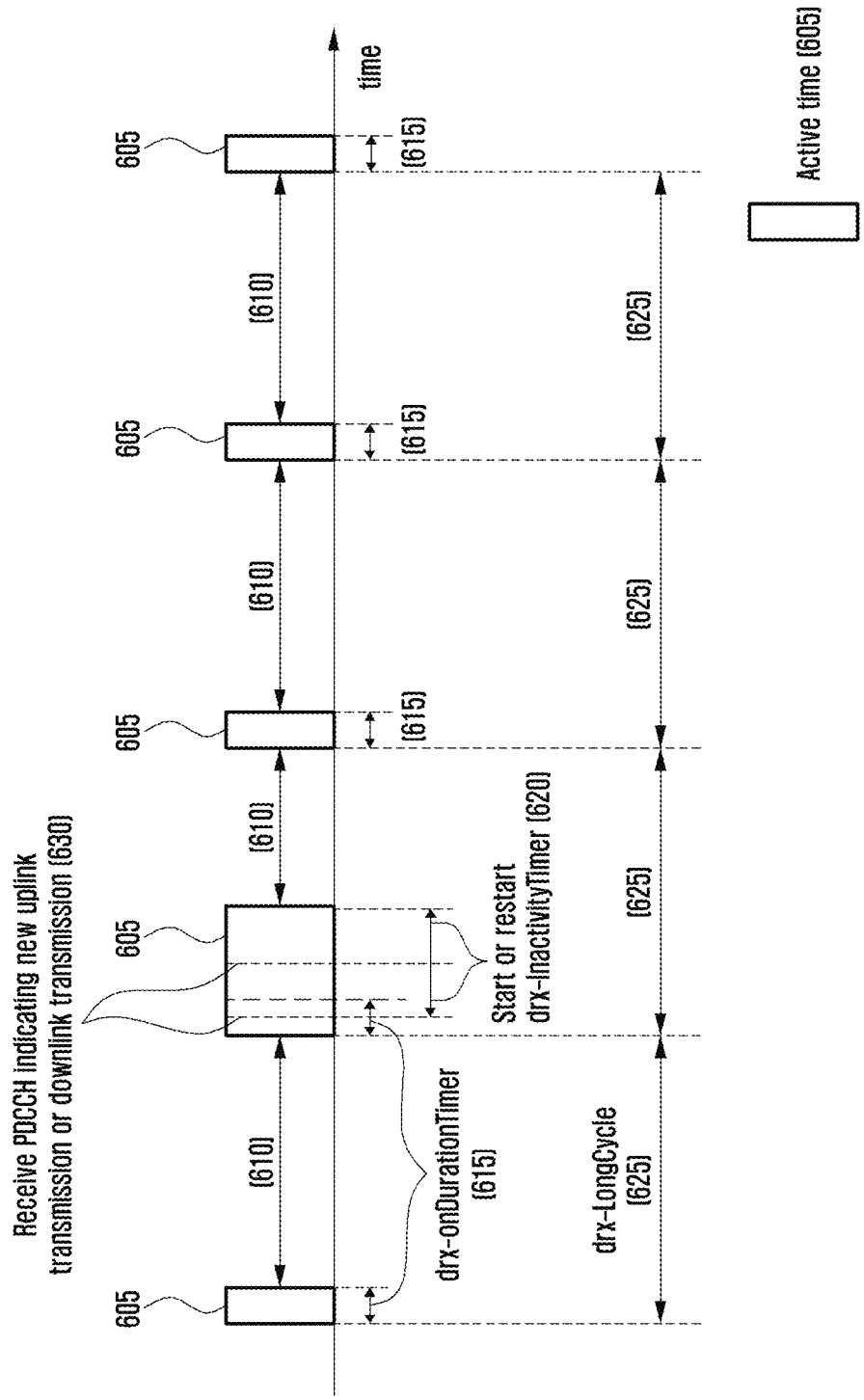
FIG. 6 illustrates an example of a DRX operation in a wireless communication system according to an embodiment of the disclosure.

FIG. 6 illustrates discontinuous reception (DRX).

Discontinuous reception (DRX) is an operation in which a terminal using a service discontinuously receives data in an RRC-connected state where a wireless link is configured between a base station and the terminal. In a case where the DRX is applied, the terminal may turn on a receiver at a particular time point to monitor a control channel, and when there is no data received for a predetermined period, the terminal may turn off the receiver to reduce the power consumption of the terminal. A DRX operation may be controlled by a MAC layer device, based on various parameters and timers.

Referring to FIG. 6, an active time 605 is a time interval for which the terminal wakes up at DRX periods and monitors a PDCCH. The active time 605 may be defined as follows:

drx-onDurationTimer or drx-InactivityTimer or drx-RetransmissionTimerDL or drx-RetransmissionTimerUL or ra-ContentionResolutionTimer is running;

a scheduling request is sent on PUCCH and is pending; or a PDCCH indicating a new transmission addressed to the C-RNTI of the MAC entity has not been received after successful reception of a random access response for the random access preamble not selected by the MAC entity among the contention-based random access preamble.

A drx-onDurationTimer, drx-InactivityTimer, drx-RetransmissionTimerDL, drx-RetransmissionTimerUL, and ra-ContentionResolutionTimer are timers, the values of which are configured by the base station, and have functions of configuring the terminal so that the terminal monitors a PDCCH in a situation satisfying a predetermined condition.

A drx-onDurationTimer 615 is a parameter for configuring a minimum time interval in which the terminal is awake in a DRX cycle. A drx-InactivityTimer 620 is a parameter for configuring an additional time interval in which the terminal is awake in a case 630 where a PDCCH indicating new uplink transmission or downlink transmission is received. A drx-RetransmissionTimerDL is a parameter for configuring a maximum time interval in which the terminal is awake to receive downlink retransmission in a downlink HARQ process. A drx-RetransmissionTimerUL is a parameter for configuring a maximum time interval in which the terminal is awake to receive a grant for uplink retransmission in an uplink HARQ process. A drx-onDurationTimer, drx-InactivityTimer, drx-RetransmissionTimerDL, and drx-RetransmissionTimerUL may be configured by a time, the number of subframes, or the number of slots. An ra-ContentionResolutionTimer is a parameter for monitoring a PDCCH in a random access process.

An inActive time 610 is a time interval configured not to monitor or receive a PDCCH in the DRX operation, and the time interval remaining after subtracting the active time 605 from the entire time interval in which the DRX operation is performed may be the inActive time 610. If the terminal does not monitor a PDCCH during the active time 605, the terminal may enter a sleep or inActive state to reduce power consumption.

A DRX cycle denotes a period by which the terminal wakes up and monitors a PDCCH. That is, the DRX cycle denotes a time interval between monitoring of a PDCCH by the terminal and monitoring of the next PDCCH, or an on-duration occurrence period. There are two types of DRX cycles which may be applied, a short DRX cycle and a long DRX cycle, wherein the short DRX cycle may be optionally applied.

A long DRX cycle 625 is a long cycle among two types of DRX cycles configured for the terminal. While the terminal operates according to a long DRX cycle, the terminal restarts the drx-onDurationTimer 615 at a time point after passage of the long DRX cycle 625 from a start point (for example, a starting symbol) of the drx-onDurationTimer 615. If the terminal operates according to the long DRX cycle 625, the terminal may start the drx-onDurationTimer 615 in a slot after passage of a drx-SlotOffset in a subframe satisfying Equation 1 below. Here, the drx-Slot-Offset means a delay before the drx-onDurationTimer 615 starts. The drx-SlotOffset may be configured by, for example, a time, the number of slots, or the like.

[(SFN×10)+subframe number]modulo(drx-Long-Cycle)=drx-StartOffset.    [Equation 1]

In this case, a drx-LongCycleStartOffset may include the long DRX cycle 625 and a drx-StartOffset, and may be used to define a subframe in which the long DRX cycle 625 is to start. The drx-LongCycleStartOffset may be configured by, for example, a time, the number of subframes, the number of slots, or the like.

[PDCCH: In Relation to DCI]

Next, downlink control information (DCI) in a 5G system will be described in detail.

In the 5G system, scheduling information on uplink data (or a physical uplink shared channel (PUSCH)) or downlink data (or a physical downlink shared channel (PDSCH)) is transferred through DCI from a base station to a terminal. The terminal may monitor a fallback DCI format and a non-fallback DCI format for the PUSCH or the PDSCH. The fallback DCI format may be configured with a fixed field pre-defined between the base station and the terminal, and the non-fallback DCI format may include a configurable field.

DCI may go through a channel coding and modulation process, and then be transmitted through a physical downlink control channel (PDCCH). A cyclic redundancy check (CRC) may be attached to a DCI message payload, and the CRC may be scrambled by a radio network temporary identifier (RNTI) corresponding to the identity of the terminal. Different types of RNTIs may be used according to the purpose of a DCI message, for example, terminal-specific (UE-specific) data transmission, a power control command, a random access response, or the like. That is, an RNTI may not be explicitly transmitted, and may be transmitted after being included in a CRC calculation process. If the terminal has received a DCI message transmitted on a PDCCH, the terminal may identify a CRC by using an assigned RNTI, and if a CRC identification result is correct, the terminal may identify that the message has been transmitted to the terminal.

For example, DCI scheduling the PDSCH for system information (SI) may be scrambled by a SI-RNTI. DCI scheduling the PDSCH for a random access response (RAR) message may be scrambled by an RA-RNTI. DCI scheduling the PDSCH for a paging message may be scrambled by a P-RNTI. DCI notifying of a slot format indicator (SFI) may be scrambled by an SFI-RNTI. DCI notifying of a transmit power control (TPC) may be scrambled by a TPC-RNTI. DCI scheduling a terminal-specific PDSCH or PUSCH may be scrambled by a cell RNTI (C-RNTI).

DCI format 0_0 may be used for fallback DCI scheduling a PUSCH, and in this case, a CRC may be scrambled by a C-RNTI. DCI format 0_0 having a CRC scrambled by a C-RNTI may include, for example, the information shown in Table 4 below.

TABLE 4

Identifier for DCI formats - [1] bit
Frequency domain resource assignment -
$\lceil \log_2(N_{RB}^{UL,BWP}(N_{RB}^{UL,BWP} + 1)/2) \rceil$ bits
Time domain resource assignment - X bits
Frequency hopping flag - 1 bit.
Modulation and coding scheme - 5 bits
New data indicator - 1 bit TABLE 4-continued Redundancy version - 2 bits
HARQ process number - 4 bits
Transmit power control (TPC) command for scheduled PUSCH - [2] bits
Uplink/supplementary uplink (UL/SUL) indicator - 0 or 1 bit DCI format 0_1 may be used for non-fallback DCI scheduling the PUSCH, and in this case, a CRC may be scrambled by a C-RNTL. DCI format 0_1 having a CRC scrambled by a C-RNTI may include, for example, the information shown in Table 5 below.

TABLE 5

Carrier indicator—0 or 3 bits
UL/SUL indicator—0 or 1 bit
Identifier for DCI formats—[1] bits
Bandwidth part indicator—0, 1, or 2 bits
Frequency domain resource assignment
 For resource allocation type 0, $\lceil N_{RB}^{UL,BWP}/P \rceil$ bits
 For resource allocation type 1, $\lceil \log_2(N_{RB}^{UL,BWP}(N_{RB}^{UL,BWP} + 1)/2 \rceil$ bits
Time domain resource assignment—1, 2, 3, or 4 bits
VRB-to-PRB mapping (mapping between virtual resource block and physical resource block)—0 or 1 bit, only for resource allocation type 1.
 0 bit if only resource allocation type 0 is configured;
 1 bit otherwise.
Frequency hopping flag—0 or 1 bit, only for resource allocation type 1.
 0 bit if only resource allocation type 0 is configured;
 1 bit otherwise.
Modulation and coding scheme—5 bits
New data indicator—1 bit
Redundancy version—2 bits
HARQ process number—4 bits
1st downlink assignment index—1 or 2 bits
 1 bit for semi-static HARQ-ACK codebook;
 2 bits for dynamic HARQ-ACK codebook with single HARQ-ACK codebook.
2nd downlink assignment index—0 or 2 bits
 2 bits for dynamic HARQ-ACK codebook with two HARQ-ACK sub-codebooks;
 0 bit otherwise.
TPC command for scheduled PUSCH—2 bits SRS resource indicator— $\left\lceil \log_2\left( \sum_{k=1}^{L_{max}} \binom{N_{SRS}}{k} \right) \right\rceil$ or $\lceil \log_2(N_{SRS}) \rceil$ bits $\left\lceil \log_2\left( \sum_{k=1}^{L_{max}} \binom{N_{SRS}}{k} \right) \right\rceil$ bits for non–codebook based PUSCH transmission (if PUSCH transmission is not based on codebook);
$\lceil \log_2(N_{SRS}) \rceil$ bits for codebook based PUSCH transmission (if PUSCH transmission is based on codebook).
Precoding information and number of layers—up to 6 bits
Antenna ports—up to 5 bits
SRS request—2 bits
Channel state information (CSI) request—0, 1, 2, 3, 4, 5, or 6 bits
Code block group (CBG) transmission information—0, 2, 4, 6, or 8 bits
Phase tracking reference signal and demodulation reference signal (PTRS-DMRS) association—0 or 2 bits.
beta_offset indicator—0 or 2 bits
Demodulation reference signal (DMRS) sequence initialization—0 or 1 bit DCI format 1_0 may be used for fallback DCI scheduling the PDSCH, and in this case, a CRC may be scrambled by a C-RNTI. DCI format 1_0 having a CRC scrambled by a C-RNTI may include, for example, pieces of information below.

TABLE 6

Identifier for DCI formats - [1] bit
Frequency domain resource assignment -
$\lceil \log_2(N_{RB}^{DL,BWP}(N_{RB}^{DL,BWP} + 1)/2) \rceil$ bits TABLE 6-continued Time domain resource assignment - X bits
VRB-to-PRB mapping - 1 bit.
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
Physical uplink control channel (PUCCH) resource indicator - 3 bits
PDSCH-to-HARQ feedback timing indicator - [3] bits DCI format 1_1 may be used for non-fallback DCI scheduling the PDSCH, and in this case, a CRC may be scrambled by a C-RNTI. DCI format 1_1 having a CRC scrambled by a C-RNTI may include, for example, pieces of information below.

TABLE 7

Carrier indicator - 0 or 3 bits
Identifier for DCI formats - [1] bits
Bandwidth part indicator - 0, 1 or 2 bits
Frequency domain resource assignment
For resource allocation type 0, $\lceil N_{RB}^{DL, BWP}/P \rceil$ bits
For resource allocation type 1, $\lceil \log_2(N_{RB}^{DL, BWP}(N_{RB}^{DL, BWP} + 1)/2) \rceil$ bits
Time domain resource assignment -1, 2, 3, or 4 bits
VRB-to-PRB mapping - 0 or 1 bit, only for resource allocation type 1.
0 bit if only resource allocation type 0 is configured;
1 bit otherwise.
PRB bundling size indicator (wherein PRB indicates physical resource block) - 0 or 1 bit
Rate matching indicator - 0, 1, or 2 bits
ZP CSI-RS trigger (wherein ZP CSI-RS indicates zero power channel state information-reference signal) - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication - 0 or 3 bits
SRS request - 2 bits
CBG transmission information - 0, 2, 4, 6, or 8 bits
CBG flushing out information (wherein CBG indicates code block group) - 0 or 1 bit
DMRS sequence initialization - 1 bit

[PDCCH: CORESET, REG, CCE, Search Space]

Figure 4:
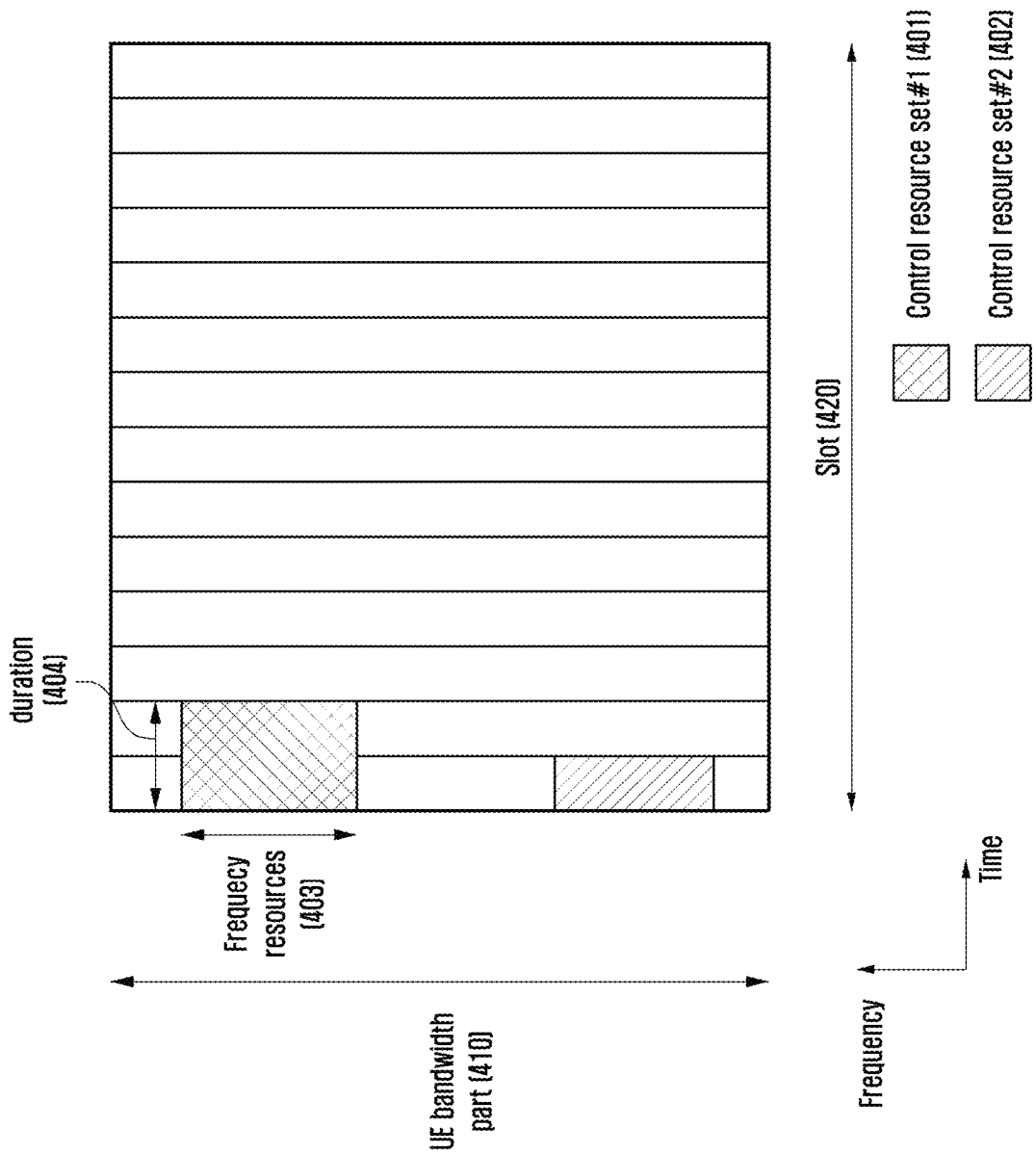
FIG. 4 illustrates an example of a configuration of a control area of a downlink control channel in a wireless communication system according to an embodiment of the disclosure.

Hereinafter, a downlink control channel in a 5G communication system will be described in detail with reference to the drawings. FIG. 4 illustrates an example of a control resource set (CORESET) on which a downlink control channel is transmitted, in a 5G wireless communication system. FIG. 4 shows an example in which a bandwidth part 410 of a terminal is configured along a frequency axis and two control resource sets (control resource set #1 401 and control resource set #2 402) are configured in one slot 420 along a time axis. The control resource sets 401 and 402 may be configured on a particular frequency resource 403 in the entire terminal bandwidth part 410 along the frequency axis. The control resource sets 401 and 402 may be configured by one or multiple OFDM symbols may be configured along the time axis, and the configured OFDM symbol or symbols, and may be defined as a control resource set duration 404. In the example illustrated in FIG. 4, control resource set #1 401 is configured to have a control resource set duration of two symbols, and control resource set #2 402 is configured to have a control resource set duration of one symbol.

A control resource set in the 5G described above may be configured for a terminal by a base station through higher layer signaling (for example, system information, master information block (MIB), and radio resource control (RRC) signaling). Configuring a control resource set for a terminal means that a base station provides, to a terminal, information such as a control resource set identity, the frequency location of the control resource set, or the symbol length of the control resource set. For example, the information provided by the base station to the terminal may include pieces of information below.

TABLE 8

```
ControlResourceSet ::=           SEQUENCE {
    -- Corresponds to L1 parameter 'CORESET-ID'
    controlResourceSetId         ControlResourceSetId,
    (control resource set identifier(Identity))
    frequencyDomainResources     BIT STRING (SIZE (45)),
    (frequency axis resource assignment information)
    duration                     INTEGER (1..maxCoReSetDuration),
    (time axis resource assignment information)
    cce-REG-MappingType          CHOICE {
    (CCE-to-REG mapping type)
        interleaved              SEQUENCE {
        reg-BundleSize           ENUMERATED {n2, n3, n6},
        (REG bundle size)
        precoderGranularity      ENUMERATED {sameAsREG-
bundle, allContiguousRBs},
        interleaverSize          ENUMERATED {n2, n3, n6}
        (interleaver size)
        shiftIndex
        INTEGER(0..maxNrofPhysicalResourceBlocks−1)
        OPTIONAL
        (interleaver shift)
    },
        nonInterleaved           NULL
    },
    tci-StatesPDCCH              SEQUENCE(SIZE
    (1..maxNrofTCI-StatesPDCCH))
        OF TCI-StateId           OPTIONAL,
    (QCL configuration information)
    tci-PresentInDCI             ENUMERATED {enabled}
                                 OPTIONAL, -- Need S
}
```

In Table 8, tci-StatesPDCCH (simply referred to as a transmission configuration indication (TCI) state) configuration information may include information on the index or indexes of one or multiple SS/PBCH blocks having a quasi-co-located (QCL) relationship with a DMRS transmitted on a corresponding CORESET, or information on the index of a channel state information reference signal (CSI-RS).

Figure 5A:
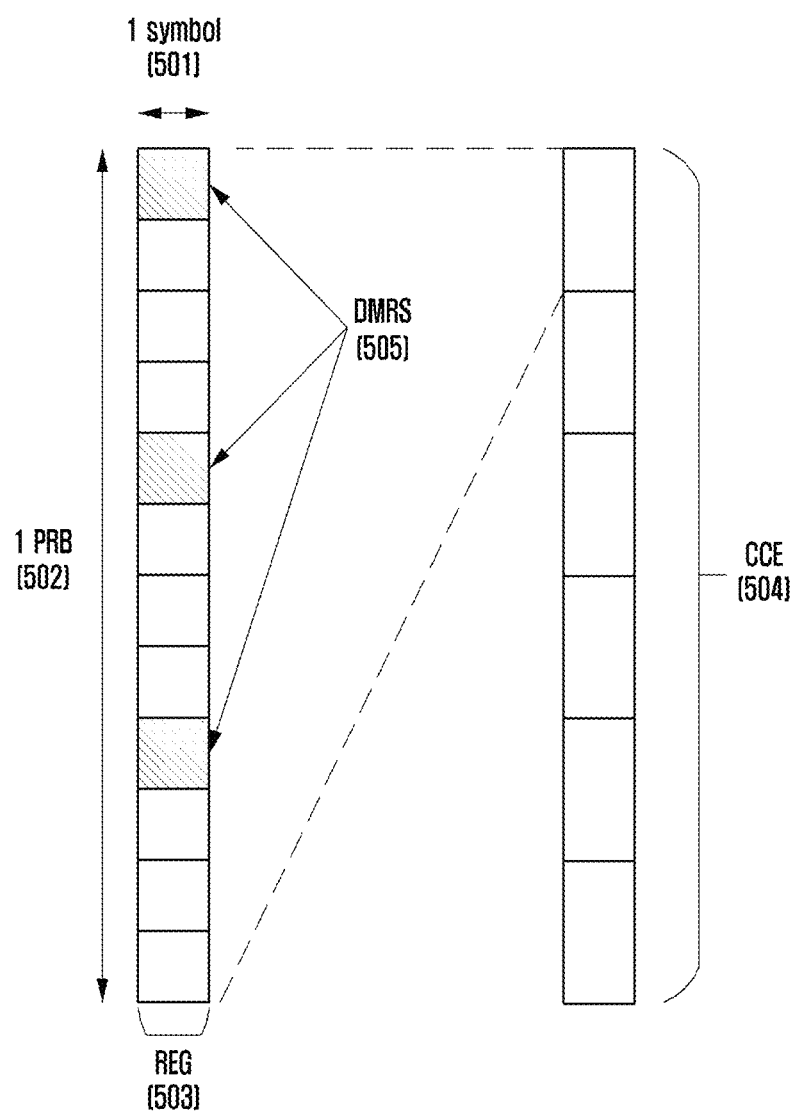
FIG. 5A illustrates a structure of a downlink control channel in a wireless communication system according to an embodiment of the disclosure.

FIG. 5A illustrates an example of a basic unit of a time and frequency resource a downlink control channel available in 5G. Referring to FIG. 5A, the basic unit of the time and frequency resource constituting the control channel may be called a resource element group (REG), wherein an REG 503 may be defined as one OFDM symbol 501 along the time axis, and one physical resource block (PRB) 502 along the frequency axis, i.e., 12 subcarriers. The base station may configure a downlink control channel allocation unit by concatenating the REG 503.

As illustrated in FIG. 5A, if the basic unit in which the downlink control channel is allocated in 5G is a control channel element (CCE) 504, one CCE 504 may include multiple REGs 503. For example, the REG 503 in FIG. 5A may include 12 REs, and if one CCE 504 includes six REGs 503, one CCE 504 may include 72 REs. If a downlink control resource set is configured, the corresponding resource set may include multiple CCEs 504, and a specific downlink control channel may be mapped to one or multiple CCEs 504 according to an aggregation level (AL) within the control resource set and may then be transmitted. The CCEs 504 within the control resource set may be distinguished by numbers, and the numbers of the CCEs 504 may be assigned according to a logical mapping scheme.

The basic unit of the downlink control channel illustrated in FIG. 5A, that is, the REG 503, may include all REs to which the DCI is mapped and an area to which a DMRS 505 corresponding to a reference signal for decoding the REs is mapped. As illustrated in FIG. 5A, three DMRSs 505 may be transmitted within one REG 503. The number of CCEs required to transmit the PDCCH may be 1, 2, 4, 8, or 16 according to the aggregation level (AL), and different number of CCEs may be used to implement link adaptation of the downlink control channel. For example, if AL=L, one downlink control channel may be transmitted through L CCEs. The terminal is required to detect a signal without knowing information on the downlink control channel, and a search space indicating a set of CCEs is defined for blind decoding. The search space is a set of downlink control channel candidates including CCEs for which the terminal may attempt decoding at the given aggregation level, and there are several aggregation levels at which a set of CCEs is configured by 1, 2, 4, 8, and 16 CCEs, and thus, the terminal may have multiple search spaces. The search space set may be defined as a set of search spaces at all configured aggregation levels.

The search spaces may be classified into a common search space and a terminal (UE)-specific search space. Terminals in a predetermined group or all terminals may investigate a common search space of the PDCCH in order to receive cell-common control information such as dynamic scheduling of system information or paging messages. For example, PDSCH scheduling allocation information for transmission of an SIB including information on the service provider of a cell may be received by investigating a common search space of the PDCCH. In a case of the common search space, terminals in a predetermined group or all terminals may receive the PDCCH, and thus the common search space may be defined as a set of pre-agreed CCEs. Scheduling allocation information of the terminal-specific PDSCH or PUSCH may be received by investigating a UE-specific search space of the PDCCH. The UE-specific search space may be defined in a UE-specific manner as a terminal identity and a function of various system parameters.

In 5G, parameters for the PDCCH search space may be configured for the terminal by the base station through higher-layer signaling (for example, SIB, MIB, or RRC signaling). For example, the base station may configure, for the terminal, the number of PDCCH candidates at each aggregation level L, a monitoring period of the search space, a monitoring occasion in units of symbols within the slot for the search space, a search space type (a common search space or a UE-specific search space), a combination of a DCI format and an RNTI to be monitored in the corresponding search space, a control resource set index for monitoring the search space, and the like. For example, the following information may be included.

TABLE 9

```
SearchSpace ::=                         SEQUENCE {
    -- Identity of the search space. SearchSpaceId = 0
identifies the SearchSpace configured via PBCH (MIB) or
ServingCellConfigCommon.
    searchSpaceId                       SearchSpaceId,
    (search space identifier)
    controlResourceSetId                ControlResourceSetId,
    (control resource set identifier)
    monitoringSlotPeriodicityAndOffset  CHOICE {
    (monitoring slot level period)
        sl1                             NULL,
        sl2                             INTEGER (0..1),
        sl4                             INTEGER (0..3),
        sl5                   INTEGER (0..4),
        sl8                             INTEGER (0..7),
        sl10                            INTEGER (0..9),
        sl16                            INTEGER (0..15),
        sl20                            INTEGER (0..19)
    }
    duration (monitoring length)        INTEGER (2..2559)
    monitoringSymbolsWithinSlot         BIT STRING (SIZE
(14))
    (monitoring symbols in slot)
        nrofCandidates                  SEQUENCE {
    (the number of PDCCH candidates for each aggregation level)
        aggregationLevel1               ENUMERATED {n0, n1, n2, n3,
n4, n5, n6, n8},
        aggregationLevel2               ENUMERATED {n0, n1, n2, n3,
n4, n5, n6, n8},
        aggregationLevel4               ENUMERATED {n0, n1, n2, n3,
n4, n5, n6, n8},
        aggregationLevel8               ENUMERATED {n0, n1, n2, n3,
n4, n5, n6, n8},
        aggregationLevel16              ENUMERATED {n0, n1, n2,
n3, n4, n5, n6, n8}
    },
    searchSpaceType                     CHOICE {
    (search space type)
```

TABLE 9-continued

```
-- Configures this search space as common search space
(CSS) and DCI formats to monitor.
      common                          SEQUENCE {
      (common search space)
   }
      ue-Specific                     SEQUENCE {
      (UE-specific search space)
         -- Indicates whether the UE monitors in this USS for
DCI formats 0-0 and 1-0 or for formats 0-1 and 1-1.
         formats                      ENUMERATED {formats0-0-And-1-
      0, formats0-1-And-1-1},
         ...
      }
```

According to the above configuration information, the base station may configure one or multiple search space sets for the terminal. According to some embodiments, the base station may configure, for the terminal, search space set 1 and search space set 2, may configure such that DCI format A scrambled by X-RNTI in search space set 1 is monitored in the common search space, and may configure such that DCI format B scrambled by Y-RNTI in search space set 2 is monitored in the UE-specific search space.

According to the above configuration information, one or multiple search space sets may exist in the common search space or UE-specific search space. For example, search space set #1 and search space set #2 may be configured as common search spaces, and search space set #3 and search space set #4 may be configured as UE-specific search spaces.

In a common search space, the following combinations of DCI formats and RNTIs may be monitored. The combinations are not limited to the examples below:
   DCI format 0_0/1_0 with CRC scrambled by C-RNTI, CS-RNTI, SP-CSI-RNTI, RA-RNTI, TC-RNTI, P-RNTI, SI-RNTI;
   DCI format 2_0 with CRC scrambled by SFI-RNTI;
   DCI format 2_1 with CRC scrambled by INT-RNTI;
   DCI format 2_2 with CRC scrambled by TPC-PUSCH-RNTI, TPC-PUCCH-RNTI; and
   DCI format 2_3 with CRC scrambled by TPC-SRS-RNTI.

In a UE-specific search space, the following combinations of DCI formats and RNTIs may be monitored. The combinations are not limited to the examples below:
   DCI format 0_0/1_0 with CRC scrambled by C-RNTI, CS-RNTI, TC-RNTI;
   DCI format 1_0/1_1 with CRC scrambled by C-RNTI, CS-RNTI, TC-RNTI;

The RNTIs enumerated above may follow the definition and usage below:
   C-RNTI (Cell RNTI): UE-specific PDSCH scheduling usage;
   TC-RNTI (Temporary Cell RNTI): UE-specific PDSCH scheduling usage;
   CS-RNTI (Configured Scheduling RNTI): semi-statically configured UE-specific PDSCH scheduling usage;
   RA-RNTI (Random Access RNTI): PDSCH scheduling usage in random access stage;
   P-RNTI (Paging RNTI): PDSCH scheduling usage for paging transmission;
   SI-RNTI (System Information RNTI): PDSCH scheduling usage for system information transmission;
   INT-RNTI (Interruption RNTI): usage for indicating whether or not puncturing regarding PDSCH exists;
   TPC-PUSCH-RNTI (Transmit Power Control for PUSCH RNTI): usage for indicating power adjustment command for PUSCH;
   TPC-PUCCH-RNTI (Transmit Power Control for PUCCH RNTI): usage for indicating power adjustment command for PUCCH; and
   TPC-SRS-RNTI (Transmit Power Control for SRS RNTI): usage for indicating power adjustment command for SRS.

The DCI formats enumerated above may follow the definition below:

TABLE 10

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

In 5G, the search space of the aggregation level L in the control resource set p and the search space set s may be represented as in Equation 2 below:

$$L \cdot \left\{ \left( Y_{p,n_{s,f}^\mu} + \left\lfloor \frac{m_{s,n_{CI}} \cdot N_{CCE,p}}{L \cdot M_{s,max}^{(L)}} \right\rfloor + n_{CI} \right) \mod \left\lfloor \frac{N_{CCE,p}}{L} \right\rfloor \right\} + i \quad \text{[Equation 2]}$$

where:
   L: aggregation level;
   $n_{CI}$: carrier index;
   $N_{CCE,p}$: total number of CCEs present in control resource set p;
   $n_{s,f}^\mu$: slot index;
   $M_{s,max}^{(L)}$: number of PDCCH candidates of aggregation level L;
   $m_{s,n_{CI}} = 0, \ldots, M_{s,max}^{(L)} - 1$: PDCCH candidate index of aggregation level L;
   $i = 0, \ldots, L-1$;
   $Y_{p,n_{s,f}^\mu} = (A_p \cdot Y_{p,n_{s,f}^\mu - 1}) \mod D$, $Y_{\mu-1} = n_{RNTI} \neq 0$, $A_p = 39827$ for p mod 3=0, $A_0 = 39829$ for p mod 3=1, $A_p = 39839$ for p mod 3=2, D=65537; and
   $n_{RNTI}$=terminal identifier.

The $Y_{p,n_{s,f}^\mu}$ value may correspond to zero in the common search space.

In a case of a UE-specific search space, the $Y_{p,n_{s,f}^\mu}$ value may correspond to a value that changes according to a time index and a terminal identity (C-RNTI or an ID configured for the terminal by the base station).

In 5G, as multiple search space sets are configurable with different parameters (e.g., parameters in Table 10), a group of search space sets monitored by the terminal may change at each time point. For example, when search space set #1 is configured with an X-slot periodicity, search space set #2 is configured with a Y-slot periodicity, and X and Y are different from each other, the terminal may monitor both search space set #1 and search space set #2 in a specific slot, or may monitor one of search space set #1 and the search space set #2 in a specific slot.

[PDCCH: Span]

The terminal may perform terminal capability reporting for a case having multiple PDCCH monitoring occasions within a slot, for each subcarrier spacing, and in this case, the concept of "span" may be used. The span may mean consecutive symbols in which the terminal can monitor a PDCCH in a slot, and each PDDCH monitoring occasion is within one span. The span may be expressed as (X, Y), wherein X indicates a minimum number of symbols required to be separated between the first symbols of two consecutive spans, and Y indicates the number of consecutive symbols in which a PDCCH can be monitored in one span. Here, the terminal may monitor the PDCCH in an interval within Y symbols from the first symbol of the span within the span.

FIG. 5B illustrates, through a span, a case where a terminal may have multiple PDCCH monitoring occasions in a slot in a wireless communication system. The span may correspond to (X, Y)=(7, 4), (4, 3), (2, 2), wherein three cases are expressed as 5-1-00, 5-1-05, and 5-1-10, respectively, in FIG. 5B. For example, 5-1-00 shows a case in which two spans which can be expressed as (7, 4) exist in a slot. The spacing between the first symbols of two spans is expressed as X=7, the PDCCH monitoring occasions may exist within a total of Y=3 symbols from the first symbol of each span, and search spaces 1 and 2 exist in Y=3 symbols. In another example, 5-1-05 shows a case where a total of three spans which can be expressed as (4, 3) exist in a slot, wherein the spacing between the second and third spans is indicated as X'=5 that is greater than X=4.

[PDCCH: UE Capability Report]

The slot positions where the above-described common search space and UE-specific search space are positioned are indicated by a monitoringSymbolsWithinSlot parameter in Table 11-1, and symbol positions within a slot are indicated by a bitmap through a monitoringSymbolsWithinSlot parameter in Table 9. The symbol occasions within a slot in which a terminal can perform search space monitoring may be reported to the base station through the following terminal capabilities (UE capabilities):

UE capability 1 (hereinafter, referred to as "FG 3-1"). This UE capability means, when there is one monitoring occasion (MO) in a slot for type 1 and type 3 common search spaces or UE-specific search spaces as shown in Table 11-1 below, and the corresponding MO is positioned within the first three symbols in the slot, a capability of monitoring the corresponding MO. This UE capability corresponds to a mandatory capability which may be supported by all terminal supporting NR, and whether the capability is supported is not explicitly reported to the base station.

TABLE 11-1

| Index | Feature group | Components | Field name in TS 38.331 [2] |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1-CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table<br>5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | n/a |

UE capability 2 (hereinafter, referred to as "FG 3-2"). This UE capability means, when there is one monitoring occasion (MO) for the common search space or the UE-specific search space in a slot as shown in Table 11-2 below, a capability of monitoring the corresponding MO regardless of the positions of the start symbol of the corresponding MO. This UE capability is selectively supportable by the terminal (optional), and whether the capability is supported is explicitly reported to the base station.

TABLE 11-2

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter, referred to as "FG 3-5, 3-5a, and 3-5b). This UE capability indicates, when there are multiple monitoring occasions (MOs) for the common search space or the UE-specific search space in a slot as shown in Table 11-3 below, a pattern of MO which can be monitored by the terminal. The above-described pattern includes X indicating a spacing between start symbols between different MOs, and Y indicating the maximum symbol length for one MO. There may be one or multiple combinations of (X, Y) supported by the terminal among {(2, 2), (4, 3), (7, 3)}. This UE capability is selectively supportable by the terminal (optional), and whether the capability is supported and the above-described (X, Y) combinations are explicitly reported to the base station.

TABLE 11-3

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions {3-5 withoutDCI-Gap 3-5a withDCI-Gap} |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as 2OFDM symbols for 15 kHz 4OFDM symbols for 30 kHz 7OFDM symbols for 60 kHz with NCP 11OFDM symbols for 120 kHz Up to one unicast DL DCI and up to one unicast UL DCI in a monitoring occasion except for the monitoring occasions of FG 3-1. In addition for TDD the minimum separation between the first two UL unicast DCIs within the first 3 OFDM symbols of a slot can be zero OFDM symbols. | |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot | |

TABLE 11-3-continued

| Feature | | Field name in |
|---|---|---|
| Index | group Components | TS 38.331 [2] |
| | boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary.<br>For the set of monitoring occasions which are within the same span:<br>Processing one unicast DCI scheduling DL and one unicast DCI scheduling UL per scheduled CC across this set of monitoring occasions for FDD<br>Processing one unicast DCI scheduling DL and two unicast DCI scheduling UL per scheduled CC across this set of monitoring occasions for TDD<br>Processing two unicast DCI scheduling DL and one unicast DCI scheduling UL per scheduled CC across this set of monitoring occasions for TDD<br>The number of different start symbol indices of spans for all PDCCH monitoring occasions per slot, including PDCCH monitoring occasions of FG-3-1, is no more than floor(14/X) (X is minimum among values reported by UE).<br>The number of different start symbol indices of PDCCH monitoring occasions per slot including PDCCH monitoring occasions of FG-3-1, is no more than 7.<br>The number of different start symbol indices of PDCCH monitoring occasions per half-slot including PDCCH monitoring occasions of FG-3-1 is no more than 4 in SCell. | |

The terminal may report, to the base station, whether the above-described UE capability 2 and/or UE capability 3 is supported and parameters related thereto. The base station may perform time domain resource allocation for the common search space and the UE-specific search space, based on the reported UE capability. During the resource allocation, the base station may allow the MO not to be positioned in the position in which the terminal cannot perform monitoring.

[PDCCH: BD/CCE Limit]

When multiple search space sets are configured for the terminal, the conditions below may be considered in a method for determining a search space set to be monitored by the terminal.

If a value of monitoringCapabilityConfig-r16 corresponding to higher-layer signaling is configured as r15monitoringcapability for the terminal, the terminal defines the number of monitorable PDCCH candidates and a maximum value of the number of CCEs constituting the entire search space (here, the entire search space means all CCE sets corresponding to a union area of multiple search space sets) for each slot, and if the value of monitoringCapabilityConfig-r16 is configured as r16monitoringcapability for the terminal, the terminal defines the number of monitorable PDCCH candidates and a maximum value of the number of CCEs constituting the entire search space (here, the entire search space means all CCE sets corresponding to a union area of multiple search space sets) for each span.

[Condition 1: Limit to Maximum Number of PDCCH Candidates]

According to the higher-layer signaling configuration value above, in a cell configured with a subcarrier spacing of $15 \cdot 2^\mu$ KHz, $M^\mu$ corresponding to the number of PDCCH candidates which can be monitored by the terminal may follow Table 12-1 below when M is defined based on a slot, and follow Table 12-2 below when M is defined based a span.

TABLE 12-1

| μ | Maximum number of PDCCH candidates per slot and per serving cell ($M^\mu$) |
|---|---|
| 0 | 44 |
| 1 | 36 |
| 2 | 22 |
| 3 | 20 |

TABLE 12-2

| | Maximum number $M^\mu$ of PDCCH candidates per span for combination (X, Y) and per serving cell | | |
|---|---|---|---|
| μ | (2, 2) | (4, 3) | (7, 4) |
| 0 | 14 | 28 | 44 |
| 1 | 12 | 24 | 36 |

[Condition 2: Limit to Maximum Number of CCEs]

According to the higher-layer signaling configuration value above, in a cell configured with a subcarrier spacing of $15 \cdot 2^\mu$ KHz, $C^\mu$ corresponding to the maximum number of CCEs constituting the entire search space (here, the entire search space means the entire set of CCEs corresponding to a union area of multiple search space sets) may follow Table 12-3 below when $C^\mu$ is defined based on a slot, and follow Table 12-4 below when $C^\mu$ is defined based a span.

TABLE 12-3

| μ | Maximum number of non-overlapped CCEs per slot and per serving cell ($C^\mu$) |
|---|---|
| 0 | 56 |
| 1 | 56 |
| 2 | 48 |
| 3 | 32 |

TABLE 12-4

| | Maximum number $C^\mu$ of non-overlapped CCEs per span for combination (X, Y) and per serving cell | | |
|---|---|---|---|
| μ | (2, 2) | (4, 3) | (7, 4) |
| 0 | 18 | 36 | 56 |
| 1 | 18 | 36 | 56 |

For convenience of description, a situation in which both of conditions 1 and 2 are satisfied at a specific time point is defined as "condition A." Therefore, a failure in satisfying condition A may mean a failure in satisfying at least one of condition 1 or condition 2.

[PDCCH: Overbooking]

There may be a case where condition A fails to be satisfied at a specific time point according to the configuration of the search space sets of the base station. When condition A is not satisfied at a specific time point, the terminal may select and monitor only a part of the search space sets configured to satisfy condition A at a corresponding time point, and the base station may transmit a PDCCH by using the selected search space set.

As a method for selecting some search spaces from the entire configured search space sets, the method below may be followed.

When condition A for a PDCCH is not satisfied at a specific time point (slot), the terminal (or the base station) may preferentially select a search space set, in which a search space type is configured as a common search space among search space sets existing at a corresponding time point, over a search space set configured as a UE-specific search space.

When all the search space sets configured as the common search space are selected (that is, when condition A is satisfied even after selecting all the search spaces configured as the common search space), the terminal (or the base station) may select the search space sets configured as the UE-specific search space. In this case, when there are multiple search space sets configured as the UE-specific search space, a search space set having a lower search space set index may have a higher priority. The UE-specific search space sets may be selected within a range in which condition A is satisfied, by taking into account the priority.

[QCL, TCI State]

In a wireless communication system, one or more different antenna ports (or replaceable with one or more channels, signals, or combinations of thereof, but for convenience of description later in the disclosure, referred to as "different antenna ports" for consistency) may be associated with each other by quasi co-location (QCL) configuration as shown in [Table 13] below. A TCI state is for notifying of a QCL relationship between a PDCCH (or a PDCCH DMRS) and different RSs or channels, and when one reference antenna port A (reference RS #A) is QCLed with another target antenna port B (target RS #B), it means that the terminal is allowed to apply some or all of large-scale channel parameters estimated in the antenna port A to perform a channel measurement from the antenna port B. QCL may require different parameters to be associated with one another according to situations such as 1) time tracking affected by average delay and delay spread, 2) frequency tracking affected by Doppler shift and Doppler spread, 3) radio resource management (RRM) affected by an average gain, and 4) beam management (BM) affected by a spatial parameter. Accordingly, NR supports four types of QCL relationships as shown in Table 13 below.

TABLE 13

| QCL type | Large-scale characteristics |
|---|---|
| A | Doppler shift, Doppler spread, average delay, delay spread |
| B | Doppler shift, Doppler spread |
| C | Doppler shift, average delay |
| D | Spatial Rx parameter |

The spatial Rx parameter may collectively refer to all or some of various parameters such as angle of arrival (AoA), power angular spectrum (PAS) of AoA, angle of departure (AoD), PAS of AoD, transmit/receive channel correlation, transmit/receive beamforming, and spatial channel correlation.

The QCL relationships may be configured for the terminal through an RRC parameter TCI-State and QCL-Info as shown in Table 14 below. Referring to Table 14, the base station may configure at least one TCI state for the terminal to notify the terminal of up to two QCL relationships (e.g., qcl-Type1 and qcl-Type2) for an RS referring to an ID of the TCI state, i.e., a target RS. In this case, each QCL information (QCL-Info) included in each TCI state includes a serving cell index and a BWP index of a reference RS indicated by the corresponding QCL information, a type and an ID of the reference RS, and a QCL type as shown in Table 13 above.

TABLE 14

```
TCI-State ::=        SEQUENCE {
    tci-StateId          TCI-StateId,
    (ID of TCI state)
    qcl-Type1            QCL-Info,
    (QCL information of first reference RS of an RS (target RS)
referring to TCI state ID)
    qcl-Type2            QCL-Info          OPTIONAL, -- Need R
    (QCL information of second reference RS of an RS (target
RS) referring to TCI state ID)
    ...
}
QCL-Info ::=         SEQUENCE {
    cell                 ServCellIndex     OPTIONAL, -- Need R
    (serving cell index of reference RS indicated by QCL
information)
    bwp-Id               BWP-Id            OPTIONAL, -- Cond CSI-
RS-Indicated
    (BWP index of reference RS indicated by QCL information)
    referenceSignal      CHOICE {
        csi-rs               NZP-CSI-RS-ResourceId,
        ssb                  SSB-Index
    (one of CSI-RS ID or SSB ID indicated by QCL
information)
    },
```

TABLE 14-continued

```
    qcl-Type             ENUMERATED {typeA, typeB, typeC,
typed},
    ...
}
```

Figure 7:
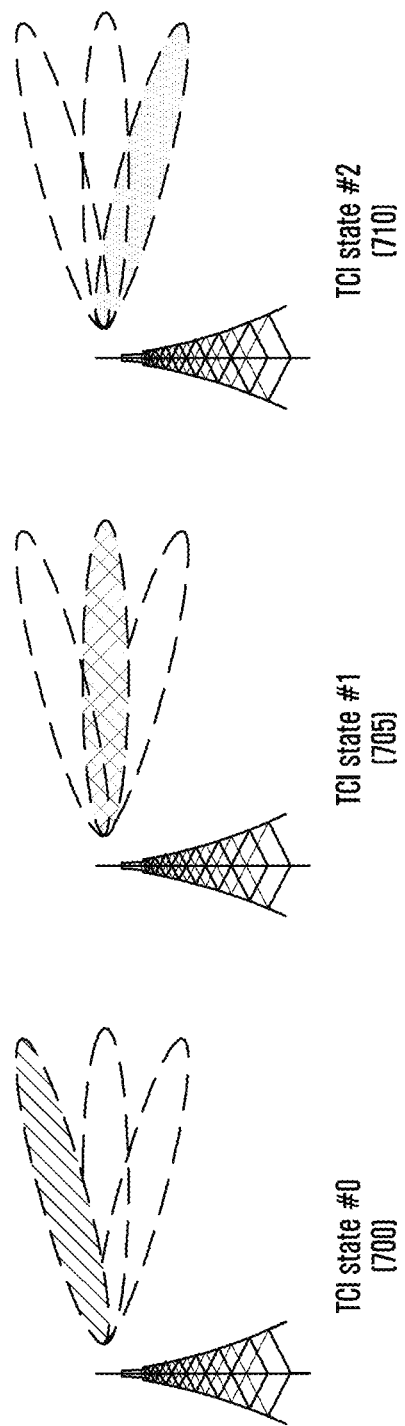
FIG. 7 illustrates an example of base station beam allocation according to a TCI state configuration in a wireless communication system according to an embodiment of the disclosure.

FIG. 7 illustrates an example of base station beam allocation according to a TCI state configuration. Referring to FIG. 7, a base station may transfer information of N number of different beams to a terminal through N number of different TCI states. For example, as illustrated in FIG. 7, if N=3, the base station may allow a qcl-Type 2 parameter included in each of three TCI states 700, 705, and 710 to be associated with a CSI-RS or SSB corresponding to different beams and to be configured to be of QCL type D, so as to notify that antenna ports referring to the different TCI states 700, 705, and 710 are associated with different spatial Rx parameters, that is, different beams.

Tables 15-1 to 15-5 below show valid TCI state configurations according to the types of the target antenna ports.

Table 15-1 shows valid TCI state configurations in a case where the target antenna port is a CSI-RS for tracking (TRS). The TRS means an NZP CSI-RS, for which no repetition parameter is configured and trs-Info is configured to have a value of "true," among CSI-RSs. In Table 15-1, when configuration 3 is configured, the target antenna port can be used for an aperiodic TRS.

TABLE 15-1

Valid TCI state configurations when target antenna port is CSI-RS for tracking (TRS)

| Valid TCI state Configuration | DL RS 1 | qcl-Type1 | DL RS 2 (if configured) | qcl-Type2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 15-2 shows valid TCI state configurations in a case where the target antenna port is a CSI-RS for CSI. The CSI-RS means an NZP CSI-RS, for which neither parameter indicating repetition (repetition parameter) is configured nor trs-Info is configured to have a value of "true," among CSI-RSs.

TABLE 15-2

Valid TCI state configurations when target antenna port is CSI-RS for CSI

| Valid TCI state Configuration | DL RS 1 | qcl-Type1 | DL RS 2 (if configured) | qcl-Type2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 15-3 shows valid TCI state configurations in a case where the target antenna port is a CSI-RS for beam management (BM) (having the same meaning as a CSI-RS for L1 RSRP reporting). The CSI-RS of BM means an NZP CSI-RS for which a repetition parameter is configured and has a value of "on" or "off" and no trs-info is configured to have a value of "true," among CSI-RSs.

TABLE 15-3

Valid TCI state configurations when target antenna port is CSI-RS for BM (for L1 RSRP reporting)

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH Block | QCL-TypeC | SS/PBCH Block | QCL-TypeD |

Table 15-4 shows valid TCI state configurations when the target antenna port is a PDCCH DMRS.

TABLE 15-4

Valid TCI state configurations when target antenna port is PDCCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 15-5 shows valid TCI state configurations when the target antenna port is a PDSCH DMRS.

TABLE 15-5

Valid TCI state configurations when target antenna port is PDSCH DMRS

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In the representative QCL configuration method according to Tables 15-1 to 15-5, the target antenna port and the reference antenna port at each stage are configured and managed such as "SSB"->"TRS"->"CSI-RS for CSJ, CSI-RS for BM, PDCCH DMRS, or PDSCH DMRS." Accordingly, the statistical characteristics measurable from the SSB and the TRS are associated with the antenna ports, and thus, a reception operation of the terminal can be assisted.

[PDCCH: In Relation to TCI State]

Specifically, a combination of TCI states applicable to a PDCCH DMRS antenna port is shown in Table 15-6 below. In Table 15-6, a combination in the fourth row is assumed by the terminal before RRC configuration, and is unable to be configured after RRC.

TABLE 15-6

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS(BM) | QCL-TypeD |
| 3 | CSI-RS(CSI) | QCL-TypeA | | |
| 4 | SS/PBCH Block | QCL-TypeA | SS/PBCH Block | QCL TypeD |

Figure 8:
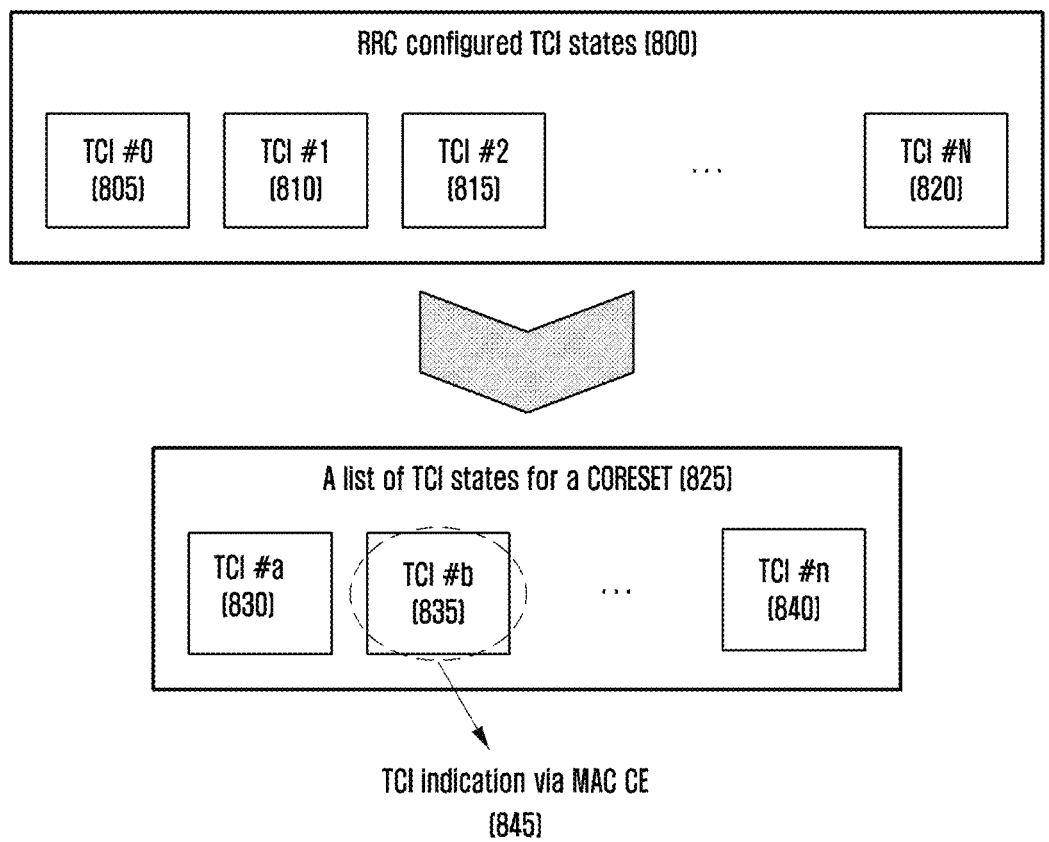
FIG. 8 illustrates an example of a TCI state allocation method for a PDCCH in a wireless communication system according to an embodiment of the disclosure.

NR supports a hierarchical signaling method as illustrated in FIG. 8 for dynamic allocation of PDCCH beams. Referring to FIG. 8, a base station may configure N number of TCI states 805, 810, . . . , and 820 for a terminal through RRC signaling 800, and may configure some of the TCI states as TCI states for a CORESET 825. After the configuration, the base station may indicate one of TCI states 830, 835, and 840 for the CORESET to the terminal through MAC CE signaling 845. Thereafter, the terminal receives a PDCCH, based on beam information included in a TCI state indicated by the MAC CE signaling.

Figure 9:
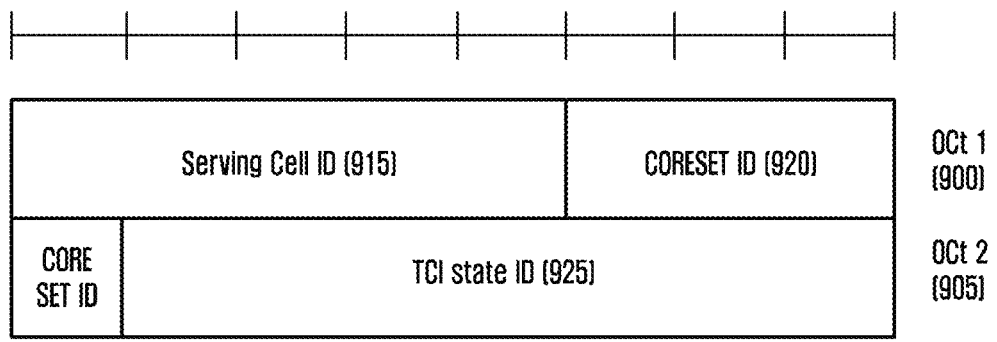
FIG. 9 illustrates a TCI indication MAC CE signaling structure for a PDCCH DMRS in a wireless communication system according to an embodiment of the disclosure.

FIG. 9 illustrates a TCI indication MAC CE signaling structure for the PDCCH DMRS. Referring to FIG. 9, the TCI indication MAC CE signaling for the PDCCH DMRS is configured by 2 bytes (16 bits) 900 and 905, and includes a 5-bit serving cell ID 915, a 4-bit CORESET ID 920, and a 7-bit TCI state ID 925.

Figure 10:
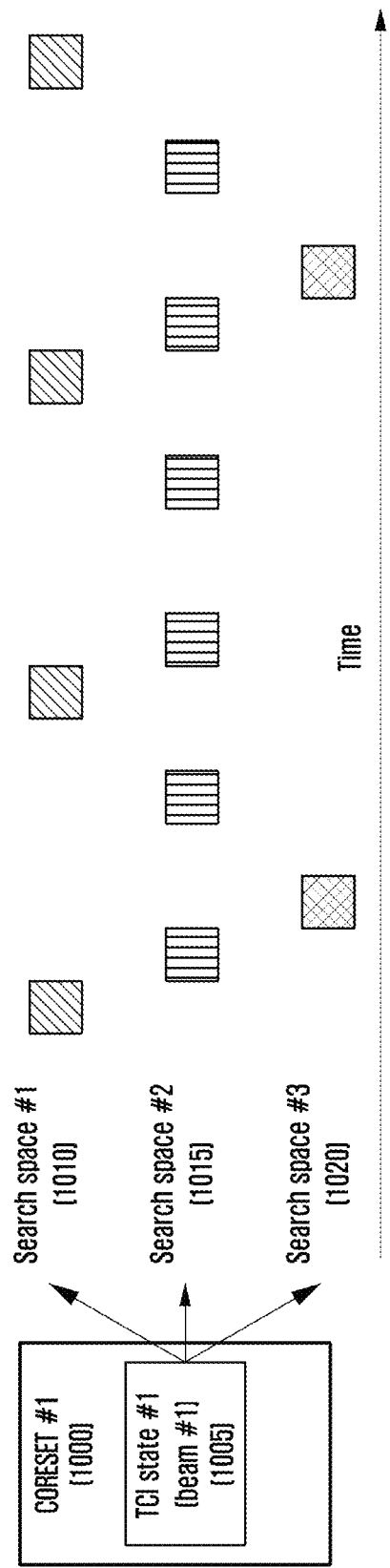
FIG. 10 illustrates an example of configuration of a control resource set and a search space beam in a wireless communication system according to an embodiment of the disclosure.

FIG. 10 illustrates an example of configuration of a CORESET and a search space beam according to the above description. Referring to FIG. 10, a base station may indicate one TCI state in a TCI state list included in a configuration of a CORESET 1000 through MAC CE signaling 1005. Thereafter, until another TCI state in the CORESET is indicated through another MAC CE signaling, a terminal may assume that the same QCL information (beam #1 1005) is applied to one or more search spaces 1010, 1015, and 1020 connected to the CORESET. In the above-described PDCCH beam allocation method, it is difficult to indicate a beam change earlier than an MAC CE signaling delay, and there is an advantage in that the same beam is collectively applied for each CORESET regardless of the characteristics of search spaces, and thus, flexible PDCCH beam management is difficult. Hereinafter, embodiments of the disclosure provide a more flexible PDCCH beam configuration and management method. In describing the embodiments of the disclosure, for convenience of description, some distinguishable examples are provided, but the examples are not mutually exclusive, and can be properly combined with each other according to a situation for application.

The base station may configure, for the terminal, one or multiple TCI states with respect to a particular control resource set, and may activate one of the configured TCI states through an MAC CE activation command. For example, {TCI state #0, TCI state #1, TCI state #2} is configured for control resource set #1 as TCI states, and the base station may transmit a command of activating that a TCI state for control resource set #1 is assumed to be TCI state #0, to the terminal through a MAC CE. Based on the activation command for the TCI state, received through the MAC CE, the terminal may correctly receive a DMRS in the control resource set, based on QCL information in the activated TCI state.

With respect to a control resource set (control resource set #0) configured to have an index of 0, if the terminal has failed to receive a MAC CE activation command for a TCI state of control resource set #0, the terminal may assume that a DMRS transmitted in control resource set #0 is QCLed with an SS/PBCH block identified in an initial access process or a non-contention-based random access process that is not triggered by a PDCCH command.

With respect to a control resource set (control resource set #X) configured to have an index of a value rather than zero, if a TCI state for control resource set #X fails to be configured for the terminal, or if one or more TCI states are configured for the terminal, but the terminal has failed to receive an MAC CE activation command of activating one of the TCI states, the terminal may assume that a DMRS transmitted in control resource set #X is QCLed with an SS/PBCH block identified in an initial access process.

[PDCCH: In Relation to QCL Prioritization Rule]

Hereinafter, an operation of determining QCL priorities for a PDCCH is described in detail.

When a terminal operates in carrier aggregation in a single cell or band and multiple control resource sets existing in an activated bandwidth part in a single cell or multiple cells overlap on time while having the same QCL-TypeD characteristic or different QCL-TypeD characteristics in a specific PDCCH monitoring occasion, the terminal may select a specific control resource set according to a QCL priority determination operation and monitor control resource sets having the same QCL-TypeD characteristic as the corresponding control resource set. That is, when multiple control resource sets overlap on time, only one QCL-TypeD characteristic can be received. In this case, a condition to determine the QCL priorities may be as follows:

Condition 1: a control resource set connected to a common search interval of the lowest index in a cell corresponding to the lowest index, among cells including the common search interval; and Condition 2: a control resource set connected to a UE-specific search interval of the lowest index in a cell corresponding to the lowest index, among cells including the UE-specific search interval As described above, when each condition is not satisfied, the next condition is applied. For example, in a case where control resource sets overlap on time in a specific PDCCH monitoring occasion, when all the control resource sets are not connected to the common search interval but connected to the UE-specific search interval, that is, when condition 1 fails to be satisfied, the terminal may omit application of condition 1 and may apply condition 2.

When the terminal selects a control resource set according to the above-described conditions, two additional matters below may be considered for QCL information configured for the control resource set. First, if control resource set 1 has CSI-RS 1 as a reference signal having a QCL-TypeD relationship, the reference signal with which CSI-RS 1 has the QCL-TypeD relationship corresponds to SSB 1, and the reference signal with which another control resource set 2 has the QCL-TypeD relationship corresponds to SSB 1, the terminal may consider that these two control resource sets 1 and 2 have different QCL-TypeD characteristics. Second, if control resource set 1 has CSI-RS 1 configured in cell 1, as a reference signal having a QCL-TypeD relationship, the reference signal with which CSI-RS 1 has the QCL-TypeD relationship corresponds to SSB 1, control resource set 2 has CSI-RS 2 configured in cell 2, as a reference signal having the QCL-TypeD relationship, and the reference signal with which CSI-RS 2 has the QCL-TypeD relationship corresponds to SSB 1, the terminal may consider that two control resource sets have the same QCL-TypeD characteristic.

Figure 12:
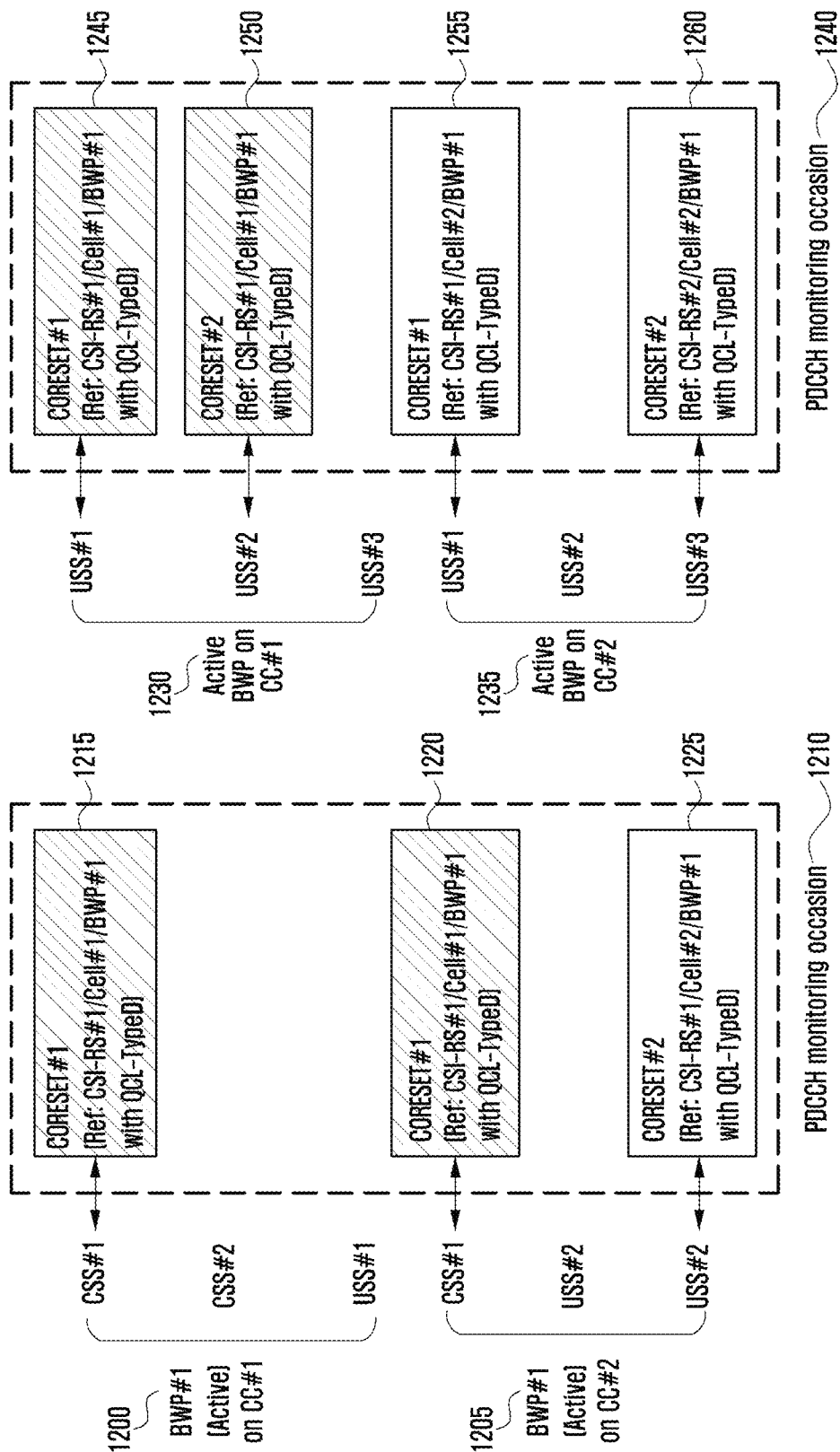
FIG. 12 illustrates a method for selecting a control resource set receivable in consideration of priorities when a terminal receives a downlink control channel in a wireless communication system according to an embodiment of the disclosure.

FIG. 12 illustrates a method for selecting a control resource set receivable in consideration of priorities when a terminal receives a downlink control channel in a wireless communication system according to an embodiment of the disclosure. For example, reception of multiple control resource sets overlapping on time in a specific PDCCH monitoring occasion 1210 may be configured for the terminal, and the multiple control resource sets may be connected to a common search space or a UE-specific search space for multiple cells. In the corresponding PDCCH monitoring occasion, control resource set #1 1215 connected to common search space #1 may exist in bandwidth part #1 1200 in cell #1, and control resource set #1 1220 connected to common search space #1 and control resource set #2 1225 connected to UE-specific search space #2 may exist in bandwidth part #1 1205 in cell #2. The control resource sets 1215 and 1220 may have a QCL-TypeD relationship with CSI-RS resource #1 configured in bandwidth part #1 in cell #1, and the control resource set 1225 may have a QCL-TypeD relationship with CSI-RS resource #1 configured in bandwidth part #1 in cell #2.

Accordingly, when applying condition 1 to the corresponding PDCCH monitoring occasion 1210, all other control resource sets having a reference signal in the QCL- TypeD, such as control resource set #1 1215, may be received. Accordingly, the terminal may receive control resource sets 1215 and 1220 in the corresponding PDCCH monitoring occasion 1210. In another example, reception of multiple control resource sets overlapping on time in a specific PDCCH monitoring occasion 1240 may be configured for the terminal, and the multiple control resource sets may be connected to a common search space or a UE-specific search space for multiple cells. In the corresponding PDCCH monitoring occasion, control resource set #1 1245 connected to UE-specific search space #1 and control resource set #2 1250 connected to UE-specific search space #2 may exist in bandwidth part #1 1230 in cell #1, and control resource set #1 1255 connected to UE-specific search space #1 and control resource set #2 1260 connected to UE-specific search space #3 may exist in bandwidth part #1 1235 in cell #2.

The control resource sets 1245 and 1250 may have a QCL-TypeD relationship with CSI-RS resource #1 configured in bandwidth part #1 in cell #1, control resource set 1255 may have the QCL-TypeD relationship with CSI-RS resource #1 configured in bandwidth part #1 in cell #2, and control resource set 1260 may have the QCL-TypeD relationship with CSI-RS resource #2 configured in bandwidth part #1 in cell #2. However, when condition 1 is applied to the corresponding PDCCH monitoring occasion 1240, there is no common search space, and thus, condition 2 corresponding to the next condition may be applied. When applying condition 2 to the corresponding PDCCH monitoring occasion 1240, all other control resource sets having a reference signal of the QCL-TypeD, such a control resource set 1245, may be received. Accordingly, the terminal may receive the control resource sets 1245 and 1250 in the corresponding PDCCH monitoring occasion 1240.

[In Relation to Rate Matching/Puncturing]

Hereinafter, a rate matching operation and a puncturing operation are described in detail.

When time and frequency resource A for transmitting predetermined symbol sequence A overlaps with predetermined time and frequency resource B, a rate matching or puncturing operation may be considered as an operation of transmitting or receiving channel A in consideration of resource C in an area in which resource A and resource B overlap. A detailed operation may follow a description below.

Rate Matching Operation

A base station may perform mapping to channel A only for a resource area remaining after excluding resource C corresponding to an area overlapping with resource B, from the entire resource A for transmitting symbol sequence A to a terminal, and perform transmission. For example, when symbol sequence A includes {symbol #1, symbol #2, symbol #3, symbol #4}, resource A includes {resource #1, resource #2, resource #3, resource #4}, and resource B includes {resource #3, resource #5}, the base station may sequentially map symbol sequence A to {resource #1, resource #2, resource #4} corresponding to a resource remaining after excluding {resource #3} corresponding to resource C from resource A, and perform transmission. Consequently, the base station may map {symbol #1, symbol #2, symbol #3} corresponding to a symbol sequence to {resource #1, resource #2, resource #4}, respectively, and perform transmission.

The terminal may determine resource A and resource B from scheduling information relating to symbol sequence A from the base station, and determine resource C corresponding to an area in which resource A overlaps with resource B. The terminal may receive symbol sequence A by assuming that symbol sequence A is mapped to an area remaining after excluding resource C from the entire resource A, and is transmitted. For example, when symbol sequence A includes {symbol #1, symbol #2, symbol #3, symbol #4}, resource A includes {resource #1, resource #2, resource #3, resource #4}, and resource B includes {resource #3, resource #5}, the terminal may receive symbol sequence A by assuming that symbol sequence A is sequentially mapped to {resource #1, resource #2, resource #4} corresponding to a resource remaining after excluding {resource #3} corresponding to resource C from resource A, and is transmitted. Consequently, the terminal may perform a series of reception operations thereafter by assuming that {symbol #1, symbol #2, symbol #3} corresponding to a symbol sequence are mapped to {resource #1, resource #2, and resource #4}, respectively, and are transmitted.

Puncturing Operation

When there is resource C corresponding to an area overlapping with resource B among the entire resource A for transmitting symbol sequence A to the terminal, the base station may map symbol sequence to the entire resource A, but may perform transmission only for a resource area remaining after excluding resource C from resource A, without performing transmission in a resource area corresponding to resource C. For example, when symbol sequence A includes {symbol #1, symbol #2, symbol #3, symbol #4}, resource A includes {resource #1, resource #2, resource #3, resource #4}, and resource B includes {resource #3, resource #5}, the base station may map symbol sequence A {symbol #1, symbol #2, symbol #3, symbol #4} to resource A {resource #1, resource #2, resource #3, resource #4}, respectively, may transmit only a symbol sequence of {symbol #1, symbol #2, symbol #4} corresponding to resources {resource #1, resource #2, resource #4} remaining after excluding {resource #3} corresponding to resource C from resource A, and may not transmit {symbol #3} mapped to {resource #3} corresponding to resource C. Consequently, the base station may map {symbol #1, symbol #2, symbol #4} corresponding to a symbol sequence to {resource #1, resource #2, resource #4}, respectively, and perform transmission.

The terminal may determine resource A and resource B from scheduling information relating to symbol sequence A from the base station, and accordingly, may determine resource C corresponding to an area in which resource A and resource B overlap. The terminal may receive symbol sequence A by assuming that symbol sequence A is mapped to the entire resource A, but transmission is performed in an area remaining after excluding resource C from resource area A. For example, when symbol sequence A includes {symbol #1, symbol #2, symbol #3, symbol #4}, resource A includes {resource #1, resource #2, resource #3, resource #4}, and resource B includes {resource #3, resource #5}, the terminal may receive symbol sequence A by assuming that {symbol #1, symbol #2, symbol #3, symbol #4} corresponding to symbol sequence A are mapped to {resource #1, resource #2, resource #3, resource #4} corresponding to resource A, but {symbol #3} mapped to {resource #3} corresponding to resource C is not transmitted and assuming that {symbol #1, symbol #2, symbol #4} of a symbol sequence corresponding to {resource #1, resource #2, resource #4} corresponding to a resource remaining after excluding {resource #3} corresponding to resource C from resource A is mapped and transmitted. Consequently, the terminal may perform a series of reception operations thereafter by assuming that {symbol #1, symbol #2, symbol #4} of a symbol sequence are mapped to {resource #1, resource #2, resource #4}, respectively.

Hereinafter, a method for configuring a rate matching resource for the purpose of rate matching in a 5G communication system is described. Rate matching means that the size of a signal is controlled by taking into consideration an amount of resources capable of transmitting the signal. For example, the rate matching of a data channel means that the amount of data is adjusted without mapping and transmitting the data channel with respect to a given time and frequency resource area.

Figure 11:
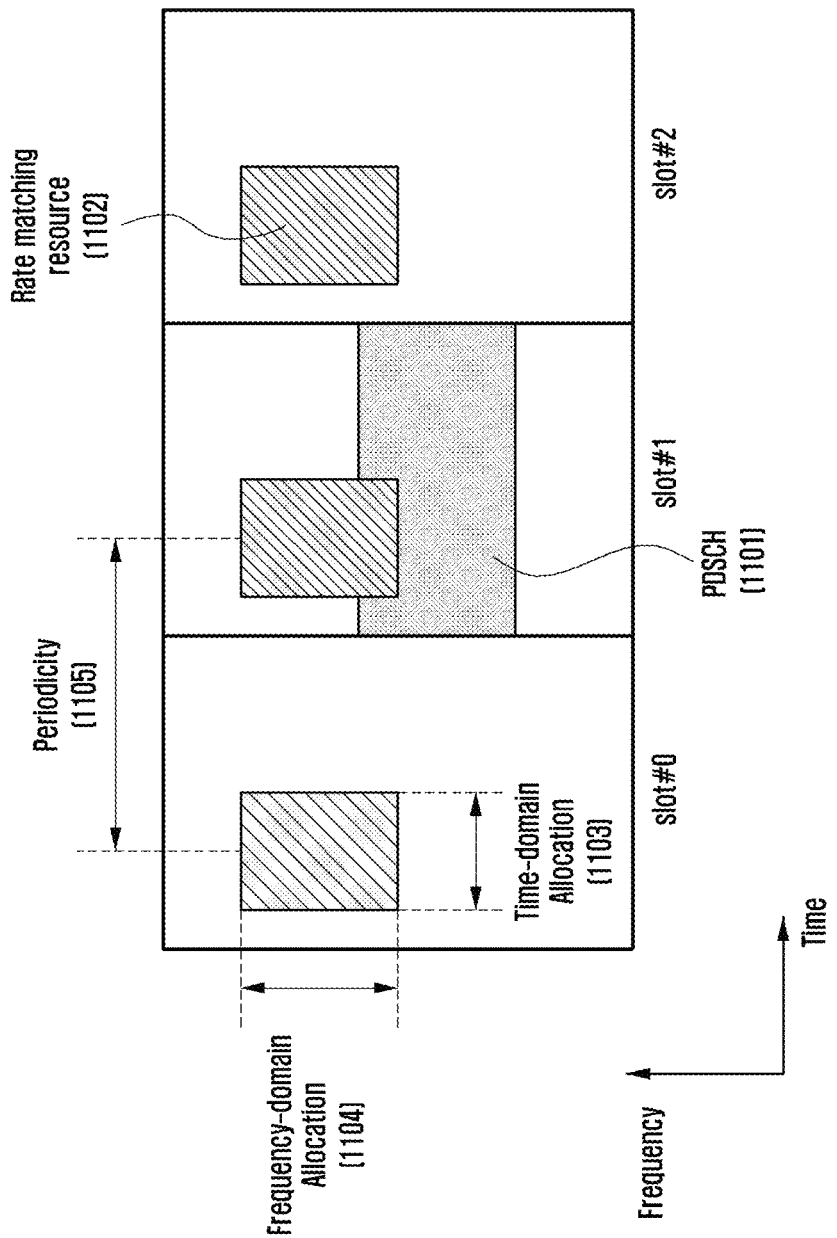
FIG. 11 illustrates a method for transmitting or receiving data in consideration of a downlink data channel and a rate matching resource by a base station and a terminal in a wireless communication system according to an embodiment of the disclosure.

FIG. 11 illustrates a method for transmitting or receiving data in consideration of a downlink data channel and a rate matching resource by a base station and a terminal.

FIG. 11 illustrates a downlink data channel (PDSCH) 1101 and a rate matching resource 1102. A base station may configure one or multiple rate matching resources 1102 for a terminal via higher layer signaling (for example, RRC signaling). Configuration information of the rate matching resource 1102 may include time-domain resource allocation information 1103, frequency-domain resource allocation information 1104, and period information 1105. Hereinafter, a bitmap corresponding to the frequency-domain resource allocation information 1104 is referred to as a "first bitmap," a bitmap corresponding to the time-domain resource allocation information 1103 is referred to as a "second bitmap," and a bitmap corresponding to the period information 1105 is referred to as a "third bitmap." If all or some of the time and frequency resources of the scheduled data channel 1101 overlap the configured rate matching resource 1102, the base station may perform rate matching for the data channel 1101 in the rate matching resource 1102 part and transmit the same. The terminal may perform reception and decoding under the assumption that rate matching for the data channel 1101 has been performed in the rate matching resource 1102 part.

Through additional configuration, the base station may dynamically notify the terminal of whether to perform rate matching for the data channel in the configured rate matching resource part, through DCI (corresponding to a "rate matching indicator" in the above-described DCI format). Specifically, the base station may select some of the configured rate matching resources and group the selected rate matching resources into a rate matching resource group, and may indicate to the terminal whether a data channel has been rate matched with respect to each rate matching resource group, through the DCI by using a bitmap scheme. For example, if four rate-matching resources RMR #1, RMR #2, RMR #3, and RMR #4 have been configured, the base station may configure RMG #1={RMR #1, RMR #2} and RMG #2={RMR #3, RMR #4} as rate matching groups, and may indicate, to the terminal, whether rate matching in each of RMG #1 and RMG #2 has been performed, in the form of a bitmap by using 2 bits in the DCI field. For example, if rate matching may be performed, indication may be made with "1," and if rate matching may not be performed, indication may be made with "0."

In 5G, as a method for configuring the above-described rate matching resource for the terminal, granularities at an "RB symbol level" and an "RE level" are supported. More specifically, a configuration method below may be used.

RB Symbol Level

Maximum four RateMatchPatterns for each bandwidth part may be configured for the terminal via higher-layer signaling, and each RateMatchPattern may include information below:

As a reserved resource in the bandwidth part, a resource for which time and frequency resource areas of the corresponding reserved resource are configured in a combination of a symbol-level bitmap and an RB-level bitmap along the frequency axis may be included. The reserved resource may span over one or two slots. A time domain pattern (periodicityAndPattern) in which time and frequency areas each including a pair of the RB-level bitmap and the symbol-level bitmap repeat may be additionally configured.

A resource area corresponding to time and frequency domain resource areas configured as a control resource set in a bandwidth part and a resource area corresponding to a time domain pattern configured as a search space configuration in which the corresponding resource areas repeat may be included.

RE Level

Information below may be configured for the terminal via higher-layer signaling:

As configuration information (lte-CRS-ToMatchAround) for an RE corresponding to an LTE CRS (a cell-specific reference signal or a common reference signal) pattern, the number of LTE CRS ports (nrofCRS-Ports) and an LTE-CRS-vshift(s) value (v-shift), center subcarrier position information (carrierFreqDL) of an LTE carrier from a base frequency point (for example, from reference point A), the bandwidth part size (carrierBandwithDL) of the LTE carrier, subframe configuration information (mbsfn-SubframConfigList) corresponding to a multicast-broadcast single-frequency network (MBSFN), and the like may be included. The terminal may determine the position of the CRS in the NR slot corresponding to the LTE subframe, based on the above-described information.

Configuration information for a resource set corresponding to one or multiple zero power (ZP) CSI-RSs in a bandwidth part may be included.

[In Relation to LTE CRS Rate Matching]

Next, the LTE cell specific reference signal (CRS) rate matching process will be described in detail. For the coexistence between long-term evolution (LTE) and new RAT (NR) (LTE-NR coexistence), a function for configuring an LTE CRS pattern is provided to the NR terminal in NR. More specifically, the CRS pattern may be provided via RRC signaling including at least one parameter in a ServingCellConfig information element (IE) or a ServingCellConfigCommon IE. An example of the parameter may include lte-CRS-ToMatchAround, lte-CRS-PatternList1-r16, lte-CRS-PatternList2-r16, crs-RateMatch-PerCORESETPoolIndex-r16, etc.

A function enabling configuration of one CRS pattern for each serving cell through the lte-CRS-ToMatchAround parameter is provided in Rel-15 NR. In Rel-16 NR, the function has expanded so as to enable configuration of multiple CRS patterns for each service cell. More specifically, one CRS pattern for each LTE carrier may be configured for a single-(transmission and reception point) TRP configuration terminal, and two CRS patterns for each LTE carrier may be configured for a multi-TRP configuration terminal. For example, maximum three CRS patterns may be configured for the single-TRP configuration terminal via the lte-CRS-PatternList1-r16 parameter. In another example, a CRS for each TRP may be configured for the multi-TRP configuration terminal. That is, a CRS pattern for TRP1 may be configured through the lte-CRS-PatternList1-r16 parameter, a CRS pattern for TRP2 may be configured through the lte-CRS-PatternList2-r16 parameter. When two TRPs are configured, whether CRS patterns for TRP1 and TRP2 are applied to a specific physical downlink shared channel (PDSCH) or a CRS pattern for only one TRP is applied is determined by a crs-RateMatch-PerCORESETPoolIndex-r16 parameter. If the crs-RateMatch-PerCORESETPoolIndex-r16 parameter is configured as enabled, a CRS pattern for only TRP is applied. Otherwise, CRS patterns for both TRPs are applied.

Table 16 below shows a ServingCellConfig IE including the CRS pattern, and Table 17 below shows a RateMatchPatternLTE-CRS IE including at least one parameter for the CRS pattern.

TABLE 16

```
ServingCellConfig ::=                       SEQUENCE {
    tdd-UL-DL-ConfigurationDedicated            TDD-UL-DL-ConfigDedicated
OPTIONAL, -- Cond TDD
    initialDownlinkBWP                          BWP-DownlinkDedicated
OPTIONAL, -- Need M
    downlinkBWP-ToReleaseList                   SEQUENCE (SIZE (1..maxNrofBWPs)) OF BWP-Id
OPTIONAL, -- Need N
    downlinkBWP-ToAddModList                    SEQUENCE (SIZE (1..maxNrofBWPs)) OF BWP-Downlink
OPTIONAL, -- Need N
    firstActiveDownlinkBWP-Id                   BWP-Id
OPTIONAL, -- Cond SyncAndCellAdd
    bwp-InactivityTimer                         ENUMERATED {ms2, ms3, ms4, ms5, ms6, ms8, ms10, ms20, ms30,
                                                    ms40,ms50, ms60, ms80,ms100, ms200,ms300, ms500,
                                                    ms750, ms1280, ms1920, ms2560, spare10, spare9,
spare8,
                                                    spare7, spare6, spare5, spare4, spare3, spare2,
spare1 }      OPTIONAL,    --Need R
    defaultDownlinkBWP-Id                       BWP-Id
OPTIONAL, -- Need S
    uplinkConfig                                UplinkConfig
OPTIONAL, -- Need M
    supplementaryUplink                         UplinkConfig
OPTIONAL, -- Need M
    pdcch-ServingCellConfig                     SetupRelease { PDCCH-ServingCellConfig }
OPTIONAL, -- Need M
    pdsch-ServingCellConfig                     SetupRelease { PDSCH-ServingCellConfig }
OPTIONAL, -- Need M
    csi-MeasConfig                              SetupRelease { CSI-MeasConfig }
OPTIONAL, -- Need M
    sCellDeactivationTimer                      ENUMERATED {ms20, ms40, ms80, ms160, ms200, ms240,
                                                    ms320, ms400, ms480, ms520, ms640, ms720,
                                                    ms840, ms1280, spare2,spare1}    OPTIONAL, --
Cond ServingCellWithoutPUCCH
    crossCarrierSchedulingConfig                CrossCarrierSchedulingConfig
OPTIONAL, -- Need M
    tag-Id                                      TAG-Id,
    dummy                                       ENUMERATED {enabled}
OPTIONAL, -- Need R
    pathlossReferenceLinking                    ENUMERATED {spCell, sCell}
OPTIONAL, -- Cond SCellOnly
    servingCellMO                               MeasObjectId
OPTIONAL, -- Cond MeasObject
    ...,
    [[
    lte-CRS-ToMatchAround                       SetupRelease { RateMatchPatternLTE-CRS }
OPTIONAL, -- Need M
    rateMatchPatternToAddModList                SEQUENCE (SIZE (1..maxNrofRateMatchPatterns)) OF
RateMatchPattern     OPTIONAL,    -- Need N
    rateMatchPatternToReleaseList               SEQUENCE (SIZE (1..maxNrofRateMatchPatterns)) OF
RateMatchPatternId   OPTIONAL,    -- Need N
    downlinkChannelBW-PerSCS-List               SEQUENCE (SIZE (1..maxSCSs)) OF SCS-SpecificCarrier
OPTIONAL   -- Need S
    ]],
    [[
    supplementaryUplinkRelease                  ENUMERATED {true}
OPTIONAL, -- Need N
    tdd-UL-DL-ConfigurationDedicated_IAB-MT-r16         TDD-UL-DL-ConfigDedicated_IAB-MT-r16
OPTIONAL, -- Cond TDD_IAB
    dormantBWP-Config-r16                       SetupRelease { DomantBWP-Config-r16 }
OPTIONAL, -- Need M
    ca-SlotOffset-r16                           CHOICE {
        refSCS15khz                                 INTEGER {-2..2},
        refSCS30KHz                                 INTEGER -5..5},
        refSCS60KHz                                 INTEGER -10..10},
        refSCS120KHz                                INTEGER -20..20}
    }
OPTIONAL, -- Cond AsyncCA
    channelAccessCinfig-r16                     SetupRelease { ChannelAcessConfig-r16 }
OPTIONAL, -- Need M
    intraCellGuardBandsDL-List-r16              SEQUENCE (SIZE (1..maxSCSc)) OF
IntraCellGuardBandsPerSCS-r16                   OPTIONAL,    -- Need S
    intraCellGuardBandsUL-List-r16              SEQUENCE (SIZE (1..maxSCSc)) OF
IntraCellGuardBandsPerSCS-r16                   OPTIONAL,    -- Need S
    csi-RS-ValidationWith-DCI-r16               ENUMERATED {enabled}
OPTIONAL, -- Need R
    lts-CRS-PatternList1-r16                    SetupRelease { LTE-CRS-PatternList-r16 }
OPTIONAL, -- Need M
    lts-CRS-PatternList2-r16                    SetupRelease { LTE-CRS-PatternList-r16 }
OPTIONAL, -- Need M
```

TABLE 16-continued

```
    crs-RateMatch-PerCORESETPoolIndex-r16         ENUMERATED {enabled}
OPTIONAL, -- Need R
    enableTwoDefaultTCI-States-r16                ENUMERATED {enabled}
OPTIONAL, -- Need R
    enableTwoDefaultTCI-StatePerCoresetPoolIndex-r16    ENUMERATED {enabled}
OPTIONAL, -- Need R
    enableMeanSwitchTiming-r16                    ENUMERATED {true}
OPTIONAL, -- Need R
    cbg-TxDiffTBsProcessingType1-r16              ENUMERATED {enabled}
OPTIONAL, -- Need R
    cbg-TxDiffTBsProcessingType2-r16              ENUMERATED {enabled}
OPTIONAL   -- Need R
    ]]
}
```

15

TABLE 17

RateMatchPatternLTE-CRS

The IE RateMatchPatternLTE-CRS is used to configure a pattern to rate match around LTE CRS. See TS 38.214 [19], clause 5.1.4.2.

RateMatchPatternLTE-CRS information element

```
-- ASN1START
-- TAG-RATEMATCHPATTERNLTE-CRS-START
RateMatchPatternLTE-CRS ::= SEQUENCE (
    carrierFreqDL           INTEGER (0 .. 16383),
    carrierBandwidthDL      ENUMERATED {n6; n15, n25, n50, n75, n100, spare2, spare1},
    mbsfn-SubframeConfigList    EUTRA-MBSFN-SubframeConfigList
OPTIONAL, -- Need M
    nrofCRS-Ports           ENUMERATED {n1, n2, n4},
    v-Shift                 ENUMERATED {n0, n1, n2, n3, n4, n5}
}
LTE-CRS-PatternList-r16 ::=    SEQUENCE (SIZE (1.. maxLTE-CRS-Patterns-r16)) OF
RateMatchPatternLTE-CRS
-- TAG-RATEMATCHPATTERNLTE-CRS-STOP
-- ASN1STOP
```

RateMatchPatternLTE-CRS field descriptions carrierBandwidthDL
BW of the LTE carrier in number of PRBs (see TS.38.214 [19], clause 5.1.4.2).
carrierFreqDL
Center of the LTE carrier (see TS 38.214 [19], clause 5.1.4.2).
mbsfn-SubframeConfigList
LTE MBSFN subframe configuration (see TS 38.214 [19], clause 5.1.4.2).
nrofCRS-Ports
Number of LTE CRS antenna port to rate-match around (see TS 38.214 [19], clause 5.1.4.2).
v-Shift
Shifting value v-shift in LTE to rate match around LTE CRS (see TS 38.214 [19], clause 5.1.4.2).

[PDSCH: In Relation to Frequency Resource Allocation]

Figure 14:
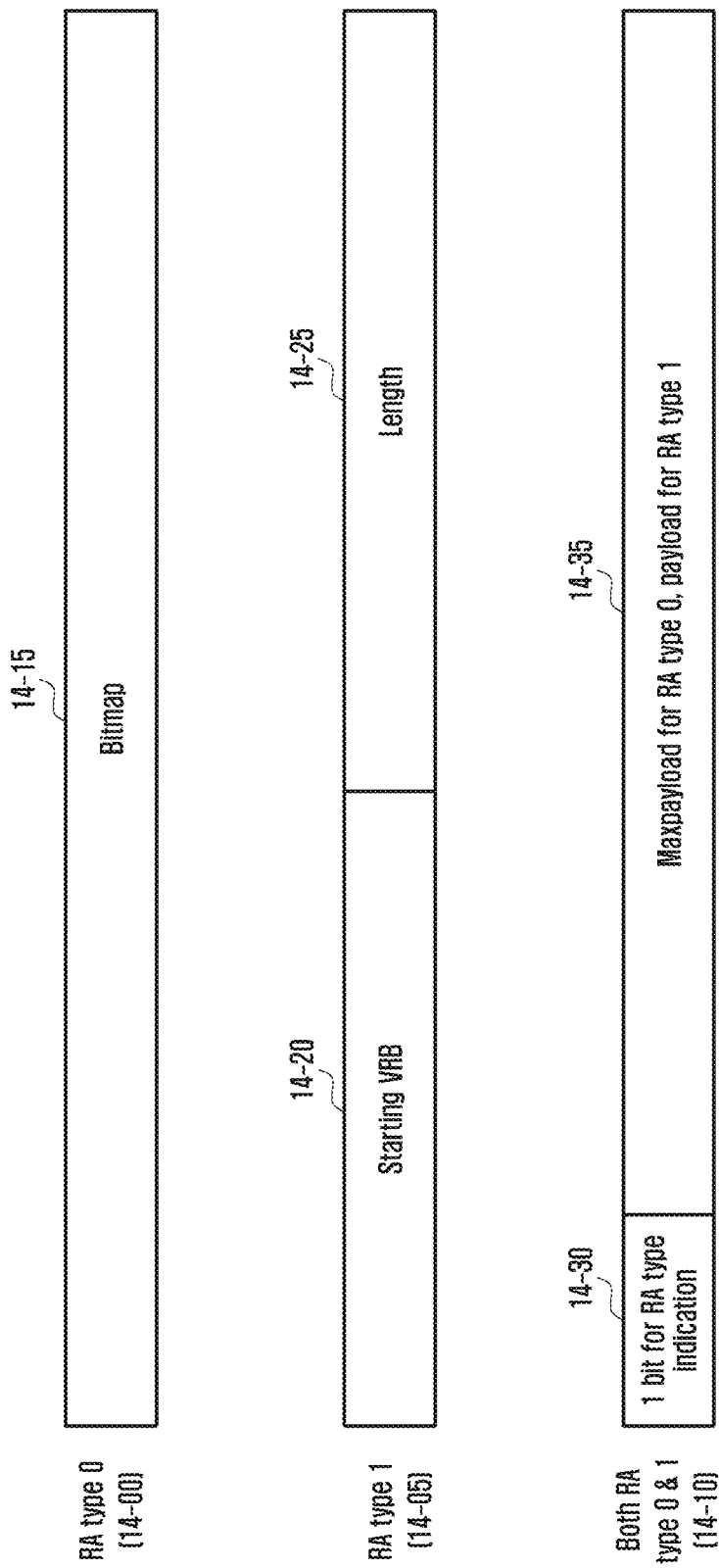
FIG. 14 illustrates an example of frequency domain resource allocation of a PDSCH in a wireless communication system according to an embodiment of the disclosure.

FIG. 14 illustrates an example of frequency domain resource allocation of a physical downlink shared channel (PDSCH) in a wireless communication system according to an embodiment of the disclosure.

FIG. 14 illustrates three frequency domain resource allocation methods of type 0 (14-00), type 1 (14-05), and dynamic switch 14-10, which may be configured through a higher layer in an NR wireless communication system.

Referring to FIG. 14, in a case where a terminal is configured to use only resource type 0, through higher-layer signaling 14-00, some pieces of downlink control information (DCI) for allocating a PDSCH to the terminal include a bitmap of NRBG bits. The conditions for this will be described later. In this case, NRBG indicates the number of resource block groups (RBGs) determined, as shown in [Table 18] below, according to the size of a BWP allocated by a BWP indicator and the higher-layer parameter "rbg-Size," and data is transmitted to the RBG represented as "1" by the bitmap.

TABLE 18

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

In a case where the terminal is configured to use only resource type 1, through higher-layer signaling 14-05, some pieces of DCI for allocating PDSCHs to the terminal have include frequency domain resource allocation information including $\lceil \log_2 (N_{RB}^{DL,BWP}(N_{RB}^{DL,BWP}+1)/2 \rceil$ bits. The conditions for this will be described again later. The base station may configure starting VRB 14-20 and the length 14-25 of the frequency domain resource consecutively allocated after the starting VRB.

If the terminal is configured to use both resource type 0 and resource type 1 through higher layer signaling 14-10, some DCI for allocating the PDSCHs to the corresponding terminal includes frequency domain resource allocation information including bits of a large value 14-35 among the payload 14-15 for configuring resource type 0 and the payloads 14-20 and 14-25 for configuring resource type 1. The conditions for this will be described again later. In this case, one bit 14-30 may be added to the foremost part (MSB) of the frequency domain resource allocation information in the DCI, when the corresponding bit has a value of "0," the use of resource type 0 may be indicated, and when the corresponding bit has a value of "1," the use of resource type 1 may be indicated.

[PDSCH/PUSCH: In Relation to Time Resource Allocation]

Hereinafter, a time domain resource allocation method for a data channel in the next-generation mobile communication system (the 5G or NR system) will be described.

The base station may configure a table about time domain resource allocation information for a downlink data channel (physical downlink shared channel (PDSCH)) and an uplink data channel (physical uplink shared channel (PUSCH)) for the terminal through higher-layer signaling (for example, RRC signaling). A table including up to maxNrofDL-Allocations=16 entries may be configured for the PDSCH, and a table including up to maxNrofUL-Allocations=16 entries may be configured for the PUSCH. In an embodiment, the time domain resource allocation information may include PDCCH-to-PDSCH slot timing (corresponding to a time interval in units of slots between a time point at which the PDCCH is received and a time point at which the PDSCH scheduled by the received PDCCH is transmitted, and denoted as K0), PDCCH-to-PUSCH slot timing (corresponding to a time interval in units of slots between a time point at which the PDCCH is received and a time point at which the PUSCH scheduled by the received PDCCH is transmitted, and denoted as K2), information on the position and length of a start symbol in which the PDSCH or PUSCH is scheduled in the slot, a mapping type of the PDSCH or PUSCH, and the like. For example, the information shown in [Table 19] or [Table 20] below may be notified of to the terminal from the base station.

"time domain resource allocation" in DCI). The terminal may obtain time domain resource allocation information for the PDSCH or the PUSCH, based on the DCI received from the base station.

Figure 15:
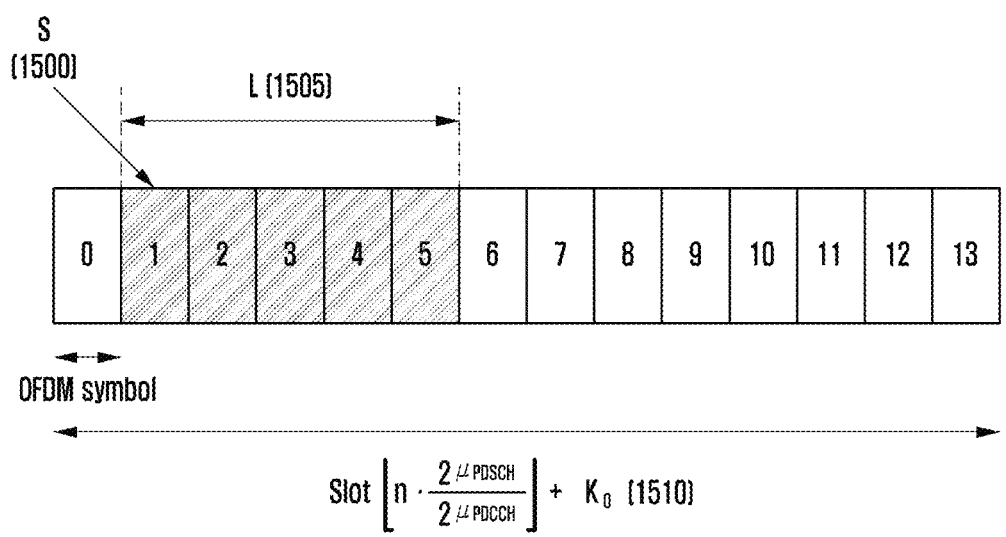
FIG. 15 illustrates an example of allocating time domain resources of a PDSCH in a wireless communication system according to an embodiment of the disclosure.

FIG. 15 illustrates an example of allocating time domain resources of a PDSCH in a wireless communication system according to an embodiment of the disclosure.

Referring to FIG. 15, the base station may indicate the time domain position of a PDSCH resource according to the subcarrier spacing (SCS) ($\mu_{PDSCH}$ and $\mu_{PDCCH}$) of a data channel and a control channel configured using a higher layer, a scheduling offset value (K0), a starting position 1500 of OFDM symbols within one slot 1510 dynamically indicated through DCI, and the length 1505 thereof.

Figure 16A:
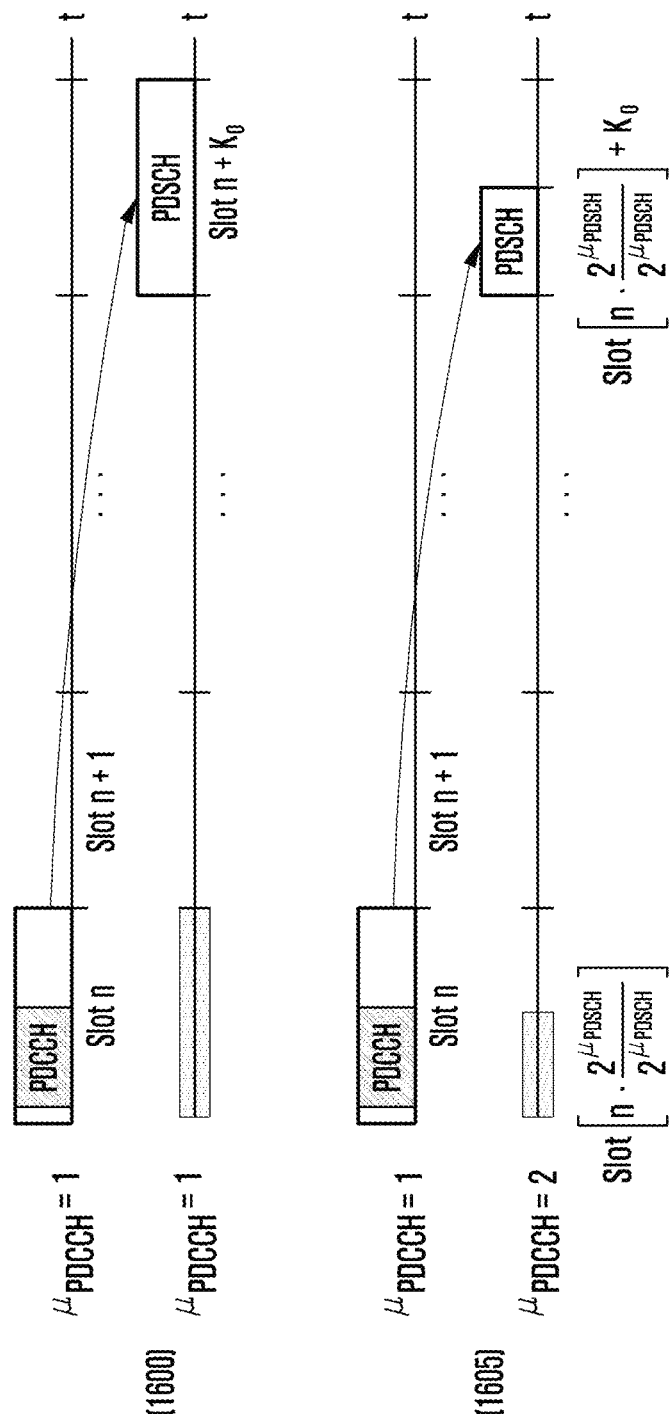
FIG. 16A illustrates an example of allocating time domain resources according to a subcarrier spacing of a data channel and a control channel in a wireless communication system according to an embodiment of the disclosure.

FIG. 16A illustrates an example of allocating time domain resources according to subcarrier spacing of a data channel and a control channel in a wireless communication system according to an embodiment of the disclosure.

Referring to FIG. 16A, if the subcarrier spacing of the data channel is identical to that of the control channel ($\mu_{PDSCH}=\mu_{PDCCH}$) 1600, the slot numbers for the data and the control are identical, and thus, the base station and the terminal may generate a scheduling offset according to a predetermined slot offset (K0). On the other hand, if the subcarrier spacing of the data channel is different from that of the control channel ($\mu_{PDSCH}$ PDCCH) 1605, the slot numbers for the data and the control are different from each other, and thus, the base station and the terminal may generate a scheduling offset according to a predetermined slot offset (K0), based on the subcarrier spacing of the PDCCH.

[PDSCH: Processing Time]

Next, a PDSCH processing time (PDSCH pressing procedure time) will be described. When the base station performs scheduling of PDSCH transmission to the terminal by using DCI format 1_0, 1_1, or 1_2, the terminal may require a PDSCH processing time for receiving the PDSCH by applying a transmission method (a modulation/demodu-

TABLE 19

PDSCH-TimeDomainResourceAllocationList Infomration element

```
PDSCH-TimeDomainResourceAllocationList ::= SEQUENCE (SIZE(1..maxNrofDL-Allocations)) OF
PDSCH-TimeDomainResourceAllocation
PDSCH-TimeDomainResourceAllocation ::= SEQUENCE {
    k0                          INTEGER (0..32)
OPTIONAL,   --Need S
    mappingType                 ENUMERATED {typeA, typeB},
    startSymbolAndLength        INTEGER (0..127)
}
```

TABLE 20

PUSCH-TimeDomainResourceAllocation Information element

```
PUSCH-TimeDomainResourceAllocationList ::= SEQUENCE (SIZE(1..maxNrofUL-Allocations)) OF
PUSCH-TimeDomainResourceAllocation
PUSCH-TimeDomainResourceAllocation ::= SEQUENCE {
    k2                          INTEGER (0..32)    OPTIONAL,   --Need S
    mapping type                ENUMERATED {typeA, typeB},
    startSymbolAndLength        INTEGER (0..127)
}
```

The base station may notify, through L1 signaling (for example, DCI), the terminal of one of the entries in the table for the time domain resource allocation information described above (for example, it may be indicated by a field lation and coding indication index (a modulation and coding scheme (MCS), modulation reference signal-related information, time and frequency resource allocation information, and the like) via DCI. The PDSCH processing time is defined in NR in consideration of the decryption above. The PDSCH processing time of the terminal may follow [Equation 3] below.

$$T_{proc,1}=(N_1+d_{1,1}+d_2)(2048+144)\kappa 2^{-\mu}T_c+T_{ext.}$$ [Equation 3]

Each parameter of $T_{proc,1}$ in Equation 3 above may have the following meaning:

$N_1$: This parameter indicates the number of symbols determined according to numerology and UE processing capability 1 or 2 according to UE capability. In a case where UE processing capability 1 is reported according to UE capability reporting, $N_1$ may have values in [Table 21], and in a case where UE processing capability 2 is reported and the availability of UE processing capability 2 is configured via higher-layer signaling, $N_1$ may have values in [Table 22]. Numerology μ may correspond to a minimum value among $\mu_{PDCCH}$, $\mu_{PDSCH}$, and $\mu_{UL}$ so as to maximize the value of $T_{proc,1}$, and $\mu_{PDCCH}$, $\mu_{PDSCH}$, and $\mu_{UL}$ may mean numerology of a PDCCH having scheduled a PDSCH, numerology of the scheduled PDSCH, and numerology of an uplink channel through HARQ-ACK is to be transmitted, respectively.

TABLE 21

PDSCH processing time in case of PDSCH processing capability 1

PDSCH decoding time $N_1$ [symbols]

| M | Case where dmrs-AdditionalPosition = pos0 in DMRS-Downlinkconfig corresponding to higher-layer signaling is configured for both PDSCH mapping type A and B | Case where dmrs-AdditionalPosition = pos0 in DMRS-Downlinkconfig corresponding to higher-layer signaling is configured for neither PDSCH mapping type A or B, or no higher-layer parameter is configured |
|---|---|---|
| 0 | 8 | $N_{1,0}$ |
| 1 | 10 | 13 |
| 2 | 17 | 20 |
| 3 | 20 | 24 |

TABLE 22

PDSCH processing time in case of PDSCH processing capability 2

PDSCH decoding time $N_1$ [symbols]
Case where dmrs-AdditionalPosition = pos0 in DMRS-Downlinkconfig corresponding to higher-layer signaling is configured

| μ | for both PDSCH mapping type A and B |
|---|---|
| 0 | 3 |
| 1 | 4.5 |
| 2 | 9 for frequency range 1 |

Text: If the terminal uses a shared spectrum channel access scheme, the terminal may calculate a value of Text and apply the same to the PDSCH processing time. Otherwise, the value of Text is assumed as 0.

If 11 indicating a PDSCH DMRS position value is 12, N1,0 in [Table 21] has a value of 14. Otherwise, N1,0 has a value of 13.

With respect to PDSCH mapping type A, if the last symbol of the PDSCH corresponds to the ith symbol in a slot in which the PDSCH is transmitted and i>7, d1,1 is 7-i. Otherwise, d1,1 is 0.

d2: If a PUCCH having a higher priority index overlaps with a PUCCH or a PUSCH having a lower priority index on the time domain, the d2 of the PUCCH having the higher priority index may be configured as a value reported from the terminal. Otherwise, d2 is 0.

If PDSCH mapping type B is used for UE processing capability 1, a value of d1,1 may be determined according to the number (L) of scheduled PDSCH symbols and the number (d) of symbols overlapping between the PDCCH for scheduling the PDSCH and the scheduled PDSCH, as described below:

If L≥7, then d1,1=0;
If L≥4 and L≤6, then $d_{1,1=7}$-L;
If L=3, then d1,1=min (d, 1); and
If L=2, then $d_{1,1=3}$+d.

If PDSCH mapping type B is used for UE processing capability 2, a value of d1,1 may be determined according to the number (L) of scheduled PDSCH symbols and the number (d) of symbols overlapping between the PDCCH for scheduling the PDSCH and the scheduled PDSCH, as described below:

If L≥7, then d1,1=0;
If L≥4 and L≤6, then d1,1=7-L; and
If L=2.

If a PDCCH which performs scheduling exists in a CORESET including three symbols and the corresponding CORESET and the scheduled PDSCH have the same start symbol, then d1,1=3,
otherwise, d1,1=d.

In a case of the terminal supporting capability 2 in a given serving cell, the PDSCH processing time according to UE processing capability 2 may be applied when the terminal is configured with the higher-layer signaling processing Type2Enabled as "enable" for the corresponding cell.

If the position (the corresponding position may consider K1 defined as HARQ-ACK transmission time point, a PUCCH resource used for HARQ-ACK transmission, and a timing advanced effect) of the first uplink transmission symbol of the PUCCH including HARQ-ACK information does not start earlier than the first uplink transmission symbol coming a $T_{proc,1}$ time later from the last symbol of the PDSCH, the terminal may transmit a valid HARQ-ACK message. That is, the terminal may transmit the PUCCH including the HARQ-ACK only if the PDSCH processing time is enough. If not, the terminal cannot provide the base station with valid HARQ-ACK information corresponding to the scheduled PDSCH. When $T_{proc,1}$ can be used for both a normal CP and an expanded CP. In a case of a PDSCH including two PDSCH transmission positions in one slot, $d_{1,1}$ is calculated with reference to the first PDSCH transmission position in the corresponding slot.

[PDSCH: Reception Preparation Time for Cross-Carrier Scheduling]

Next, in a case of cross-carrier scheduling in which $\mu_{PDCCH}$ corresponding to numerology with which a PDCCH for performing scheduling is transmitted is different from $\mu_{PDSCH}$ corresponding numerology with which a PDSCH scheduled by the corresponding PDCCH is transmitted, $N\text{-}_{pdsch}$ corresponding to a terminal PDSCH reception preparation time defined for a time interval between the PDCCH and the PDSCH will be described.

In a case of $\mu_{PDCCH} \leq \mu_{PDSCH}$, the scheduled PDSCH cannot be transmitted earlier than the first symbol of a slot, coming $N_{pdsch}$ symbols later from the last symbol of the PDCCH which has scheduled the corresponding PDSCH. The transmission symbol of the corresponding PDSCH may include a DM-RS.

In a case of $\mu_{PDCCH} > \mu_{PDSCH}$, the scheduled PDSCH can be transmitted after $N_{pdsch}$ symbols later from the last symbol of the PDCCH which has scheduled the corresponding PDSCH. The transmission symbol of the corresponding PDSCH may include a DM-RS.

TABLE 23

$N_{pdsch}$ according to scheduled PDCCH subcarrier spacing

| $\mu_{PDCCH}$ | $N_{pdsch}$ [symbols] |
|---|---|
| 0 | 4 |
| 1 | 5 |
| 2 | 10 |
| 3 | 14 |

[In Relation to SRS]

Next, an uplink channel estimation method using sounding reference signal (SRS) transmission of the terminal will be described. In order to transfer configuration information for the SRS transmission, the base station may configure, for the terminal, at least one SRS configuration for each uplink BWP and at least one SRS resource set for each SRS configuration. For example, the base station and the terminal may transmit or receive higher-layer signaling information below to transfer information relating to the SRS resource set:

- srs-ResourceSetId: An SRS resource set index;
- srs-ResourceIdList: A set of SRS resource indices referred to by an SRS resource set;
- resourceType: This corresponds to time axis transmission configuration of the SRS resource referred to by the SRS resource set, and may be configured with one of "periodic," "semi-persistent," and "aperiodic." When it is configured with "periodic" or "semi-persistent," the associated CSI-Rs information may be provided according to the usage of the SRS resource set. When it is configured with "aperiodic," an aperiodic SRS resource trigger list and slot offset information may be provided, and associated CSI-RS may be provided according to the usage of the SRS resource set;
- usage: This corresponds to a configuration for the usage of the SRS resource referred to by the SRS resource set, and may be configured with one of "beamManagement," "codebook," "nonCodebook," and "antennaSwitching"; and
- alpha, p0, pathlossReferenceRS, srs-PowerControlAdjustmentStates: This provides a parameter configuration for transmission power adjustment of the SRS resource referred by the SRS resource set.

The terminal may understand that the SRS resource included in the set of SRS resource indices referred by the SRS resource set follows information configured for the SRS resource set.

In addition, the base station and the terminal may transmit and receive higher-layer signaling information to transmit individual configuration information for the SRS resource. For example, the individual configuration information for the SRS resource may include time-frequency axis mapping information in the slot of the SRS resource, and this may include information relating to intra-slot or inter-slot frequency hopping of the SRS resource. In addition, the individual configuration information of the SRS resource may include time axis transmission configuration of the SRS resource, and may be configured as one of "periodic," "semi-persistent," and "aperiodic." This may be restricted to have the same time axis transmission configuration as that of the SRS resource set including the SRS resource. If the time axis transmission configuration of the SRS resource is configured as "periodic" or "semi-persistent," the SRS resource transmission periodicity and the slot offset (for example, periodicityAndOffset) may be additionally included in the time axis transmission configuration.

The base station may activate, deactivate, or trigger SRS transmission for the terminal via higher-layer singling including RRC signaling or MAC CE signaling, or L1 signaling (for example, DCI). For example, the base station may activate or deactivate periodic SRS transmission for the terminal via higher-layer signaling. The base station may indicate to activate an SRS resource set having resourceType configured as periodic, via higher-layer signaling, and the terminal may transmit the SRS resource referred to by the activated SRS resource set. The time-frequency domain resource mapping in the slot of the transmitted SRS resource may follow resource mapping information configured for the SRS resource, and the slot mapping including the transmission periodicity and the slot offset may follow periodicityAndOffset configured for the SRS resource. In addition, a spatial domain transmission filter applied to the transmitted SRS resource may refer to spatial relation information configured for the SRS resource, or refer to associated CSI-RS information configured for the SRS resource set in which the SRS resource is included. The terminal may transmit the SRS resource in the uplink BWP activated for the periodic SRS resource activated via higher-layer signaling.

For example, the base station may activate or deactivate semi-persistent SRS transmission for the terminal via higher-layer signaling. The base station may indicate activation of the SRS resource set via MAC CE signaling, and the terminal may transmit the SRS resource referred to by the activated SRS resource set. The SRS resource set activated via MAC CE signaling may be limited to the SRS resource set having resourceType configured as semi-persistent. The time-frequency domain resource mapping in the slot of the transmitted SRS resource may follow resource mapping information configured for the SRS resource, and the slot mapping including the transmission periodicity and the slot offset may follow periodicityAndOffset configured for the SRS resource.

In addition, a spatial domain transmission filter applied to the transmitted SRS resource may refer to spatial relation info configured for the SRS resource, or refer to associated CSI-RS information configured for the SRS resource set in which the SRS resource is included. If the spatial relation info is configured for the SRS resource, the spatial relation info may not be followed, and the spatial domain transmission filter may be determined with reference to configuration information of the spatial relation info transferred through the MAC CE signaling for activating the semi-persistent SRS transmission. The terminal may transmit the SRS resource in the uplink BWP activated for the semi-persistent SRS resource activated via higher-layer signaling.

For example, the base station may trigger aperiodic SRS transmission for the terminal via DCI. The base station may indicate, via an SRS request field of the DCI, one of aperiodic SRS resource triggers (aperiodicSRS-Resource-Trigger). The terminal may understand that an SRS resource set including an aperiodic SRS resource trigger indicated via DCI from an aperiodic SRS resource trigger list, among the SRS resource set configuration information. The terminal may transmit the SRS resource referred to by the triggered SRS resource set. The time-frequency domain resource mapping in the slot of the transmitted SRS resource may follow the resource mapping information configured for the SRS resource. In addition, the slot mapping of the transmitted SRS resource may be determined through a slot offset between the SRS resource and the PDCCH including the DCI, and this may be referred to value(s) included in a slot offset set configured for the SRS resource set.

Specifically, for the slot offset between the SRS resource and the PDCCH including the DCI, a value indicated by the time domain resource assignment field of the DCI may be applied, among offset value(s) included in slot offset set configured for the SRS resource set. In addition, the spatial domain transmission filter applied to the transmitted SRS resource may refer to spatial relation info configured for the SRS resource, or may refer to associated CSI-RS information configured for the spatial relation info configured for the SRS resource. The terminal may transmit the SRS resource in the uplink BWP activated for the aperiodic SRS resource triggered via the DCI.

When the base station triggers the aperiodic SRS resource for the terminal via the DCI, a minimum time interval between the transmitted SRS and the PDCCH including the DCI for triggering the aperiodic SRS transmission may be required so that the terminal applies the configuration information of the SRS resource and transmit the SRS. The time interval for the SRS transmission of the terminal may be defined as the number of symbols between the last symbol of the PDCCH including the DCI for triggering the aperiodic SRS transmission and the first symbol to which the first transmitted SRS resource is mapped, among the transmitted SRS resource(s). The minimum time interval may be determined with reference to a PUSCH preparation procedure time required by the terminal to prepare PUSCH transmission. In addition, the minimum time interval may have a value different from the usage of the SRS resource set including the transmitted SRS resource.

For example, the minimum time interval may be determined with N2 symbols defined in consideration the UE processing capability according to the UE capability with reference to the PUSCH preparation procedure time of the terminal. In addition, when the usage of the SRS resource set is configured as "codebook" or "antennaSwitching" in consideration of the usage of the SRS resource set including the transmitted SRS resource, the minimum time internal may be determined to be N2 symbols, and when the usage of the SRS resource set is configured as "nonCodebook" or "beamManagement," the minimum time interval may be determined to be N2+14 symbols. The terminal may transmit the aperiodic SRS when the time interval for the aperiodic SRS transmission has a value equal to or greater than the minimum time interval, and may omit the DCI for triggering the aperiodic SRS when the time interval for the aperiodic SRS transmission has a value smaller than the minimum time interval.

TABLE 24

```
SRS-Resource ::=                    SEQUENCE {
    srs-ResourceId                      SRS-ResourceId,
    nrofSRS-Ports                       ENUMERATED {port1, ports2, ports4},
    ptrs-PortIndex                      ENUMERATED {n0, n1 }
OPTIONAL,    -- Need R
    transmissionComb                    CHOICE {
        n2                                  SEQUENCE {
            combOffset-n2                       INTEGER (0..1),
            cyclicShift-n2                      INTEGER (0..7)
        },
        n4                                  SEQUENCE {
            combOffset-n4                       INTEGER (0..3),
            cyclicShift-n4                      INTEGER (0..11)
        }
    },
    resourceMapping                     SEQUENCE {
        startPosition                       INTEGER (0..5),
        nrofSymbols                         ENUMERATED {n1, n2, n4},
        repetitionFactor                    ENUMERATED {n1, n2, n4}
    },
    freqDomainPosition                  INTEGER (0..67),
    freqDomainShift                     INTEGER (0..268),
    freqHopping                         SEQUENCE {
        c-SRS                               INTEGER (0..63),
        b-SRS                               INTEGER (0..3),
        b-hop                               INTEGER (0..3)
    },
    groupOrSequenceHopping              ENUMERATED { neither, groupHopping,
sequenceHopping },
    resourceType                        CHOICE {
        aperiodic                           SEQUENCE {
            ...
        },
        semi-persistent                     SEQUENCE {
            periodicityAndOffset-sp             SRS-PeriodicityAndOffset,
            ...
        },
```

TABLE 24-continued

```
      periodic                    SEQUENCE {
        periodicityAndOffset-p        SRS-PeriodicityAndOffset,
        ...
      }
    },
    sequenceId                    INTEGER (0..1023),
    spatialRelationInfo           SRS-SpatialRelationInfo
  OPTIONAL,   -- Need R
  ...
}
```

The spatialRelationInfo configuration information in [Table 24] allows one reference signal to be referred to and beam information of the corresponding reference signal to be applied for a beam used for the corresponding SRS transmission. For example, the configuration of the spatialRelationInfo may include information as in [Table 25] below.

TABLE 25

```
SRS-SpatialRelationInfo ::= SEQUENCE {
    servingCellId           ServCellIndex    OPTIONAL,   -- Need S
    referenceSignal         CHOICE {
      ssb-Index               SSB-Index,
      csi-RS-Index            NZP-CSI-RS-ResourceId,
      srs                     SEQUENCE {
        resourceId              SRS-ResourceId,
        uplinkBWP               BWP-Id
      }
    }
}
```

Referring to the spatialRelationInfo configuration, as an index of a specific reference signal to be referred to for the use of beam information of the reference signal, that is, an SS/PBCH block index, a CSI-RS index, or an SRS index may be configured. The higher-layer signaling referenceSignal corresponds to configuration information indicating beam information of a reference signal, to be referred to for the corresponding SRS information, ssb-Index indicates an SS/PBCH block index, csi-RS-Index indicates a CSI-RS index, and srs indicates an SRS index. When a value of the higher-layer signal referenceSignal is configured as "ssb-Index," the terminal may apply a reception beam which has been used when an SS/PBCH block corresponding to ssb-Index is received, as a transmission beam for the corresponding SRS transmission. When a value of the higher-layer signaling referenceSignal is configured as "csi-RS-Index," the terminal may apply a reception beam which has been used when a CSI-RS corresponding to csi-RS-Index is received, as a transmission beam for the corresponding SRS transmission. When a value of the higher-layer signaling referenceSignal is configured as "srs," the terminal may apply a transmission beam which has been used when an SRS corresponding to srs is transmitted, as a transmission beam for the corresponding SRS transmission.

[PUSCH: In Relation to Transmission Scheme]

Next, a PUSCH transmission scheduling scheme is described. PUSCH transmission may be dynamically scheduled by a UL grant in DCI, or may be operated by configured grant Type 1 or Type 2. The indication of the dynamic scheduling for the PUSCH transmission can be made by DCI format 0_0 or 0_1. Configured grant Type 1 PUSCH transmission may be semi-statically configured through reception of configuredGrantConfig including rrc-ConfiguredUplinkGrant in [Table 26] via higher-layer signaling, without reception of the UL grant in the DCI. Configured grant Type 2 PUSCH transmission may be semi-persistently scheduled by the UL grant in the DCI after the reception of configuredGrantConfig not including rrc-ConfiguredUplinkGrant in [Table 26], via higher-layer signaling. When the PUSCH transmission is operated by a configured grant, parameters to be applied to the PUSCH transmission are applied via higher-layer signaling configuredGrantConfig in [Table 33], except dataScramblingIdentityPUSCH, txConfig, codebookSubset, maxRank, and scaling of UCI-OnPUSCH provided via higher-layer signaling pusch-Config in [Table 27]. When the terminal is provided with transformPrecoder in higher-layer signaling configuredGrantConfig in [Table 26], the terminal applies tp-pi2BP2K in pusch-Config in [Table 27] for the PUSCH transmission operated by the configured grant.

TABLE 26

```
ConfiguredGrantConfig ::=        SEQUENCE {
  frequencyHopping                 ENUMERATED {intraSlot, interSlot}
  OPTIONAL,   -- Need S,
    cg-DMRS-Configuration            DMRS-UplinkConfig,
    mcs-Table                        ENUMERATED {qam256, qam64LowSE}
  OPTIONAL,   -- Need S
    mcs-TableTransformPrecoder       ENUMERATED {qam256, qam64LowSE}
  OPTIONAL,   -- Need S
    uci-OnPUSCH                      SetupRelease { CG-UCI-OnPUSCH }
  OPTIONAL,   -- Need M
    resourceAllocation               ENUMERATED { resourceAllocationType0,
  resourceAllocationType1, dynamicSwitch },
    rbg-Size                         ENUMERATED {config2}
  OPTIONAL,   -- Need S
    powerControlLoopToUse            ENUMERATED {n0, n1},
    p0-PUSCH-Alpha                   P0-PUSCH-AlphaSetId,
    transformPrecoder                ENUMERATED {enabled, disabled}
  OPTIONAL,   -- Need S
```

TABLE 26-continued

```
    nrofHARQ-Processes              INTEGER(1..16),
    repK                            ENUMERATED {n1, n2, n4, n8},
    repK-RV                         ENUMERATED {s1-0231, s2-0303, s3-0000}
OPTIONAL,  -- Need R
    periodicity                     ENUMERATED {
                                      sym2, sym7, sym1x14, sym2x14, sym4x14, sym5x14,
sym8x14, sym10x14, sym16x14, sym20x14,
                                      sym32x14, sym40x14, sym64x14, sym80x14,
sym128x14, sym160x14, sym256x14, sym320x14, sym512x14,
                                      sym640x14, sym1024x14, sym1280x14, sym2560x14,
sym5120x14,
                                      sym6, sym1x12, sym2x12, sym4x12, sym5x12,
sym8x12, sym10x12, sym16x12, sym20x12, sym32x12,
                                      sym40x12, sym64x12, sym80x12, sym128x12,
sym160x12, sym256x12, sym320x12, sym512x12, sym640x12,
                                      sym1280x12, sym2560x12
    },
    configuredGrantTimer            INTEGER (1..64)
OPTIONAL,  -- Need R
    rrc-ConfiguredUplinkGrant       SEQUENCE {
        timeDomainOffset            INTEGER (0..5119),
        timeDomainAllocation        INTEGER (0..15),
        frequencyDomainAllocation   BIT STRING (SIZE(18)),
        antennaPort                 INTEGER (0..31),
        dmrs-SeqInitialization      INTEGER (0..1)
OPTIONAL,  -- Need R
        precodingAndNumberOfLayers  INTEGER (0..63),
        srs-ResourceIndicator       INTEGER (0..15)
OPTIONAL,  -- Need R
        mcsAndTBS                   INTEGER (0..31),
        frequencyHoppingOffset      INTEGER (1..maxNrofPhysicalResourceBlocks-1)
OPTIONAL,  -- Need R
        pathlossReferenceIndex      INTEGER
(0..maxNrofPUSCH-PathlossReferenceRSs-1),
        ...
    }
OPTIONAL,  -- Need R
    ...
}
```

Next, a PUSCH transmission method will be described. A DMRS antenna port for PUSCH transmission is identical to an antenna port for SRS transmission. The PUSCH transmission may follow a codebook-based transmission method or a non-codebook-based transmission method according to whether a value of txConfig in higher-layer signaling pusch-Config in [Table 27] is "codebook" or "nonCodebook." As described above, the PUSCH transmission may be dynamically scheduled through DCI format 0_0 or 0_1, and may be semi-statically configured by the configured grant. If the scheduling for the PUSCH transmission is indicated to the terminal through DCI format 0_0, the terminal may perform beam configuration for PUSCH transmission by using pucch-spatialRelationInfoID corresponding to a UE-specific PUCCH resource corresponding to a minimum ID in an activated uplink BWP in a serving cell, wherein the PUSCH transmission is based on a single antenna port. The terminal does not expect scheduling for PUSCH transmission through DCI format 0_0 in a BWP in which a PUCCH resource including pucch-spatialRelationInfo is not configured. If txConfig in pusch-Config in [Table 27] is not configured for the terminal, the terminal does not expect to be scheduled by DCI format 0_1.

TABLE 27

```
PUSCH-Config ::=                          SEQUENCE {
    dataScramblingIdentityPUSCH           INTEGER (0..1023)
OPTIONAL,  -- Need S
    txConfig                              ENUMERATED {codebook, nonCodebook}
OPTIONAL,  -- Need S
    dmrs-UplinkForPUSCH-MappingTypeA      SetupRelease { DMRS-UplinkConfig }
OPTIONAL,  -- Need M
    dmrs-UplinkForPUSCH-MappingTypeB      SetupRelease { DMRS-UplinkConfig }
OPTIONAL,  -- Need M
    pusch-PowerControl                    PUSCH-PowerControl
OPTIONAL,  -- Need M
    frequencyHopping                      ENUMERATED {intraSlot, interSlot}
OPTIONAL,  -- Need S
    frequencyHoppingOffsetLists           SEQUENCE (SIZE (1..4)) OF INTEGER (1..
maxNrofPhysicalResourceBlocks-1)
OPTIONAL,  -- Need M
    resourceAllocation                    ENUMERATED { resourceAllocationType0,
resourceAllocationType1, dynamicSwitch},
```

TABLE 27-continued

```
  pusch-TimeDomainAllocationList              SetupRelease
{ PUSCH-TimeDomainResourceAllocationList }        OPTIONAL,   -- Need M
  pusch-AggregationFactor                    ENUMERATED { n2, n4, n8 }
OPTIONAL,  -- Need S
  mcs-Table                                  ENUMERATED {qam256, qam64LowSE}
OPTIONAL,  -- Need S
  mcs-TableTransformPrecoder                 ENUMERATED {qam256, qam64LowSE}
OPTIONAL,  -- Need S
  transformPrecoder                          ENUMERATED {enabled, disabled}
OPTIONAL,  -- Need S
  codebookSubset                             ENUMERATED
{fullyAndPartialAndNonCoherent, partialAndNonCoherent,nonCoherent}
OPTIONAL, -- Cond codebookBased
  maxRank                                    INTEGER (1..4)
OPTIONAL, -- Cond codebookBased
  rbg-Size                                   ENUMERATED { config2}
OPTIONAL, -- Need S
  uci-OnPUSCH                                SetupRelease { UCI-OnPUSCH}
OPTIONAL, -- Need M
  tp-pi2BPSK                                 ENUMERATED {enabled}
OPTIONAL, -- Need S
  ...
}
```

Next, codebook-based PUSCH transmission is described. The codebook-based PUSCH transmission may be dynamically scheduled by DCI format 0_0 or 0_1, and may be semi-statically operated by the configured grant. When the codebook-based PUSCH is dynamically scheduled by DCI format 0_1 or semi-statically configured by the configured grant, the terminal may determine a precoder for PUSCH transmission, based on an SRS resource indicator (SRI), a transmission precoding matrix indicator (TPMI), and a transmission rank (the number of PUSCH transmission layers).

In this case, the SRI may be given via an SRS resource indicator field in the DCI, or may be configured through higher-layer signaling srs-ResourceIndicator. When the codebook-based PUSCH transmission is performed, at least one SRS resource is configured for the terminal, and maximum two SRS resources may be configured. When the SRI is provided to the terminal via the DCI, the SRS resource indicated by the corresponding SRI means an SRS resource corresponding to the SRI, among SRS resources transmitted earlier than a PDCCH including the corresponding SRI. In addition, the TPMI and the transmission rank may be given via a precoding information and number of layers field in the DCI, or may be configured via higher-layer signaling precodingAndNumberOfLayers. The TPMI is used to indicate a precoder applied to the PUSCH transmission. When one SRS resource is configured for the terminal, the TPMI is used to indicate a precoder to be applied to the one configured SRS resource. When multiple SRS resources are configured for the terminal, the TPMI is used to indicate a precoder to be applied to an SRS resource indicated via the SRI.

The precoder to be used for the PUSCH transmission is selected from an uplink codebook having the number of antenna ports, which is identical to a nrorSRS-Ports value in the higher-layer signaling SRS-Config. In the codebook-based PUSCH transmission, the terminal determines a codebook subset, based on the TPMI and codebookSubset in the higher-layer signaling pusch-Config. The codebookSubset in the higher-layer signaling pusch-Config may be configured as one of "fullyAndPartialAndNonCoherent," "partialAndNonCoherent," and "nonCoherent," based on the UE capability reported to the base station by the terminal. If the terminal has reported "partialAndNonCoherent" as UE capability, the terminal does not expect that a value of the higher-layer singling codebookSubset is to be configured as "fullyAndPartialAndNonCoherent." In addition, when the terminal has reported "nonCoherent" as UE capability, the terminal does not expect that a value of the higher-layer signaling codebookSubset is to be configured as "fullyAndPartialAndNonCoherent" or "partialAndNonCoherent." When nrofSRS-Ports in the higher-layer signaling SRS-ResourceSet indicates two SRS antenna ports, the terminal does not expect that a value of the higher-layer signaling codebookSubset is to be configured as "partialAndNonCoherent."

One SRS resource set having the usage value in the higher-layer signaling SRS-ResourceSet, the usage value being configured as "codebook," may be configured for the terminal, and one SRS resource in the corresponding SRS resource set may be indicated via the SRI. When there are several SRS resources configured in the SRS resource set having the usage value in the higher-layer signaling SRS-ResourceSet, the usage value being configured as "codebook," the terminal expects that, as the value of nrofSRS-Ports in the higher-layer signaling SRS-Resource, the same value is to be configured for all SRS resources.

The terminal transmits one or multiple SRS resources including the SRS resource set having the usage value configured as "codebook" according to the higher-layer signaling, and the base station selects one of the SRS resources transmitted by the terminal, and indicates the terminal to perform PUSCH transmission, by using transmission beam information of the corresponding SRS resource. In this case, in the codebook-based PUSCH transmission, the SRI is used as information for selecting an index of the SRS resource, and is included in the DCI. Additionally, the base station includes information indicating the rank and the TPMI to be used when the terminal performs PUSCH transmission, in the DCI. The terminal performs the PUSCH transmission by applying a precoder indicated by the rank and the TPMI indicated based on the transmission beam of the corresponding SRS resource, by using the SRS resource indicated by the SRI.

Next, the non-codebook-based PUSCH transmission is described. The non-codebook-based PUSCH transmission may be dynamically scheduled via DCI format 0_0 or 0_1, and may be semi-statically operated by the configured grant.

When at least one SRS resource is configured in the SRS resource set having the usage value in the higher-layer signaling SRS-ResourceSet, the usage value being configured as "nonCodebook," the non-codebook-based PUSCH transmission may be scheduled to the terminal via DCI format 0_1.

For the SRS resource set having the usage value in the higher-layer signaling SRS-ResourceSet, the usage value being configured as "nonCodebook," one connected non-zero power CSI-RS (NZP CSI-RS) resource may be configured for the terminal. The terminal may calculate a precoder for SRS transmission through measurement for an NZP CSI-RS resource connected to the SRS resource set. When the interval between the last reception symbol of the aperiodic NZP CSI-RS resource connected to the SRS resource set and the first symbol of the aperiodic SRS transmission has a value greater than 42, the terminal does not expect that information on the precoder for the SRS transmission is to be updated.

When the value of resourceType in the higher-layer signaling SRS-ResourceSet is configured as "aperiodic," the connected NZP CSI-RS is indicated by an SRS request corresponding to a field in DCI format 0_1 or 1_1. In this case, when the connected NZP CSI-RS resource corresponds to an aperiodic NZP CSI-RS resource, the existence of the connected NZP CSI-RS is indicated when a value of the SRS request field in DCI format 0_1 or 1_1 does not correspond to "00." In this case, the corresponding DCI may not indicate cross-carrier or cross-BWP scheduling. In addition, when the value of the SRS request indicates the existence of the NZP CSI-RS, the corresponding NZP CSI-RS is positioned in a slot in which a PDCCH including the SRS request field is transmitted. In this case, TCI states configured for the scheduled subcarrier are not configured as QCL-TypeD.

When the periodic or semi-persistent SRS resource set is configured, the connected NZP CSI-RS may be indicated through associated CSI-RS in the higher-layer signaling SRS-ResourceSet. For the non-codebook-based transmission, the terminal does not expect that higher-layer signaling spatialRelationInfo for the SRS resource and the associated CSI-RS in the higher-layer signaling SRS-ResourceSet are configured together.

When multiple SRS resources are configured for the terminal, the terminal may determine the transmission rank and the precoder to the applied for the PUSCH transmission, based on the SRI indicated by the base station. In this case, the SRI may be indicated through an SRS resource indicator field in the DCI, or may be configured via higher-layer signaling srs-ResourceIndicator. Similar to the above-described codebook-based PUSCH transmission, when the SRI is provided to the terminal via the DCI, the SRS resource indicated by the corresponding SRI may mean an SRS resource corresponding to the SRI, among the SRS resources transmitted earlier than the PDCCH including the corresponding SRI. The terminal may use one or multiple SRS resources for the SRS transmission, and the maximum number of SRS resources and the maximum number of SRS resources which can be simultaneously transmitted in the same symbol in one SRS resource set are determined by UE capability reported to the base station by the terminal. In this case, the SRS resources simultaneously transmitted by the terminal occupy the same RB. The terminal configures one SRS port for each SRS resource. Only one SRS resource set having the usage value in the higher-layer signaling SRS-ResourceSet, the usage value being configured as "non-Codebook," may be configured, and maximum four SRS resources for non-codebook-based PUSCH transmission may be configured.

The base station transmits one NZP-CSI-RS connected to the SRS resource set to the terminal, and the terminal calculates a precoder to be used during transmission of one or multiple SRS resources in the corresponding SRS resource set, based on the result of measurement during reception of the corresponding NZP-CSI-RS. When transmitting, to the base station, one or multiple SRS resources in the SRS resource set having the usage configured as "non-Codebook," the terminal applies the calculated precoder, and the base station selects one or multiple SRS resources from among the received one or multiple SRS resources. In this case, the SRI in the non-codebook-based PUSCH transmission indicates an index which can represent one or a combination of multiple SRS resources, and the SRI is included in the DCI. In this case, the number of SRS resources indicated by the SRI transmitted by the base station may correspond to the number of transmission layers of the PUSCH, and the terminal applies the precoder, applied to the SRS resource transmission, to each layer to transmit the PUSCH.

[PUSCH: Preparation Procedure Time]

Next, a PUSCH preparation procedure time is described. When the base station performs scheduling so that the terminal transmits the PUSCH, by using DCI format 0_0, 0_1, or 0_2, the terminal may require a PUSCH preparation procedure time to apply a transmission method (a transmission precoding method of the SRS resource, the number of transmission layers, and a spatial domain transmission filter) indicated via the DCI and transmit the PUSCH. In NR, the PUSCH preparation procedure time is defined in consideration of the description above. The PUSCH preparation procedure time of the terminal may follow [Equation 4] below:

$$T_{proc,2} = \max((N_2 + d_{2,1} + d_2)(2048+144)\kappa 2^{-\mu} T_c + T_{ext} + T_{switch}, d_{2,2}).$$ [Equation 4]

Each parameter of $T_{proc,2}$ in Equation 4 above may have the following meaning:

$N_2$: This parameter indicates the number of symbols determined according to numerology and UE processing capability 1 or 2 according to UE capability. In a case where UE processing capability 1 is reported according to UE capability reporting, $N_2$ may have values in [Table 28], and in a case where UE processing capability 2 is reported and the availability of UE processing capability 2 is configured via higher-layer signaling, $N_2$ may have values in [Table 29].

TABLE 28

| μ | PUSCH preparation time $N_2$ [symbols] |
| --- | --- |
| 0 | 10 |
| 1 | 12 |
| 2 | 23 |
| 3 | 36 |

TABLE 29

| μ | PUSCH preparation time $N_2$ [symbols] |
| --- | --- |
| 0 | 5 |
| 1 | 5.5 |
| 2 | 11 for frequency range 1 | d2,1: This corresponds to the number of symbols, determined as 0 if resource elements of the first OFDM symbol of the PUSCH transmission is configured with only DM-RSs. Otherwise, d2,1 is determined as 1;

K: 64;

μ: This follows a value which makes Tproc,2 bigger, among $\mu_{DL}$ and $\mu_{UL}$. $\mu_{DL}$ indicates numerology of a downlink through which a PDCCH including DCI for scheduling a PUSCH is transmitted, and $\mu_{UL}$ indicates numerology of an uplink through which a PUSCH s transmitted;

Tc: Tc has $1/(\Delta f_{max} \cdot N_f)$, $\Delta f_{max}=480 \cdot 10^3$ Hz, and $N_f=4096$;

d2,2: If DCI for scheduling a PUSCH indicates BWP switching, d2,2 follows a BWP switching time. Otherwise, d2,2 has a value of 0;

d2: If OFDM symbols of a PUCCH, a PUSCH having a higher priority index, and PUCCH having a lower priority index overlap on the time domain, a d2 value of the PUSCH having the higher priority index is used. Otherwise, d2 is 0;

Text: If the terminal uses a shared spectrum channel access scheme, the terminal may calculate a value of Text and apply the same to the PDSCH preparation procedure time. Otherwise, the value of Text is assumed as 0; and Tswitch: If an uplink switching spacing is triggered, Tswitch is assumed as a switching spacing time. Otherwise, $T_{switch}$ is assumed as 0.

Considering the time axis resource mapping information of the PUSCH scheduled via the DCI and an uplink-downlink timing advance effect, the base station and the terminal determine that a PUSCH preparation procedure time is not enough if the first symbol of the PUSCH starts earlier than the first uplink symbol in which a CP starts after a $T_{proc,2}$ time later from the last symbol of the PDCCH including the DCI which has scheduled the PUSCH. Otherwise, the base station and the terminal determine that the PUSCH preparation procedure time is enough. The terminal may transmit the PUSCH only when the PUSCH preparation procedure time is enough, and may omit the DCI for scheduling the PUSCH when the PUSCH preparation procedure time is not enough.

[PUSCH: In Relation to Repeated Transmission]

Hereinafter, a detailed description of repeated uplink data channel transmission in the 5G system will be made. In the 5G system, two types of repeated uplink data channel transmission schemes are supported: repeated PUSCH transmission type A and repeated PUSCH transmission type B. One of repeated PUSCH transmission type A and repeated PUSCH transmission type B may be configured for the terminal via higher-layer signaling.

Repeated PUSCH Transmission Type A

As described above, in one slot, a symbol length of an uplink data channel and the position of a start symbol are determined according to a time domain resource allocation method, and the base station may notify the terminal of the number of repeated transmissions via higher-layer signaling (for example, RRC signaling) or L1 signaling (for example, DCI).

The terminal repeatedly transmit, in consecutive slots, an uplink data channel having the same length and start symbol as those of the configured uplink data channel, based on the number of repeated transmission, received from the base station. In this case, when a slot configured via downlink for the terminal by the base station or at least one of uplink data channel symbols configured for the terminal is configured via downlink, the terminal may omit uplink data channel transmission but count the number of repeated uplink data channel transmissions.

Repeated PUSCH Transmission Type B

As described above, in one slot, the length and a start symbol of an uplink data channel are determined according to a time domain resource allocation method, and the base station may notify the terminal of the number of repeated transmissions (numberofrepetitions) via higher-layer signaling (for example, RRC signaling) or L1 signaling (for example, DCI).

First, nominal repetition of the uplink data channel is determined based on the length and the start symbol the configured uplink data channel as follows. A slot in which the nth nominal repetition starts is given by $$K_s + \left\lfloor \frac{s+n \cdot L}{N_{symb}^{slot}} \right\rfloor,$$

and the symbol starts from the slot is given by $\mathrm{mod}(S+n \cdot L, N_{symb}^{slot})$. A slot in which the nth nominal repetition ends is given by $$K_s + \left\lfloor \frac{s+(n+1) \cdot L - 1}{N_{symb}^{slot}} \right\rfloor,$$

and a symbol ends in the slot is given by $\mathrm{mod}(S+(n+1) \cdot L-1, N_{symb}^{slot})$. Here, n=0, . . . , numberofrepetitions−1, S indicates the start symbol of the configured uplink data, and L indicates the symbol length of the configured uplink data channel. K indicates a slot in which PUSCH transmission starts, and $N_{symb}^{slot}$ indicates the number of symbols per slot.

The terminal determines an invalid symbol for repeated PUSCH transmission type B. A symbol configured via downlink by tdd-UL-DL-ConfigurationCommon or tdd-UL-DL-ConfigurationDedicated is determined as the invalid symbol for repeated PUSCH transmission type B. Additionally, the invalid symbol may be configured in a higher-layer parameter (for example, InvalidSymbolPattern). The higher-layer parameter (for example, InvalidSymbolPattern) may provide a symbol-level bitmap over one slot or two slots, and the invalid symbol may be configured therein. In the bitmap, 1 indicates the invalid symbol. Additionally, the periodicity and the pattern of the bitmap may be configured through the higher-layer parameter (for example, periodicityAndPattern). If the higher-layer parameter (for example, InvalidSymbolPattern) is configured and an InvalidSymbolPatternIndicator-ForDCIFormat0_1 or an InvalidSymbolPatternIndicator-ForDCIFormat0_2 parameter indicates 1, the terminal applies an invalid symbol pattern. If the parameter indicates 0, the terminal does not apply the invalid symbol pattern. If the higher-layer parameter (for example, InvalidSymbolPattern) is configured and an InvalidSymbolPatternIndicator-ForDCIFormat0_1 or an InvalidSymbolPatternIndicator-ForDCIFormat0_2 parameter is not configured, the terminal applies the invalid symbol pattern.

After the invalid symbol is determined, the terminal may consider symbols other than the invalid symbol, as valid symbols, for each nominal repetition. When one or more valid symbols are included in each nominal repetition, the nominal repetition may include one or more actual repetitions. Here, each actual repetition includes consecutive sets of valid symbols in one slot, which can be used for repeated PUSCH transmission type B.

Figure 16B:
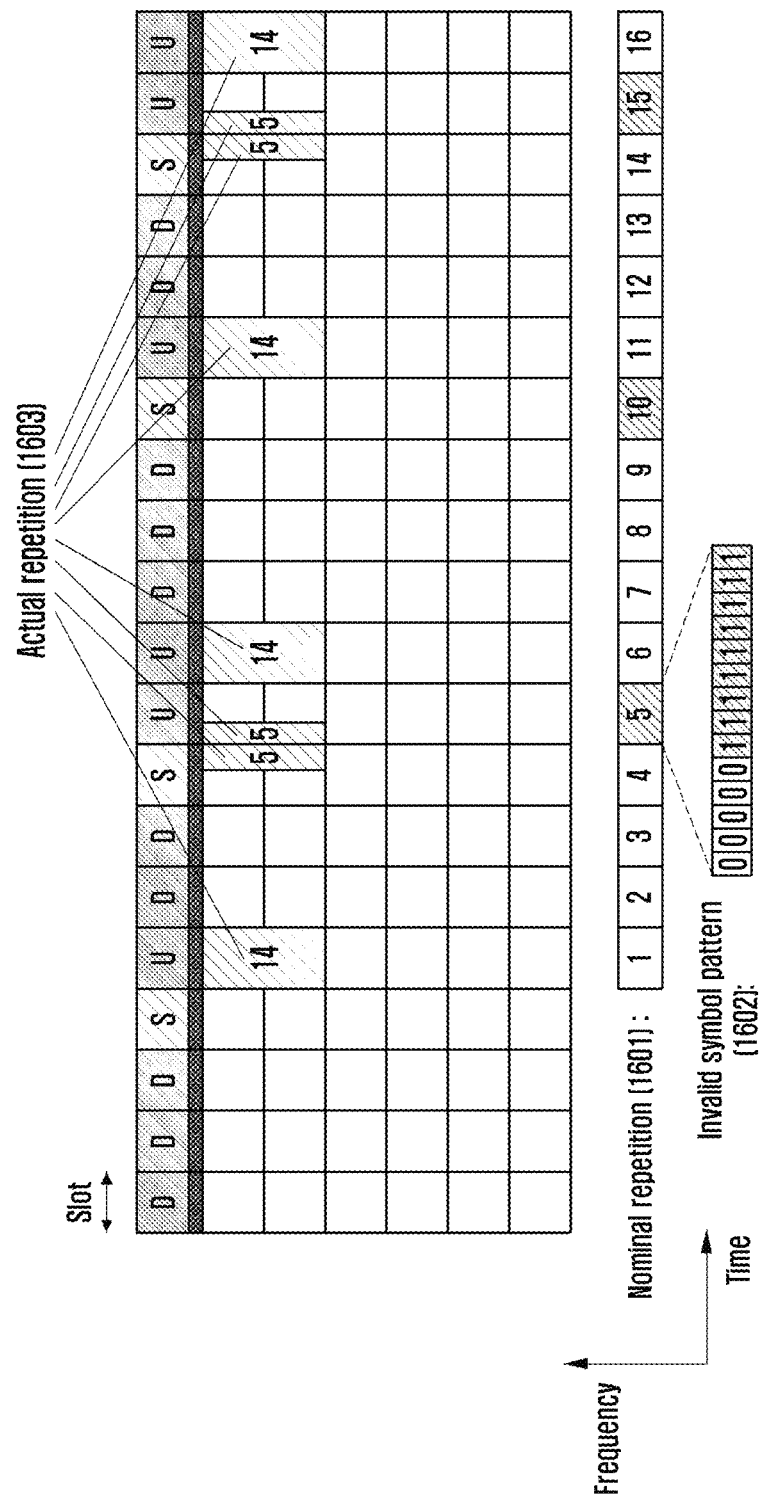
FIG. 16B illustrates an example of repeated PUSCH transmission type B in a wireless communication system according to an embodiment of the disclosure.

FIG. 16B illustrates an example of repeated PUSCH transmission type B in a wireless communication system according to an embodiment of the disclosure. The terminal may receive a configuration of a start symbol S of an uplink data channel as 0, the length L of the uplink data channel as 14, and the number of repeated transmissions as 16. In this case, the nominal repetition 1601 indicates 16 consecutive slots. Thereafter, the terminal may determine a symbol configured as a downlink symbol in each nominal repetition 1601 as an invalid symbol. In addition, the terminal determines symbols configured as 1 in an invalid symbol pattern 1602, as invalid symbols. When valid symbols, rather than invalid symbols, are configured as one or more consecutive symbols in one slot, in each nominal repetition, the valid symbols are configured as actual repetition 1603 and transmitted.

In addition, with respect to repeated PUSCH transmission, in NR Release 16, additional methods below may be defined for UL grant-based PUSCH transmission and configured grant-based PUSCH transmission across a slot boundary.

Method 1 (mini-slot level repetition): Through one UL grant, two or more repeated PUSCH transmissions are scheduled in one slot or across a slot boundary in consecutive available slots. In addition, in relation to method 1, time domain resource allocation information in the DCI indicates a resource of the first repeated transmission. In addition, the time domain resource information of the first repeated transmission and the time domain resource information of the remaining repeated transmission may be determined according to the uplink or downlink direction determined for each symbol of each slot. Each repeated transmission occupies consecutive symbols.

Method 2 (multi-segment transmission): Through one UL grant, two or more repeated PUSCH transmissions are scheduled in consecutive slots. In this case, one transmission is designated for each slot, and transmissions may have different start points or different repetition lengths, respectively. In addition, in method 2, the time domain resource allocation information in the DCI indicates start points and repetition lengths of all repeated transmissions. In addition, when the repeated transmission is performed in a single slot through method 2 and there are several groups of consecutive uplink symbols in the corresponding slot, each repeated transmission is performed for each uplink symbol group. If there is only one group of consecutive uplink symbols in the corresponding slot, one repeated PUSCH transmission is performed according to the method in NR Release 15.

Method 3: Through two or more UL grants, two or more repeated PUSCH transmission are scheduled in consecutive slots. In this case, one transmission is designated for each slot, and the nth UL grant may perform reception before the PUSCH transmission scheduled by the (n−1)th UL grant ends.

Method 4: Through one UL grant or one configured grant, one or several repeated PUSCH transmissions may be supported in a single sot, or two or more repeated PUSCH transmissions may be supported across the boundary of consecutive slots. The number of repetitions, indicated to the terminal by the base station, is merely a nominal value, and the number of repeated PUSCH transmissions actually performed by the terminal may be greater than the nominal number of repetitions. The time domain resource allocation information in the DCI or the configured grant means a resource of the first repeated transmission indicated by the base station. The time domain resource information of the remaining repeated transmission may be determined with reference to the uplink or downlink direction of symbols and resource information of at least the first repeated transmission. If the time domain resource information of the repeated transmission, indicated by the base station, is on a slot boundary or includes uplink/downlink transition point, the corresponding repeated transmission may be divided into multiple repeated transmissions. In this case, one slot may include one repeated transmission for each uplink period.

[PUSCH: Frequency Hopping Process]

Hereinafter, a detailed description of a frequency hopping of an uplink data channel (a physical uplink shared channel (PUSCH)) in a 5G system will be made.

In 5G, as an uplink data channel frequency hopping method, two methods are supported for each repeated PUSCH transmission type. First, in repeated PUSCH repetition transmission type A, intra-slot frequency hopping and inter-slot frequency hopping are supported, and in repeated PUSCH transmission type B, inter-repetition frequency hopping and inter-slot frequency hopping are supported.

The intra-slot frequency hopping method supported in repeated PUSCH transmission type A corresponds to method in which the terminal changes a frequency domain allocation resource by a configured frequency offset in two hops in one slot and performing transmission. In the intra-slot frequency hopping, a start RB of each hop may be indicated through Equation 5 below.

$$RB_{start} = \begin{cases} RB_{start} & i = 0 \\ (RB_{start} + RB_{offset}) \bmod N_{BWP}^{size} & i = 1 \end{cases}. \quad \text{[Equation 5]}$$

In Equation 5, i=0 and i=1 indicate the first hop and the second hop, respectively, and $RB_{start}$ indicates the start RB in the UL BWP, and is calculated from the frequency resource allocation method. $RB_{offset}$ indicates a frequency offset between two hops through a higher-layer parameter. The number of symbols of the first hop may be indicated by $\lfloor N_{symb}^{PUSCH,s}/2 \rfloor$, and the number of symbols of the second hop may be indicated by $N_{symb}^{PUSCH,s} - \lfloor N_{symb}^{PUSCH,s}/2 \rfloor$. $N_{symb}^{PUSCH,s}$ is indicated by the length of PUSCH transmission and the number of OFDM symbols in one slot.

Next, the inter-slot frequency hopping method supported in repeated PUSCH transmission types A and B corresponds to a method in which the terminal changes a frequency domain allocation resource for each slot by a configured frequency offset and performs transmission. In the inter-slot frequency hopping, a start RB for $n_s^\mu 0$ slots may be indicated through Equation 6 below.

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases}. \quad \text{[Equation 6]}$$

In Equation 6, $n_s^\mu$ indicates a current slot number in multi-slot PUSCH transmission, and $RB_{start}$ indicates a start RB in the UL BWP and is calculated from the frequency resource allocation method. $RB_{offset}$ indicates a frequency offset between two hops through a higher-layer parameter.

Next, the inter-repetition frequency hopping method supported in repeated PUSCH transmission type B corresponds to a method for moving a frequency domain allocation resource for one or multiple actual repetitions in each nominal repetition by a configured frequency offset and performing transmission. RBstart(n) corresponding to an index of the start RB on the frequency domain for one or multiple actual repetitions in the nth nominal repetition may follow Equation 7 below.

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases} \quad \text{[Equation 7]}$$

In Equation 7, n indicates an index of nominal repetition, and $RB_{offset}$ indicates an RB offset between two hops through a higher-layer parameter.

[PUSCH: Multiplexing Rule for AP/SP CSI Reporting]

Hereinafter, a detailed description of a method for measuring and reporting a channel state in a 5G communication system will be made. Channel state information (CSI) may include a channel quality indicator (CQI), a precoding matrix indicator (PMI), a CSI-RS resource indicator (CRI), an SS/PBCH block resource indicator (SSBRI), a layer indicator (LI), a rank indicator (RI), L1-reference signal received power (RSRP), and like. The base station may control time and frequency resources for the above-described CSI measurement and reporting of the terminal.

For the above-described CSI measurement and reporting, the terminal may receive a configuration of N (≥1) pieces of CSI report setting information (CSI-ReportConfig), M (≥1) RS transmission resource setting information (CSI-ResourceConfig), and one or two pieces of trigger states list information (CSI-AperiodicTriggerStateList and CSI-SemiPersistentOnPUSCH-TriggerStateList), via higher-layer signaling. The configuration information of the above-described CSI measurement and reporting may be described as shown in [Table 30] to [Table 36] below in more detail.

[Table 30] CSI-ReportConfig

The IE CSI-ReportConfig is used to configure a periodic or semi-persistent report sent on PUCCH on the cell in which the CSI-ReportConfig is included, or to configure a semi-persistent or aperiodic report sent on PUSCH triggered by DCI received on the cell in which the CSI-ReportConfig is included (in this case, the cell on which the report is sent is determined by the received DCI). See TS 38.214 [19], clause 5.2.1.

TABLE 31

| CSI-ResourceConfig information element |
|---|
| -- ASN1START |
| -- TAG-CSI-REPORTCONFIG-START |
| CSI-ReportConfig ::=        SEQUENCE { |
|     reportConfigId                    CSI-ReportConfigId, |
|     carrier                           ServCellIndex                     OPTIONAL,  -- Need S |
|     resourcesForChannelMeasurement    CSI-ResourceConfigId, |
|     csi-IM-ResourcesForInterference   CSI-ResourceConfigId              OPTIONAL,  -- Need R |
|     nzp-CSI-RS-ResourcesForInterference  CSI-ResourceConfigId           OPTIONAL,  -- Need R |
|     reportConfigType                  CHOICE { |
|         periodic                          SEQUENCE { |
|             reportSlotConfig                  CSI-ReportPeriodicityAndOffset, |
|             pucch-CSI-ResourceList            SEQUENCE (SIZE (1..maxNrofBWPs)) OF PUCCH-CSI-Resource |
|         }, |
|         semiPersistentOnPUCCH             SEQUENCE { |
|             reportSlotConfig                  CSI-ReportPeriodicityAndOffset, |
|             pucch-CSI-ResourceList            SEQUENCE (SIZE (1..maxNrofBWPs)) OF PUCCH-CSI-Resource |
|         }, |
|         semiPersistentOnPUSCH             SEQUENCE { |
|             reportSlotConfig                  ENUMERATED {sl5, sl10, sl20, sl40, sl80, sl160, sl320}, |
|             reportSlotOffsetList              SEQUENCE (SIZE (1.. maxNrofUL-Allocations)) OF INTEGER(0..32), |
|             p0alpha                           P0-PUSCH-AlphaSetId |
|         }, |
|         aperiodic                        SEQUENCE { |
|             reportSlotOffsetList              SEQUENCE (SIZE (1..maxNrofUL-Allocations)) OF INTEGER(0..32) |
|         } |
|     }, |
|     reportQuantity                    CHOICE { |
|         none                              NULL, |
|         cri-RI-PMI-CQI                    NULL, |
|         cri-RI-i1                         NULL, |
|         cri-RI-i1-CQI                     SEQUENCE { |
|             pdsch-BundleSizeForCSI            ENUMERATED {n2, n4} |
|         }                                 OPTIONAL,  -- Need S |
|         cri-RI-CQI                        NULL, |
|         cri-RSRP                          NULL, |
|         ssb-Index-RSRP                    NULL, |
|         cri-RI-LI-PMI-CQI                 NULL |
|     }, |
|     reportFreqConfiguration           SEQUENCE { |
|         cqi-FormatIndicator               ENUMERATED { widebandCQI, subbandCQI } OPTIONAL,  -- Need R |
|         pmi-FormatIndicator               ENUMERATED { widebandPMI, subbandPMI } OPTIONAL,  -- Need R |

TABLE 31-continued

| CSI-ResourceConfig information element |
|---|

```
        csi-ReportingBand              CHOICE {
                   subbands3          BIT STRING(SIZE(3)),
                   subbands4          BIT STRING(SIZE(4)),
                   subbands5          BIT STRING(SIZE(5)),
                   subbands6          BIT STRING(SIZE(6)),
                   subbands7          BIT STRING(SIZE(7)),
                   subbands8          BIT STRING(SIZE(8)),
                   subbands9          BIT STRING(SIZE(9)),
                   subbands10         BIT STRING(SIZE(10)),
                   subbands11         BIT STRING(SIZE(11)),
                   subbands12         BIT STRING(SIZE(12)),
                   subbands13         BIT STRING(SIZE(13)),
                   subbands14         BIT STRING(SIZE(14)),
                   subbands15         BIT STRING(SIZE(15)),
                   subbands16         BIT STRING(SIZE(16)),
                   subbands17         BIT STRING(SIZE(17)),
                   subbands18         BIT STRING(SIZE(18)),
                   ...,
                   subbands19-v1530   BIT STRING(SIZE(19))
           }             OPTIONAL    -- Need S
       }
OPTIONAL,              -- Need R
       timeRestrictionForChannelMeasurements              ENUMERATED {configured, notConfigured},
       timeRestrictionForInterferenceMeasurements         ENUMERATED {configured, notConfigured},
       codebookConfig              CodebookConfig
OPTIONAL,              -- Need R
       dummy                       ENUMERATED {n1, n2}
OPTIONAL,              -- Need R
       groupBasedBeamReporting     CHOICE {
           enabled                 NULL,
           disabled                SEQUENCE {
                   nrofReportedRS   ENUMERATED {n1, n2, n3, n4}
OPTIONAL            -- Need S
           }
       },
       cqi-Table             ENUMERATED {table1, table2, table3, spare1}
OPTIONAL,             -- Need R
       subbandSize           ENUMERATED {value1, value2},
       non-PMI-PortIndication     SEQUENCE (SIZE (1..maxNrofNZP-CSI-RS-ResourcesPerConfig)) OF
PortIndexFor8Ranks OPTIONAL,    -- Need R
       ...,
       [[
       semiPersistentOnPUSCH-v1530      SEQUENCE {
           reportSlotConfig-v1530          ENUMERATED {sl4, sl8, sl16}
       }
OPTIONAL           -- Need R
       ]],
       [[
       semiPersistentOnPUSCH-v1610      SEQUENCE {
           reportSlotOffsetListDCI-0-2-r16        SEQUENCE (SIZE (1.. maxNrofUL-Allocations-r16)) OF
INTEGER(0..32)   OPTIONAL,    -- Need R
           reportSlotOffsetListDCI-0-1-r16        SEQUENCE (SIZE (1.. maxNrofUL-Allocations-r16)) OF
INTEGER(0..32)   OPTIONAL,    -- Need R
       }
OPTIONAL,           -- Need R
       aperiodic-v1610      SEQUENCE {
           reportSlotOffsetListDCI-0-2-r16        SEQUENCE (SIZE (1.. maxNrofUL-Allocations-r16)) OF
INTEGER(0..32)   OPTIONAL,    -- Need R
           reportSlotOffsetListDCI-0-1-r16        SEQUENCE (SIZE (1.. maxNrofUL-Allocations-r16)) OF
INTEGER(0..32)   OPTIONAL,    -- Need R
       }
OPTIONAL,           -- Need R
       reportQuantity-r16          CHOICE {
           cri-SINR-r16            NULL,
           ssb-Index-SINR-r16      NULL
       }
OPTIONAL,           -- Need R
       codebookConfig-r16          CodebookConfig-r16
OPTIONAL           -- Need R
       ]]
}
CSI-ReportPeriodicityAndOffset ::= CHOICE {
       slots4                INTEGER(0..3),
       slots5                INTEGER(0..4),
       slots8                INTEGER(0..7),
       slots10               INTEGER(0..9),
       slots16               INTEGER(0..15),
       slots20               INTEGER(0..19),
```

TABLE 31-continued

| CSI-ResourceConfig information element | |
|---|---|
| slots40 | INTEGER(0..39), |
| slots80 | INTEGER(0..79), |
| slots160 | INTEGER(0..159), |
| slots320 | INTEGER(0..319) |
| } | |
| PUCCH-CSI-Resource ::= | SEQUENCE { |
| uplinkBandwidthPartId | BWP-Id, |
| pucch-Resource | PUCCH-ResourceId |
| } | |
| PortIndexFor8Ranks ::= | CHOICE { |
| portIndex8 | SEQUENCE{ |
| rank1-8 OPTIONAL,    -- Need R | PortIndex8 |
| rank2-8 OPTIONAL,    -- Need R | SEQUENCE(SIZE(2)) OF PortIndex8 |
| rank3-8 OPTIONAL,    -- Need R | SEQUENCE(SIZE(3)) OF PortIndex8 |
| rank4-8 OPTIONAL,    -- Need R | SEQUENCE(SIZE(4)) OF PortIndex8 |
| rank5-8 OPTIONAL,    -- Need R | SEQUENCE(SIZE(5)) OF PortIndex8 |
| rank6-8 OPTIONAL,    -- Need R | SEQUENCE(SIZE(6)) OF PortIndex8 |
| rank7-8 OPTIONAL,    -- Need R | SEQUENCE(SIZE(7)) OF PortIndex8 |
| rank8-8 OPTIONAL    -- Need R | SEQUENCE(SIZE(8)) OF PortIndex8 |
| }, | |
| portIndex4 | SEQUENCE{ |
| rank1-4 OPTIONAL,    -- Need R | PortIndex4 |
| rank2-4 OPTIONAL,    -- Need R | SEQUENCE(SIZE(2)) OF PortIndex4 |
| rank3-4 OPTIONAL,    -- Need R | SEQUENCE(SIZE(3)) OF PortIndex4 |
| rank4-4 OPTIONAL    -- Need R | SEQUENCE(SIZE(4)) OF PortIndex4 |
| }, | |
| portIndex2 | SEQUENCE{ |
| rank1-2 OPTIONAL, -- Need R | PortIndex2 |
| rank2-2 OPTIONAL-- Need R | SEQUENCE(SIZE(2)) OF PortIndex2 |
| }, | |
| portIndex1 | NULL |
| } | |
| PortIndex8::= | INTEGER (0..7) |
| PortIndex4::= | INTEGER (0..3) |
| PortIndex2::= | INTEGER (0..1) |
| -- TAG-CSI-REPORTCONFIG-STOP | |
| -- ASN1STOP | |

| CSI-ReportConfig field descriptions |
|---|
| carrier |
| Indicates in which serving cell the CSI-ResourceConfig indicated below are to be found. If the field is absent, the resources are on the same serving cell as this report configuration. |
| codebookConfig |
| Codebook configuration for Type-1 or Type-2 including codebook subset restriction. Network does not configure codebookConfig and codebookConfig-r16 simultaneously to a UE |
| cqi-FormatIndicator |
| Indicates whether the UE shall report a single (wideband) or multiple (subband) CQI. (see TS 38.214 [19], clause 5.2.1.4). |
| cqi-Table |
| Which CQI table to use for CQI calculation (see TS 38.214 [19], clause 5.2.2.1). |
| csi-IM-ResourcesForInterference |
| CSI IM resources for interference measurement. csi-ResourceConfigId of a CSI-ResourceConfig included in the configuration of the serving cell indicated with the field "carrier" above. The CSI-ResourceConfig indicated here contains only CSI-IM resources. The bwp-Id in that CSI-ResourceConfig is the same value as the bwp-Id in the CSI-ResourceConfig indicated by resourcesForChannelMeasurement. |
| csi-ReportingBand |
| Indicates a contiguous or non-contiguous subset of subbands in the bandwidth part which CSI shall be reported for. Each bit in the bit-string represents one subband. The right-most bit in the bit string represents the lowest subband in the BWP. The choice determines the number of subbands (subbands3 for 3 subbands, subbands4 for 4 subbands, and so on) (see TS 38.214 [19], clause 5.2.1.4). This field is absent if there are less than 24 PRBs (no sub band) and present otherwise, the number of sub bands can be from 3 (24 PRBs, sub band size 8) to 18 (72 PRBs, sub band size 4). |
| dummy |

TABLE 31-continued

CSI-ResourceConfig information element

This field is not used in the specification. If received it shall be ignored by the UE.
groupBasedBeamReporting
Turning on/off group beam based reporting (see TS 38.214 [19], clause 5.2.1.4)
non-PMI-PortIndication
Port indication for RI/CQI calculation. For each CSI-RS resource in the linked ResourceConfig for channel
measurement, a port indication for each rank R, indicating which R ports to use. Applicable only for non-PMI feedback
(see TS 38.214[19], clause 5.2.1.4.2).
The first entry in non-PMI-PortIndication corresponds to the NZP-CSI-RS-Resource indicated by the first entry in
nzp-CSI-RS-Resources in the NZP-CSI-RS-ResourceSet indicated in the first entry of nzp-CSI-RS-ResourceSetList
of the CSI-ResourceConfig whose CSI-ResourceConfigId is indicated in a CSI-MeasId together with the above
CSI-ReportConfigId; the second entry in non-PMI-PortIndication corresponds to the NZP-CSI-RS-Resource indicated
by the second entry in nzp-CSI-RS-Resources in the NZP-CSI-RS-ResourceSet indicated in the first entry of
nzp-CSI-RS-ResourceSetList of the same CSI-ResourceConfig, and so on until the NZP-CSI-RS-Resource indicated
by the last entry in nzp-CSI-RS-Resources in the in the NZP-CSI-RS-ResourceSet indicated in the first entry of
nzp-CSI-RS-ResourceSetList of the same CSI-ResourceConfig. Then the next entry corresponds to the
NZP-CSI-RS-Resource indicated by the first entry in nzp-CSI-RS-Resources in the NZP-CSI-RS-ResourceSet
indicated in the second entry of nzp-CSI-RS-ResourceSetList of the same CSI-ResourceConfig and so on.
nrofReportedRS
The number (N) of measured RS resources to be reported per report setting in a non-group-based report. N <=
N_max, where N_max is either 2 or 4 depending on UE capability.
(see TS 38.214 [19], clause 5.2.1.4) When the field is absent the UE applies the value 1
nzp-CSI-RS-ResourcesForInterference
NZP CSI RS resources for interference measurement. csi-ResourceConfigId of a CSI-ResourceConfig included in the
configuration of the serving cell indicated with the field "carrier" above. The CSI-ResourceConfig indicated here
contains only NZP-CSI-RS resources. The bwp-Id in that CSI-ResourceConfig is the same value as the bwp-Id in the
CSI-ResourceConfig indicated by resourcesForChannelMeasurement.
p0alpha
Index of the p0-alpha set determining the power control for this CSI report transmission (see TS 38.214 [19], clause
6.2.1.2).
pdsch-BundleSizeForCSI
PRB bundling size to assume for CQI calculation when reportQuantity is CRI/RI/i1/CQI. If the field is absent, the UE
assumes that no PRB bundling is applied (see TS 38.214 [19], clause 5.2.1.4.2).
pmi-FormatIndicator
Indicates whether the UE shall report a single (wideband) or multiple (subband) PMI. (see TS 38.214 [19], clause
5.2.1.4).
pucch-CSI-ResourceList
Indicates which PUCCH resource to use for reporting on PUCCH.
reportConfigType
Time domain behavior of reporting configuration
reportFreqConfiguration
Reporting configuration in the frequency domain. (see TS 38.214 [19], clause 5.2.1.4).
reportQuantity
The CSI related quantities to report. see TS 38.214 [19], clause 5.5.1. If the field reportQuantity-r16 is present, UE
shall ignore reportQuantity (without suffix).
reportSlotConfig
Periodicity and slot offset (see TS 38.214 [19], clause 5.2.1.4). If the field reportSlotConfig-v1530 is present, the UE
shall ignore the value provided in reportSlotConfig (without suffix).
reportSlotOffsetList, reportSlotOffsetListDCI-0-1, reportSlotOffsetListDCI-0-2
Timing offset Y for semi persistent reporting using PUSCH. This field lists the allowed offset values. This list must have
the same number of entries as the pusch-TimeDomainAllocationList in PUSCH-Config. A particular value is indicated
in DCI. The network indicates in the DCI field of the UL grant, which of the configured report slot offsets the UE shall
apply. The DCI value 0 corresponds to the first report slot offset in this list, the DCI value 1 corresponds to the second
report slot offset in this list, and so on. The first report is transmitted in slot n + Y, second report in n + Y + P, where P is the
configured periodicity.
Timing offset Y for aperiodic reporting using PUSCH. This field lists the allowed offset values. This list must have the
same number of entries as the pusch-TimeDomainAllocationList in PUSCH-Config. A particular value is indicated in
DCI. The network indicates in the DCI field of the UL grant, which of the configured report slot offsets the UE shall
apply. The DCI value 0 corresponds to the first report slot offset in this list, the DCI value 1 corresponds to the second
report slot offset in this list, and so on (see TS 38.214 [19], clause 6.1.2.1). The field reportSlotOffsetList applies to DCI
format 0_0, the field reportSlotOffsetListDCI-0-1 applies to DCI format 0_1 and the field reportSlotOffsetListDCI-0-2
applies to DCI format 0 2 (see TS 38.214 [19], clause 6.1.2.1).
resourcesForChannelMeasurement
Resources for channel measurement. csi-ResourceConfigId of a CSI-ResourceConfig included in the configuration of
the serving cell indicated with the field "carrier" above. The CSI-ResourceConfig indicated here contains only
NZP-CSI-RS resources and/or SSB resources. This CSI-ReportConfig is associated with the DL BWP indicated by
bwp-Id in that CSI-ResourceConfig.
subbandSize
Indicates one out of two possible BWP-dependent values for the subband size as indicated in TS 38.214 [19], table
5.2.1.4-2. If csi-ReportingBand is absent, the UE shall ignore this field.
timeRestrictionForChannelMeasurements
Time domain measurement restriction for the channel (signal) measurements (see TS 38.214 [19], clause 5.2.1.1)
timeRestrictionForInterferenceMeasurements
Time domain measurement restriction for interference measurements (see TS 38.214 [19], clause 5.2.1.1)

The JE CSI-ResourceConfig defines a group of one or more NZP-CSI-RS-ResourceSet, CSI-IM-ResourceSet, and/or CSI-SSB-ResourceSet.

TABLE 32

| NZP-CSI-RS-ResourceSet |
|---|
| CSI-ResourceConfig information element |
| -- ASN1START<br>-- TAG-CSI-RESOURCECONFIG-START<br>CSI-ResourceConfig ::=        SEQUENCE {<br>  csi-ResourceConfigId           CSI-ResourceConfigId,<br>  csi-RS-ResourceSetList         CHOICE {<br>    nzp-CSI-RS-SSB                  SEQUENCE {<br>      nzp-CSI-RS-ResourceSetList   SEQUENCE (SIZE (1..maxNrofNZP-CSI-RS-ResourceSetsPerConfig)) OF NZP-CSI-RS-ResourceSetId OPTIONAL,       -- Need R<br>      csi-SSB-ResourceSetList           SEQUENCE (SIZE (1..maxNrofCSI-SSB-ResourceSetsPerConfig)) OF CSI-SSB-ResourceSetId OPTIONAL -- Need R<br>    },<br>    csi-IM-ResourceSetList                          SEQUENCE (SIZE (1..maxNrofCSI-IM-ResourceSetsPerConfig)) OF CSI-IM-ResourceSetId<br>  },<br>  bwp-Id                           BWP-Id,<br>  resourceType                     ENUMERATED { aperiodic, semiPersistent, periodic },<br>  ...<br>}<br>-- TAG-CSI-RESOURCECONFIG-STOP<br>-- ASN1STOP |
| CSI-ResourceConfig field descriptions |
| bwp-Id<br>The DL BWP which the CSI-RS associated with this CSI-ResourceConfig are located in (see TS 38.214 [19], clause 5.2.1.2<br>csi-IM-ResourceSetList<br>List of references to CSI-IM resources used for beam measurement and reporting in a CSI-RS resource set Contains up to maxNrofCSI-IM-ResourceSetsPerConfig resource sets if resource Type is 'aperiodic' and 1 otherwise (see TS 38.214 [19], clause 5.2.1.2).<br>csi-ResourceConfigId<br>Used in CSI-ReportConfig to refer to an instance of CSI-ResourceConfig.<br>csi-SSB-ResourceSetList<br>List of references to SSB resources used for beam measurement and reporting in a CSI-RS resource set (see TS 38.214 [19], clause 5.2.1.2).)<br>nzp-CSI-RS-ResourceSetList<br>List of references to NZP CSI-RS resources used for beam measurement and reporting in a CSI-RS resource set. Contains up to maxNrofNZP-CSI-RS-ResourceSetsPerConfig resource sets if resoureType is 'aperiodic' and 1 otherwise (see TS 38.214 [19], clause 5.2.1.2).<br>resourceType<br>Time domain behavior of resource configuration (see TS 38.214 [19], clause 5.2.1.2). It does not apply to resources provided in the csi-SSB-ResourceSetList. |

45

The IE NZP-CSI-RS-ResourceSet is a set of Non-Zero-Power (NZP) CSI-RS resources (their IDs) and set-specific parameters.

TABLE 33

| CSI-SSB-ResourceSet |
|---|
| NZP-CSI-RS-ResourceSet information element |
| -- ASN1START<br>-- TAG-NZP-CSI-RS-RESOURCESET-START<br>NZP-CSI-RS-ResourceSet ::=            SEQUENCE {<br>  nzp-CSI-ResourceSetId              NZP-CSI-RS-ResourceSetId,<br>  nzp-CSI-RS-Resources               SEQUENCE (SIZE (1..maxNrofNZP-CSI-RS-ResourcesPerSet)) OF NZP-CSI-RS-ResourceId,<br>  repetition                         ENUMERATED { on, off } OPTIONAL,    -- Need S<br>  aperiodicTriggeringOffset          INTEGER(0..6) OPTIONAL,    -- Need S<br>  trs-Info                           ENUMERATED {true} OPTIONAL,    -- Need R<br>  ..., |

TABLE 33-continued

| CSI-SSB-ResourceSet |
|---|

```
        [[
        aperiodicTriggeringOffset-r16          INTEGER(0..31)
        OPTIONAL   -- Need S
        ]]
    }
-- TAG-NZP-CSI-RS-RESOURCESET-STOP
-- ASN1STOP
```

| NZP-CSI-RS-ResourceSet field descriptions |
|---| aperiodicTriggeringOffset, aperiodicTriggeringOffset-r16
Offset X between the slot containing the DCI that triggers a set of aperiodic NZP CSI-RS resources and the slot in which the CSI-RS resource set is transmitted. For aperiodicTriggeringOffset the value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. For aperiodicTriggeringOffset-r16 the value indicates the number of slots. The network configures only one of the fields. When neither field is included, the UE applies the value 0.
nzp-CSI-RS-Resources
NZP-CSI-RS-Resources associated with this NZP-CSI-RS resource set (see TS 38.214 [19], clause 5.2). For CSI, there are at most 8 NZP CSI RS resources per resource set.
repetition
Indicates whether repetition is on/off. If the field is set to off or if the field is absent, the UE may not assume that the NZP-CSI-RS resources within the resource set are transmitted with the same downlink spatial domain transmission filter (see TS 38.214 [19], clauses 5.2.2.3.1 and 5.1.6.1.2). It can only be configured for CSI-RS resource sets which are associated with CSI-ReportConfig with report of L1 RSRP or "no report".
trs-Info
Indicates that the antenna port for all NZP-CSI-RS resources in the CSI-RS resource set is same. If the field is absent or released the UE applies the value false (see TS 38.214 [19], clause 5.2.2.3.1).

The IE CSI-SSB-ResourceSet is used to configure one SS/PBCH block resource set which refers to SS/PBCH as indicated in ServingCellConfigCommon.

TABLE 34

| CSI-IM-ResourceSet |
|---|
| CSI-SSB-ResourceSet information element |

```
-- ASN1START
-- TAG-CSI-SSB-RESOURCESET-START
CSI-SSB-ResourceSet ::= SEQUENCE {
    csi-SSB-ResourceSetId    CSI-SSB-ResourceSetId,
    csi-SSB-ResourceList     SEQUENCE (SIZE(1..maxNrofCSI-SSB-ResourcePerSet))
OF SSB-Index,
    ...
}
-- TAG-CSI-SSB-RESOURCESET-STOP
-- ASN1STOP
```

The IE CSI-IM-ResourceSet is used to configure a set of one or more CSI Interference Management (IM) resources (their IDs) and set-specific parameters.

TABLE 35

| CSI-AperiodicTriggerStateList |
|---|
| CSI-IM-ResourceSet information element |

```
                    -- ASN1START
                -- TAG-CSI-IM-RESOURCESET-START
CSI-IM-ResourceSet ::=  SEQUENCE {
    csi-IM-ResourceSetId     CSI-IM-ResourceSetId,
    csi-IM-Resources         SEQUENCE (SIZE(1..maxNrofCSI-IM-ResourcesPerSet)) OF
CSI-IM-ResourceId,
    ...
}
-- TAG-CSI-IM-RESOURCESET-STOP
-- ASN1STOP
```

TABLE 35-continued

CSI-AperiodicTriggerStateList

CSI-IM-ResourceSet field descriptions csi-IM-Resources
CSI-IM-Resources associated with this CSI-IM-ResourceSet (see TS 38.214 [19], clause 5.2)

The CSI-AperiodicTriggerStateList IE is used to configure the UE with a list of aperiodic trigger states. Each codepoint of the DCI field "CSI request" is associated with one trigger state. Upon reception of the value associated with a trigger state, the UE may perform measurement of CSI-RS (reference signals) and aperiodic reporting on L1 according to all entries in the associatedReportConfigInfoList for that trigger state.

TABLE 36

CSI-SemiPersistentOnPUSCH-TriggerStateList

CSI-AperiodicTriggerStateList information element

```
-- ASN1START
-- TAG-CSI-APERIODICTRIGGERSTATELIST-START
CSI-AperiodicTriggerStateList ::=        SEQUENCE (SIZE (1..maxNrOfCSI-AperiodicTriggers)) OF
CSI-AperiodicTriggerState
CSI-AperiodicTriggerState ::=            SEQUENCE {
    associatedReportConfigInfoList       SEQUENCE
(SIZE(1..maxNrofReportConfigPerAperiodicTrigger)) OF CSI-AssociatedReportConfigInfo,
    ...
}
CSI-AssociatedReportConfigInfo ::=       SEQUENCE {
    reportConfigId                       CSI-ReportConfigId,
    resourcesForChannel                  CHOICE {
        nzp-CSI-RS                       SEQUENCE {
            resourceSet                  INTEGER
(1..maxNrofNZP-CSI-RS-ResourceSetsPerConfig),
            qcl-info                     SEQUENCE
(SIZE (1..maxNrofAP-CSI-RS-ResourcesPerSet)) OF TCI-StateId OPTIONAL -- Cond Aperiodic
        },
        csi-SSB-ResourceSet              INTEGER
(1..maxNrofCSI-SSB-ResourceSetsPerConfig)
    },
    csi-IM-ResourcesForInterference      INTEGER (1..maxNrofCSI-IM-ResourceSetsPerConfig)
OPTIONAL, -- Cond CSI-IM-ForInterference
    nzp-CSI-RS-ResourcesForInterference INTEGER
(1..maxNrofNZP-CSI-RS-ResourceSetsPerConfig)  OPTIONAL,  -- Cond
NZP-CSI-RS-ForInterference
    ...
}
-- TAG-CSI-APERIODICTRIGGERSTATELIST-STOP
-- ASN1STOP
```

CSI-AssociatedReportConfigInfo field descriptions csi-IM-ResourcesForInterference
CSI-IM-ResourceSet for interference measurement. Entry number in csi-IM-ResourceSetList in
the CSI-ResourceConfig indicated by csi-IM-ResourcesForInterference in the CSI-ReportConfig
indicated by reportConfigId above (1 corresponds to the first entry, 2 to the second entry, and so
on). The indicated CSI-IM-ResourceSet should have exactly the same number of resources like
the NZP-CSI-RS-ResourceSet indicated in nzp-CSI-RS-ResourcesforChannel.
csi-SSB-ResourceSet
CSI-SSB-ResourceSet for channel measurements. Entry number in csi-SSB-ResourceSetList in
the CSI-ResourceConfig indicated by resourcesForChannelMeasurement in the
CSI-ReportConfig indicated by reportConfigId above (1 corresponds to the first entry, 2 to the
second entry, and so on).
nzp-CSI-RS-ResourcesForInterference
NZP-CSI-RS-ResourceSet for interference measurement. Entry number in
nzp-CSI-RS-ResourceSetList in the CSI-ResourceConfig indicated by
nzp-CSI-RS-ResourcesForInterference in the CSI-ReportConfig indicated by reportConfigId
above (1 corresponds to the first entry, 2 to the second entry, and so on).
qcl-info
List of references to TCI-States for providing the QCL source and QCL type for each
NZP-CSI-RS-Resource listed in nzp-CSI-RS-Resources of the NZP-CSI-RS-ResourceSet
indicated by nzp-CSI-RS-ResourcesforChannel. Each TCI-StateId refers to the TCI-State which
has this value for tci-StateId and is defined in tci-StatesToAddModList in the PDSCH-Config
included in the BWP-Downlink corresponding to the serving cell and to the DL BWP to which the
resourcesForChannelMeasurement (in the CSI-ReportConfig indicated by reportConfigId above)
belong to. First entry in qcl-info-forChannel corresponds to first entry in nzp-CSI-RS-Resources of
that NZP-CSI-RS-ResourceSet, second entry in qcl-info-forChannel corresponds to second entry
in nzp-CSI-RS-Resources, and so on (see TS 38.214 [19], clause 5.2.1.5.1)

TABLE 36-continued

CSI-SemiPersistentOnPUSCH-TriggerStateList reportConfigId
The reportConfigId of one of the CSI-ReportConfigToAddMod configured in CSI-MeasConfig
resourceSet
NZP-CSI-RS-ResourceSet for channel measurements. Entry number in
nzp-CSI-RS-ResourceSetList in the CSI-ResourceConfig indicated by
resourcesForChannelMeasurement in the CSI-ReportConfig indicated by reportConfigId above (1
corresponds to the first entry, 2 to thesecond entry, and so on).

| Conditional Presence | Explanation |
| --- | --- |
| Aperiodic | The field is mandatory present if the NZP-CSI-RS-Resources in the associated resourceSet have the resourceType aperiodic. The field is absent otherwise. |
| CSI-IM-ForInterference | This field is optional need M if the CSI-ReportConfig identified by reportConfigId is configured with csi-IM-ResourcesForInterference; otherwise it is absent. |
| NZP-CSI-RS-ForInterference | This field is optional need M if the CSI-ReportConfig identified by reportConfigId is configured with nzp-CSI-RS-ResourcesForInterference; otherwise it is absent. |

The CSI-SemiPersistentOnPUSCH-TriggerStateList IE is used to configure the UE with list of trigger states for semi-persistent reporting of channel state information on L1. See also TS 38.214 [19], clause 5.2.

CSI-SemiPersistentOnPUSCH-TriggerStateList information element

```
-- ASN1START
-- TAG-CSI-SEMIPERSISTENTONPUSCHTRIGGERSTATELIST-START
CSI-SemiPersistentOnPUSCH-TriggerStateList ::= SEQUENCE(SIZE
(1..maxNrOfSemiPersistentPUSCH-Triggers)) OF CSI-SemiPersistentOnPUSCH-
TriggerState
CSI-SemiPersistentOnPUSCH-TriggerState ::=         SEQUENCE {
    associatedReportConfigInfo                     CSI-ReportConfigId,
    ...
}
-- TAG-CSI-SEMIPERSISTENTONPUSCHTRIGGERSTATELIST-STOP
-- ASN1STOP
```

With respect to the above-described CSI report setting, each CSI report setting (CSI-ReportConfig) may be associated with one downlink (DL) bandwidth part identified by a higher-layer parameter bandwidth part identity (bwp-id) provided via CSI resource setting (CSI-ResourceConfig) associated with the corresponding CSI report setting. "Aperiodic," "semi-persistent," and "periodic" types are supported for a time domain reporting operation regarding each reporting setting CSI-ReportConfig, and may be configured by the base station to the terminal via a reportConfigType parameter configured from a higher-layer. A semi-persistent CSI reporting method supports "PUCCH-based semi-persistent (semi-PersistentOnPUCCH)" and "PUSCH-based semi-persistent (semi-PersistentOnPUSCH)" reporting methods. In a periodic or semi-persistent CSI reporting method, the terminal may be configured with a PUCCH or PUSCH resource for transmitting the CSI from the base station via higher layer signaling. A period and a slot offset of the PUCCH or PUSCH resource for transmitting the CSI may be provided via numerology of an UL bandwidth part configured to transmit CSI reporting. In an aperiodic CSI reporting method, the PUSCH resource for transmitting the CSI may be scheduled to the terminal via L1 signaling (DCI format 0_1 described above) by the base station.

With respect to the CSI resource setting (CSI-ResourceConfig), each CSI resource setting (CSI-ResourceConfig) may include S (≥1) CSI resource sets (provided as a higher-layer parameter csi-RS-ResourceSetList). A CSI resource set list may include a non-zero power (NZP) CSI-RS resource set and a SS/PBCH block set or may include a CSI-interference measurement (CSI-IM) resource set. Each CSI resource setting may be positioned at a downlink (DL) bandwidth part identified by the higher-layer parameter bwp-id, and the CSI resource setting may be connected to the CSI report setting at the same downlink bandwidth part. A time domain operation of a CSI-RS resource in the CSI resource setting may be configured, by a higher-layer parameter resourceType to be one of "aperiodic," "periodic," or "semi-persistent." With respect to the periodic or semi-persistent CSI resource setting, the number of CSI-RS resource sets may be limited to S=1, and a configured period and a slot offset may be provided by numerology of the downlink bandwidth part identified by bwp-id. The terminal may be configured with, by the base station, one or more CSI resource settings for channel or interference measurement via higher-layer signaling, and for example, may include the following CSI resources:

CSI-interference measurement (IM) resource for IM;
NZP CSI-RS resource for IM; and
NZP CSI-RS resource for channel measurement.

With respect to the CSI-RS resource sets associated with resource setting in which the higher-layer parameter resourceType is configured to be "aperiodic," "periodic," or "semi-persistent," a trigger state for the CSI report setting in which the reportType is configured to be "aperiodic" and a resource setting for channel or interference measurement for one or multiple component cells (CCs) may be configured as a higher-layer parameter CSI-AperiodicTriggerStateList.

Aperiodic CSI reporting of the terminal may use a PUSCH, periodic CSI reporting may use a PUCCH, and a semi-persistent CSI reporting may use a PUSCH when triggered or activated by DCI and may use a PUCCH after being activated by an MAC control element (CE). As described above, the CSI-ResourceConfig may be configured to be aperiodic, periodic, or semi-persistent. A combination of the CSI report setting and the CSI resource setting may be supported based on [Table 37] below.

TABLE 37

Triggering/Activation of CSI Reporting for the possible CSI-RS Configurations.

| CSI-RS Configuration | Periodic CSI Reporting | Semi-Persistent CSI Reporting | Aperiodic CSI Reporting |
| --- | --- | --- | --- |
| Periodic CSI-RS | No dynamic triggering/activation | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Semi-Persistent CSI-RS | Not Supported | For reporting on PUCCH, the UE receives an activation command [10, TS 38.321]; for reporting on PUSCH, the UE receives triggering on DCI | Triggered by DCI; additionally, activation command [10, TS 38.321] possible as defined in Subclause 5.2.1.5.1. |
| Aperiodic CSI-RS | Not Supported | Not Supported | Triggered by DCI; additionally, activation command [10, TS 38.321] possible as defined in Subclause 5.2.1.5.1. |

TABLE 38

| CSI request field | CSI trigger state | CSI-ReportConfigId | CSI-ResourceConfigId |
| --- | --- | --- | --- |
| 00 | no CSI request | N/A | N/A |
| 01 | CSI trigger state#1 | CSI report#1 CSI report#2 | CSI resource#1 CSI resource#2 |
| 10 | CSI trigger state#2 | CSI report#3 | CSI resource#3 |
| 11 | CSI trigger state#3 | CSI report#4 | CSI resource#4 |

The terminal may perform measurement on a CSI resource in the CSI trigger state triggered by the CSI request field, and generate CSI (including at least one of CQI, PMI, The aperiodic CSI reporting may be triggered by a "CSI request" field of DCI format 0_1 corresponding to scheduling DCI for a PUSCH. The terminal may monitor a PDCCH, obtain DCI format 0_1, and obtain scheduling information for the PUSCH and a CSI request indicator. The CSI request indicator may be configured in NTS(=0, 1, 2, 3, 4, 5, or 6) bits and may be determined by a higher-layer signaling reportTriggerSize. One trigger state from among one or multiple aperiodic CSI reporting trigger states that may be configured via the higher-layer signaling (CSI-AperiodicTriggerStateList) may be triggered by the CSI request indicator:

When all bits of a CSI request field is 0, the CSI reporting may not have requested;

When the number M of CSI trigger states within the configured CSI-AperiodicTriggerStateList is greater than 2NTs−1, the M CSI trigger states may be mapped to 2NTs−1 according to a pre-defined mapping relationship, and one of 2NTs−1 trigger states may be indicated via the CSI request field; and When the number M of CSI trigger states in the configured CSI-AperiodicTriggerStateList is equal to or less than 2NTs−1, one of M CSI trigger states may be indicated via the CSI request field.

[Table 38] below shows an example of relationships between a CSI request indicator and a CSI trigger state which can be indicated by the CSI request indicator.

CRI, SSBRI, LI, RI, or L1-RSRP described above) therefrom. The terminal may transmit the obtained CSI by using the PUSCH scheduled by the corresponding DCI format 0_1. When 1 bit corresponding to an UL data indicator (UL-SCH indicator) in DCI format 0_1 indicates "1," uplink data (UL-SCH) and the obtained CSI may be multiplexed and transmitted with the PUSCH resource scheduled by DCI format 0_1. When the 1 bit corresponding to the uplink data indicator (UL-SCH indicator) in DCI format 0_1 indicates "0," only the CSI may be mapped and transmitted with the PUSCH resource scheduled by DCI format 0_1, without the uplink data (UL-SCH).

Figure 13:
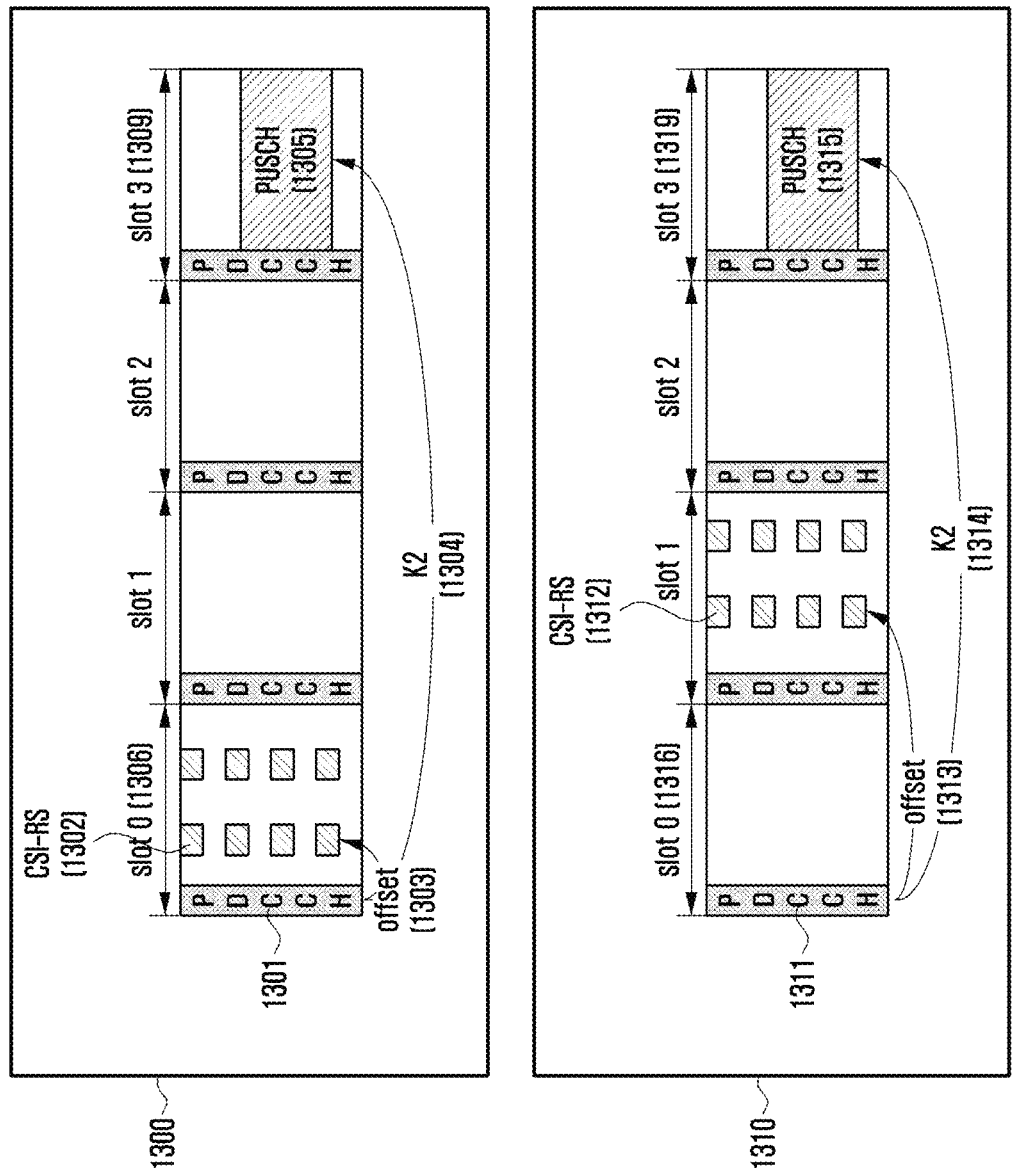
FIG. 13 illustrates an example of an aperiodic CSI reporting method according to an embodiment of the disclosure.

FIG. 13 illustrates an example of an aperiodic CSI reporting method.

In the example 1300 of FIG. 13, the terminal may obtain DCI format 0_1 by monitoring a PDCCH 1301, and obtain scheduling information and CSI request information for a PUSCH 1305 therefrom. The terminal may obtain resource information for a CSI-RS 1302 to be measured from a received CSI request indicator. The terminal may determine a time point at which a resource of the CSI-RS 1302 subject to measurement is transmitted, based on a time point when the DCI format 0_1 is received and a parameter (aperiodicTriggeringOffset described above) for an offset in CSI resource set configuration (for example, NZP CSI-RS resource set configuration (NZP-CSI-RS-ResourceSet). In detail, the terminal may be configured with, by the base station via higher-layer signaling, an offset value X of the parameter (aperiodicTriggeringOffset) in the NZP-CSI-RS resource set configuration, and the configured offset value X may denote an offset between a slot where a CSI-RS resource is transmitted and a slot where DCI triggering aperiodic CSI reporting is received. For example, a parameter value of the aperiodicTriggeringOffset and the offset value X may have a mapping relationship of [Table 39] below.

TABLE 39

| aperiodicTriggeringOffset | Offset X |
|---|---|
| 0 | 0 slot |
| 1 | 1 slot |
| 2 | 2 slots |
| 3 | 3 slots |
| 4 | 4 slots |
| 5 | 16 slots |
| 6 | 24 slots |

In the example 1300 of FIG. 13, an offset value 1303 is configured as X=0. In this case, the terminal may receive the CSI-RS 1302 from a slot (slot 0 1306 of FIG. 13) that received DCI format 0_1 triggering the aperiodic CSI reporting, and report, to the base station, CSI information measured by the received CSI-RS via the PUSCH 1305. The terminal may obtain scheduling information (information corresponding to each field of DCI format 0_1 described above) for the PUSCH 1305 for CSI reporting, from DCI format 0_1. For example, the terminal may obtain information on a slot for transmitting the PUSCH 1305 from time domain resource assignment information for the PUSCH 1305 in DCI format 0_1. In the example 1300 of FIG. 13, the terminal has obtained 3 as a K2 value corresponding to a slot offset value for PDCCH-to-PUSCH, and accordingly, the PUSCH 1305 may be transmitted from slot 3 1309 that is three slots away from slot 0 1306, i.e., when the PDCCH 1301 is received.

In the example 1310 of FIG. 13, the terminal may obtain DCI format 0_1 by monitoring a PDCCH 1311, and obtain scheduling information and CSI request information for a PUSCH 1315 therefrom. The terminal may obtain resource information for a CSI-RS 1312 to be measured from a received CSI request indicator. The example 1310 of FIG. 13 shows an example in which an offset value 1313 for the CSI-RS is configured as X=1. In this case, the terminal may receive the CSI-RS 1312 from a slot (slot 0 1316 of FIG. 13) that received DCI format 0_1 triggering the aperiodic CSI reporting, and report CSI information measured by the received CSI-RS to the base station via the PUSCH 1315. The terminal may obtain scheduling information (information corresponding to each field of DCI format 0_1 described above) for the PUSCH 1315 for CSI reporting, from DCI format 0_1. For example, the terminal may obtain information on a slot for transmitting the PUSCH 1315 from time domain resource assignment information for the PUSCH 1315 in DCI format 0_1. In the example 1310 of FIG. 13, the terminal has obtained 3 as a K2 value 1314 corresponding to a slot offset value for PDCCH-to-PUSCH, and accordingly, the PUSCH 1315 may be transmitted from slot 3 1319 that is three slots away from slot 0 1316, i.e., when the PDCCH 1311 is received.

The aperiodic CSI reporting may include at least one of or both CSI part 1 and CSI part 2, and when the aperiodic CSI reporting is transmitted through a PUSCH, the aperiodic CSI reporting may be multiplexed to a transport block. Once CRC is inserted into an input bit of the aperiodic CSI for multiplexing, the CSI is mapped to a resource element in the PUSCH, in a specific pattern, after going through encoding and rate matching, and is transmitted. The CRC insertion may be omitted according to a coding method or the length of input bit. The number of modulation symbols, calculated for rate matching for multiplexing CSI Part 1 and CSI part 2 included in the aperiodic CSI reporting may be calculated as shown in [Table 40] below.

TABLE 40

For CSI part 1 transmission on PUSCH not using repetition type B with UL-SCH, the number of coded modulation symbols per layer for CSI part 1 transmission, denoted as $Q_{CSI-part1}'$, is determined as follows:

$$Q_{CSI-1}' = \min\left\{ \left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil \cdot \left[ \alpha \cdot \sum_{l=0}^{N_{symb,all}^{PUSCH}-1} M_{sc}^{UCI}(l) \right] - Q_{ACK/CG-UCI}' \right\}$$

. . .

For CSI part 1 transmission on an actual repetition of a PUSCH with repetition Type B with UL-SCH, the number of coded modulation symbols per layer for CSI part 1 transmission, denoted as $Q_{CSI-part1}'$, is determined as follows:

$$Q_{CSI-1}' = \min\left\{ \left\lceil \frac{(O_{CSI-1} + L_{CSI-1}) \cdot \beta_{offset}^{PUSCH} \cdot \sum_{l=0}^{N_{symb,nominal}^{PUSCH}-1} M_{sc,nominal}^{UCI}(l)}{\sum_{r=0}^{C_{UL-SCH}-1} K_r} \right\rceil \cdot \left[ \alpha \cdot \sum_{l=0}^{N_{symb,nominal}^{PUSCH}-1} M_{sc,nominal}^{UCI}(l) \right] - Q_{ACK/CG-UCI}' \cdot \sum_{l=0}^{N_{symb,actual}^{PUSCH}-1} M_{sc,actual}^{UCI}(l) - Q_{ACK/CG-UCI}' \right\}$$

TABLE 40-continued

For CSI part 1 transmission on PUSCH without UL-SCH, the number of coded modulation symbols per
layer for CSI part 1 transmission, denoted as $Q_{CSI-part1}'$, is determined as follows:
if there is CSI part 2 to be transmitted on the PUSCH, $$Q_{CSI-1}' = \min\left\{\left\lceil\frac{(o_{CSI-1} + L_{CSI-1}) \cdot \beta_{offset}^{PUSCH}}{\beta \cdot Q_m}\right\rceil, \Sigma_{l=o}^{N_{symb,all}^{PUSCH}-1} M_{sc}^{UCI}(l) - Q_{ACK}'\right\}$$

else $$Q_{CSI-1}' = \Sigma_{l=0}^{N_{symb,all}^{PUSCH}-1} M_{sc}^{UCI}(l) - Q_{ACK}'$$

end if

For CSI part 2 transmission on PUSCH not using repetition type B with UL-SCH, the number of coded
modulation symbols per layer for CSI part 2 transmission, denoted as $Q_{CSI-part2}'$, is determined as
follows:

$$Q_{CSI-2}' = \min\left\{\left\lceil\frac{(o_{CSI-2} + L_{CSI-2}) \cdot \beta_{offset}^{PUSCH} \cdot \Sigma_{l=0}^{N_{symb,all}^{PUSCH}-1} M_{sc}^{UCI}(l)}{\Sigma_{r=0}^{C_{UL-SCH}-1} K_r}\right\rceil \cdot \left[\alpha \cdot \Sigma_{l=0}^{N_{symb,all}^{PUSCH}-1} M_{sc}^{UCI}(l)\right] - Q_{ACK/CG-UCI}' - Q_{CSI-1}'\right\}$$

For CSI part 2 transmission on an actual repetition of a PUSCH with repetition Type B with UL-SCH,
the number of coded modulation symbols per layer for CSI part 2 transmission, denoted as $Q_{CSI-part2}'$, is
determined as follows:

$$Q_{CSI-2}' = \min\left\{\left\lceil\frac{(O_{CSI-2} + L_{CSI-2}) \cdot \beta_{offset}^{PUSCH} \cdot \Sigma_{l=0}^{N_{symb,nominal}^{PUSCH}-1} M_{sc,nominal}^{UCI}(l)}{\Sigma_{r=0}^{C_{UL-SCH}-1} K_r}\right\rceil \cdot\right.$$

$$\left[\alpha \cdot \sum_{l=0}^{N_{symb,nominal}^{PUSCH}-1} M_{sc,nominal}^{UCI}(l)\right] - Q_{ACK/CG-UCI}' - Q_{CSI-1}' \cdot$$

$$\left.\sum_{l=0}^{N_{symb,actual}^{PUSCH}-1} M_{sc,actual}^{UCI}(l) - Q_{ACK/CG-UCI}' - Q_{CSI-1}'\right\}$$

For CSI part 2 transmission on PUSCH without UL-SCH, the number of coded modulation symbols per
layer for CSI part 2 transmission, denoted as $Q_{CSI-part2}'$, is determined as follows:
$$Q_{CSI-2}' = \Sigma_{i=0}^{N_{symb,all}^{PUSCH}-1} M_{sc}^{UCI}(l) - Q_{ACK}' - Q_{CIS-1}'$$

Specifically, in the case of repeated PUSCH transmission types A and B, the terminal may multiplex the aperiodic CSI reporting only to the first repeated transmission among the repeated PUSCH transmissions, and transmit the same. This is because the multiplexed aperiodic CSI reporting information is encoded in a polar code scheme, and in this case, to perform multiplexing to several PUSCH repetitions, each PUSCH repetition needs to have the same frequency and time resource allocation. Specifically, in the case of PUSCH repetition type B, respective actual repetitions may have different OFDM symbol lengths, and thus, the aperiodic CSI reporting may be multiplexed to only the first PUSCH repetition and transmitted.

In addition, for repeated PUSCH transmission type B, when the terminal schedules the aperiodic CSI reporting without scheduling for a transport block or receives DCI for activating the semi-persistent CSI reporting, a value of nominal repetition may be assumed as 1 even when the number of repeated PUSCH transmissions, configured via higher-layer signaling, is greater than 1. In addition, when the aperiodic or semi-persistent CSI reporting is scheduled or activated without scheduling for the transport block, based on repeated PUSCH transmission type B, the terminal may expect that the first nominal repetition is identical to the first actual repetition. For the PUSCH transmitted to include the semi-persistent CSI, based on repeated PUSCH transmission type B, without scheduling for DCI after the semi-persistent CSI reporting has been activated via the DCI, if the first nominal repetition is different from the first actual repetition, the transmission for the first nominal repetition may be omitted.

[In Relation to UE Capability Reporting]

In LTE and NR, the terminal may perform a process of reporting capability supported for the base station by the terminal while the terminal is connected to the serving base station. In the description below, this process is referred to as UE capability reporting.

The base station may transfer a UE capability enquiry message for requesting capability reporting from the terminal that is in a connected state. The message may include a UE capability request for each radio access technology (RAT) type of the base station. The request for each RAT type may include supported frequency band combination information, etc. In addition, in a case of the UE capability enquiry message, multiple RAT type-specific UE capabilities may be required through one RRC message container transmitted by the base station, or a UE capability enquiry message including each RAT type-specific UE capability request may be included multiple times to be transferred to the terminal. That is, the UE capability enquiry may repeat multiple times in one message, and the terminal may configure a UE capability information message corresponding thereto to report the message multiple times. In the next mobile communication system, a UE capability request for multi-RAT dual connectivity including NR, LTE, E-UTRA-NR dual connectivity (EN-DC) may be requested. In addition, it is normal that the UE capability enquiry message is transmitted in the initial stage after the terminal is connected to the base station, but may be requested on the needs of the base station under any conditions.

In the stage above, the terminal having received the UE capability reporting request from the base station configures UE capability according to the RAT type and band information required from the base station. A method for configuring the UE capability by the terminal in the NR system is described below.

1. If the terminal is provided with a list for an LTE and/or NR band upon the UE capability request from the base station, the terminal configures a band combination (BC) for EN-DC and NR stand-alone (SA). That is, a BC candidate list for the EN-DC and the NR SA is configured based on the bands requested from the base station with FreqBandList. In addition, the bands have priorities according to the priorities listed in the FreqBandList.

2. If the base station sets an "eutra-nr-only" flag or an "eutra" flag and requests the UE capability reporting, the terminal completely removes candidates for NR SA BCs from the above-configured BC candidate list. This operation may occur only when the LTE base station (eNB) requests "eutra" capability.

3. Thereafter, the terminal removes fallback BCs from the BC candidate list configured in the stage above. Here, the fallback BC means a BC which can be obtained by removing a band corresponding to at least one SCell from predetermined BCs, and can be omitted because the BC before the removal of the band corresponding to the at least one SCell can already cover the fallback BC. This stage is also applied to the MR-DC, that is, is applied to LTE bands. BCs remaining after this stage is called a final "candidate BC list."

4. The terminal selects BCs matching the requested RAT type, from among the final "candidate BC list" so as to select BCs to be reported. In this stage, the terminal configures supportedBandCombinationList according to predetermined sequences. That is, the terminal configures the BC and UE capability to be reported according to the predetermined rat-Type sequences (nr->eutra-nr->eutra). In addition, the terminal configures featureSetCombination for the configured supportedBandCombinationList, and configures a "candidate feature set combination" list from the candidate BC list from which the list of fallback BCs (including the same or lower step capability) is removed. The "candidate feature set combination" includes all feature set combinations for NR and EUTRA-NR BC, and may be obtained from feature set combinations for containers of UE-NR-Capabilities and UE-MRDC-Capabilities.

5. In addition, when the requested rat Type is eutra-nr and there is an influence therefrom, featureSetCombinations may be included in both containers of UE-MRDC-Capabilities and UE-NR-Capabilities. However, the NR feature set is included in UE-NR-Capabilities.

After the UE capability is configured, the terminal transfers the UE capability information message including the UE capability to the base station. Thereafter, based on the UE capability received from the terminal, the base station performs scheduling and transmission or reception management proper to the corresponding terminal.

[In Relation to CA/DC]

FIG. 17 illustrates a radio protocol structure of a base station and a terminal in single cell, carrier aggregation, and dual connectivity cases according to an embodiment of the disclosure.

Referring to FIG. 17, the radio protocol of the next-generation mobile communication system includes an NR service data adaption protocol (SDAP) S25 or S70, an NR packet data convergence protocol (PDCP) S30 or S65, an NR radio link control (RLC) S35 or S60, and an NR medium access control (MAC) S40 or S55 in each of a terminal and an NR base station.

The primary functions of the NR SDAP S25 or S70 may include some of the functions below:
  Transfer of user plane data;
  Mapping between QoS flow and DRB for both DL and UL;
  Marking QoS flow ID in both DL and UL packets; and
  Mapping reflective QoS flow to DRB for UL SDAP PDUs.

With regard to the SDAP layer entity, the terminal may receive, through an RRC message, a configuration indicating whether or not to use a header of the SDAP layer entity or whether or not to use functions of the SDAP layer entity, for each PDCP layer entity, for each bearer, or for each logical channel. In a case where the SDAP header is configured, a 1-bit NAS reflective QoS configuration indicator and a 1-bit AS reflective QoS configuration indicator of the SDAP header may instruct the terminal to update or reconfigure mapping information between the QoS flow and the data bearer of the uplink and downlink. The SDAP header may include QoS flow ID information indicating QoS. The QoS information may be used as data processing priority, scheduling information, or the like, in order to support effective services.

The primary functions of the NR PDCP S30 or S65 may include some of the functions below:
  Header compression and decompression: ROHC only;
  Transfer of user data;
  In-sequence delivery of upper layer PDUs;
  Out-of-sequence delivery of upper layer PDUs;
  PDCP PDU reordering for reception;
  Duplicate detection of lower layer SDUs;
  Retransmission of PDCP SDUs;
  Ciphering and deciphering; and
  Timer-based SDU discard in uplink.

The reordering function of the NR PDCP layer entity denotes a function of reordering PDCP PDUs received from a lower layer in sequence, based on a PDCP sequence number (SN), and may include a function of transferring data to a higher layer in the reordered order. Alternatively, the reordering function of the NR PDCP layer entity may include a function of directly transferring data without consideration of an order, a function of performing reordering and recording lost PDCP PDUs, a function of sending a status report of the lost PDCP PDUs to a transmission end, and a function of requesting retransmission of the lost PDCP PDUs.

The primary functions of the NR RLC S35 or S60 may include some of the functions below:
Transfer of upper layer PDUs;
In-sequence delivery of upper layer PDUs;
Out-of-sequence delivery of upper layer PDUs;
Error Correction through ARQ;
Concatenation, segmentation and reassembly of RLC SDUs;
Re-segmentation of RLC data PDUs;
Reordering of RLC data PDUs;
Duplicate detection;
Protocol error detection;
RLC SDU discard; and
RLC re-establishment.

The in-sequence delivery function of the NR RLC layer entity denotes a function of transferring RLC SDUs received from a lower layer to a higher layer in sequence. The in-sequence delivery function of the NR RLC layer entity may include a function of, if one original RLC SDU is divided into multiple RLC SDUs and received, reassembling and transmitting the same, may include a function of reordering the received RLC PDUs, based on an RLC sequence number (SN) or a PDCP sequence number (SN), may include a function of performing reordering and recording lost RLC PDUs, may include a function of sending a status report of the lost RLC PDUs to a transmitting end, and may include a function of requesting retransmission of the lost RLC PDUs. The in-sequence delivery function of the NR RLC layer entity may include a function of, if there is a lost RLC SDU, transmitting only the RLC SDUs prior to the lost RLC SDU to a higher layer in sequence, or may include a function of, if a predetermined timer expires even though there is a lost RLC SDU, transmitting all RLC SDUs received before the timer starts to a higher layer in sequence.

Alternatively, the in-sequence delivery function of the NR RLC layer entity may include a function of, if a predetermined timer expires even though there is a lost RLC SDU, transmitting all RLC SDUs received until the present to a higher layer in sequence. In addition, the RLC PDUs may be processed in the order of reception (in the order of arrival regardless of a serial number or a sequence number thereof), and may be transferred to the PDCP layer entity in an out-of-sequence delivery manner. In the case of segments, the segments, which are stored in the buffer or are to be received later, may be received and reconfigured into one complete RLC PDU, and the RLC PDU may be processed and transferred to the PDCP layer entity. The NR RLC layer may not include a concatenation function, and the function may be performed in the NR MAC layer or may be replaced with a multiplexing function of the NR MAC layer.

The out-of-sequence delivery of the NR RLC layer entity denotes a function of directly transmitting RLC SDUs received from a lower layer to a higher layer regardless of sequence, may include a function of, if one original RLC SDU is divided into multiple RLC SDUs and received, reassembling and transmitting the same, and may include a function of storing and ordering RLC SNs or PDCP SNs of the received RLC PDUs, thereby recording the lost RLC PDUs.

The NR MAC S40 or S55 may be connected to multiple NR RLC layer entities configured in a single UE, and the primary functions of the NR MAC may include some of the following functions:
Mapping between logical channels and transport channels;
Multiplexing/demultiplexing of MAC SDUs;
Scheduling information reporting;
HARQ function (error correction through HARQ);
Priority handling between logical channels of one UE;
Priority handling between UEs by means of dynamic scheduling;
MBMS service identification;
Transport format selection; and
Padding.

The NR PHY layers S45 or S50 may perform an operation of channel-coding and modulating of the higher layer data into an OFDM symbol and transmitting the same through a radio channel, or an operation of performing demodulating and channel-decoding of the OFDM symbol received through the radio channel and transmitting the same to the higher layer.

The detailed structure of the radio protocol may change in various ways according to a carrier (or cell) operating scheme. For example, in the case where the base station transmits data to the terminal, based on a single carrier (or cell), the base station and the terminal use a single protocol structure for each layer as shown in S00. On the other hand, in a case where the base station transmits data to the terminal, based on carrier aggregation (CA) using multiple carriers in a single TRP, the base station and the terminal use a protocol structure in which a single structure is provided until the RLC layer and in which the PHY layer is multiplexed through the MAC layer as shown in S10. In another example, in a case where the base station transmits data to the terminal, based on dual connectivity (DC) using multiple carriers in multiple TRPs, the base station and the terminal use a protocol structure in which a single structure is provided until the RLC layer and in which the PHY layer is multiplexed through the MAC layer as shown in S20.

Referring to the descriptions above related to the PDCCH and the beam configuration, in the current Rel-15 and Rel-16 NR, repeated PDCCH transmission is not supported, and thus, it is difficult to achieve reliability required in a scenario requiring high-reliability such as URLLC. In the disclosure, a repeated PDCCH transmission method through multiple transmission points (TRPs) is provided so as to enhance PDCCH reception reliability of the terminal. A detailed method is described in the embodiments below in detail.

Hereinafter, an embodiment of the disclosure is described in detail with reference to the accompanying drawings. The content of the disclosure is applicable to frequency division duplexing (FDD) and time division duplexing (TDD) systems. Hereinafter, in the disclosure, high-level signaling (higher-layer signaling) is a signal transmission method in which a signal is transmitted from a base station to a terminal using a downlink data channel of a physical layer or from a terminal to a base station using an uplink data channel of a physical layer, and may be referred to as RRC signaling, PDCP signaling, or a medium access control (MAC) control element (MAC CE).

Hereinafter, in the disclosure, in determining whether to apply cooperative communication, the terminal may use various methods: in which the PDCCH(s) allocating a PDSCH to which the cooperative communication is applied has a specific format; the PDCCH(s) allocating the PDSCH to which the cooperative communication is applied includes a specific indicator indicating whether the cooperative communication is applied; the PDCCH(s) allocating the PDSCH to which the cooperative communication is applied is scrambled with a specific RNTI; the application of cooperative communication is assumed in a specific section indicated by the higher layer; or the like. Hereinafter, for convenience of description, a case in which the terminal receives the PDSCH to which the cooperative communication is applied based on conditions similar to the above will be referred to as an NC-JT case.

Hereinafter, in the disclosure, determining the priorities between A and B may be mentioned in various ways, such as selecting one having a higher priority than the other according to a predetermined priority rule to perform an operation corresponding thereto, or omitting or dropping an operation having a lower priority.

Hereinafter, in the disclosure, the above examples will be described through a number of embodiments, but these are not independent, and it is possible that one or more embodiments are applied simultaneously or in combination.

[In Relation to NC-JT]

According to an embodiment of the disclosure, in order for the terminal to receive PDSCHs from multiple TRPs, non-coherent joint transmission (NC-JT) may be used.

The 5G wireless communication system may support not only services requiring a high transmission speed, but also services having a very short transmission delay and services requiring a high connection density. In a wireless communication network including multiple cells, transmission and reception points (TRP), or beams, the coordinated transmission between each cell, TRP, and/or beam can satisfy various service requirements by increasing the strength of a signal received by the terminal or efficiently performing interference control between cells, TRPs or/and beams.

Joint transmission (JT) is a representative transmission technique for cooperative communication described above, wherein a signal is transmitted to one terminal through different cells, TRPs, and/or beams to increase the strength or throughput of the signal received by the terminal. In this case, channels between the terminal and each cell, TRP, or/and beam may have significantly different characteristics, and specifically, in the case of non-coherent joint transmission ((NC-JT) supporting non-coherent precoding between respective cells, TRPs, and/or beams, individual precoding, MCS, resource allocation, TCI indication, and the like may be required according to a channel characteristic of a link between a terminal and each cell, TRP, and/or beam.

The NC-JT transmission above may be applied to at least one of a downlink data channel (a physical downlink shared channel (PDSCH)), a downlink control channel (a physical downlink control channel (PDCCH)), an uplink data channel (a physical uplink shared channel (PUSCH)), and an uplink control channel (a physical uplink control channel (PUCCH)). During the PDSCH transmission, transmission information such as precoding, MCS, resource allocation, and TCI is to be indicated via DL DCI, and for NC-JT transmission, the transmission information needs to be independently indicated for each cell, TRP, and/or beam. This becomes a major factor in increasing the payload required for DL DCI transmission, which may adversely affect the reception performance of the PDCCH transmitting the DCI. Therefore, it is necessary to carefully design a tradeoff between a DCI information amount and a control information reception performance for JT support of the PDSCH.

Figure 18:
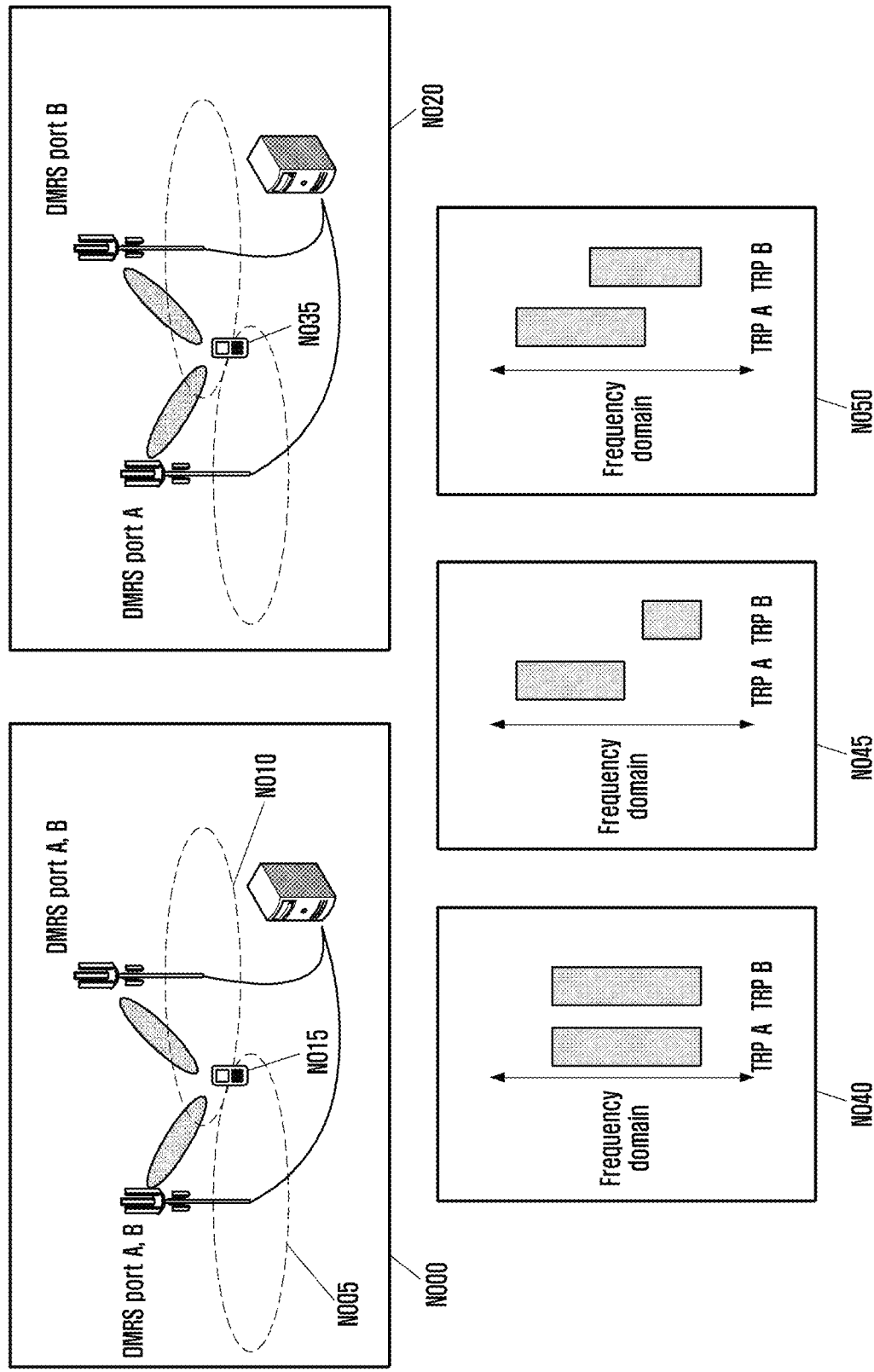
FIG. 18 illustrates an example of antenna port configuration and resource allocation for cooperative communication in a wireless communication system according to an embodiment of the disclosure.

FIG. 18 illustrates an example of antenna port configuration and resource allocation for PDSCH transmission using cooperative communication in a wireless communication system according to an embodiment of the disclosure.

Referring to FIG. 18, an example of PDSCH transmission is described for each joint transmission (JT) technique, and examples of radio resource allocation are illustrated for each TRP.

Referring to FIG. 18, an example N000 of coherent joint transmission (C-JT) supporting coherent precoding between respective cells, TRPs, or/and beams is illustrated.

In the case of C-JT, single data (PDSCH) is transmitted from TRP A N005 and TRP B N010 to the terminal N015, and joint precoding may be performed in multiple TRPs. This may mean that TRP A N005 and TRP B N010 transmit DMRSs through the same DMRS port to transmit the same PDSCH. For example, TRP A N005 and TRP B N010 may transmit DMRSs to the terminal through DMRS port A and DMRS port B, respectively. In this case, the terminal may receive one piece of DCI information for receiving one PDSCH demodulated based on the DMRSs transmitted through DMRS ports A and B.

FIG. 18 illustrates an example N020 of non-coherent joint transmission (NC-JT) supporting non-coherent precoding between respective cells, TRPs, or/and beams for PDSCH transmission.

In the case of NC-JT, a PDSCH is transmitted to the terminal N035 for each cell, TRP, or/and beam, and individual precoding may be applied to each PDSCH. Each cell, TRP, or/and beam transmits different PDSCHs or different PDSCH layers to the terminal to improve throughput compared to single cell, TRP, or/and beam transmission. In addition, each cell, TRP, or/and beam may repeatedly transmit the same PDSCH to the terminal to improve reliability compared to single cell, TRP, or/and beam transmission. For convenience of description, the cell, the TRP, and/or the beam is collectively referred to as a TRP.

In this case, various radio resource allocations such as a case where all of the frequency and time resources used by multiple TRPs for transmitting the PDSCH are identical (N040), a case where the frequency and time resources used by multiple TRPs do not overlap at all (N045), or a case where some of the frequency and time resources used by multiple TRPs overlap (N050), may be considered.

For NC-JT support, DCIs of various forms, structures, and relationships may be considered to simultaneously allocate multiple PDSCHs to one UE.

Figure 19:
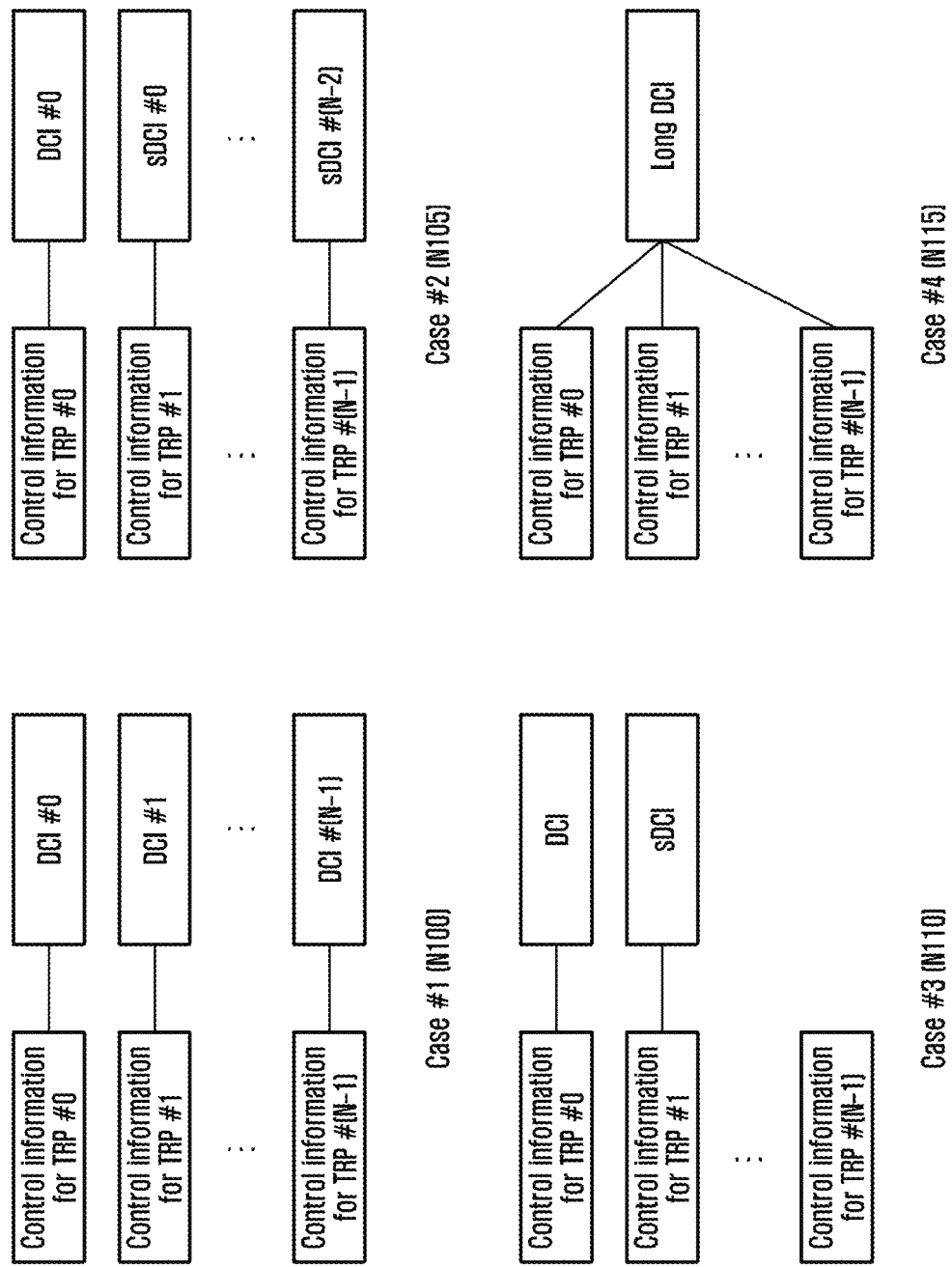
FIG. 19 illustrates an example of downlink control information (DCI) configuration for cooperative communication in a wireless communication according to an embodiment of the disclosure.

FIG. 19 illustrates an example of downlink control information (DCI) configuration for NC-JT in which respective TRPs transmit different PDSCHs or different PDSCH layers to a terminal in a wireless communication system according to an embodiment of the disclosure.

Referring to FIG. 19, case #1 (N100) is an example in which control information for PDSCHs transmitted in (N−1) additional TRPs is transmitted independently from control information for a PDSCH transmitted in a serving TRP, in a situation in which different (N−1) PDSCHs are transmitted from (N−1) additional TRPs (TRP #1 to TRP #(N−1)) in addition to serving TRP (TRP #0) used when transmitting a single PDSCH. That is, the terminal may obtain control information for PDSCHs transmitted from different TRPs (DCI #0 to DCI #(N−1)) through independent DCIs (DCI #0 to DCI #(N−1)). The independent DCIs may have the same format or different formats, and may have the same payload or different payloads. In case #1 described above, the degree of freedom for each PDSCH control or allocation may be completely guaranteed, but when the respective DCIs are transmitted in different TRPs, a coverage difference for each DCI may occur and reception performance may be deteriorated.

Case #2 (N105) is an example in which the pieces of control information (DCI) for PDSCHs transmitted from (N−1) additional TRPs are respectively transmitted, and each DCI is dependent on control information for a PDSCH transmitted from a serving TRP, in a situation in which different (N−1) PDSCHs are transmitted in (N−1) additional TRPs (TRP #1 to TRP #(N−1)) in addition to the serving TRP (TRP #0) used when transmitting a single PDSCH.

For example, in the case of DCI #0 corresponding to control information for the PDSCH transmitted from serving TRP (TRP #0), all information elements of DCI format 10, DCI format 1_1, and DCI format 1_2 are included, but in the case of shortened DCI (sDCI #0 to sDCI #(N−2)) corresponding to control information for PDSCHs transmitted from the cooperative TRPs (TRP #1 to TRP #(N−1)), only some of the information elements of DCI format 1_0, DCI format 1_1, and DCI format 1_2 may be included. Therefore, in the case of sDCI that transmits control information for PDSCHs transmitted in the cooperative TRPs, the payload is small compared to the normal DCI (nDCI) transmitting PDSCH-related control information transmitted from the serving TRP, and thus, it is possible to include reserved bits, compared to the nDCI.

In case #2 described above, the degree of freedom of each PDSCH control or allocation may be limited according to a content of the information element included in the sDCI, but since the reception performance of sDCI is superior to that of nDCI, the probability of occurrence of a coverage difference for each DCI can be lowered.

Case #3 (N110) is an example in which on piece of control information of PDSCHs for (N−1) additional TRPs is transmitted and the DCI is dependent on control information for a PDSCH transmitted from a serving TRP, in a situation in which (N−1) PDSCHs are transmitted from (N−1) additional TRPs (TRP #1 to TRP #(N−1)) other than serving TRP (TRP #0) used when transmitting a single PDSCH.

For example, in the case of DCI #0 corresponding to control information for the PDSCH transmitted from serving TRP (TRP #0), all information elements of DCI format 10, DCI format 1_1, DCI format 1_2 are included, and in the case of control information for PDSCHs transmitted from cooperative TRPs (TRP #1 to TRP #(N−1)), only some of the information elements of DCI format 10, DCI format 1_1, DCI format 1_2 may be collected in one piece of "secondary" DCI (sDCI) and transmitted. For example, the sDCI may include at least one of HARQ-related information, such as frequency domain resource assignment, time domain resource assignment, and MCS of cooperative TRPs. In addition, for information not included in sDCI, such as a bandwidth part (BWP) indicator or a carrier indicator, the information may follow the DCI (DCI #0, normal DCI, and nDCI) of a serving TRP.

In case #3, the degree of freedom of each PDSCH control or assignment may be limited according to a content of information elements included in sDCI, but the reception performance of sDCI can be adjusted and the complexity of DCI blind decoding of the terminal can be reduced compared to case #1 (N100) or case #2 (N105).

Case #4 (N115) is an example of in which control information for PDSCHs transmitted from (N−1) additional TRPs and control information for a PDSCH transmitted from a serving TRP are transmitted in the same DCI (long DCI), in a situation in which (N−1) PDSCHs are transmitted from (N−1) additional TRPs (TRP #1 to TRP #(N−1)) other than serving TRP (TRP #0) used when transmitting a single PDSCH. That is, the terminal may acquire control information for PDSCHs transmitted from different TRPs (TRP #0 to TRP #(N−1)) through single DCI. In case #4 (N115), the complexity of DCI blind decoding of the terminal may not increase, but the degree of freedom of each PDSCH control or assignment may be low, such as a limited number of cooperative TRPs due to long DCI payload limitation.

In the following description and embodiments, sDCI may refer to various auxiliary DCIs, such as shortened DCI, secondary DCI, or normal DCI (DCI format 1_0 to 1_1 described above) including PDSCH control information transmitted from a cooperative TRP. If no special restrictions are specified, the description is similarly applicable to the various auxiliary DCIs.

In the following descriptions and embodiments, the above-described case #1 (N100), case #2 (N105), and case #3 (N110) in which one or more DCIs (PDCCHs) are used for NC-JT support are classified as NC-JT based on multiple PDCCHs, and the above-described case #4 (N115) in which single DCI (PDCCH) is used for NC-JT support is classified as NC-JT based on a single PDCCH. In the PDSCH transmission based on multiple PDCCHs, a CORESET in which DCI of a serving TRP (TRP #0) is scheduled may be distinguished from a CORESET in which DCI of cooperative TRPs (TRP #1 to TRP #(N−1)) is scheduled. As a method for dividing CORESETs, there may be a method for division through a higher-layer indicator for each CORESET, a method for division through beam configuration for each CORESET, and the like. In addition, in NC-JT based on a single PDCCH, instead of scheduling multiple PDSCHs by single DCI, a single PDSCH having multiple layers may be scheduled, and the multiple layers are transmitted from multiple TRPs. In this case, a connection relationship between a layer and a TRP for transmitting the corresponding layer may be indicated through a transmission configuration indicator (TCI) indicator for the layer.

In embodiments of the disclosure, a "cooperative TRP" may be replaced with various terms such as a "cooperative panel" or a "cooperative beam" when actually applied.

In embodiments of the disclosure, the term "a case where NC-JT is applied" may be interpreted in various ways according to the situation, such as "a case where a terminal simultaneously receives one or more PDSCHs in one BWP," "a case where a terminal receives a PDSCH in one BWP, based on two or more transmission configuration indicator (TCI) indications simultaneously," and "a case where the PDSCH received by the terminal is associated with one or more DMRS port groups," etc., but one expression is used for the cases for convenience of description.

In the disclosure, a radio protocol structure for NC-JT may be used in various ways depending on the TRP deployment scenario. For example, if there is no or little backhaul delay between cooperative TRPs, it is possible to use a method (CA-like method) of using a structure based on MAC layer multiplexing similar to FIG. 17 (S10). On the other hand, when the backhaul delay between cooperative TRPs is too large to ignore (e.g., when a time of 2 ms or more is required for CSI exchange or scheduling information exchange between cooperative TRPs), it is possible to use a method (DC-like method) of securing a delay robust characteristic by using an independent structure for each TRP from the RLC layer, similar to S20 of FIG. 17.

The terminal supporting C-JT/NC-JT may receive a C-JT/NC-JT-related parameter, setting value, or the like from a higher-layer configuration and may set an RRC parameter of the terminal based thereon. For the higher-layer configuration, the terminal may utilize a UE capability parameter, for example, tci-StatePDSCH. Here, the UE capability parameter, for example, tci-StatePDSCH, may define TCI states for the purpose of PDSCH transmission, wherein the number of TCI states may be configured to be 4, 8, 16, 32, 64, and 128 in FR1 and to be 64 and 128 in FR2, and among the configured numbers, the maximum eight states which may be indicated by a 3-bit TCI field of DCI through a MAC CE message may be configured. The maximum value 128 may refer a value indicated by maxNumberConfiguredTCIstatesPerCC in the tci-StatePDSCH parameter included in the UE capability signaling. A serial configuration operation from the higher-layer configuration to the MAC CE configuration may be applied to a beamforming indication or beamforming switching command for at least one PDSCH in one TRP.
[Multi-DC-Based Multi-TRP]

According to an embodiment of the disclosure, a downlink control channel for NC-JT transmission may be configured based on a multi-PDCCH.

In NC-JT based on the multiple PDCCHs, when DCI is transmitted for scheduling of a PDSCH of each TRP, there may be a CORESET or a search space that is classified for each TRP. The CORESET or the search space for each TRP can be configured as at least one of the following cases.

In one example case, higher-layer index configuration for each CORESET: The CORESET configuration information configured via the higher layer may include an index value, and the TRP that transmits the PDCCH from the corresponding CORESET can be classified by an index value configured for each CORESET. That is, in a set of CORESETs having the same higher-layer index value, it may be considered that the same TRP transmits the PDCCH or that the PDCCH scheduling the PDSCH of the same TRP is transmitted. The above-described index for each CORESET may be named as CORESETPoolIndex, and for CORESETs for which the same CORESETPoolIndex value is configured, it may be considered that the PDCCH is transmitted from the same TRP. In the case of a CORESET in which the CORESETPoolIndex value is not configured, it may be considered that the default value of CORESETPoolIndex is configured, and the default value may be 0.

In one example case, configuration of multiple PDCCH-Configs: Multiple PDCCH-Configs may be configured in one BWP, and each PDCCH-Config may include PDCCH configuration for each TRP. That is, a list of CORESETs for each TRP and/or a list of search spaces for each TRP can be configured in one PDCCH-Config, and one or more CORESETs and one or more search spaces included in one PDCCH-Config may be considered to correspond to a specific TRP.

In one example case, CORESET beam/beam group configuration: Through a beam or beam group set for each CORESET, A TRP corresponding to the corresponding CORESET may be classified. For example, when the same TCI state is configured for multiple CORESETs, may be considered that the corresponding CORESETs is transmitted through the same TRP, or that a PDCCH scheduling a PDSCH of the same TRP is transmitted in the corresponding CORESET.

In one example case, search space beam/beam group configuration: A beam or beam group may be configured for each search space, and a TRP for each search space may be classified through the beam or beam group. For example, when the same beam/beam group or TCI state is configured in multiple search spaces, it may be considered that the same TRP transmits a PDCCH in the search space, or that a PDCCH scheduling a PDSCH of the same TRP is transmitted in the search space.

By classifying the CORESET or search space for each TRP as described above, it is possible to classify PDSCH and HARQ-ACK information for each TRP, and through this, it is possible to generate an independent HARQ-ACK codebook for each TRP and use an independent PUCCH resource.

The configuration above may be independent for each cell or each BWP. For example, two different CORESETPoolIndex values are configured in a PCell, but a CORESETPoolIndex value may not be configured in a specific SCell. In this case, NC-JT transmission is configured in the PCell, but NC-JT transmission is not configured in the SCell in which no CORESETPoolIndex value is configured.
[Single-DCI-Based Multi-TRP]

In another embodiment of the disclosure, a downlink beam for NC-JT transmission may be configured based on a single PDCCH.

In single PDCCH-based NC-JT, a PDSCH transmitted by multiple TRPs via one piece of DCI may be scheduled. In this case, as a method for indicating the number of TRPs for transmitting the corresponding PDSCH, the number of TCI states may be used. That is, when the number of TCI states indicated in the DCI scheduling the PDSCH is two, single PDCCH-based NC-JT transmission may be considered, and when the number of TCI states is one, single-TRP transmission may be considered. The TCI states indicated by the DCI may correspond to one or two TCI states among TCI states activated via a MAC-CE. When the TCI states of the DCI correspond to two TCI states activated via the MAC-CE, a correspondence relationship between the TCI states activated via the MAC-CE and a TCI codepoint indicated by the DCI, and there may be two TCI states activated via the MAC-CE, corresponding to the TCI codepoint.

The configuration may be independent for each cell or each BWP. For example, there may be maximum two activated TCI states corresponding to one TCI codepoint in a PCell, but there may be maximum one activated TCI state corresponding to one TCI codepoint in a specific SCell. In this case, it may be considered that NC-JT transmission is configured for the PCell, but NC-JT transmission is not configured in the SCell.

According to the description of the PUSCH and aperiodic/semi-persistent CSI reporting, in the current Rel-15/16 NR, the aperiodic CSI reporting may be multiplexed only to the first PUSCH or the first actual repetition according to repeated PUSCH transmission type A or B. That is, the aperiodic CSI reporting can be transmitted to the single TRP only by using a single transmission beam. In the Rel-17 FeMIMO, to acquire better reliability during the repeated PUSCH transmission, a method in which a support is made by expansion to PUSCH repetition based on multiple TRPs is being discussed, so that space diversity can be secured through application of the multiple transmission beams to the PUSCH repetition. In the corresponding discussion, the main discussion is made on supporting repeated PUSCH transmission to multiple TRPs by applying different beams to each PUSCH repetition, based on the existing repeated PUSCH transmission type A or B. In this case, in the case of repeated PUSCH transmission type A or B based on the multiple TRPs, when the aperiodic CSI reporting is multiplexed and transmitted and the multiplexing is performed only to the first PUSCH repetition in the existing Rel-15/16 scheme, transmission to the corresponding TRP may fail due to a channel deterioration factor such as blockage, and thus, a method for performing multiplexing to transmission to each TRP may require.

In this case, as described above, due to a polar code characteristic, combining after reception from the base station is possible only when the time and frequency resource allocation values, that is, the numbers of resource elements (REs) allocated to the terminal, of respective repeated PUSCH transmissions are identical to each other. Accordingly, when the aperiodic CSI reporting is multiplexed while a transport block is transmitted by using repeated PUSCH transmission type A or B, a method for determining a PUSCH repetition to which the aperiodic CSI reporting is to be multiplexed, among all PUSCH repetitions, may be required. In addition, in a case where the aperiodic or semi-persistent CSI reporting is multiplexed when no transport block is transmitted in the repeated PUSCH transmission type B, at least one transmission is to be secured for each TRP even through the number of PUSCH repetitions is configured to be greater than 1. In the disclosure, when the aperiodic/semi-persistent CSI reporting is transmitted or multiplexed, a method for multiplexing or transmitting the CSI report for repeated PUSCH transmission in consideration of multiple TRPs is provided so that CSI reception reliability in the base station can be enhanced. A detailed method is described in embodiments below.

In the following description in the disclosure, for convenience of description, a cell, a transmission point, a panel, a beam, and/or a transmission direction, which can be classified through an indicator such as an indicator such as a cell ID, a TRP ID, or a panel ID, or a higher-layer/L1 parameter such as a TCI state or station relation information is collectively referred to as a transmission reception point (TRP). Accordingly, when actual application is made, the TRP may be properly replaced with one of the terms above.

Hereinafter, in the disclosure, in determining whether to apply cooperative communication by the terminal, various methods including a method in which PDCCH(s) for allocating a PDSCH to which the cooperative communication is applied has a specific format, PDCCH(s) for allocating the PDSCH to which the cooperative communication is applied includes a specific indicator indicating whether the cooperative communion is applied, PDCCH(s) for applicating the PDSCH to which the cooperative communication is applied is scrambled with specific RNTI, or the application of the cooperative communication is assumed in a specific period indicated via a higher-layer may be used. Hereinafter, for convenience of description, receiving, by a terminal, a PDSCH to which the cooperative communication is applied, based on conditions similar to the description above, is referred to as an NC-JT case.

Hereinafter, an embodiment of the disclosure is described with reference to the accompanying drawings. Hereinafter, the base station is an entity that performs resource allocation of the terminal, and may be at least one of a gNode B, gNB, eNode B, Node B, a base station (BS), a radio access unit, a base station controller, or a node on a network. The terminal may include a user equipment (UE), a mobile station (MS), a cellular phone, a smart phone, a computer, or a multimedia system capable of performing a communication function. Hereinafter, an embodiment of the disclosure will be described using a 5G system as an example, but an embodiment of the disclosure may be applied to other communication systems having a similar technical background or channel type. For example, other communication systems may include mobile communication technologies developed after LTE or LTE-A mobile communication, and 5G. Accordingly, embodiments of the disclosure may also be applied to different communication systems with some modifications to such an extent that does not significantly deviate the scope of the disclosure according to the determination by those of skilled in the art. The content of the disclosure is applicable to FDD and TDD systems.

In addition, in describing the disclosure, a detailed description of a related known function or configuration will be omitted if it is deemed to make the gist of the disclosure unnecessarily vague. Furthermore, terms to be described below have been defined by taking into consideration functions in the disclosure, and may vary depending on a user, an operator's intention or practice. Accordingly, each term should be defined based on contents over the entire specification.

Hereinafter, in describing the disclosure, higher-layer signaling may be signaling corresponding to at least one of the signaling methods below or a combination of one or more thereof:
Master information block (MIB);
System information block (SIB) or SIB X (X=1, 2, . . . );
Radio resource control (RRC); and
Medium access control (MAC) control element (CE).

In addition, L1 signaling may be signaling corresponding to at least one of signaling methods using the physical layer channels or signalings below or a combination of one or more of the methods:
Physical downlink control channel (PDCCH);
Downlink control information (DCI);
UE-specific DCI;
Group common DCI;
Common DCI;
Scheduling DCI (e.g., DCI used for scheduling downlink or uplink data);
Non-scheduling DCI (e.g., DCI not for scheduling downlink or uplink data);
Physical uplink control channel (PUCCH); and
Uplink control information (UCI).

Hereinafter, in the disclosure, determining the priorities between A and B may be mentioned in various ways, such as selecting one having a higher priority than the other according to a predetermined priority rule to perform an operation corresponding thereto, or omitting or dropping an operation having a lower priority.

Hereinafter, in the disclosure, the above examples will be described through a number of embodiments, but these are not independent, and it is possible that one or more embodiments are applied simultaneously or in combination.

First Embodiment: Method for Repeated PUSCH Transmission in Consideration of Multi-TRP In the first embodiment of the disclosure, a method for indicating L1 signaling and configuring higher-layer signaling for repeated PUSCH transmission in consideration of a multi-TRP is described. The repeated PUSCH transmission in consideration of the multi-TRP may be operated through single or multi-DCI-based indication, and single and multi-DCI-based repeated PUSCH transmissions are described in the (1-1)th embodiment and the (1-2)th embodiment, respectively. In addition, in the (1-3)th embodiment of the disclosure, a method for repeated configured grant PUSCH transmission in consideration of the multi-TRP is described. In addition, in the (1-4)th embodiment of the disclosure, a method for configuring an SRS resource set for repeated PUSCH transmission in consideration of the multi-TRP is described.

(1-1)Th Embodiment: Method for Repeated PUSCH Transmission in Consideration of Single DCI-Based Multi-TRP In the (1-1)th embodiment, as an embodiment of the disclosure, a repeated PUSCH transmission method in consideration of a single DCI-based multi-TRP is described. A terminal may report to the base station, through UE capability reporting, that the repeated PUSCH transmission in consideration of the single DCI-based multi-TRP is possible. The base station may configure, for the terminal having reported the corresponding UE capability (for example, UE capability supporting the repeated PUSCH transmission in consideration of the single DCI-based multi-TRP), a type of repeated PUSCH transmission to be used, through higher-layer signaling. In this case, the higher-layer signaling may be configured by selecting one of repeated PUSCH transmission type A and repeated PUSCH transmission type B.

In a case of a method for repeated PUSCH transmission in consideration of a single TRP in Rel-15/16, both codebook and non-codebook-based transmission schemes are performed based on single DCI. The terminal may apply the same value to each repeated PUSCH transmission by using an SRI or a TPMI indicated by single DCI when performing the codebook-based PUSCH transmission. In addition, the terminal may apply the same value to each repeated PUSCH transmission by using an SRI indicated by single DCI when performing the non-codebook-based PUSCH transmission. For example, when the codebook-based PUSCH transmission and repeated PUSCH transmission type A are configured via higher-layer signaling and a time resource allocation index having the number of repeated PUSCH transmissions configured as four, SRI index 0, and TPMI index 0 are indicated via the DCI, the terminal applies SRI index 0 and TPMI index 0 to all of the four repeated PUSCH transmissions.

Here, the SRI may be related to a transmission beam, and the TPMI may be related to a transmission precoder. Unlike the method for repeated PUSCH transmission in consideration of the single-TRP, the method for repeated PUSCH transmission in consideration of the multi-TRP may require that different transmission beams and transmission precoders are applied to transmissions to the respective TRPs. Accordingly, the terminal may receive indication of multiple SRIs or TPMIs via DCI, apply the indication to each repeated PUSCH transmission, and perform repeated PUSCH transmission in consideration of the multi-TRP.

When the method for repeated PUSCH transmission in consideration of the single DCI-based multi-TRP is indicated to the terminal, methods below may be considered as methods for indicating multiple SRIs or TPMIs to the terminal for the codebook or non-codebook-based PUSCH transmission method.

[Method 1] Transmission of Single DCI in which Multiple SRI or TPMI Fields Exist In order to support the repeated PUSCH transmission in consideration of the single DCI-based multi-TRP, the base station may transmit DCI in which multiple SRI or TPMI fields exist to the terminal. Such DCI has a new format (for example, DCI format 0_3) or the existing format (for example, DCI format 0_1, 0_2), but the DCI, in which there has been only one SRI field and one TPMI field, may have multiple SRI or TPMI fields if additional higher-layer signaling (for example, signaling for enabling determination of whether multiple SRI or TPMI fields can be supported) is configured and the corresponding configuration exists. For example, when the codebook-based PUSCH transmission is configured via higher-layer signaling and the terminal receives a configuration of enabling determination of whether the multiple SRI or TPMI fields can be supported, via higher-layer signaling, the terminal may receive DCI which has two SRI fields and two TPMI fields and has a new format or the existing format, so as to perform the codebook-based repeated PUSCH transmission in consideration of the multi-TRP.

In another example, when the non-codebook-based PUSCH transmission is configured via higher-layer signaling and the terminal receives higher-layer signaling enabling determination of whether the multiple SRI or TPMI fields can be supported, the terminal may receive DCI which has two SRI fields and has a new format or the existing format, so as to perform the non-codebook-based repeated PUSCH transmission in consideration of the multi-TRP. When multiple SRI fields are used for both the codebook and non-codebook-based PUSCH transmissions, two or more SRS resource sets corresponding to the higher-layer signaling and having the usage configured as a codebook or a non-codebook may be configured, wherein SRI fields may indicate SRS resources, respectively, and the SRS resources may be included in two different SRS resource sets, respectively. A detailed description of the multiple SRS resource sets will be made in the (1-4)th embodiment.

[Method 2] Transmission of DCI to which Enhanced SRI and TPMI Fields are Applied In order to support the method for repeated PUSCH transmission in consideration of the single DCI-based multi TRP, the terminal may receive a MAC-CE for supporting the enhanced SRI or TPMI fields, from the base station. The MAC-CE may include information indicating to change the interpretation of the codepoint in the DCI field so that multiple transmission beams are indicated for a specific codebook in the SRI field in the DCI, or multiple transmission precoders are indicated for a specific codebook in the TPMI field. Below two methods for indicating the multiple transmission beams may be considered:

Receiving a MAC-CE for performing activation so that a specific codepoint in an SRI field indicates one SRS resource connected to multiple pieces of SRS spatial relation info; and Receiving a MAC-CE for performing activation so that a specific codepoint in an SRI field indicates multiple SRS resources connected to one piece of SRS spatial relation info.

When the multiple SRS resources are indicated by using the enhanced SRI field, a transmission power adjustment parameter of the SRS resource is configured for each SRS resource set, and thus, in order to configure different transmission power adjustment parameters for TRPs, respectively, respective SRS resources may exist in different SRS resource sets. Accordingly, there may be two or more SRS resource sets corresponding to the higher-layer signaling and having the usage configured as a codebook or a non-codebook.

(1-2)Th Embodiment: Method for Repeated PUSCH Transmission in Consideration of Multi-DCI-Based Multi-TRP In the (1-2)th embodiment, as an embodiment of the disclosure, a method for repeated PUSCH transmission in consideration of a multi-DCI-based multi-TRP is described. As described above, all the repeated PUSCH transmission methods in Rel-15/16 consider a single TRP, and thus, it is possible for the transmission beam, transmission precoder, resource allocation, and power adjustment parameters to use the same value for each repeated transmission. However, during the repeated PUSCH transmission in consideration of the multi-TRP, different PUSCH transmission-related parameters configured via higher-layer signaling or indicated by DCI may need to be applied to TRPs, respectively, for each repeated PUSCH transmission to the multiple TRPs. For example, when the multiple TRPs exist in different directions from the terminal, transmission beams or transmission precoders may be different, and thus, a transmission beam or a transmission precoder for each TRP needs to be configured or indicated.

In another example, when the multiple TRPs are spaced apart from the terminal by different distances, an independent power adjustment scheme between the multiple TRPs and the terminal may be needed, and accordingly, different time/frequency resource allocations may be performed. For example, a relatively small number of RBs and a relatively large number of symbols may be allocated to a TRP in a relatively far distance, compared to a specific TRP, in order to increase power per RE. Accordingly, transferring different information pieces applied to each TRP to the terminal through single DCI may cause the length of a bit of the corresponding DCI to be too long, and thus, indicating repeated PUSCH transmission to the terminal via multiple pieces of DCIs may be more efficient.

The terminal may report, to the base station, as UE capability reporting, that the repeated PUSCH transmission in consideration of the multi-DCI-based multi-TRP is possible. The base station may transmit a notification to the terminal so that the terminal performs repeated PUSCH transmission in consideration of the multi-TRP through multi-DCI, by using a configuration via higher-layer signaling, an indication via L1 signaling, and a configuration and an indication via a combination of the higher-layer signaling and the L1 signaling, with respect to the terminal having reported the corresponding UE capability (for example, UE capability supporting the repeated PUSCH transmission in consideration of the multi-DCI-based multi-TRP). The base station may use a method for configuring or indicating the repeated PUSCH transmission in consideration of the multi-DCI-based multi-TRP as described below.

When performing the PUSCH transmission in consideration of the multi-DCI-based multi-TRP, the terminal may expect that pieces of time/frequency resource allocation information indicated via each DCI piece in consideration of TRPs spaced apart from the terminal by different distances are different from each other. The terminal may report whether different time/frequency resource allocations can be supported, to the base station through UE capability. The base station may configure, for the terminal, whether different time/frequency resource allocations can be supported, via higher-layer signaling, and the terminal having received the configuration may expect that the pieces of time/frequency resource allocation information to be indicated via each DCI piece are different from each other.

In this case, the terminal may receive a configuration or an indication of the repeated PUSCH transmission in consideration of the multi-DCI-based multi-TRP, from the base station in consideration of the higher-layer signal configuration and a condition between multiple DCI fields. When the transmission beam and transmission precoder information are indicated through the multi-DCI, the SRI and the TPMI in the first received DCI may be applied in the first time when a transmission beam mapping scheme in the second embodiment below is applied, and the SRI and the TPMI in the second received DCI may be applied in the second time when the transmission beam mapping scheme in the second embodiment below is applied.

The base station may configure CORESETPoolIndex corresponding to the higher-layer signaling to the terminal for each CORESET, and when receiving a CORESET, the terminal may identify a TRP, from which the corresponding CORESET is transmitted, from CORESETPoolIndex. For example, when CORESETPoolIndex is configured as 0 in CORESET #1 and CORESETPoolIndex is configured as 1 in CORESET #2, the terminal may identify that CORESET #1 is transmitted from TRP #0 and CORESET #2 is transmitted from TRP #1. In addition, the fact that DCI transmitted in CORESETs having CORESETPoolIndex values configured with 0 and 1, respectively, indicates a repeated PUSCH may be implicitly indicated by a condition between specific fields in multiple DCI pieces.

For example, when HARQ process number field values and NDI field values in multiple DCI pieces transmitted from the base station to the terminal are identical, the terminal may implicitly consider that the multiple DCI pieces perform scheduling of repeated PUSCH in consideration of multi-TRP. When the HARQ process number field values are identical and the NDI field values are identical, there may be a limit to the reception of the multiple DCI pieces. For example, a maximum spacing between the multiple DCI receptions may be defined to be within one or more specific slot numbers or one or more specific symbol numbers. In this case, the terminal may perform PUSCH transmission based on the minimum transport block size calculated (or identified) based on the different time/frequency resource allocation information pieces indicated by the multiple DCI pieces.

(1-3)Th Embodiment: Method for Repeated Configured Grant PUSCH Transmission in Consideration of Multi-TRP In the (1-3)th embodiment, as an embodiment of the disclosure, a method for a repeated configured grant PUSCH transmission in consideration of a multi-TRP is described. The terminal may report whether repeated configured grant PUSCH transmission in consideration of the multi-TRP is performed, to the base station, as UE capability. The base station may configure the repeated configured grant PUSCH transmission in consideration of the multi-TRP for the terminal via higher-layer signaling, indicate the same via L1 signaling, or configure and indicate the same via a combination of the higher-layer signaling and the L1 signaling, by using various methods below.

[Method 1] Activation of Single DCI-Based Single Configured Grant Configuration

Method 1 corresponds to a method for indicating multiple SRIs or TPMIs to the terminal, based on the single DCI, and activating, in addition to the indication, a single configured grant configuration. The method for indicating the multiple SRIs or TPMIs, based on the single DCI, may follow the method in the (1-1)th embodiment, and when there is only one configured grant configuration in the terminal, all bits in an HARQ process number field and a redundancy version field in the corresponding DCI may be indicated by zero. When there are multiple configured grant configurations in the terminal and one of the configurations is activated as the corresponding DCI, the HARQ process number field in the corresponding DCI may indicate a configured grant configuration index, and all bits in the redundancy version field may be indicated by zero. The terminal may perform mapping of each repeated transmission of the activated configured grant PUSCH to the transmission beam and the transmission precoder according to a transmission beam mapping method in the second embodiment below, by using the multiple SRIs or TPMIs indicated by the single DCI.

[Method 2] Activation of Multi-DCI-Based Single Configure Grant Configuration

Method 2 corresponds to a method for indicating multiple SRIs or TPMIs to the terminal, based on the multi-DCI, and activating, in addition to the indication, a single configured grant configuration. The method for indicating the multiple SRIs or TPMIs, based on the multi-DCI, may follow the method in the (1-2)th embodiment, and when there is only one configured grant configuration in the terminal, all bits in an HARQ process number field and a redundancy version field in the corresponding multi-DCI may be indicated by zero. When there are multiple configured grant configurations in the terminal and one of the configurations is activated as the corresponding multi-DCI, all HARQ process number fields in the corresponding multi-DCI may indicate the same configured grant configuration index, and all bits in all redundancy version fields in the corresponding multi-DCI may be indicated by zero.

According to a condition of a DCI field during the multi-DCI-based repeated PUSCH transmission, NDI fields, in addition to the HARQ process number fields, may be the same value. The terminal may perform mapping of each repeated transmission of the activated configured grant PUSCH to the transmission beam and the transmission precoder according to a transmission beam mapping method below, by using the multiple SRIs or TPMIs indicated by the multi-DCI. For example, when transmission beam and transmission precoder-related information indicated by the first received DCI corresponds to SRI #1 and TPMI #1, transmission beam and transmission precoder-related information indicated by the second received DCI corresponds to SRI #2 and TPMI #2, and the transmission beam mapping scheme configured via the higher-layer signaling is cyclical, the terminal may apply SRI #1 and TPMI #1 for the odd-numbered (1, 3, 5, . . . ) transmission of the repeated transmission of the activated configured grant PUSCH, and may apply SRI #2 and TPMI #2 to the even-numbered (2, 4, 6, . . . ) of the repeated transmission, so as to perform the PUSCH transmission.

[Method 3] Activation of Multi-DCI-Based Multiple Configured Grant Configurations Method 3 corresponds to a method for indicating multiple SRIs or TPMIs to the terminal, based on the multi-DCI, and activating, in addition to the indication, multiple configured grant configurations. The method for indicating the multiple SRIs or TPMIs, based on the multi-DCI, may follow the method in the (1-2)th embodiment. When there are multiple configured grant configurations in the terminal, each configured grant configuration index may be indicated through an HARQ process number field in each DCI piece. In addition, all bits in all redundancy version fields in the corresponding multi-DCI may be indicated by zero.

According to a condition of a DCI field during the multi-DCI-based repeated PUSCH transmission, NDI fields, in addition to the HARQ process number fields, may be the same value. The terminal may receive MAC-CE signaling indicating (commanding) a connection between multiple configured grant configurations activated as the multi-DCI. The terminal may receive the multi-DCI from the base station after 3 ms once HARQ-ACK transmission for the MAC-CE signaling is performed, and when the configured grant configuration index indicated by each DCI piece is identical to the configured grant configuration indices having received the indication (the command) of the connection, via the MAC-CE signaling, repeated PUSCH transmission in consideration of the multi-TRP may be performed based on the corresponding indicated configured grant configurations.

In this case, the multiple configured grant configurations connected to each other may share the same value for some configurations. For example, repK corresponding to higher-layer signaling meaning the number of repeated transmissions, repK-RV corresponding to higher-layer signaling meaning the sequence of the redundancy version during the repeated transmission, and periodicity corresponding to higher-layer signaling meaning the periodicity of the repeated transmission may be configured to have the same value in the connected configured grant configuration.

(1-4)Th Embodiment: Method for Configuring SRS Resource Set for Repeated PUSCH Transmission in Consideration of Multi-TRP In the (1-4)th embodiment, as an embodiment of the disclosure, a method for configuring an SRS resource set for repeated PUSCH transmission in consideration of multi-TRP is described. An SRS power adjustment parameter (for example, alpha, p0, pathlossReferenceRS, srs-PowerControlAdjustmentStates, etc. which can be configured via higher-layer signaling) may vary for each SRS resource set, and thus, the number of SRS resource sets may be increased to be a value equal to or greater than two for the use of making different SRS power adjustments for TRPs during the repeated PUSCH transmission in consideration of the multi-TRP, and different SRS resource sets may be used for the purpose of supporting different TRPs. The SRS resource set configuration method considered in the embodiment is applicable to the (1-1)th to (1-3)th embodiments.

When performing repeated PUSCH transmission in consideration of the single DCI-based multi-TRP, multiple SRIs indicated by the single DCI may be selected from among SRS resources existing in different SRS resource sets. For example, when two SRIs are indicated by single DCI, the first SRI may be selected from SRS resource set #1, and the second SRI may be selected from SRS resource set #2.

When performing repeated PUSCH transmission in consideration of the multi-DCI-based multi-TRP, respective SRIs indicated by two DCI pieces may be selected from among SRS resources existing in different SRS resource sets, and the SRS resource sets may be explicitly or implicitly connected to (or may explicitly or implicitly correspond to) higher-layer signaling (for example, CORESETPoolIndex) meaning each TRP. As an explicit connection method, a CORESETPoolIndex value may be configured in an SRS resource set configuration configured via higher-layer signaling, and a semi-static connection state between a CORESET and an SRS resource set may be notified to the terminal.

In another example, as a more explicit connection method, a MAC-CE activating a connection between an SRS resource set and a specific CORESET (including both a case in which a CORESETPoolIndex value is configured with 0 or 1, and a case in which no CORESETPoolIndex value is configured) may be used. After 3 ms from a time point at which the terminal transmits HARQ-ACK for MAC-CE signaling activating a connection between an SRS resource set and a specific CORESET (including both a case in which a CORESETPoolIndex value is configured with 0 or 1, and a case in which no CORESETPoolIndex value is configured), the terminal may consider that the connection between the SRS resource set and the corresponding CORESET is activated.

As an implicit method, an implicit connection state is assumed by using a specific condition between an index of the SRS resource set and CORESETPoolIndex. For example, it is assumed that the terminal has received two configurations of SRS resource sets #0 and #1, the terminal may assume that CORESETs having no configured CORESETPoolIndex or having CORESETPoolIndex configured with 0 are connected to SRS resource set #0, and may assume that a CORESET having CORESETPoolIndex configured with 1 is connected to SRS resource set #1.

For the single or multi-DCI-based methods, the terminal, for which the connection between different SRS resource sets and respective TRPs is explicitly or implicitly configured or indicated, may expect that an srs-PowerControlAdjustmentStates value configured via higher-layer signaling in each SRS resource set is to be configured with sameAsFci2, or may not expect that the srs-PowerControlAdjustmentStates value is to be configured with separateClosedLoop. In addition, the terminal may expect that the same usage configured via higher-layer signaling is to be configured with a codebook or a non-codebook, for each SRS resource set.

(1-5)Th Embodiment: Dynamic Switching Method for Determining PUSCH Transmission in Consideration of Single TRP or PUSCH Transmission in Consideration of Multi-TRP, Based on Codebook In the (1-5)th embodiment, as an embodiment of the disclosure, a dynamic switching method for determining PUSCH transmission in consideration of a single TRP or PUSCH transmission in consideration of a multi-TRP, based on a codebook, is described.

According to the (1-1)th embodiment to the (1-4)th embodiment, the base station may receive UE capability reporting from the terminal which can perform codebook-based repeated PUSCH transmission in consideration of a single DCI-based multi-TRP, and may configure higher-layer signaling for performing repeated PUSCH transmission through the multi-TRP, for the terminal. In this case, as described in the (1-4)th embodiment, during the repeated PUSCH transmission in consideration of the single DCI-based multi-TRP, the base station may transmit single DCI including multiple SRI fields to the terminal to indicate SRS resources existing in different SRS resource sets.

The multiple SRI fields may be interpreted in the same method as each NR Release 15/16. More specifically, the first SRI field may select an SRS resource from the first SRS resource set, and the second SRI field may select an SRS resource from the second SRS resource set. Similar to the multiple SRI fields, in order to perform repeated PUSCH transmission in consideration of the multi-TRP, the base station may transmit single DCI including multiple TPMI fields to the terminal so that a TPMI corresponding to the SRS resource indicated by each SRI field is to be selected. In this case, multiple TPMI fields may be indicated via DCI identical to the DCI including the multiple SRI fields. The multiple TPMIs used during the PUSCH transmission to each TRP may be selected through the methods below:

[Method 1] Each TPMI field may be interpreted in the same method as NR Release 15/16. For example, the first TPMI field may indicate TPMI index and layer information for an SRS resource indicated by the first SRI field, and the second TPMI field may indicate TPMI index and layer information for an SRS resource indicated by the second SRI field.

[Method 2] In the same method as NR Release 15-/16, the first TPMI field may indicate TPMI index and layer information for an SRS resource indicated by the first SRI field. Unlike the first TPMI field, the second TPMI field selects a TPMI index for a layer identical to the layer indicated by the first TPMI field, and may not indicate layer information, and indicate TPMI index information for the SRS resource indicated by the second SRI field.

In a case of selecting multiple TPMIs through method 2, a bit length of the second TPMI field may be shorter than that of the first TPMI field. This is because the second TPMI field indicates one value (index) among TPMI index candidates identical to the layer indicated by the first TPMI field, and accordingly, may not indicate layer information.

The terminal may receive single DCI including multiple SRI fields and multiple TPMI fields, and support a dynamic switching method for determining repeated PUSCH transmission in consideration of the multi-TRP or repeated PUSCH transmission in consideration of single TRP, based on the received single DCI. The terminal may support dynamic switching by using a reserved value having no meaning, among values that the multiple TRMI fields or SRI fields may have, the multiple TRMI fields or SRI fields being included in the received DCI. For example, when a bit length of an SRI field is 2 bits, a total of four number of cases may be represented, and in this case, each representable case may be defined as a codepoint. In addition, if three of a total of four codepoints have a meaning for an SRI to be indicated and the remaining one codepoint has no meaning, the remaining codepoint may correspond to a codepoint indicating a reserved value (hereinafter, a codepoint indicating a reserved value may be represented as a codepoint configured as "reserved"). A more detailed description will be made below.

In order to describe a dynamic switching method, which can be supported through reserved values in multiple TPMI fields, with a detailed example, a case in which there are four PUSCH antenna ports is assumed. In addition, it is assumed that the first TPMI field is configured with 6 bits, a higher-layer parameter codebookSubset is configured with fullyAndPartialAndNonCoherent, and is indicated in the same method as NR Release 15/16. In this case, in the first TPMI field, indices 0 to 61 may be configured to indicate valid TPMI index and layer information, and indices 62 and 63 may be configured as reserved. If the second TPMI field includes TPMI index information remaining after excluding the layer information as described in method 2 above, the second TPMI field may indicate only a TPMI index in a case in which a layer for PUSCH transmission is limited to one value (for example, one of 1 to 4) according to the first TPMI field.

In this case, the number of bits of the second TPMI field may be configured with reference to a bit number which can represent a layer having the largest number of candidates among TPMI index candidates which can be configured for each layer. For example, according to an example in which layer 1 has 0 to 27 candidates, layer 2 has 0 to 21 candidates, layer 3 has 0 to 6 candidates, and layer 4 has 0 to 4 candidates, layer 1 has the largest number of candidates. Accordingly, the number of bits of the second TPMI field may be configured with 5 according to the number of TPMI index candidates of layer 1. According to a detailed description of the second TPMI field configuration, for example, when layer 1 and a TPMI index according to layer 1 are indicated by the second TPMI field, the terminal may interpret the second TPMI field as a codepoint indicating one value among TPMI indices 0 to 27 and a codepoint indicating a reserved value.

In another example, when layer 2 and a TPMI index according to layer 2 are indicated by the first TPMI field, the terminal may interpret the second TPMI field as a codepoint indicating one value among TPMI indices 0 to 21 and a codepoint indicating a reserved value. In addition, for example, when layer 3 or layer 4 and a TPMI index according to 3 layer or layer 4 are indicated by the first TPMI field, the terminal may also interpret the second TPMI field in the similar way to the description above. In this case, when there are two or more codepoints indicating reserve values in the second TPMI field, in addition to a codepoint indicating a TPMI index, two codepoints indicating the reserved values may be used to indicate dynamic switching.

That is, among codepoints of the second TPMI field configured with 5 bits, the second to last codepoint (i.e., the 31st codepoint in the example) corresponding to a codepoint indicating a reserved value may be used to indicate repeated PUSCH transmission to the first TRP in consideration of the single TRP, and the last codepoint (i.e., the 32nd codepoint in the example) may be used to indicate repeated PUSCH transmission to the second TRP in consideration of the single TRP. In this case, the layer information and the TPMI index information for repeated PUSCH transmission in consideration of the single TRP may be indicated to the terminal through the first TPMI field. The assumption made in the description above is for convenience of description, and the disclosure is not limited thereto.

For convenience of description, according to an example in which the detailed example above for two TRPs is generalized, the terminal may receive single DCI including two SRI fields and two TPMI fields and perform dynamic switching according to a codepoint indicated by the second TPMI field. If the codepoint of the second TPMI field indicates a TPMI index for a layer indicated by the first TPMI field, the terminal may perform repeated PUSCH transmission in consideration of a multi-TRP. If the second TPMI field indicates the second to last codepoint corresponding to a codepoint indicating a reserved value, the terminal may perform repeated PUSCH transmission in consideration of a single TRP for TRP 1, and may identify layer information and TPMI index for codebook-based PUSCH transmission from the first TPMI field. If the second TPMI field indicates the last codepoint corresponding to a codepoint indicating a reserved value, the terminal may perform repeated PUSCH transmission in consideration of a single TRP for TRP 2, and may identify layer information and TPMI index information for codebook-based PUSCH transmission from the first TPMI field.

In the example above, the last two reserved codepoints of the second TPMI field are used to indicate dynamic switching, but the embodiment is not limited thereto. In other words, dynamic switching may be indicated by using codepoints indicating two different reserved value of the second TPMI field, and repeated PUSCH transmission in consideration of the single TRP for TRP 1 or repeated PUSCH transmission in consideration of the single TRP for TRP 2 may be mapped to a codepoint indicating each reserved value and indicated.

In addition, in the example above, it is described that the second TPMI field is determined according to method 2, but even in a case where the second TPMI field is determined in the same way as NR Release 15/16, as described in method 1, dynamic switching may be supported by using a reserved codepoint of the TPMI in the same way as the example above.

For example, if the number of codepoints indicating the reserved values of the second TPMI field is less 2, the number of bits of the second TPMI fields may be increased by 1, and the second to last codepoint and the last codepoint with reference to the increased bit number may be used for supporting dynamic switching.

When two TPMI fields are determined according to method 1, a method for supporting the dynamic switching according to whether each TPMI field is indicated as a codepoint indicating a reserved value may be additionally considered. That is, when the first TPMI field is indicated as a codepoint indicating a reserved value, the terminal may perform repeated PUSCH transmission in consideration of a single TRP for TRP 2, and when the second TPMI field is indicated as a codepoint indicating a reserved value, the terminal may perform repeated PUSCH transmission in consideration of a single TRP for TRP 1. If both TPMI fields indicate codepoints for the TPMI, rather than the codepoints indicating the reserved values, the terminal may perform repeated PUSCH transmission in consideration of a multi-TRP. If there is no codepoint having a reserved value, the number of bits of the TPMI field may be increased by one, and the last codepoint with reference to the increased bit number may be used for supporting dynamic switching.

As another dynamic switching supporting method, two SRI fields may indicate dynamic switching, and two TPMI fields may indicate layer information and TPMI index information for repeated PUSCH transmission in consideration of a multi-TRP or a single TRP. If each SRI field has one or more codepoints indicating a reserved value, dynamic switching may be supported according to whether the corresponding SRI field indicates a codepoint indicating a reserved value. If the first SRI field indicates a codepoint indicating a reserved value and the second SRI field indicates an SRS resource of the second SRS resource set, the terminal may perform repeated PUSCH transmission in consideration of a single TRP for TRP 2. In this case, the terminal may identify layer information and TPMI index information from the first TPMI field to perform repeated PUSCH transmission in consideration of the single TRP for TRP2. If the second SRI field indicates a codepoint indicating a reserved value and the first SRI field indicates an SRS resource of the first SRS resource set, the terminal may perform repeated PUSCH transmission in consideration of the single TRP for TRP 1.

In this case, the terminal may identify layer information and TPMI index information from the first TPMI field to perform repeated PUSCH transmission in consideration of the single TRP for TRP 1. If two SRI fields have codepoints indicating SRS resources of each SRS resource set, rather than codepoints indicating reserved values, the terminal may perform repeated PUSCH transmission in consideration of the multi-TRP. In this case, in order to perform repeated PUSCH transmission for TRP 1, the terminal may identify layer information and TPMI index information from the first TPMI field, and identify TPMI index information from the second TPMI field to perform repeated PUSCH transmission for TRP 2. In this case, during the PUSCH transmission for TRP 1 and TRP 2, the same layer may be configured. If there is no codepoint indicating a reserved value in two SRI fields, the number of bits of each SRI field may be increased by 1, and the last codepoint among codepoints indicating reserved values with reference to the increased bit number may be used for supporting dynamic switching.

(1-6)Th Embodiment: Dynamic Switching Method for Determining PUSCH Transmission in Consideration of Single TRP or PUSCH Transmission in Consideration of Multi-TRP, Based on Non-Codebook In the (1-6)th embodiment, as an embodiment of the disclosure, a dynamic switching method for determining PUSCH transmission in consideration of a single TRP or PUSCH transmission in consideration of a multi-TRP, based on a non-codebook, is described.

According to the (1-1)th embodiment to the (1-4)th embodiment, the base station may receive UE capability reporting from the terminal which can perform non-codebook-based repeated PUSCH transmission in consideration of a single DCI-based multi-TRP, and may configure higher-layer signaling for performing repeated PUSCH transmission through the multi-TRP, for the terminal. In this case, as described in the (1-4)th embodiment, during the repeated PUSCH transmission in consideration of the single DCI-based multi-TRP, the base station may transmit single DCI including multiple SRI fields to the terminal to indicate SRS resources existing in different SRS resource sets. The multiple SRI fields may be selected through, for example, the methods below:

[Method 1] Each SRI field may be interpreted in the same method as NR Release 15/16. For example, the first SRI field may indicate a PUSCH transmission SRS resource in the first SRS resource set, and the second SRI field may indicate a PUSCH transmission SRS resource in the second SRS resource set.

[Method 2] In the same method as NR Release 15-/16, the first SRI field may indicate PUSCH transmission SRS resource(s) in the first SRS resource set. The second SRI field may indicate PUSCH transmission SRS resource(s) in the second SRS resource set for a layer identical to the layer indicated by the first SRI field.

In a case of selecting multiple SRIs through method 2, a bit length of the second SRI field may be shorter than that of the first SRI field. This is because the second SRI is determined from among SRI candidates for a layer identical to the layer determined as the first SRI field from among SRI candidates for all supported layers.

The terminal may receive single DCI including multiple SRIs, and support a dynamic switching method for determining repeated PUSCH transmission in consideration of the multi-TRP or repeated PUSCH transmission in consideration of single TRP, based on the received single DCI. The terminal may support dynamic switching by using codepoints indicating reserved values of multiple SRI fields included in the received DCI.

In order to describe a dynamic switching method, which can be supported through a codepoint indicating reserved values in multiple SRI fields, with a detailed example, a case in which there are maximum four PUSCH antenna ports and there are four SRS resources in each SRS resource set is assumed. In addition, it is assumed that the first SRI field is configured with 4 bits, and is indicated in the same method as NR Release 15/16. In this case, in the first TPMI field, indices 0 to 14 may be configured to indicate a PUSCH transmission SRS resource and a layer according to the selected SRS resource, and index 15 may be configured as a codepoint indicating a reserved value. If the second SRI field selects as many SRS resources as the number of layers indicated by the first SRI, as in method 2, the second SRI field may indicate an SRS resource selection candidate for a case in which a layer for PUSCH transmission is limited to one value (for example, one of 1 to 4) according to the first SRI field.

In this case, the number of bits of the second SRI field may be configured with reference to a layer having the largest number of candidates among the number of SRS resource selection candidates for each layer. For example, SRI field values indicating SRS resource selection candidates of layer 1 may correspond to 0 to 3 and a total of four candidates exists. SRI field values indicating SRS resource selection candidates of layer 2 may correspond to 4 to 9 and a total of six candidates exists. SRI field values indicating SRS resource selection candidates of layer 3 may correspond to 10 to 13 and a total of four candidates exists. An SRI field value indicating an SRS resource selection candidate of layer 4 may correspond to 14 and one candidate exists. In this case, layer 2 has the largest candidate value (six), and thus, the number of bits of the second SRI field may be configured with 3. According to a detailed description of the second SRI field configuration, for example, when the first SRI field indicates an SRI value in a case where a layer for PUSCH transmission is 1, the terminal may interpret the second SRI field as a codepoint indicating one value among SRI candidates 0 to 3 for layer 1 or a codepoint having other reserved values.

In another example, when the first SRI field indicates an SRI value in a case where a layer for PUSCH transmission is 2, the terminal may interpret the second SRI field as a codepoint indicating one value among SRI candidates 0 to 5 for layer 2 or a codepoint having other reserved values. In addition, for example, when the first SRI field indicates an SRI value in a case where a layer for PUSCH transmission is 3 or 4, the terminal may also interpret the second SRI field in the similar way to the description above. In this case, when there are two or more codepoints indicating reserved values in the second SRI field, in addition to a codepoint indicating an SRI index according to a layer, two codepoints indicating the reserved values may be used to indicate dynamic switching.

That is, among codepoints of the second SRI field configured with 3 bits, the second to last codepoint (i.e., the 7th codepoint in the example) corresponding to a codepoint indicating a reserved value may be used to indicate repeated PUSCH transmission to the first TRP in consideration of the single TRP, and the last codepoint (i.e., the 8th codepoint in the example) may be used to indicate repeated PUSCH transmission to the second TRP in consideration of the single TRP. In this case, the SRI for repeated PUSCH transmission in consideration of the single TRP may be indicated to the terminal through the first SRI field. The assumption made in the description above is for convenience of description, and the disclosure is not limited thereto.

For convenience of description, according to an example in which the detailed example above for two TRPs is generalized, the terminal may receive single DCI including two SRI fields and perform dynamic switching according to a codepoint indicated by the second SRI field. If the codepoint of the second SRI field indicates an SRI value for a layer indicated by the first SRI field, the terminal may perform repeated PUSCH transmission in consideration of a multi-TRP. If the second SRI field indicates the second to last codepoint corresponding to a codepoint indicating a reserved value, the terminal may perform repeated PUSCH transmission in consideration of a single TRP for TRP 1, and may identify an SRI for non-codebook-based PUSCH transmission from the first SRI field. If the second SRI field indicates the last codepoint corresponding to a codepoint indicating a reserved value, the terminal may perform repeated PUSCH transmission in consideration of a single TRP for TRP 2, and may identify an SRI for non-codebook-based PUSCH transmission from the first SRI field.

In the example above, the last two codepoints of the second SRI field, which indicate reserved values, are used to indicate dynamic switching, but the embodiment is not limited thereto. In other words, dynamic switching may be indicated by using codepoints indicating two different reserved values of the second SRI field, and repeated PUSCH transmission in consideration of the single TRP for TRP 1 or repeated PUSCH transmission in consideration of the single TRP for TRP 2 may be mapped to a codepoint indicating each reserved value and indicated.

In addition, in the example above, it is described that the second SRI field is determined according to method 2, but even in a case where the second SRI field is determined in the same way as NR Release 15/16, as described in method 1, dynamic switching may be supported by using a codepoint of an SRI field, which indicates a reserved value, in the same way as the example above.

For example, if the number of codepoints indicating the reserved values of the second SRI field is less than 2, the number of bits of the second SRI fields may be increased by 1, and the second to last codepoint and the last codepoint with reference to the increased bit number may be used for supporting dynamic switching.

When two SRI fields are determined according to method 1, a method for supporting the dynamic switching according to whether each SRI field is indicated as a codepoint indicating a reserved value may be additionally considered. That is, when the first SRI field is indicated as a codepoint indicating a reserved value, the terminal may perform repeated PUSCH transmission in consideration of a single TRP for TRP 2, and when the second SRI field is indicated as a codepoint indicating a reserved value, the terminal may perform repeated PUSCH transmission in consideration of a single TRP for TRP 1. If both SRI fields indicate codepoints for indicating the SRI, rather than the codepoints indicating the reserved values, the terminal may perform repeated PUSCH transmission in consideration of a multi-TRP. If there is no codepoint indicating a reserved value, the number of bits of the SRI field may be increased by 1, and the last codepoint with reference to the increased bit number may be used for supporting dynamic switching.

Figure 20A:
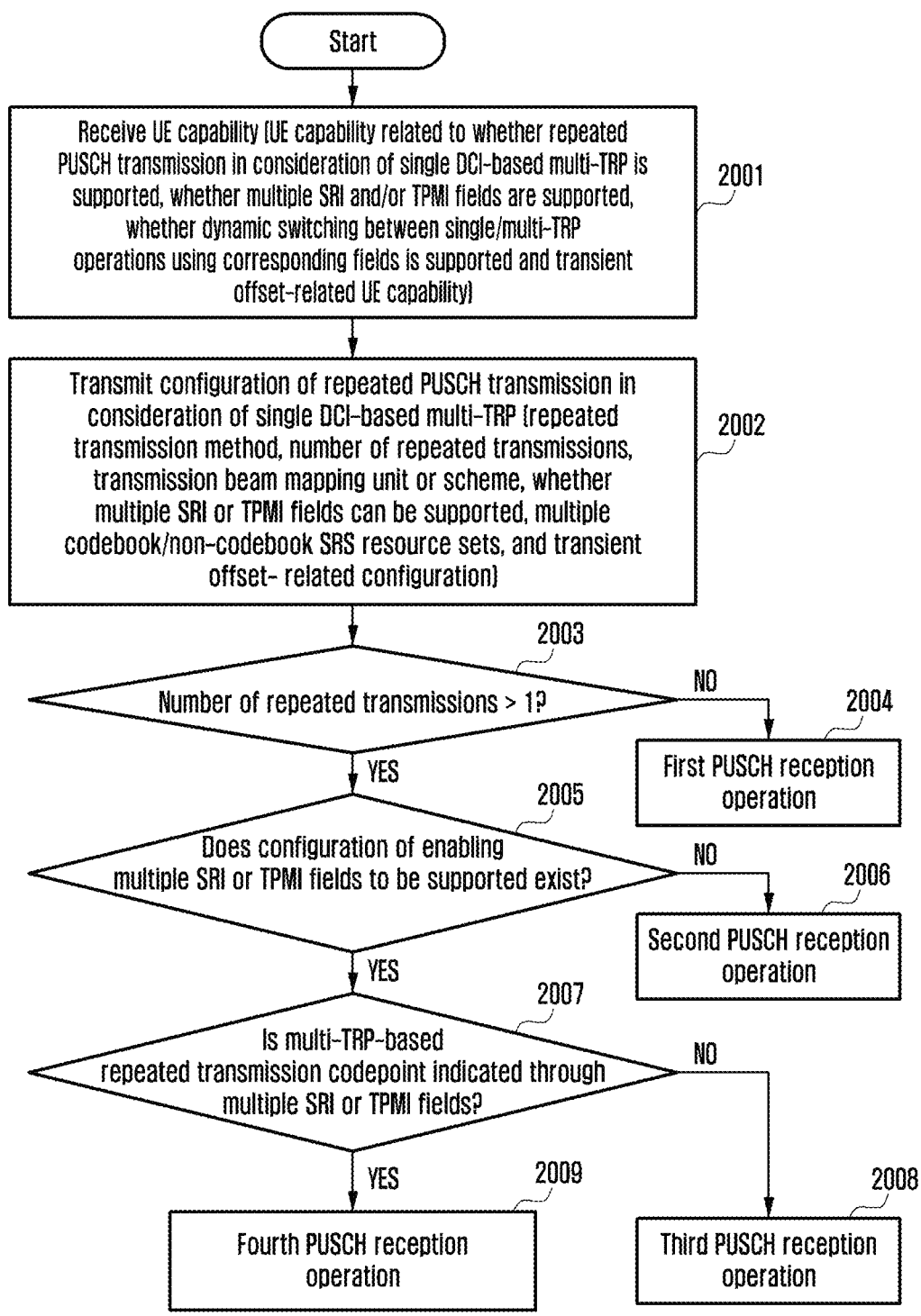
FIGS. 20A and 20B illustrate operations of a base station and a terminal for repeated PUSCH transmission in consideration of a multi-TRP based on transmission of single DCI in which multiple SRI or TPMI fields exist, according to an embodiment of the disclosure.
Figure 20B:
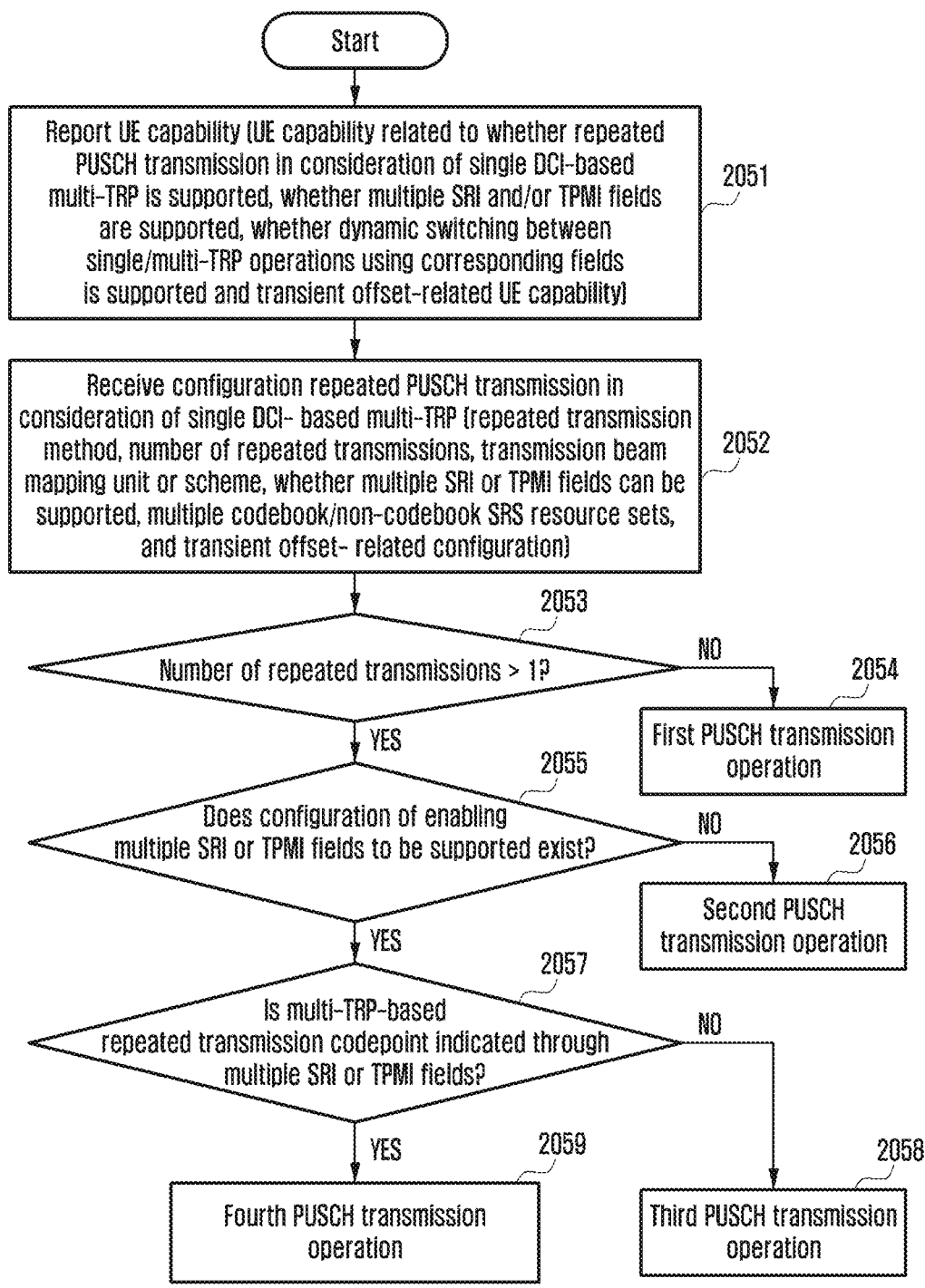

FIGS. 20A and 20B illustrate operations of a base station and a terminal for repeated PUSCH transmission in consideration of a multi-TRP based on transmission of single DCI in which multiple SRI or TPMI fields exist, according to an embodiment of the disclosure. The terminal performs UE capability reporting for information related to whether repeated PUSCH transmission in consideration of a single DCI-based multi-TRP is supported, whether the multiple SRI or TPMI fields are supported, whether dynamic switching between single/multiple TRPs by using the corresponding fields is supported, and a transient offset when transmission beam switching to be described in the second embodiment below is performed (operation 2051), and the base station having received the corresponding UE capability reporting (operation 2001) transmits a repeated PUSCH transmission configuration in consideration of the single DCI-based multi-TRP to the terminal (operation 2002).

In this case, the transmitted configuration information may include information on a repeated transmission method, the number of repeated transmissions, a transmission beam mapping unit or scheme, whether multiple SRI or TPMI fields are supported, multiple codebook or non-codebook SRS resource sets, a transient offset when the transmission beam switching to be described in the second embodiment below is performed, and the like. The terminal having received the corresponding configuration (operation 2052) may identify the number of repeated PUSCH transmissions, based on a time resource allocation field in the DCI or the configuration through higher-layer signaling.

In this case, when the number of repeated transmissions is not greater than 1 (operation 2003 or 2053), that is, when the repeated transmission is not performed, the terminal may perform a first PUSCH transmission operation (operation 2004 or 2054). The first PUSCH transmission operation may correspond to an operation of performing single transmission of a PUSCH to a single TRP by using one SRI field and one TPMI field in a case of codebook-based PUSCH transmission, and using one SRI field in a case of non-codebook-based PUSCH transmission, that is, using one transmission beam. When the number of repeated transmissions is greater than 1 (operation 2003 or 2053) and the terminal has not received a configuration of capable of supporting multiple SRI or TPMI fields from the base station (operation 2005 or 2055), the terminal may perform a second PUSCH transmission operation (operation 2006 or 2056). The second PUSCH transmission operation corresponds to an operation of performing repeated PUSCH transmission to a single TRP by using one SRI field and one TPMI field in the case of the codebook-based PUSCH transmission, and using one SRI field in the case of the non-codebook-based PUSCH transmission, that is, using one transmission beam.

When the terminal has received the configuration of capable of supporting the multiple SRI or TPMI fields from the base station (operation 2005 or 2055), and the multiple SRI or TPMI fields in the DCI received by the terminal indicate a codepoint meaning the single-TRP-based repeated transmission as described in the (1-5)th and (1-6)th embodiments above, rather than a codepoint meaning the multi-TRP-based repeated transmission (operation 2007 or 2057), the terminal may perform a third PUSCH transmission operation (2008 or 2058). The third PUSCH transmission operation corresponds to an operation in which the terminal performs the PUSCH repeated transmission to a specific single TRP through a codepoint indicating the single TRP transmission among codepoints in each field by using two SRI fields and two TRMI fields in the case of the codebook-based PUSCH transmission and using two SRI fields in the case of the non-codebook-based PUSCH transmission, that is, using one transmission beam.

Therefore, the repeated transmission to either TRP #1 or TRP #2 may be indicated depending on a codepoint indicated through the multiple SRI or TPMI fields. When the terminal has received the configuration of capable of supporting the multiple SRI or TPMI fields from the base station (operation 2005 or 2055), and the multiple SRI or TPMI fields in the DCI received by the terminal indicate the codepoint meaning the multi-TRP-based repeated transmission (operation 2007 or 2057), the terminal may perform a fourth PUSCH transmission operation (operation 2009 or 2059). The fourth PUSCH transmission operation corresponds to an operation in which the terminal performs the repeated PUSCH transmission to multiple TRPs through a codepoint indicating the multi-TRP transmission among codepoints in each field by using two SRI fields and two TRMI fields in the case of the codebook-based PUSCH transmission and using two SRI fields in the case of the non-codebook-based PUSCH transmission, that is, using two transmission beams.

Second Embodiment: Method for Defining Time Interval and Transmitting Uplink Signal in Consideration of UE Capability Reporting According to an embodiment of the disclosure, a terminal may define a time interval (for example, referred to as a transient period, a transient offset, a transient gap, etc.) which may be required between multiple uplink transmissions to perform UE capability reporting or receive a configuration from the base station, and by considering this, the terminal may apply, when perform uplink signal transmission, the corresponding time interval between the respective uplink transmissions. To transmit an uplink signal, the terminal may change at least one of an uplink beam, transmission power, and the frequency before transmitting the uplink signal.

In addition, to transmit the uplink signal, the terminal may change a panel before transmitting the uplink signal. Therefore, to transmit the uplink signal, the terminal may change at least one of the uplink beam, the transmission power, the frequency, and the panel before transmitting the uplink signal. For example, when multiple beams are classified into multiple beam groups, the panel may be configured to correspond to each beam group such as panel #1 in beam group #1, panel #2 in beam group #2, . . . , etc. In another example, when multiple antenna modules for forming a beam in the terminal exist and the multiple antenna modules are installed in different positions, the panel may be configured to correspond to each of the antenna modules. In addition, multiple panels may be configured in various schemes of classifying multiple beams having different beam widths, different beam directions, etc. Such a change for the uplink signal transmission may be performed in the following cases:

In one example Case 1, a case where an uplink signal (for example, a PUCCH, a PUSCH, an SRS, or the like) is repeatedly transmitted to multiple TRPs and a terminal changes an uplink beam, transmission power, or frequency to change and transmit TRPs between repeated transmissions, or the terminal changes a panel to change and transmit TRPs between repeated transmissions.

In one example Case 2, a case where a base station indicates uplink signal transmission via L1 signaling or MAC CE signaling including DCI and a terminal changes an uplink beam, transmission power, or frequency to transmit an uplink signal, or the terminal changes a panel to transmit the uplink signal.

In one example Case 3, a case where SRS transmission is indicated or configured, multiple SRS resources included in an SRS resource set are used, and an uplink beam, transmission power, or frequency is changed to use the multiple SRS resources, or a terminal changes a panel to perform SRS transmission.

In Case 1, a case of changing transmission information for a TRP change between repeated transmissions may be determined according to a mapping pattern between the repeated transmission and the TRP. Here, the repeated transmission means, for example, a case where the same uplink signal is transmitted. In the 3GPP Release 16 standard, two mapping patterns (for example, "sequential" and "cyclical") are supported when the base station performs repeated PUSCH transmission. A mapping pattern for repeatedly transmitting a PDSCH to multiple TRPs may be applied to a case where the terminal repeatedly transmits an uplink signal to multiple TRPs. "Sequential" mapping corresponds to, for example, a scheme of changing the TRPs into two repeated transmission units such as {TRP1, TRP1, TRP2, TRP2} and transmitting the same, and "cyclical" mapping corresponds to, for example, a scheme of changing the TRPs into {TRP1, TRP2, TRP1, TRP2} at each repeated transmission and transmitting the same.

When at least one of an uplink beam, transmission power, and transmission frequency (or a frequency hop) for transmitting an uplink signal to multiple TRPs, the terminal may apply uplink transmission change information determined according to the mapping scheme to transmit the uplink signal. Alternatively, when the panel for transmitting the uplink signal to multiple TRPs is determined, the terminal may apply uplink transmission change information determined according to the mapping scheme to transmit the uplink signal. In this case, the uplink transmission change information may mean at least one of an uplink beam, transmission power, and transmission frequency for transmitting the uplink signal.

Alternatively, the uplink transmission change information may mean a panel for transmitting the uplink signal. The case of repeatedly transmitting the PUSCH to multiple TRPs may include both a case where the PUSCH is repeatedly transmitted according to repeated PUSCH transmission type A and a case where the PUSCH is repeatedly transmitted according to repeated PUSCH transmission type B. For a repeated transmission unit, repeated PUSCH transmission type B may consider both a case of nominal repetition and a case of actual repetition.

In Case 2, the base station may configure a higher-layer parameter for uplink signal transmission for the terminal, and indicate transmission of an uplink signal (for example, a PUCCH, a PUSCH, an SRS, etc.) by the terminal, through L1 signaling (for example, DCI). In this case, a time interval between signaling of indicating the uplink signal transmission to the terminal by the base station and the uplink signal transmitted by the terminal may be defined as a "time offset," and this may be replaced with a "scheduling interval," a "scheduling offset," a "time interval," a "transient period," a "transient offset," a "transient time," etc.

When the base station indicates the uplink signal transmission to the terminal via L1 signaling including the DCI, the time offset may be calculated as an interval between "after the last symbol in which the PDCCH including the DCI is transmitted and before the first symbol in which the uplink signal (for example, a PUCCH including HARQ-ACK for an aperiodic/semi-persistent SRS, a PUSCH, or a PDSCH) is transmitted." When a DCI decoding time of the terminal is additionally considered, the time offset may be calculated as an interval between "after the last symbol in which the PDCCH including the DCI is transmitted and before the first symbol in which the uplink signal is transmitted." When the base station indicates the uplink signal transmission via MAC CE signaling, the time offset may be calculated according to the following methods:

In one example of Method 1, after the last symbol in which the PDSCH including the MAC CE signaling is transmitted ends and before the first symbol in which the uplink signal (for example, the aperiodic/semi-persistent SRS) is transmitted starts.

In one example of Method 2, after the last symbol in which the PUCCH/PUSCH including HARQ-ACK for the PDSCH including the MAC CE signaling is transmitted ends and before the first symbol in which the uplink is transmitted starts In one example of Method 3, after a MAC CE application delay time (for example, the first starting slot after 3 ms passes) passes from a time point where the last symbol in which the PUCCH/PUSCH including HARQ-ACK for the PDSCH including the MAC CE signaling is transmitted ends and before the first symbol in which the uplink signal is transmitted starts.

Such a time offset may be converted in units of absolute times (for example, ms) or in units of symbols. When the terminal receives an uplink signal transmission indication from the base station, the terminal may change at least one of the uplink beam, the transmission power, and the frequency for uplink transmission during the time offset. Alternatively, the terminal may change the panel for uplink transmission during the time offset.

In Case 3, when the terminal transmits the SRS scheduled by the base station, the terminal may change the uplink beam, the transmission power, and the frequency according to the higher-layer configuration of the SRS resource included in the SRS resource set to be transmitted, and transmit the same. Alternatively, the terminal may change the panel according to the higher-layer configuration of the SRS resource and transmit the SRS.

The terminal may need a transient time to change at least one of an uplink beam, transmission power, and frequency according to UE capability. Alternatively, the terminal may need a transient time to change a panel for uplink transmission according to UE capability. Such transient time may be considered when, for example, repeated transmission is performed in units of long sub-slots, or repeated transmission is performed in units of short sub-slots. The transient time according to UE capability may be applied to some or all of the uplink beam, transmission power, or frequency determined in transmission of an uplink signal, according to whether the transient time satisfies a time offset or an interval between repeated transmissions of the uplink signal.

As described above, a predetermined time may be needed to change the uplink beam, transmission power, or frequency, and to satisfy the predetermined time, the base station may indicate uplink signal transmission to the terminal so that an offset interval is added between repeated transmissions or the time offset is greater than the predetermined time for the change. Alternatively, the predetermined time may be also needed when performing additional panel changing for uplink transmission, and to satisfy the predetermined time, the base station may indicate uplink signal transmission to the terminal so that an offset interval is added between repeated transmissions or the time offset is greater than the predetermined time for the change.

Hereinafter, in the disclosure, an offset in the time domain for uplink transmission of the terminal may be understood as a meaning embracing the time offset or a time interval between repeated transmissions of the uplink signal.

In the disclosure, a detailed embodiment relating to a method for determining an offset in the time domain by the base station to secure a time required to change the uplink beam, transmission power, or frequency according to UE capability, and a method for transmitting an uplink signal indicated by the base station, by the terminal, will be made through the (2-1)th embodiment and the (2-2)th embodiment below. The division between the (2-1)th embodiment and the (2-2)th embodiment is for convenience of description, and each of the embodiments of the disclosure may be combined with at least one embodiment to be implemented.

(2-1)Th Embodiment: Method for Determining Offset According to UE Capability and Configuring Offset for Terminal, by Base Station As an example of a method for determining an offset in the time domain for uplink signal transmission, the terminal may report, to the base station, UE capability information including at least one of UE capability for performing an uplink beam change, UE capability for performing a transmission power change, UE capability for performing a frequency change in consideration of frequency hopping, etc. Alternatively, three UE capabilities above may be individually reported to the base station. In addition, the terminal may select one of the three UE capabilities and report the same. In addition, the terminal may report a representative value of UE capability for changing a transmission configuration of an uplink signal.

Additionally, when the terminal may transmit the uplink signal by using multiple panels, the UE capability for the panel change may be considered together in the stage of determining the UE capability to be reported. That is, the terminal may report, to the base station, UE capability information including at least one of UE capability for performing an uplink beam change, UE capability for performing a transmission power change, UE capability for performing a frequency change in consideration of frequency hopping, etc., and UE capability for performing a panel change. Alternatively, four UE capabilities above may be individually reported to the base station. In addition, the terminal may select one of the four UE capabilities and report the same. In addition, the terminal may report a representative value of UE capability for changing a transmission configuration of an uplink signal.

Hereinafter, the terms "UE capability," "UE capability information," and "terminal capability," which are interchangeably used in the disclosure, may be understood to have the same meaning.

As described above, the reason why the terminal reports the UE capability to the base station is to provide information required for the base station to determine an offset in a case where the terminal changes some or all of the uplink beam, transmission power, or frequency in transmitting the uplink signal. Additionally, when the terminal supports multiple panels and the panels are changed, the terminal may provide the base station with information required for the base station to determine an offset. The terminal may perform report the UE capability for each uplink beam change or power adjustment or frequency change by using one of the following methods. In addition, the UE capability for the panel change may also be reported by using one of the following methods.

In one embodiment, the terminal may report UE capability for an uplink transmission configuration change of NR Release 15/16. For example, to report the UE capability for the beam change, the terminal may configure, for example, "beamSwitchTiming" as one of {14, 28, 48} as described in NR Release 15/16, so as to report the UE capability to the base station. To report the UE capability for the panel change, the terminal may configure "beamSwitchTiming" as one of {224, 336} to report the UE capability to the base station. Here, a number indicating "beamSwitchTiming" may correspond to a symbol unit, and for example, when "beamSwitchTiming" is configure as "224" in the UE capability reporting for the panel change, it means that a beam switching processing time in the UE capability for the panel change means takes as much time as 224 symbols. In addition, the "beamSwitchTiming" may be configured for each subcarrier spacing.

In one embodiment, a time required for a change may be reported in units of symbols or absolute time periods (for example, ms).

In one embodiment, the base station and the terminal may pre-define a processing time allowing indication of a processing capability. A processing time for N processing capabilities may be pre-defined, and may vary according to a subcarrier spacing. [Table 41] and [Table 42] below indicate examples for processing time intervals pre-defined between the base station and the terminal for processing capability n and n+1 for changing of the uplink beam, transmission power, or frequency. Here, a value of a required time area may be configured so that, for example, {a1<a2<a3<a4} and {b1<a1, b2<a2, b3<a3} relationships are formed. The unit of the required time may be configured to be a symbol or ms.

TABLE 41

| Processing capability n | |
|---|---|
| μ | Required time |
| 0 | a1 |
| 1 | a2 |
| 2 | a3 |
| 3 | a4 |

TABLE 42

| Processing capability n + 1 | |
|---|---|
| μ | Required time |
| 0 | b1 |
| 1 | b2 |
| 2 | b3 |

When reporting a processing time for changing at least one of the uplink beam, transmission power, and frequency, as UE capability, the terminal may determine a value to be reported, in consideration of each uplink signal. For example, when the terminal report the processing time for the uplink beam change, as the UE capability, the terminal may classify UE capabilities into UE capability for a beam change for a PUCCH, UE capability for a beam change for a PUSCH, and UE capability for a beam change for an SRS, so as to report the UE capabilities. UE capabilities for the transmission power change and UE capabilities for the frequency change may be classified according to the PUCCH, the PUSCH, or the SRS and reported, in the same manner as described above.

When the terminal report the UE capability for the change of at least one of each uplink beam, transmission power, and frequency for the PUCCH, the terminal may determine the UE capability by considering the number of PUCCH resources, the number of pieces of configured spatial relation info, the number of pieces of activated spatial relation info, a frequency hopping configuration, etc. When the terminal reports the UE capability for the change of at least one of each uplink beam, transmission power, and frequency for the PUSCH, the terminal may determine the UE capability by considering a precoding method (for example, "codebook" or "non-codebook") of the PUSCH, the number of SRS resource sets associated with the PUSCH transmission, the number of SRS resources configured in the associated SRS resource set, a relationship between PUSCH and SRS antenna ports, a frequency hopping configuration, etc.

When the terminal reports the UE capability for the change of at least one of each uplink beam, transmission power, and frequency for the SRS, the terminal may determine the UE capability by considering an SRS transmission indication method (for example, DCI-based or MAC-CE based), SRS time axis information (for example, a periodic SRS, a semi-persistent SRS, or an aperiodic SRS), the usage of the SRS (for example, "beamMangement," "codebook," "non-codebook," or "antennaSwitching"), the number of SRS resource sets, the number of SRS resources, etc. Additionally, the terminal supporting multiple panels reports a processing time for the panel change, as UE capability, the terminal may determine a value to be reported, in consideration of the uplink signal. Alternatively, the terminal may determine and report the UE capability for the change of at least one of the uplink beam, transmission power, and frequency, without distinguishing UE capabilities for each uplink signal. In addition, the terminal may determine and report UE capability for the panel change without distinguishing UE capabilities for each uplink signal.

Additionally, the terminal may report UE capability for indicating whether the uplink beam, transmission power, and frequency can be simultaneously changed or sequentially changed. Here, the terminal supporting the multiple panels may report the UE capability for indicating whether the panels can also be simultaneously changed. That is, the terminal may report, as the UE capability, whether the uplink beam, the transmission power, the frequency, the panel, and the like can be simultaneously changed. As an example of UE capability, the terminal may select one of "simultaneous" and "sequential" and report the same to the base station. When the terminal reports the UE capability as "simultaneous," it means that the terminal may simultaneously change the uplink beam, the transmission power, and the frequency. It also means that the terminal supporting the multiple panels may simultaneously change the panel as well. When the terminal reports the UE capability as "sequential," it means that the terminal may sequentially change the uplink beam, the transmission power, and the frequency. It also means that the terminal supporting the multiple panels may sequentially change the panel as well.

The terminal may report, to the base station, UE capability "beamCorrespondenceWithoutUL-BeamSweeping" for informing whether beam correspondence requirements are satisfied, in addition to the UE capability reporting for supporting the change of uplink beam, the transmission power, the frequency, and the panel. The beam correspondence means capability of whether the terminal can select a beam for uplink transmission, based on downlink measurement, without depending on uplink beam sweeping. If the terminal reports that "beamCorrespondenceWithoutUL-BeamSweeping" corresponding to the UE capability for the beam correspondence is "supported," the terminal may select an uplink beam for uplink transmission without uplink beam sweeping, and transmit an uplink signal by using the selected uplink beam.

The base station may determine an offset for securing a required time to apply uplink transmission change information, based on the UE capability reported by the terminal. The base station may determine the offset in consideration of one or a combination of the options below.

In one example of Option 1, an offset may be determined with reference to the largest value for at least one of the UE capability for the uplink beam change, the UE capability for the transmission power change, and the UE capability for the frequency change, which are reported from the terminal.

In one example of Option 2, an offset may be determined with reference to the largest value among UE capabilities for the change required for actual uplink transmission, among the UE capabilities reported from the terminal. For example, when the base station indicates an uplink signal to the terminal so that only the uplink beam change and the transmission power change are to be performed, an offset may be determined with reference to the largest value among the UE capability for the uplink beam change and the UE capability for the transmission power change. In addition to the example above, an offset for the uplink transmission change combination may be also determined in the same manner as the example above.

In one example of Option 3, an offset may be determined with reference to the number of the UE capability for the uplink beam change, the UE capability for the transmission power change, and the UE capability for the frequency change, which are reported from the terminal.

In one example of Option 4, an offset may be determined with reference to the sum of the UE capabilities for the change required to perform actual uplink transmission, among UE capabilities reported from the terminal. For example, when the base station indicates an uplink signal to the terminal so that only the uplink beam change and the transmission power change are to be performed, an offset may be determined with reference to the sum of the UE capability for the uplink beam change and the UE capability for the transmission power change. In addition to the example above, an offset for the uplink transmission change combination may be also determined in the same manner as the example above.

In one example of Option 5, when determining an offset through one of options 1 to 4 above, the offset may be determined in consideration of the configuration of each uplink transmission signal. For example, when the base station determines an offset for repeatedly transmitting a PUCCH to multiple TRPs, according to option 1 above, the base station may determine the offset with reference to the UE capability reported by the terminal in consideration of the PUCCH configuration. Alternatively, when the terminal has not reported the UE capabilities without distinguishing the UE capabilities for each uplink signal, the base station may predict an additionally required time due to the PUCCH configuration, in addition to the UE capability, so as to determine an offset. This option may be applied when the base station determines an offset for transmitting another uplink signal (for example, a PUSCH or an SRS).

In one example of Option 6, when determining an offset through one of options 1 to 4 above, an offset may be determined without distinguishing configurations of each uplink transmission signal.

In one example of Option 7, the base station may determine an offset by using a predetermined value. In this case, a higher-layer parameter configuration, an uplink resource configuration, and the like of the uplink signal may be considered.

In one example of Option 8, when the terminal supports multiple panels and determines an offset through options 1 to 6 above, the terminal may determine the offset by additionally considering the UE capability for the panel change.

Each option corresponds to an example in a case where all UE capabilities for three pieces of uplink transmission change information above are reported, and when the terminal has reported only some of the UE capabilities, the base station may determine an offset by applying only the reported UE capabilities to each option.

For example, when terminal has reported that the uplink beam, the transmission power, and the frequency can be simultaneously changed, the base station may select option 1 or option 2 to determine an offset. Alternatively, when the terminal has reported that the uplink beam, the transmission power, and the frequency can be sequentially changed, the base station may select option 3 or option 4 to determine an offset. When the terminal supports multiple panels and has reported that the uplink beam, the transmission power, the frequency, and the panel (or two or more of the uplink beam, the transmission power, the frequency, and the panel) can be simultaneously changed, the base station may determine an offset by additionally considering, in addition to option 1, the UE capability for the panel change, according to option 8, or may determine an offset by additionally considering, in addition to option 2, the UE capability for the panel change, according to option 8. This corresponds to an example of the embodiment above, and the base station may determine an offset in consideration of one or a combination of options 1 to 8 above, according to the UE capabilities reported by the terminal.

The base station may adjust the offset value determined according to the above-described options, according to whether the beam correspondence reported by the terminal through the UE capability is supported. For example, when the terminal supports the beam correspondence, the base station may determine the offset value determined through the options above, as a final offset value, or may adjust the offset value to a smaller value. When the terminal does not support the beam correspondence, the base station may add an additionally required time to the offset value determined through the options.

The base station may adjust the offset value determined according to the options above, according to whether there is uplink beam reporting for uplink transmission to multiple TRPs by the terminal. When the uplink beam has been reported to the base station, it may mean that the corresponding uplink beam is a "known" beam for the terminal. When the uplink beam has not been reported, it may mean that the corresponding uplink beam is an "unknown" beam for the terminal. If the uplink beam to be used for the terminal to perform uplink transmission has been reported to the base station, the base station may determine the offset value determined through the options above, as a final offset value, or may adjust the offset value to a smaller value. When the uplink beam used for the terminal to perform uplink transmission has not been reported to the base station, the base station may add an additionally required time to the offset value determined through the options.

The base station may inform the terminal of the determined offset. In this case, the base station may explicitly or implicitly inform the terminal of the offset.

In one embodiment, a case where the base station explicitly configures the determined offset for the terminal: The base station may configure the offset as a new higher-layer parameter and explicitly inform the terminal of the same. For example, a new higher-layer parameter "timeDurationForULSwitch" may be added to PUSCH transmission configuration information such as PUCCH-FormatConfig or PUCCH-Config. For the PUSCH or the SRS, a new parameter for the offset may be also added to a higher-layer parameter for PUSCH transmission and a higher-layer parameter for SRS transmission in the similar way. The example above corresponds to a method for configuring a new higher-layer parameter for indicating the offset determined by the base station to the terminal, and may be defined as a higher-layer parameter having the same function in another name.

In one embodiment, a case where the base station implicitly configures the determined offset: The base station may implicitly indicate an offset through configuration(s) for transmitting another uplink signal, instead of directly configuring an offset with the higher-layer parameter as described above. For example, the offset may be implicitly indicated through "startingSymbolIndex" configured in PUCCH-format[a] (here, a refers to, for example, 0, 1, 2, 3, or 4) in the higher-layer parameter PUCCH-Resource. More specifically, as one of enhancing examples for indicating repeated transmission of a PUCCH in a slot, startingSymbolIndex in PUCCH-format[a] of PUCCH-Resource may be configured as many times as repeated times of the PUCCH in the slot. As a detailed example, when the repeated times in the slot is, for example, 2, startingSymbolIndex may indicate a transmission start symbol of the first repeated PUCCH transmission occasion in the slot, and a newly addable "startingSymbolIndex2" may indicate a transmission start symbol of the second repeated PUCCH transmission occasion in the slot.

In this case, the symbol position indicated by startingSymbolIndex may be in an earlier symbol position than the symbol position indicated by startingSymbolIndex2, and the spacing between two symbols may be determined by the base station so that the spacing is greater than nrofSymbols, the number of symbols for one PUCCH transmission, and the offset determined by the base station. The example above is merely an example, and the base station may implicitly inform the terminal of the offset through PUCCH resource configuration for PUCCH transmission, etc. Alternatively, when the base station performs scheduling the PUCCH including HARQ-ACK information of a PDSCH, for the terminal, the base station may indicate a PDSCH-to-HARQ_feedback timing indicator to the terminal so that a time offset is greater than the determined offset. Also, for an uplink signal (for example, a PUSCH or an SRS) other than the PUCCH, the base station may implicitly inform the terminal of the offset through a transmission timing indicated by DCI or higher-layer parameter configuration of the uplink signal.

(2-2)Th Embodiment: Method for Transmitting Uplink Signal Indicated from Base Station According to UE Capability When the terminal has received repeated transmission of an uplink signal from the base station, the terminal may determine an operation for repeated uplink transmission according to whether the offset determined by the base station has been explicitly configured or implicitly indicated. When the offset has been explicitly configured for the terminal by the base station, the terminal may configure an interval between repeated transmissions according to the offset in the time domain to transmit the uplink signal. When the offset has been implicitly indicated to the terminal, the terminal transmits the uplink signal according to the higher-layer parameter configuration for the uplink signal configured by the base station. When the offset is explicitly configured for the terminal by base station or the offset is implicitly indicated and the offset is applied to repeated transmission of the uplink signal, at least one of the uplink beam, the transmission power, and the frequency is changed and transmitted according to the capability of the terminal during the offset.

If the offset determined by the base station is configured to have a value equal or greater than the UE capability for changing the uplink beam, the transmission power, or the frequency, the terminal may change the uplink beam or the transmission beam to change TRPs between repeated transmissions and transmit, or may change the frequency for frequency hopping, etc. If the offset determined by the base station is configured to have a value smaller than the UE capability for changing the uplink beam, the transmission beam, or the frequency, the terminal may perform a default uplink transmission method pre-defined between the base station and the terminal, in consideration of one or a combination of the following operations in order to perform repeated transmission of the uplink signal.

In one example, for transmitting an uplink signal with the same uplink beam, transmission power, and frequency as those in the previous repeated transmission, the terminal cannot satisfy a time required to change the beam, the transmission power, or the frequency between repeated transmissions because the offset determined by the base station has a value smaller than the UE capability. Accordingly, the terminal may perform the next repeated transmission by using the same beam, transmission power, and frequency applied to the previous repeated transmission. Here, the previous repeated transmission means a repeated transmission occasion immediately before a repeated transmission occasion to be transmitted. In addition, it is possible to use at least one the uplink beam, the transmission power, and the frequency, which is identical to that in the previous (repeated) transmission, and to change the rest of the at least one the uplink beam, the transmission power, and the frequency. For example, it is also possible to use the same uplink beam and frequency as those of the previous (repeated) transmission, and change the transmission power in the next repeated transmission.

In one example, for transmitting an uplink signal with an uplink beam, transmission power, and frequency configured by default, the terminal cannot satisfy a time required to change the beam, the transmission power, or the frequency between repeated transmissions because the offset determined by the base station has a value smaller than the UE capability. Accordingly, the terminal may perform the next repeated transmission with the pre-defined default uplink beam, default transmission power, and default frequency. Here, the base station and the terminal may define default transmission information for each uplink signal (a PUCCH, a PUSCH, or an SRS). Alternatively, the base station and the terminal may mutually define default transmission information for the uplink signal. In addition, it is possible to use at least one of the uplink beam, the transmission power, and the frequency as a default configuration, and change the rest of the at least one of the uplink beam, the transmission power, and the frequency. For example, it is also possible use the uplink beam and the frequency as a default configuration and change the transmission power in the next repeated transmission.

In one example, for changing an uplink beam, transmission power, or frequency on condition and transmitting an uplink signal, when mapping between uplink repeated transmission and a TRP is configured as "sequential," the uplink beam, the transmission power, or the frequency may be changed in the repeated transmission occasion satisfying the UE capability, and transmitted. The terminal may transmit the uplink signal with the same configuration as that of the previous repeated transmission occasion in the repeated transmission occasion which cannot satisfy the UE capability. For example, when the mapping is configured as {TRP1, TRP1, TRP2, TRP2}, the first two repeated transmission occasions are transmitted by using the uplink beam, the transmission power, and the frequency for TRP1. The third repeated transmission occasion requires the change to the uplink beam, transmission power, and frequency for TRP2, so as to be transmitted, but the offset has a value smaller than the UE capability, and thus, the uplink signal is transmitted by using the TRP1 configuration without the change of the uplink transmission information. The terminal may transmit the fourth repeated transmission occasion by performing a change to the uplink beam, transmission power, and frequency for TRP2.

In one example, for transmitting repeated uplink transmission by applying a changeable configuration among an uplink beam, transmission power, and frequency, when the terminal compares the size of the offset configured by the base station with that of the UE capability, the terminal may apply some changeable configurations, in which the offset has a value smaller than the UE capability among UE capabilities, to the next repeated transmission occasion. For example, when the offset has a value greater than the UE capability for the uplink beam change and has a value smaller than the UE capability for the transmission power change or the frequency change, the terminal may only change the uplink beam and apply the same transmission power and frequency as those in the previous repeated transmission to transmit the next repeated transmission occasion. When the terminal sequentially changes the uplink beam, the transmission beam, and the frequency, the terminal compares the offset determined by the base station with the sum of a combination of UE capabilities for the change of the uplink beam, the transmission power, and the frequency. In this case, when a value of a combination of multiple UE capabilities is smaller than the offset, determination is made according to priorities for the change of the uplink beam, the transmission power, or the frequency, predetermined between the base station and the terminal. For example, when the offset determined by the base station has a value smaller than the sum of all UE capabilities, the sum of UE capabilities for the uplink beam and transmission power change, the sum of UE capabilities for the uplink beam and frequency change, and the sum of UE capabilities for the transmission power and frequency change and the priorities are predetermined between the base station and the terminal as, for example, {uplink beam>transmission power>frequency}, the terminal may transmit the uplink signal by changing the uplink beam and the transmission power.

In one example, for transmitting an uplink signal by dropping some symbols or repeated transmission occasions, in order to apply uplink transmission change information and perform repeated transmission of the uplink signal, the terminal may drop some symbols in the front part of the repeated transmission occasion in which at least one of the beam, the transmission power, and the frequency is changed and may perform repeated transmission by using the remaining resources. For example, when the mapping between the repeated PUCCH transmission and the TRP is configured as {TRP1, TRP1, TRP2, TRP2}, the PUCCH is not transmitted during some symbols in the front part until a time required to change the uplink beam, the transmission power, and the frequency for TRP2, in the third repeated transmission. The terminal may perform the third repeated PUCCH transmission for the remaining symbols after the time required to change the uplink beam, the transmission power, and the frequency is satisfied.

In another example, for repeated transmission in which a TRP is changed, when the time required to change the uplink beam, the transmission power, or the frequency has failed to be satisfied, the terminal may drop the corresponding repeated uplink transmission occasion. For example, the mapping between the repeated PUCCH transmission and the TRP is configured as {TRP1, TRP1, TRP2, TRP2}, the terminal may drop the third repeated PUCCH transmission occasion. Thereafter, the fourth repeated PUCCH transmission occasion may be transmitted after the change to the uplink beam, the transmission beam, and the frequency for TRP2. In another example, when the mapping between the repeated PUCCH transmission and the TRP is configured as {TRP1, TRP2, TRP1, TRP2}, the terminal may drop the second and fourth repeated PUCCH transmission occasions and transmit single TRP-based repeated PUCCH transmission.

When repeated PUCCH transmission is performed in consideration of a channel state of each TRP through the methods provided in the embodiments of the disclosure, coverage expansion of an uplink control signal can be expected. In addition, since transmission power is configured for each transmission or reception point, efficient battery management of the terminal can be expected.

This may be applied in the same manner to the relationship between the sizes of the time offset and the UE capability for the uplink signal transmission. If a time offset has a value greater than UE capability for changing the uplink beam, the transmission power, or the frequency, the terminal may transmit the uplink signal. When the time offset has a value smaller than UE capability for changing the uplink beam, the transmission power, or the frequency, the terminal may transmit the uplink signal in consideration of one or a combination of the operations below in the similar way to the case where the offset between the repeated transmissions fails to satisfy the UE capability:

Transmitting an uplink signal with the same uplink beam, transmission power, and frequency as those in the previous uplink signal transmission;

Transmitting an uplink signal with an uplink beam, transmission power, and frequency configured by default;

Applying a changeable configuration among an uplink beam, transmission power, and frequency and transmitting repeated uplink signal transmission; and Dropping some symbols of the first repeated transmission occasion or the first repeated transmission occasion and transmitting an uplink signal.

The operations according to the condition describe a method in which the terminal supporting a single panel changes the uplink beam, the transmission power, or the frequency. If the terminal can support multiple panels, the terminal identifies whether the offset determined by the base station is configured to have a value smaller than the UE capability for the change of the uplink beam, the transmission power, the frequency, or the panel. When the offset determined by the base station has a value greater than the UE capability for the change of the uplink beam, the transmission power, the frequency, or the panel, the terminal may transmit the uplink signal. When the offset is configured to have a value smaller than the UE capability for the change of the uplink beam, the transmission power, the frequency, or the panel, the terminal may transmit the uplink signal according to one or a combination of the operations below by additionally considering the UE capability for the change of the panel, in the similar way to the case where the offset between the repeated transmissions fails to satisfy the UE capability:

Transmitting an uplink signal with the same uplink beam, transmission power, frequency, and panel as those in the previous uplink signal transmission;

Transmitting an uplink signal with an uplink beam, transmission power, frequency, and a panel configured by default;

Applying a changeable configuration among an uplink beam, transmission power, frequency, and panel and transmitting repeated uplink signal transmission; and Dropping some symbols of the first repeated transmission occasion or the first repeated transmission occasion and transmitting an uplink signal.

Here, the previous uplink signal means the recently transmitted physical channel identical to an uplink signal (a PUCCH, a PUSCH, or an SRS) to be transmitted. The base station and the terminal may define default transmission information for each uplink signal (a PUCCH, a PUSCH, or an SRS). Alternatively, the base station and the terminal may mutually define default transmission information for the uplink signal.

Third Embodiment: Aperiodic CSI Report Multiplexing Method During Repeated PUSCH Transmission in Consideration of Multi-TRP According to an embodiment of the disclosure, when the terminal receives a configuration of multi-TRP-based repeated PUSCH transmission type A or B and receives scheduling of transport block transmission, various methods for multiplexing aperiodic CSI reporting to a specific PUSCH repetition(s) may be considered. The PUSCH repetition to be considered below may correspond to nominal repetition or actual repetition. In addition, in a case where the terminal determines the PUSCH repetition to which the aperiodic CSI reporting is to be multiplexed, when the corresponding PUSCH repetition has the length of one OFDM symbol, the PUSCH repetition may be excluded. The terminal may report, as UE capability, whether a function of multiplexing the aperiodic CSI reporting to multiple PUSCH repetitions is supported.

[Method 1-1] According to a disclosure, the terminal may perform multiplexing of the aperiodic CSI reporting only to the first PUSCH repetition among all PUSCH repetitions.

[Method 1-2] According to a disclosure, the terminal may perform multiplexing of the aperiodic CSI reporting to two PUSCH repetitions among all PUSCH repetitions. In this case, the terminal may determine, as the first PUSCH repetition among two PUSCH repetition to which the aperiodic CSI reporting is multiplexed, the first PUSCH repetition to which the first transmission beam is applied. In addition, the terminal may determine the second PUSCH repetition among two PUSCH repetitions to which the aperiodic CSI reporting is multiplexed, according to detailed methods below. According to a disclosure, the aperiodic CSI reporting having the same information may be multiplexed to each PUSCH repetition. In other words, CSI part 1 or CSI part 2 having the same information may be multiplexed.

[Method 1-2-1] In continuation of method 1-2 above, the terminal may determine, as the second PUSCH repetition, the first PUSCH repetition to which the second transmission beam is applied. In this case, the terminal may perform multiplexing of the aperiodic CSI reporting to two PUSCH repetitions, regardless of whether two determined PUSCH repetitions have the same OFDM symbol length or different OFDM symbol lengths. In such case, when two PUSCH repetitions have different OFDM symbol lengths, soft combining is impossible in the base station, and only selection diversity may be acquired by decoding each of two PUSCH repetitions.

[Method 1-2-2] In continuation of method 1-2 above, the terminal may restrict that the OFDM symbol length of the first PUSCH repetition to which the second transmission beam is applied is identical to that of the first PUSCH repetition which is determined in method 1-2 above so that the aperiodic CSI reporting is to be multiplexed thereto. For example, the terminal may adjust a transient period so that two PUSCH repetitions determined for multiplexing of the aperiodic CSI reporting have the same length during beam switching between two transmission beams. That is, the terminal may increase the length of the transient period existing between the nominal repetitions in which transmission beam switching is performed, so that the OFDM symbol lengths between the first actual repetitions of the respective transmission beams are identical to each other.

For example, when there is no OFDM symbol position configured as an invalid symbol, the transmission beam mapping method of the multi-TRP-based PUSCH repetition is sequential, the OFDM symbol length of the nominal repetition of repeated PUSCH transmission type A is six, and the number of repeated transmissions is four, the first nominal repetition may be mapped to the first transmission beam and transmitted in OFDM symbols 1 to 6 of slot 1, and the second nominal repetition may be mapped to the first transmission beam and transmitted in OFDM symbols 7 to 12 of slot 1. The third nominal repetition corresponds to the first nominal repetition after the beam switching from the first transmission beam to the second transmission beam, and thus, a transient period may exist between the second and third nominal repetitions. When the length of the transient period requires one OFDM symbol length, the third nominal repetition may be transmitted in OFDM symbol 14 of slot 1 to OFDM symbol 5 of slot 2, and may be separated into two actual repetitions at the slot boundary. The first actual repetition of the third nominal repetition may be transmitted in OFDM symbol 14 of slot 1, and the second actual repetition may be transmitted in OFDM symbols 1 to 5 of slot 2.

In this case, the OFDM symbol length of the first actual repetition to which the first transmission beam is applied may be different from that of the second actual repetition to which the second transmission beam is applied. To make the OFDM symbol lengths identical, a transmission period corresponding to one OFDM symbol may be added between the second and third nominal repetitions. In this case, the third nominal repetition may be mapped to the second transmission beam and transmitted in OFDM symbols 1 to 6 of slot 2, and the aperiodic CSI reporting may be multiplexed to the first actual repetition of each transmission beam and transmitted.

According to a disclosure, when the OFDM symbol length of the first PUSCH repetition to which the second transmission beam is applied is different from that of the first PUSCH repetition, the aperiodic CSI reporting may be multiplexed only to one of two PUSCH repetitions. In this case, the one PUSCH to which the aperiodic CSI reporting is multiplexed may be pre-defined. That is, the aperiodic CSI reporting may be multiplexed to the first PUSCH repetition or the second PUSCH repetition. Alternatively, the aperiodic CSI reporting may be multiplexed to a shorter or longer PUSCH repetition among two PUSCH repetitions. Alternatively, the aperiodic CSI reporting may be multiplexed to a PUSCH repetition having a large or small amount of resources, among two PUSCH repetitions.

[Method 1-2-3] In continuation of method 1-2, when the OFDM symbol length of the first PUSCH repetition to which the second transmission beam is applied is not identical to that of the first PUSCH repetition which is determined in method 1-2 above so that the aperiodic CSI reporting is to be multiplexed thereto, the terminal may compare the amount of resources between two PUSCH repetitions to determine a rate matching scheme according to a PUSCH repetition to which a smaller amount of resources are allocated, and perform multiplexing of the aperiodic CSI reporting to two PUSCH repetitions.

According to an embodiment, referring to [Table 40] above, $Q_{CSI\text{-}part1}'$ and $Q_{CSI\text{-}part2}'$ of the first and second PUSCH repetitions may be calculated, respectively, and the aperiodic CSI reporting may be multiplexed to two PUSCH repetitions by using $Q_{CSI\text{-}part1}'$ and $Q_{CSI\text{-}part2}'$ having small values.

According to another embodiment, at least one of values of $M_{sc,nominal}^{UCI}(l)$, $N_{symb,nominal}^{PUSCH}$, $M_{sc,nominal}^{UCI}(l)$, and $N_{symb,actual}^{PUSCH}$ used in the equation in [Table 40] above may be applied in the same way to a multiplexing operation of two PUSCH repetitions. In other words, $M_{sc,nominal}^{UCI}(l)$, $N_{symb,nominal}^{PUSCH}$, $M_{sc,nominal}^{UCI}(l)$, and $N_{symb,actual}^{PUSCH}$ having small values, among $M_{sc,nominal}^{UCI}(l)$, $N_{symb,nominal}^{PUSCH}$, $M_{sc,nominal}^{UCI}(l)$, and $N_{symb,acutal}^{PUSCH}$ corresponding to each of two PUSCH repetitions may be used to calculate $Q_{CSI\text{-}part1}'$ and $Q_{CSI\text{-}part2}'$ for rate matching of two PUSCH repetitions.

In the embodiments above, the aperiodic CSI reporting may be multiplexed by calculating only one of two values of $Q_{CSI\text{-}part1}'$ and $Q_{CSI\text{-}part2}'$.

[Method 1-2-4] In continuation of method 1-2, the terminal may determine, as a PUSCH repetition to which the aperiodic CSI reporting is to be multiplexed, the Xth PUSCH repetition having the same length as that of the first PUSCH repetition which is determined in method 1-2 above so that the aperiodic CSI reporting is to be multiplexed thereto, among the PUSCH repetitions to which the second transmission beam is applied. In this case, when there is a case where several PUSCH repetitions have the same length, the terminal may determine, as the PUSCH repetition to which the aperiodic CSI reporting is to be multiplexed, the Xth PUSCH repetition in the earliest order, that is, having the smallest number. When there is no such case (that is, when there is no PUSCH repetition having the same length as that of the first PUSCH repetition among PUSCH repetitions to which the second transmission beam is applied), the terminal may determine the second PUSCH repetition to which the aperiodic CSI reporting is to be multiplexed, in consideration of one of methods 1-1, 1-2-1, 1-2-2, and 1-2-3 above.

[Method 1-3] According to a disclosure, when determining the PUSCH repetition to which the aperiodic CSI reporting is to be multiplexed, the terminal may determine, as the PUSCH repetition, the Xth PUSCH repetition having the same OFDM symbol length for each transmission beam. For example, when there are four PUSCH repetitions per transmission beam for each of two transmission beams and the second PUSCH repetition to which the first and second transmission beams are applied have the same OFDM symbol length, the terminal may multiplex the aperiodic CSI reporting to the corresponding PUSCH repetitions. Here, when there is a case where several pairs of PUSCH repetitions having the same length exist, the terminal may determine, as the PUSCH repetition to which the aperiodic CSI reporting is to be multiplexed, the Xth PUSCH repetition pair in the earliest order, that is, having the smallest number. When there is no such case, that is, when the PUSCH repetitions in the same order in two transmission beams have different OFDM symbol lengths, the terminal may determine two PUSCH repetitions to which the aperiodic CSI reporting is to be multiplexed, in consideration of one of methods 1-1, 1-2-1, 1-2-2, and 1-2-3 above.

In methods 1-1 to 1-3 above, for convenience of description, descriptions are made in consideration of two transmission beams only, but the methods may also be generalized into and considered for repeated transmission in consideration of N (>2) or more transmission beams, i.e., N (>2) or more TRPs. In addition, in methods 1-1 to 1-3 above, in determining, by the terminal, a PUSCH repetition to which the aperiodic CSI reporting is to be multiplexed, descriptions are made, for convenience of description, only in consideration of whether PUSCH repetitions have the same number of or different number of OFDM symbols, but the descriptions are made by assuming the same frequency resource allocation between the PUSCH repetitions, and thus, methods 1-1 to 1-3 may be generalized into and considered for not only whether the PUSCH repetitions have the same OFDM symbol number but also whether the PUSCH repetitions have the same resource allocation value. That is, generalization into whether the PUSCH repetitions have the same RE number determined in consideration of both the time and frequency resource allocations is possible.

Figure 21:
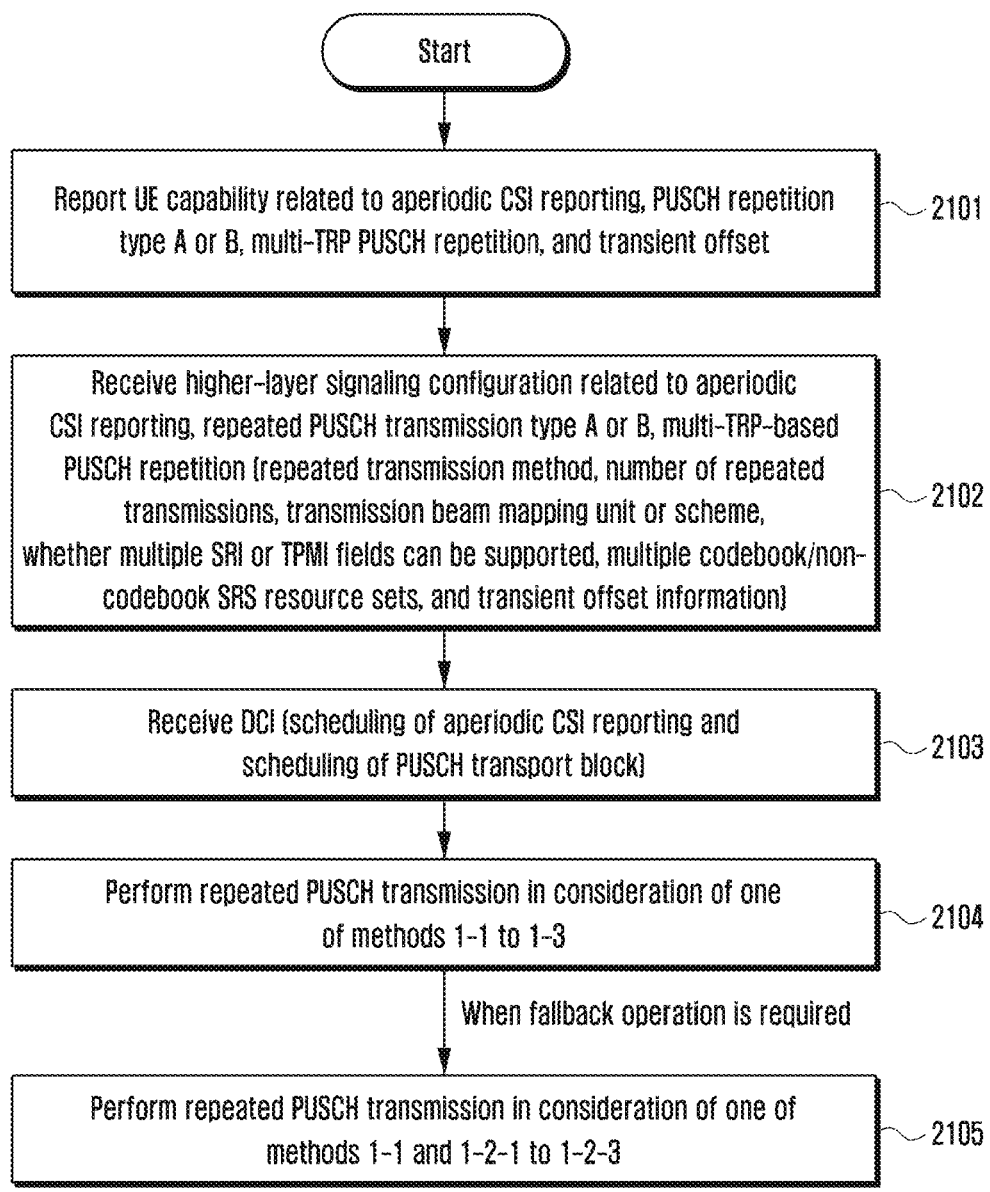
FIG. 21 illustrates an operation of a terminal in consideration of the third embodiment of the disclosure.

FIG. 21 illustrates an operation of a terminal in consideration of the third embodiment of the disclosure. In FIG. 21, the terminal may report UE capability information to a base station (operation 2101). In this case, transmittable information may include aperiodic CSI reporting-related information, PUSCH repetition type A or B-related information, whether multi-TRP-based PUSCH repetition is supported, and transient offset-related information when the transmission beam switching in the second embodiment is performed.

Thereafter, the terminal may receive higher-layer signaling configuration information from the base station (operation 2102). In this case, receivable information may include aperiodic CSI reporting-related information, repeated PUSCH transmission type A or B-related information, multi-TRP-based PUSCH repetition-related information (a repeated transmission method, the number of repeated transmissions, a transmission beam mapping unit or scheme, whether multiple SRI or TPMI fields can be supported, multiple codebook/non-codebook SRS resource sets, etc.).

Thereafter, the terminal may receive DCI for scheduling aperiodic CSI reporting and repeated transmission of a PUSCH including a transport block (operation 2103), and perform a repeated PUSCH transmission in consideration of one of methods 1-1 to 1-3 in determining the repeated PUSCH transmission to which the aperiodic CSI reporting is to be multiplexed (operation 2104). When the terminal considers methods 1-2-4 and 1-3 and a fallback operation is required as described above (for example, when method 1-2-4 is considered and there is no PUSCH repetition having the same length as that of the first PUSCH repetition among PUSCH repetitions to which the second transmission beam is applied), the terminal may perform the repeated PUSCH transmission in consideration of one of methods 1-1 and 1-2-1 to 1-2-3 (operation 2105).

Figure 22:
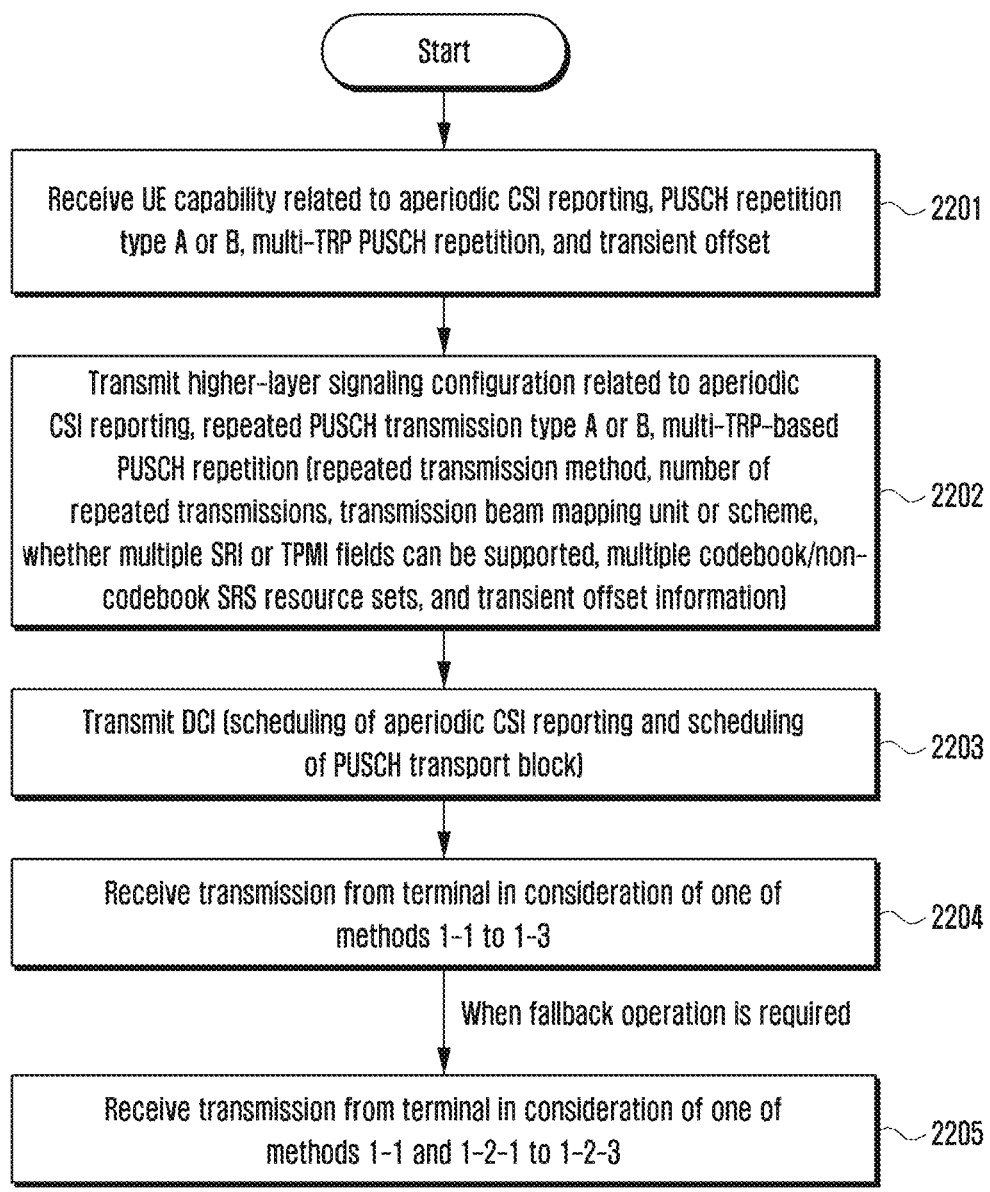
FIG. 22 illustrates an operation of a base station in consideration of the third embodiment of the disclosure.

FIG. 22 illustrates an operation of a base station in consideration of the third embodiment of the disclosure. In FIG. 22, the base station may receive UE capability reporting from a terminal (operation 2201). In this case, receivable information may include aperiodic CSI reporting-related information, PUSCH repetition type A or B-related information, multi-TRP-based PUSCH repetition-related information, and transient offset-related information when the transmission beam switching in the second embodiment is performed. Thereafter, the base station may transmit higher-layer signaling configuration information to the terminal (operation 2202).

In this case, transmittable information may include aperiodic CSI reporting-related information, repeated PUSCH transmission type A or B-related information, multi-TRP-based PUSCH repetition-related information (a repeated transmission method, the number of repeated transmissions, a transmission beam mapping unit or scheme, whether multiple SRI or TPMI fields can be supported, multiple codebook/non-codebook SRS resource sets, etc.). Thereafter, the base station may transmit DCI for scheduling aperiodic CSI reporting and repeated transmission of a PUSCH including a transport block (operation 2203), and receive a repeated PUSCH transmission by assuming that one of methods 1-1 to 1-3 is considered while the terminal determines the repeated PUSCH transmission to which the aperiodic CSI reporting is to be multiplexed (operation 2204). When the terminal considers methods 1-2-4 and 1-3 and a fallback operation is required as described above (for example, when method 1-2-4 is considered and there is no PUSCH repetition having the same length as that of the first PUSCH repetition among PUSCH repetitions to which the second transmission beam is applied), the base station may receive the repeated PUSCH transmission by assuming that the terminal considers one of methods 1-1 and 1-2-1 to 1-2-3 (operation 2205).

(3-1)Th Embodiment: Method for Multiplexing Aperiodic CSI Reporting According to Higher-Layer Signaling During PUSCH Transmission in Consideration of Multi-TRP According to an embodiment of the disclosure, when the terminal receives a configuration of a multi-TRP-based repeated PUSCH transmission type A or B and receives scheduling of transport block transmission, various methods for multiplexing the aperiodic CSI reporting to a specific PUSCH repetition(s) may be considered. The PUSCH repetition to be considered below may correspond to nominal repetition or actual repetition. In addition, in a case where the terminal determines the PUSCH repetition to which the aperiodic CSI reporting is to be multiplexed, when the corresponding PUSCH repetition has the length of one OFDM symbol, the PUSCH repetition may be excluded. The terminal may report, as UE capability, whether a function of multiplexing the aperiodic CSI reporting to multiple PUSCH repetitions is supported.

[Method 1-4] According to a disclosure, the terminal may multiplex the aperiodic CSI reporting to two PUSCH repetitions among all PUSCH repetitions. In this case, the terminal may determine, as the first PUSCH repetition to which the first transmission beam is applied, the first PUSCH repetition among two PUSCH repetitions to which the aperiodic CSI reporting is to be multiplexed. In addition, when the terminal determines the Xth PUSCH repetition to which the second transmission beam is applicable, the base station may configure Y corresponding to the number of candidates of X, via higher-layer signaling. In a case of PUSCH repetition type A, when the number of repetitions indicated to the terminal via DCI is N, Y may be a natural number equal to or greater than 1 and equal to or smaller than N.

In a case of PUSCH repetition type B, when the number of nominal repetitions indicated to the terminal via DCI is N and the number of actual repetitions is M, Y may be a natural number equal to or greater than 1 and equal to or smaller than M. In addition, for the second PUSCH repetition among two PUSCH repetitions to which the aperiodic CSI reporting is to be multiplexed, the terminal may determine detailed methods below by using a Y value configured via higher-layer signaling. According to a disclosure, the aperiodic CSI reporting having the same information may be multiplexed to each PUSCH repetition. In other words, CSI part 1 and CSI part 2 having the same information may be multiplexed.

[Method 1-4-1] In continuation of method 1-4 above, the terminal may determine the second PUSCH repetition as the first PUSCH repetition to which the second transmission beam is applied. In this case, the terminal may multiplex the aperiodic CSI reporting to two PUSCH repetitions, regardless of the fact that the determined two PUSCH repetitions have the same OFDM symbol length and different OFDM symbol lengths. In such case, when two PUSCH repetitions have different OFDM symbol lengths, soft combining is impossible in the base station, and only selection diversity may be acquired by decoding each of two PUSCH repetitions.

[Method 1-4-2] In continuation of method 1-4 above, the terminal may restrict that the OFDM symbol length of the first PUSCH repetition to which the second transmission beam is applied is identical to that of the first PUSCH repetition which is determined in method 1-4 above so that the aperiodic CSI reporting is to be multiplexed thereto. For example, the terminal may adjust a transient period so that two PUSCH repetitions determined for multiplexing of the aperiodic CSI reporting have the same length during beam switching between two transmission beams. That is, the terminal may increase the length of the transient period existing between the nominal repetitions in which transmission beam switching is performed, so that the OFDM symbol lengths between the first actual repetitions of the respective transmission beams are identical to each other.

For example, when there is no OFDM symbol position configured as an invalid symbol, the transmission beam mapping method of the multi-TRP-based PUSCH repetition is sequential, the OFDM symbol length of the nominal repetition of repeated PUSCH transmission type B is six, and the number of repeated transmissions is four, the first nominal repetition may be mapped to the first transmission beam and transmitted in OFDM symbols 1 to 6 of slot 1, and the second nominal repetition may be mapped to the first transmission beam and transmitted in OFDM symbols 7 to 12 of slot 1. The third nominal repetition corresponds to the first nominal repetition after the beam switching from the first transmission beam to the second transmission beam, and thus, a transient period may exist between the second and third nominal repetitions.

When the length of the transient period requires one OFDM symbol length, the third nominal repetition may be transmitted in OFDM symbol 14 of slot 1 to OFDM symbol 5 of slot 2, and may be separated into two actual repetitions at the slot boundary. The first actual repetition of the third nominal repetition may be transmitted in OFDM symbol 14 of slot 1, and the second actual repetition may be transmitted in OFDM symbols 1 to 5 of slot 2. In this case, the OFDM symbol length of the first actual repetition to which the first transmission beam is applied may be different from that of the second actual repetition to which the second transmission beam is applied. To make the OFDM symbol lengths be identical, a transmission period corresponding to one OFDM symbol may be added between the second and third nominal repetitions. In this case, the third nominal repetition may be mapped to the second transmission beam and transmitted in OFDM symbols 1 to 6 of slot 2, and the aperiodic CSI reporting may be multiplexed to the first actual repetition of each transmission beam and transmitted.

According to a disclosure, when the OFDM symbol length of the first PUSCH repetition to which the second transmission beam is applied is different from that of the first PUSCH repetition, the aperiodic CSI reporting may be multiplexed only to one of two PUSCH repetitions. In this case, the one PUSCH to which the aperiodic CSI reporting is multiplexed may be pre-defined. That is, the aperiodic CSI reporting may be multiplexed to the first PUSCH repetition or the second PUSCH repetition. Alternatively, the aperiodic CSI reporting may be multiplexed to a shorter or longer PUSCH repetition among two PUSCH repetitions. Alternatively, the aperiodic CSI reporting may be multiplexed to a PUSCH repetition having a large or small amount of resources, among two PUSCH repetitions.

[Method 1-4-3] In continuation of method 1-4-3, when the OFDM symbol length of the first PUSCH repetition to which the second transmission beam is applied is not identical to that of the first PUSCH repetition which is determined in method 1-4 above so that the aperiodic CSI reporting is to be multiplexed thereto, the terminal may compare the amount of resources between two PUSCH repetitions to determine a rate matching scheme according to a PUSCH repetition to which a smaller amount of resources are allocated, and perform multiplexing of the aperiodic CSI reporting to two PUSCH repetitions.

According to an embodiment, referring to [Table 40] above, $Q_{CSI,part1}$ and $Q_{CSI,part2}$ of the first and second PUSCH repetitions may be calculated, respectively, and the aperiodic CSI reporting may be multiplexed to two PUSCH repetitions by using $Q_{CSI,part1}$ and $Q_{CSI,part2}$ having small values.

According to another embodiment, at least one of values $M_{sc,nominal}^{UCI}(1)$, $N_{symb,nominal}^{PUSCH}$, $M_{sc,nominal}^{UCI}(1)$, $N_{symb,actual}^{PUSCH}$ used in the equation in [Table 40] above may be applied in the same way to a multiplexing operation of two PUSCH repetitions. In other words, $M_{sc,nominal}^{UCI}(1)$, $N_{symb,nominal}^{PUSCH}$, $M_{sc,nominal}^{UCI}(1)$, and $N_{symb,actual}^{PUSCH}$ having small values, among $M_{sc,nominal}^{UCI}(1)$, $N_{symb,nominal}^{PUSCH}$, $M_{sc,nominal}^{UCI}(1)$, and $N_{symb,actual}^{PUSCH}$ corresponding to each of two PUSCH repetitions may be used to calculate $Q_{CSI,part1}$ and $Q_{CSI,part2}$ for rate matching of two PUSCH repetitions.

In the embodiments above, the aperiodic CSI reporting may be multiplexed by $Q_{CSI,part1}$ calculating only one of two values of $Q_{CSI,part1}$ and $Q_{CSI,part2}$.

[Method 1-4-4] In continuation of method 1-4, the terminal may determine, as a PUSCH repetition to which the aperiodic CSI reporting is to be multiplexed, the Xth PUSCH repetition having the same length as that of the first PUSCH repetition which is determined in method 1-4 above so that the aperiodic CSI reporting is to be multiplexed thereto, among the PUSCH repetitions to which the second transmission beam is applied. Here, when determining the Xth PUSCH repetition, the number of PUSCH repetitions to which the second transmission beam is applied for comparison whether to have the same OFDM symbol length as that of the first PUSCH repetition may be limited to a Y value configured via higher-layer signaling.

In this case, when there is a case where several PUSCH repetitions have the same length, the terminal may determine, as the PUSCH repetition to which the aperiodic CSI reporting is to be multiplexed, the Xth PUSCH repetition in the earliest order, that is, having the smallest number. When there is no such case (that is, when there is no PUSCH repetition having the same length as that of the first PUSCH repetition among PUSCH repetitions to which the second transmission beam is applied), the terminal may determine the second PUSCH repetition to which the aperiodic CSI reporting is to be multiplexed, in consideration of one of methods 1-4, 1-4-1, 1-4-2, and 1-4-3 above.

[Method 1-5] According to a disclosure, when determining the PUSCH repetition to which the aperiodic CSI reporting is to be multiplexed, the terminal may determine, as the PUSCH repetition, the Xth PUSCH repetition having the same OFDM symbol length for each transmission beam. Here, when determining the Xth PUSCH repetition, the number of PUSCH repetition pairs for comparison whether to have the same OFDM symbol length each transmission beam may be limited to a Y value configured via higher-layer signaling.

For example, when there are four PUSCH repetitions per transmission beam for each of two transmission beams, Y is configured with 2, and the second PUSCH repetition to which the first and second transmission beams are applied have the same OFDM symbol length, the terminal may multiplex the aperiodic CSI reporting to the corresponding PUSCH repetitions. Here, when there is a case where several pairs of PUSCH repetitions having the same length exist, the terminal may determine, as the PUSCH repetition to which the aperiodic CSI reporting is to be multiplexed, the Xth PUSCH repetition pair in the earliest order, that is, having the smallest number. When there is no such case, that is, when the PUSCH repetitions in the same order in two transmission beams have different OFDM symbol lengths, the terminal may determine two PUSCH repetitions to which the aperiodic CSI reporting is to be multiplexed, in consideration of one of methods 1-4, 1-4-1, 1-4-2, and 1-4-3 above.

In methods 1-4, 1-4-1, 1-4-2, 1-4-3, and 1-5 above, for convenience of description, descriptions are made in consideration of two transmission beams only, but the methods may also be generalized into and considered for repeated transmission in consideration of N (>2) or more transmission beams, i.e., N (>2) or more TRPs. In addition, in methods 1-4, 1-4-1, 1-4-2, 1-4-3, and 1-5 above, in determining, by the terminal, a PUSCH repetition to which the aperiodic CSI reporting is to be multiplexed, descriptions are made, for convenience of description, only in consideration of whether PUSCH repetitions have the same number of or different number of OFDM symbols, but the descriptions are made by assuming the same frequency resource allocation between the PUSCH repetitions, and thus, methods 1-4, 1-4-1, 1-4-2, 1-4-3, and 1-5 may be generalized into and considered for not only whether the PUSCH repetitions have the same OFDM symbol number but also whether the PUSCH repetitions have the same resource allocation value. That is, generalization into whether the PUSCH repetitions have the same RE number determined in consideration of both the time and frequency resource allocations is possible.

Fourth Embodiment: Method for Aperiodic/Semi-Persistent CSI Reporting Transmission During Repeated PUSCH Transmission in Consideration of Multi-TRP In an embodiment of the disclosure, the terminal receives a configuration of multi-TRP-based repeated PUSCH transmission type B and receives DCI for receiving scheduling of the aperiodic CSI reporting or activating the semi-persistent SCI reporting, and the corresponding DCI may consider various PUSCH repetition transmission schemes for a case where transport block transmission is not scheduled. In addition, when determining PUSCH repetition to which the aperiodic or semi-persistent CSI reporting is to be multiplexed and the corresponding PUSCH repetition has the length of one OFDM symbol, the PUSCH repetition may be excluded.

[Method 2-1] According to a disclosure, the terminal may assume that the number of nominal repetitions corresponds to one, regardless of the configured number of repeated transmissions of repeated PUSCH transmission type B. In this case, the terminal may apply the first transmission beam among two different transmission beams received through the multi-TRP-based repeated PUSCH transmission configuration, and transmit the same. In this case, it is assumed that the OFDM symbol length of the first nominal repetition is identical to that of the first actual repetition. If the OFDM symbol length of the first nominal repetition is not identical to that of the first actual repetition, the first nominal repetition transmission can be omitted.

[Method 2-1-1] In continuation of method 2-1, the terminal may only consider transmission for one nominal repetition, regardless of the configured number of repeated PUSCH transmissions, the terminal may transmit one PUSCH such as nominal repetition and actual repetition among multiple nominal repetitions and actual repetitions generated by the configured number of repeated transmissions of repeated PUSCH transmission type B, and omit different repeated PUSCH transmissions. In this case, when there are multiple PUSCH transmissions such as the nominal repetition and the actual repetition, the PUSCH repetition in the earliest order may be performed and the remaining repeated PUSCH transmission may be omitted. When the OFDM symbol lengths of all nominal repetitions and actual repetitions are different, the corresponding repeated PUSCH transmission may be omitted.

[Method 2-2] According a disclosure, the terminal may assume that the number of nominal repetitions corresponds to one and the number of actual repetitions corresponds to two, regardless of the configured number of repeated transmissions of repeated PUSCH transmission type B. In this case, each of the actual repetition and the nominal repetition may have a half of the number of OFDM symbols. When the configured OFDM symbol length of the nominal repetition corresponds to an odd number and when the terminal determines the OFDM symbol length of the actual repetition, the terminal may use a value obtained by dividing the OFDM symbol length by 2 and truncating the resulting number.

In this case, the terminal may map the first transmission beam to the first actual repetition and map the second transmission beam to the second actual repetition, regardless of the configuration in which the transmission beam mapping scheme during the multi-TRP-based PUSCH repetition corresponds to a sequential or cyclic scheme. That is, the terminal may apply the cyclic scheme as a transmission beam mapping scheme, regardless of the configuration in which the transmission beam mapping scheme corresponds to a sequential or cyclic scheme. If the OFDM symbol length of the first actual repetition is not identical to that of the second actual repetition, both actual repetitions may be omitted, or one of the (first and second) actual repetition transmissions can be omitted.

[Method 2-3] According to a disclosure, the terminal may assume that the number of nominal repetitions corresponds to two, regardless of the configured number of repeated transmissions of PUSCH repetition type B. In this case, the terminal may map the first transmission beam to the first PUSCH repetition and map the second transmission beam to the second PUSCH repetition, regardless of the configuration in which the transmission beam mapping scheme during the multi-TRP-based PUSCH repetition corresponds to a sequential or cyclic scheme. That is, the terminal may apply the cyclic scheme as a transmission mapping scheme, regardless of the configuration in which the transmission beam mapping scheme corresponds to a sequential or cyclic scheme.

If the OFDM symbol length of the first nominal repetition is not identical to that of the first actual repetition, the first nominal repetition transmission may be omitted. As such, when the first transmission is omitted, the transmission beam for the second transmission may be still mapped to the second transmission beam. In addition, if the OFDM symbol length of the second nominal repetition is not identical to that of the second actual repetition, the second nominal repetition transmission may be omitted. In another example, if the OFDM symbol length of the first nominal repetition is not identical to that of the first actual repetition, both the first and second nominal repetition transmissions may be omitted.

[Method 2-3-1] In continuation of method 2-3 above, the terminal may only consider transmission for two nominal repetitions, regardless of the configured number of repeated PUSCH transmissions, the terminal may transmit one PUSCH transmission for each transmission beam, such as nominal repetition and actual repetition among multiple nominal repetitions and actual repetitions generated by the configured number of repeated PUSCH transmissions, and omit different repeated PUSCH transmissions.

That is, a total of two nominal repetition transmissions may be considered, wherein transmission is performed for the PUSCH in the earliest order among PUSCHs in which the nominal repetition and the actual repetition have the same OFDM symbol length through comparison between all nominal repetitions and actual repetitions for the first transmission beam, and transmission is performed for the PUSCH in the earliest order among PUSCHs in which the nominal repetition and the actual repetition have the same OFDM symbol length through comparison between all nominal repetitions and actual repetitions for the second transmission beam. In this case, there is no case where the nominal repetition and the actual repetition have the same OFDM symbol length for each transmission beam, the corresponding transmission may be omitted.

In methods 2-1 to 2-3-1, for convenience of description, descriptions are made in consideration of two transmission beams only, but the methods may also be generalized into and considered for repeated transmission in consideration of N (>2) or more transmission beams, i.e., N (>2) or more TRPs.

Figure 23:
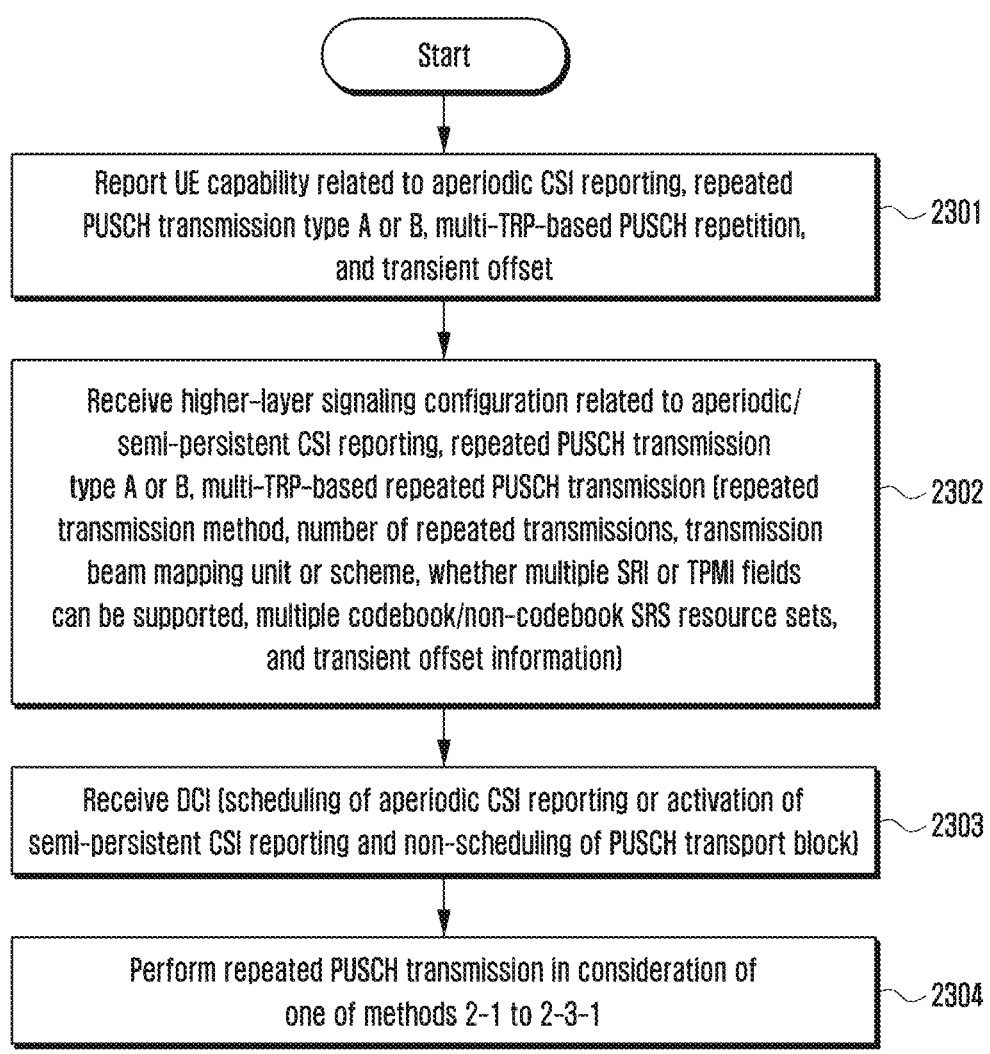
FIG. 23 illustrates an operation of a terminal in consideration of the fourth embodiment of the disclosure.

FIG. 23 illustrates an operation of a terminal in consideration of the fourth embodiment of the disclosure. In FIG. 23, the terminal may report UE capability information to a base station (operation 2301). In this case, transmittable information may include aperiodic CSI reporting-related information, repeated PUSCH transmission type A or B-related information, multi-TRP-based PUSCH repetition-related information, and transient offset-related information when the transmission beam switching in the second embodiment is performed. Thereafter, the terminal may receive higher-layer signaling configuration information from the base station (operation 2302).

In this case, receivable information may include aperiodic/semi-persistent CSI reporting-related information, repeated PUSCH transmission type A or B-related information, multi-TRP-based repeated PUSCH transmission-related information (a repeated transmission method, the number of repeated transmissions, a transmission beam mapping unit or scheme, whether multiple SRI or TPMI fields can be supported, multiple codebook/non-codebook SRS resource sets, etc.), and transient offset-related information when transmission beam switching in the second embodiment is performed. Thereafter, the terminal may receive DCI for scheduling aperiodic CSI reporting, activating the semi-persistent CSI reporting, and scheduling repeated PUSCH transmission not including transport block scheduling (operation 2303), and perform repeated PUSCH transmission in consideration of one of methods 2-1 to 2-3 in determining the repeated PUSCH transmission to which the aperiodic or semi-persistent CSI reporting is to be multiplexed (operation 2304).

Figure 24:
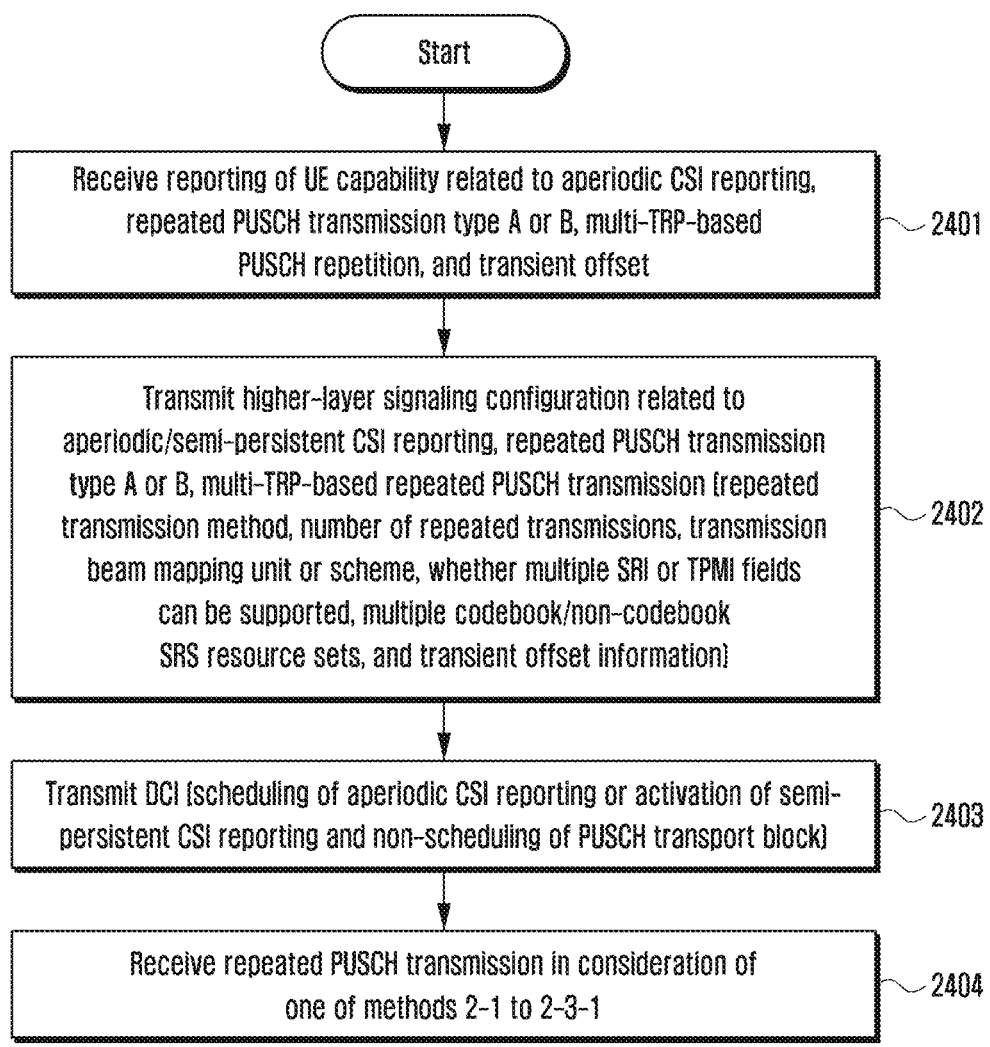
FIG. 24 illustrates an operation of a base station in consideration of the fourth embodiment of the disclosure.

FIG. 24 illustrates an operation of a base station in consideration of the fourth embodiment of the disclosure. In FIG. 24, the base station may receive UE capability reporting from a terminal (operation 2401). In this case, receivable information may include aperiodic CSI reporting-related information, repeated PUSCH transmission type A or B-related information, multi-TRP-based repeated PUSCH transmission-related information, and transient offset-related information when the transmission beam switching in the second embodiment is performed. Thereafter, the base station may transmit higher-layer signaling configuration information to the terminal (operation 2402).

In this case, transmittable information may include aperiodic CSI reporting-related information, repeated PUSCH transmission type A or B-related information, multi-TRP-based PUSCH repetition-related information (a repeated transmission method, the number of repeated transmissions, a transmission beam mapping unit or scheme, whether multiple SRI or TPMI fields can be supported, multiple codebook/non-codebook SRS resource sets, etc.), and transient offset-related information when transmission beam switching in the second embodiment is performed. Thereafter, the base station may transmit DCI for scheduling aperiodic CSI reporting, activating the semi-persistent CSI reporting, and scheduling repeated PUSCH transmission not including transport block scheduling (operation 2403), and receive repeated PUSCH transmission by assuming that one of methods 2-1 to 2-3 is considered while the terminal determines the repeated PUSCH transmission to which the aperiodic or semi-persistent CSI reporting is to be multiplexed (operation 2404).

Figure 25:
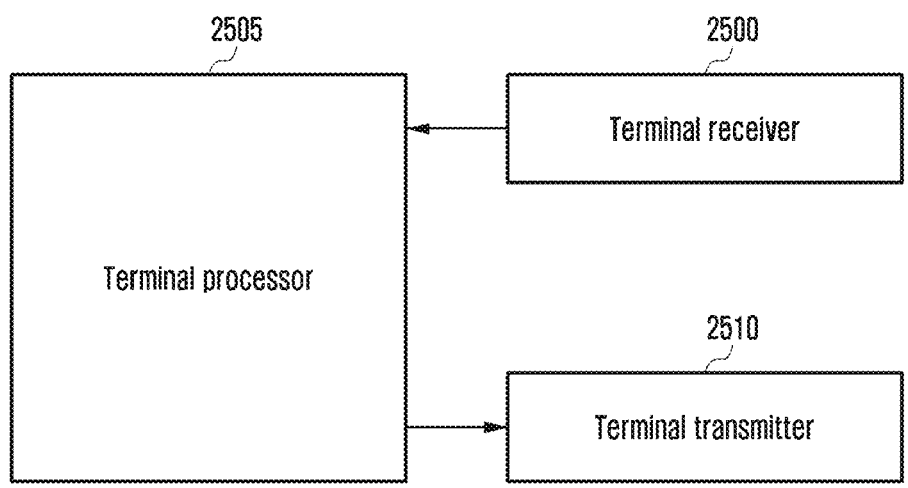
FIG. 25 illustrates a structure of a terminal in a wireless communication system according to an embodiment of the disclosure.

FIG. 25 illustrates a terminal structure in a wireless communication system according to an embodiment of the disclosure.

Referring to FIG. 25, the terminal may include a transceiver indicating a terminal receiver 2500 and a terminal transmitter 2510, a memory (not shown), and a terminal processor 2505 (or a terminal controller or processor). The transceiver 2500 and 2510, the memory, and the terminal processor 2505 of the terminal may operate according to the above-described terminal communication method. However, the elements of the terminal are not limited to the above-described examples. For example, the terminal may include more or fewer components than the above-described elements. In addition, the transceiver, the memory, and the processor may be implemented in the form of a single chip.

The transceiver may transmit or receive a signal to or from a base station. Here, the signal may include control information and data. To this end, the transceiver may include an RF transmitter that up-converts and amplifies the frequency of the transmitted signal, an RF receiver that amplifies the received signal with low noise and down-converts the frequency, and the like. However, this is only an embodiment of the transceiver, and the elements of the transceiver are not limited to the RF transmitter and the RF receiver.

In addition, the transceiver may receive a signal through a wireless channel, output the signal to the processor, and transmit a signal output from the processor through the wireless channel.

The memory may store programs and data necessary for the operation of the terminal. In addition, the memory may store control information or data included in signals transmitted and received by the terminal. The memory may include a storage medium such as a ROM, a RAM, a hard disk, a CD-ROM and a DVD, or a combination of storage media. In addition, there may be multiple memories.

In addition, the processor may control a series of processes so that the terminal operates according to the above-described embodiment. For example, the processor may control an element of the terminal to simultaneously receive multiple PDSCHs by receiving DCI including two layers. There may be multiple processors, and the processor may perform an operation of controlling elements of the terminal by executing a program stored in the memory.

Figure 26:
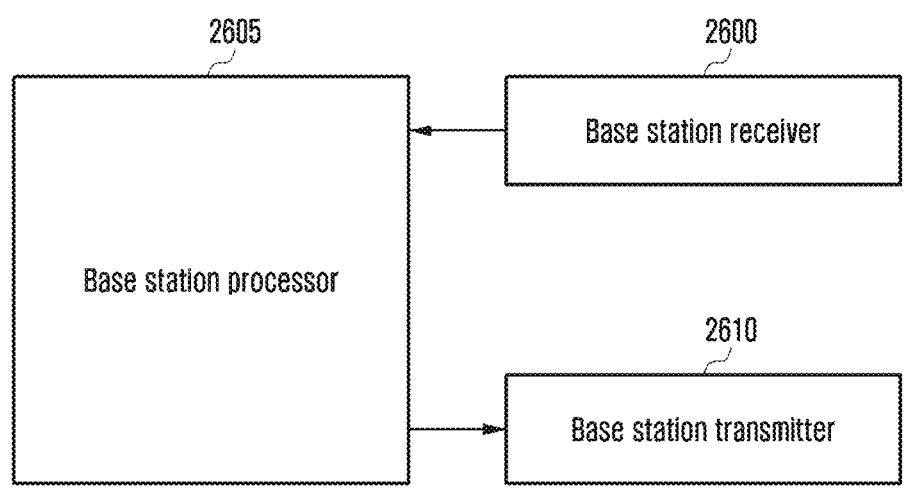
FIG. 26 illustrates a structure of a base station in a wireless communication system according to an embodiment of the disclosure.

FIG. 26 illustrates a structure of a base station in a wireless communication system according to an embodiment of the disclosure.

Referring to FIG. 26, the base station may include a transceiver indicating a base station receiver 2600 and a base station transmitter 2610, a memory (not shown), and a base station processor 2605 (or a base station controller or processor). The transceiver 2600 and 2610, the memory, and the base station processor 2605 of the base station may operate according to the above-described communication method of the base station. However, the elements of the base station are not limited to the examples described above. For example, the base station may include more or fewer elements than the above-described elements. In addition, the transceiver, the memory, and the processor may be implemented in the form of a single chip.

The transceiver may transmit or receive signals to or from the terminal. Here, the signal may include control information and data. To this end, the transceiver may include an RF transmitter that up-converts and amplifies the frequency of the transmitted signal, an RF receiver that amplifies the received signal with low noise and down-converts the frequency, and the like. However, this is only an embodiment of the transceiver, and the elements of the transceiver are not limited to the RF transmitter and the RF receiver.

In addition, the transceiver may receive a signal through a wireless channel, output the signal to the processor, and transmit the signal output from the processor through the wireless channel.

The memory may store programs and data necessary for the operation of the base station. Furthermore, the memory may store control information or data included in signals transmitted and received by the base station. The memory may include a storage medium such as a ROM, a RAM, a hard disk, a CD-ROM and a DVD, or a combination of storage media. In addition, there may be multiple memories.

The processor may control a series of processes so that the base station may operate according to the above-described embodiments of the disclosure. For example, the processor may configure two layers of DCI including allocation information for multiple PDSCHs and control each element of the base station to transmit the same. There may be multiple processors, and the processor may perform an operation of controlling elements of the base station by executing a program stored in the memory.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Further, although the above embodiments have been described based on FDD LTE systems, other variants based on the technical idea of the embodiments may also be implemented in other systems such as TDD LTE, 5G, or NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Various embodiments of the disclosure have been described, but the above description of the disclosure is only for the purpose of illustration and embodiments of the disclosure are not limited to the embodiments set forth herein. Those skilled in the art will appreciate that the disclosure may be changed into other specific forms without making changes to the technical idea or essential features of the disclosure. The scope of the disclosure should be determined not by the above detailed description but by the appended claims, and all changes and modifications derived from the meaning and scope of the claims and concepts equivalent thereto shall be construed as falling within the scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A terminal in a communication system, the terminal comprising:
   a transceiver; and
   a controller operably connected to the transceiver, the controller configured to:
      receive, from a base station, a configuration of a physical uplink shared channel (PUSCH) repetition type B,
      receive, from the base station, downlink control information (DCI) that schedules an aperiodic channel state information (CSI) report or activates a semi-persistent CSI report on a PUSCH, the DCI including a first sounding reference signal (SRS) resource indicator field associated with a first SRS resource set and a second SRS resource indicator field associate with a second SRS resource set,
      identify nominal repetitions and actual repetitions for the PUSCH according to the PUSCH repetition type B, and
      transmit, to the base station, a CSI report on the PUSCH according to the PUSCH repetition type B,
   wherein, in case that the PUSCH is transmitted with a transport block, the CSI report is transmitted on two actual repetitions in response to a first actual repetition associated with the first SRS resource set and a first actual repetition associated with the second SRS resource set including a same number of symbols.

2. The terminal of claim 1, wherein the two actual repetitions comprise the first actual repetition associated with the first SRS resource set and the first actual repetition associated with the second SRS resource set.

3. The terminal of claim 1, wherein, in case that the PUSCH is transmitted with the transport block, the CSI report is transmitted on a first actual repetition among the actual repetitions for the PUSCH, in response to the first actual repetition associated with the first SRS resource set and the first actual repetition associated with the second SRS resource set including a different number of symbols.

4. The terminal of claim 1, wherein, in case that the PUSCH is transmitted with no transport block, a number of nominal repetitions for the PUSCH is determined as two regardless of the number of nominal repetitions configured from the base station.

5. The terminal of claim 4, wherein a first nominal repetition and a second nominal repetitions in the number of nominal repetitions that is determined as two include a same number of symbols corresponding to the first actual repetition and a second actual repetition, respectively, and
   wherein the CSI report is transmitted on the first actual repetition and the second actual repetition.

6. The terminal of claim 4, wherein one of a first nominal repetition or a second normal repetition includes a same number of symbols with a corresponding first actual repetition or second actual repetition, and wherein a nominal repetition that does not include the same number of symbols with corresponding actual repetition is omitted and the CSI report is transmitted on an actual repetition that is not omitted.

7. A base station in a communication system, the base station comprising:

a transceiver; and a controller operably connected to the transceiver, the controller configured to:

transmit, to a terminal, a configuration of a physical uplink shared channel (PUSCH) repetition type B, transmit, to the terminal, downlink control information (DCI) that schedules an aperiodic channel state information (CSI) report or activates a semi-persistent CSI report on a PUSCH, the DCI including a first sounding reference signal (SRS) resource indicator field associated with a first SRS resource set and a second SRS resource indicator field associate with a second SRS resource set, and receive, from the terminal, a CSI report on the PUSCH according to the PUSCH repetition type B, wherein, in case that the PUSCH is received with a transport block, the CSI report is received on two actual repetitions in response to a first actual repetition associated with the first SRS resource set and a first actual repetition associated with the second SRS resource set including a same number of symbols.

8. The base station of claim 7, wherein the two actual repetitions comprise the first actual repetition associated with the first SRS resource set and the first actual repetition associated with the second SRS resource set.

9. The base station of claim 7, wherein, in case that the PUSCH is received with the transport block, the CSI report is received on a first actual repetition among the actual repetitions, in response to the first actual repetition associated with the first SRS resource set and the first actual repetition associated with the second SRS resource set including a different number of symbols.

10. The base station of claim 7, wherein, in case that the PUSCH is received with no transport block, a number of nominal repetitions for the PUSCH is determined as two regardless of the number of nominal repetitions configured to the terminal.

11. The base station of claim 10, wherein a first nominal repetition and a second nominal repetitions in the number of nominal repetitions that is determined as two include a same number of symbols corresponding to the first actual repetition and a second actual repetition, respectively, and wherein the CSI report is received on the first actual repetition and the second actual repetition.

12. The base station of claim 10, wherein one of a first nominal repetition or a second normal repetition includes a same number of symbols with a corresponding first actual repetition or second actual repetition, and wherein a nominal repetition that does not include the same number of symbols with corresponding actual repetition is omitted and the CSI report is received on an actual repetition that is not omitted.

13. A method of a terminal in a communication system, the method comprising:

receiving, from a base station, a configuration of a physical uplink shared channel (PUSCH) repetition type B;

receiving, from the base station, downlink control information (DCI) that schedules an aperiodic channel state information (CSI) report or activates a semi-persistent CSI report on a PUSCH, the DCI including a first sounding reference signal (SRS) resource indicator field associated with a first SRS resource set and a second SRS resource indicator field associate with a second SRS resource set;

identifying nominal repetitions and actual repetitions for the PUSCH according to the PUSCH repetition type B; and transmitting, to the base station, a CSI report on the PUSCH according to the PUSCH repetition type B, wherein, in case that the PUSCH is transmitted with a transport block, the CSI report is transmitted on two actual repetitions, in response to a first actual repetition associated with the first SRS resource set and a first actual repetition associated with the second SRS resource set including a same number of symbols.

14. The method of claim 13, wherein the two actual repetitions comprise the first actual repetition associated with the first SRS resource set and the first actual repetition associated with the second SRS resource set.

15. The method of claim 13, wherein, in case that the PUSCH is transmitted with the transport block, the CSI report is transmitted on a first actual repetition among the actual repetitions for the PUSCH, in response to the first actual repetition associated with the first SRS resource set and the first actual repetition associated with the second SRS resource set including a different number of symbols.

16. The method of claim 13, wherein, in case that the PUSCH is transmitted with no transport block, a number of nominal repetitions for the PUSCH is determined as two regardless of the number of nominal repetitions configured from the base station.

17. A method of a base station in a communication system, the method comprising:

transmitting, to a terminal, a configuration of a physical uplink shared channel (PUSCH) repetition type B;

transmitting, to the terminal, downlink control information (DCI) that schedule an aperiodic channel state information (CSI) report or activates a semi-persistent CSI report on a PUSCH, the DCI including a first sounding reference signal (SRS) resource indicator field associated with a first SRS resource set and a second SRS resource indicator field associate with a second SRS resource set; and receiving, from the terminal, a CSI report on the PUSCH according to the PUSCH repetition type B, wherein, in case that the PUSCH is received with a transport block, the CSI report is received on two actual repetitions, in response to a first actual repetition associated with the first SRS resource set and a first actual repetition associated with the second SRS resource set including a same number of symbols.

18. The method of claim 17, wherein the two actual repetitions comprise the first actual repetition associated with the first SRS resource set and the first actual repetition associated with the second SRS resource set.

19. The method of claim 17, wherein, in case that the PUSCH is received with the transport block, the CSI report is received on a first actual repetition among the actual repetitions, in response to the first actual repetition associated with the first SRS resource set and the first actual repetition associated with the second SRS resource set including a different number of symbols.

20. The method of claim 17, wherein, in case that the PUSCH is received with no transport block, a number of nominal repetitions for the PUSCH is determined as two regardless of the number of nominal repetitions configured to the terminal.

* * * * *